(12) United States Patent
Yi et al.

(10) Patent No.: US 11,118,819 B2
(45) Date of Patent: Sep. 14, 2021

(54) FEEDBACK DEVICE AND THERMAL FEEDBACK PROVIDING METHOD USING SAME

(71) Applicant: TEGWAY CO., LTD., Daejeon (KR)

(72) Inventors: Kyoung Soo Yi, Daejeon (KR); Ock Kyun Oh, Daejeon (KR); Jong Ok Ko, Incheon (KR)

(73) Assignee: TEGWAY CO., LTD., Daejeon (KR)

( * ) Notice: Subject to any disclaimer, the term of this patent is extended or adjusted under 35 U.S.C. 154(b) by 0 days.

(21) Appl. No.: 16/310,430

(22) PCT Filed: Oct. 25, 2017

(86) PCT No.: PCT/KR2017/011867
§ 371 (c)(1),
(2) Date: Dec. 15, 2018

(87) PCT Pub. No.: WO2018/080175
PCT Pub. Date: May 3, 2018

(65) Prior Publication Data
US 2019/0249908 A1    Aug. 15, 2019

Related U.S. Application Data

(60) Provisional application No. 62/415,437, filed on Oct. 31, 2016, provisional application No. 62/449,500, filed on Jan. 23, 2017.

(30) Foreign Application Priority Data

Feb. 6, 2017   (KR) .......................... 10-2017-0016402
May 19, 2017   (KR) .......................... 10-2017-0062589
(Continued)

(51) Int. Cl.
*G05B 15/00*     (2006.01)
*F25B 21/04*     (2006.01)
(Continued)

(52) U.S. Cl.
CPC .............. *F25B 21/04* (2013.01); *A63F 13/00* (2013.01); *G05B 15/02* (2013.01); *H04N 5/222* (2013.01);
(Continued)

(58) Field of Classification Search
None
See application file for complete search history.

(56) References Cited

U.S. PATENT DOCUMENTS 5,709,219 A    1/1998   Chen et al.
5,803,810 A    9/1998   Norton et al.
(Continued)

FOREIGN PATENT DOCUMENTS

EP    2 128 907 A1    12/2009
EP    2 511 793 A2    10/2012
(Continued)

OTHER PUBLICATIONS

KR Office Action dated Jul. 21, 2017 in application No. 10-2016-0071860.
(Continued)

*Primary Examiner* — Paul B Yanchus, III
(74) *Attorney, Agent, or Firm* — Maschoff Brennan

(57) ABSTRACT

The present invention relates to a feedback device and a method of providing thermal feedback using the same. A method for calibration of an intensity of a thermal feedback of a feedback device may comprise: outputting the thermal feedback in order from a weak intensity to a strong intensity among a plurality of intensities of the thermal feedback; obtaining a first user input; setting an intensity of the thermal feedback outputted at the time of the obtaining the first user input to a lowest intensity of the thermal feedback; obtaining a second user input; setting an intensity of the thermal feedback outputted at the time of the obtaining the second
(Continued)

user input to a highest intensity of the thermal feedback; setting at least one intermediate intensity; and outputting the thermal feedback by using the lowest intensity, the highest intensity and the at least one intermediate intensity.

14 Claims, 109 Drawing Sheets

(30) Foreign Application Priority Data

| May 19, 2017 | (KR) | ........................ 10-2017-0062590 |
|---|---|---|
| May 19, 2017 | (KR) | ........................ 10-2017-0062594 |
| May 19, 2017 | (KR) | ........................ 10-2017-0062595 |

(51) Int. Cl.

| *G05B 15/02* | (2006.01) |
|---|---|
| *H04N 5/222* | (2006.01) |
| *A63F 13/00* | (2014.01) |
| *G06F 3/02* | (2006.01) |
| *A47C 1/12* | (2006.01) |
| *A47C 7/74* | (2006.01) |

(52) U.S. Cl.
CPC ............... *A47C 1/12* (2013.01); *A47C 7/742* (2013.01); *A47C 7/748* (2013.01); *G06F 3/02* (2013.01)

(56) References Cited

U.S. PATENT DOCUMENTS

| 5,952,728 | A | 9/1999 | Imanishi et al. |
|---|---|---|---|
| 6,353,623 | B1 | 3/2002 | Munks et al. |
| 6,362,740 | B1 | 3/2002 | Jung |
| 6,496,200 | B1 | 12/2002 | Snibbe et al. |
| 8,016,673 | B2 | 9/2011 | Takatsuka |
| 8,550,905 | B2 | 10/2013 | Mikhailov |
| 8,902,159 | B1 | 12/2014 | Matthews et al. |
| 9,672,702 | B2 | 6/2017 | Coish et al. |
| 10,101,810 | B2 | 10/2018 | Li et al. |
| 2005/0091989 | A1 | 5/2005 | Leija et al. |
| 2008/0238937 | A1* | 10/2008 | Muraki ................ A63F 13/211 345/619 |
| 2009/0131165 | A1 | 5/2009 | Buchner et al. |
| 2009/0149928 | A1 | 6/2009 | Relin |
| 2009/0233710 | A1 | 9/2009 | Roberts |
| 2010/0154856 | A1 | 6/2010 | Hiroyama et al. |
| 2012/0198616 | A1 | 8/2012 | Makansi et al. |
| 2012/0258800 | A1 | 10/2012 | Mikhailov |
| 2013/0021234 | A1 | 1/2013 | Umminger et al. |
| 2014/0022162 | A1* | 1/2014 | Yu ............................ A61N 5/06 345/156 |
| 2014/0165607 | A1 | 6/2014 | Alexander |
| 2014/0192247 | A1 | 7/2014 | Cheong et al. |
| 2014/0194726 | A1 | 7/2014 | Mishelevich et al. |
| 2014/0338713 | A1 | 11/2014 | Nakanuma |
| 2014/0339211 | A1 | 11/2014 | Barfuss et al. |
| 2014/0364212 | A1 | 12/2014 | Osman et al. |
| 2016/0056360 | A1 | 2/2016 | Cho et al. |
| 2016/0098095 | A1 | 4/2016 | Gonzalez-Banos et al. |
| 2016/0133151 | A1 | 5/2016 | O'Dowd et al. |
| 2016/0153508 | A1 | 6/2016 | Battlogg |
| 2016/0238040 | A1 | 8/2016 | Gallo et al. |
| 2016/0246370 | A1 | 8/2016 | Osman |
| 2016/0312505 | A1 | 10/2016 | Wuerth et al. |
| 2017/0192620 | A1 | 7/2017 | Kim et al. |
| 2017/0354190 | A1 | 12/2017 | Cauchy |
| 2017/0365764 | A1 | 12/2017 | Shingai et al. |
| 2018/0095534 | A1 | 4/2018 | Omote |
| 2018/0098635 | A1 | 4/2018 | Jeon et al. |
| 2019/0063797 | A1 | 2/2019 | Yi et al. |
| 2019/0381314 | A1 | 12/2019 | Howard |
| 2020/0046936 | A1 | 2/2020 | Nofzinger et al. |
| 2020/0060905 | A1 | 2/2020 | Bogie et al. |

FOREIGN PATENT DOCUMENTS

| JP | 2003-308009 A | 10/2003 |
|---|---|---|
| JP | 2004-318400 A | 11/2004 |
| JP | 2005-077066 A | 3/2005 |
| JP | 2005-234881 A | 9/2005 |
| JP | 2008-227178 A1 | 9/2008 |
| JP | 2009-018055 A | 1/2009 |
| JP | 2009-276996 A1 | 11/2009 |
| JP | 2012-217861 A | 11/2012 |
| JP | 2013-175627 A | 9/2013 |
| KR | 10-2007-0066931 A | 6/2007 |
| KR | 10-2010-0051386 A | 5/2010 |
| KR | 10-1056950 B1 | 8/2011 |
| KR | 10-2013-0137417 A | 12/2013 |
| KR | 10-2014-015045 A | 9/2014 |
| KR | 10-2014-0105045 A | 9/2014 |
| KR | 10-1493792 B1 | 2/2015 |
| KR | 10-1493797 B1 | 2/2015 |
| KR | 10-2015-0035634 A | 4/2015 |
| KR | 10-2015-0138252 A | 12/2015 |
| KR | 10-2016-0033585 A | 3/2016 |
| KR | 10-2016-0036383 A | 4/2016 |
| KR | 10-2016-0117944 A | 10/2016 |
| KR | 10-2016-0124388 A | 10/2016 |
| KR | 10-2017-0089441 A | 8/2017 |
| WO | 2014/189195 A1 | 11/2014 |
| WO | 2016/021747 A1 | 2/2016 |

OTHER PUBLICATIONS

International Search Report dated Jul. 25, 2017 in application No. PCT/KR2017/004032.
International Search Report dated Jan. 8, 2018 in application No. PCT/KR2017/010428.
International Search Report dated Jan. 9, 2018 in application No. PCT/KR2017/010429.
International Search Report dated Feb. 13, 2018 in application No. PCT/KR2017/011865.
International Search Report dated Mar. 19, 2018 in application No. PCT/KR2017/011867.
International Search Report dated May 29, 2018 in application No. PCT/KR2017/010430.
U.S. Notice of Allowance in U.S. Appl. No. 16/520,350 dated Oct. 25, 2019.
International Search Report in application No. PCT/KR2017/010430 dated May 29, 2018.
U.S. Office Action in U.S. Appl. No. 15/633,341 dated Jun. 13, 2019.
U.S. Notice of Allowance in U.S. Appl. No. 15/858,351 dated Jun. 25, 2019.
U.S. Office Action in U.S. Appl. No. 15/633,501 dated Jun. 27, 2019.
U.S. Office Action in U.S. Appl. No. 16/221,509 dated Jul. 31, 2020.
U.S. Notice of Allowance in U.S. Appl. No. 15/633,501 dated Apr. 2, 2020.
U.S. Notice of Allowance in U.S. Appl. No. 16/310,432 dated Apr. 21, 2020.
EP Search Report in Application No. 17863485.3 dated Oct. 6, 2020.
U.S. Office Action in U.S. Appl. No. 16/221,509 dated Nov. 25, 2020.
International Search Report in Application No. PCT/KR2017/011865 dated Feb. 13, 2018.
International Search Report in Application No. PCT/KR2017/011866 dated Mar. 7, 2018.
International Search Report in Application No. PCT/KR2017/011867 dated Mar. 19, 2018.
Written Opinion in Application No. PCT/KR2017/011865 dated Feb. 13, 2018.
Written Opinion in Application No. PCT/KR2017/011866 dated Mar. 7, 2018.
Written Opinion in Patent Application No. PCT/KR2017/011867 dated Mar. 19, 2018.

(56) References Cited

OTHER PUBLICATIONS

KR Office Action in Application No. 10-2017-0062594 dated Jan. 27, 2021.
U.S. Notice of Allowance in U.S. Appl. No. 15/633,341 dated Oct. 8, 2019.
U.S. Office Action in U.S. Appl. No. 15/633,501 dated Dec. 31, 2019.
U.S. Notice of Allowance in U.S. Appl. No. 16/736,678 dated Apr. 2, 2021.

* cited by examiner

1640

1640

1640

| Thermal feedback intensity | Number of thermoelectric couple groups to which voltage is applied | Thermoelectric couple groups for heat distribution uniformity |
|---|---|---|
| Highest level | 5 | 1,2,3,4,5 |
| Higher middle level | 4 | 1,2,4,5 |
| Middle level | 3 | 1,3,5 |
| Lower middle level | 2 | 2,4 |
| Lowest level | 1 | 3 |

FIG. 18

| Grade | Forward voltage | Thermal feedback saturation temperature | Reverse voltage | Thermal feedback saturation temperature |
|---|---|---|---|---|
| 1 | V1+ | ΔT1+ | V1− | ΔT1−=−ΔT1+ |
| 2 | V2+ | ΔT2+=2ΔT1+ | V2− | ΔT2−=−2ΔT1+ |
| 3 | V3+ | ΔT3+=3ΔT1+ | V3− | ΔT3−=−3ΔT1+ |
| 4 | V4+ | ΔT4+=4ΔT1+ | V4− | ΔT4−=−4ΔT1+ |
| 5 | V5+ | ΔT5+=5ΔT1+ | V5− | ΔT5−=−5ΔT1+ |

| Neutral ratio | First thermoelectric element application voltage | Second thermoelectric element application voltage |
|---|---|---|
| 2 | V1+, V2+ | V2−, V4− |
| 2.5 | V2+ | V5− |
| 3 | V1+ | V3− |
| 4 | V1+ | V4− |
| 5 | V1+ | V5− |

FIG. 21
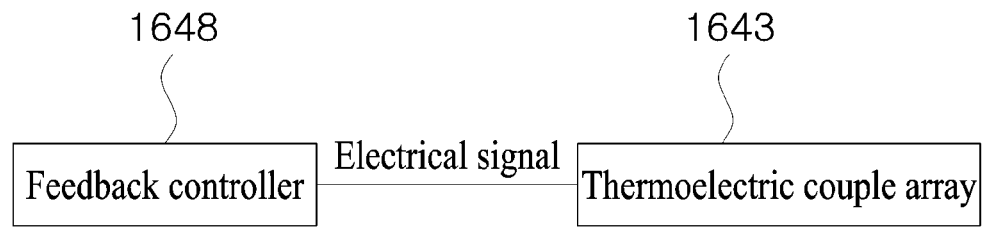
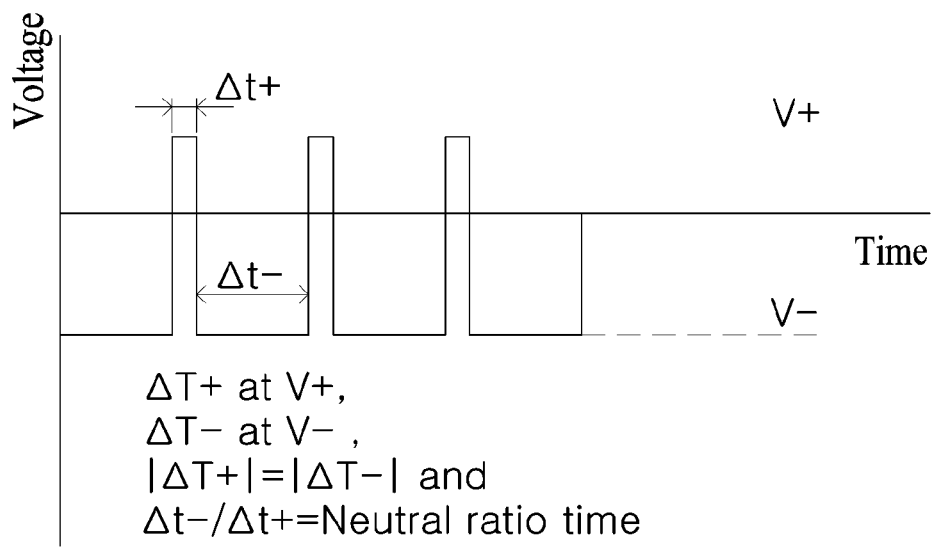

FIG. 22
1640
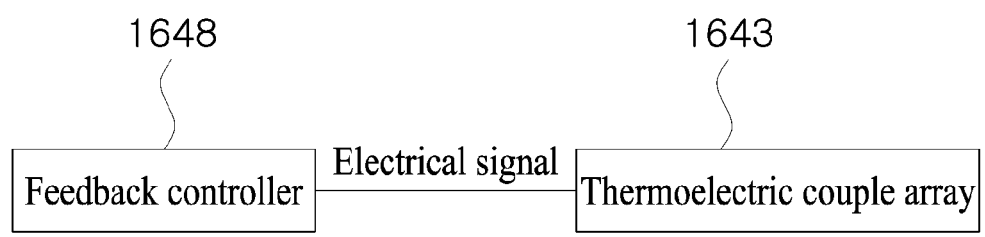
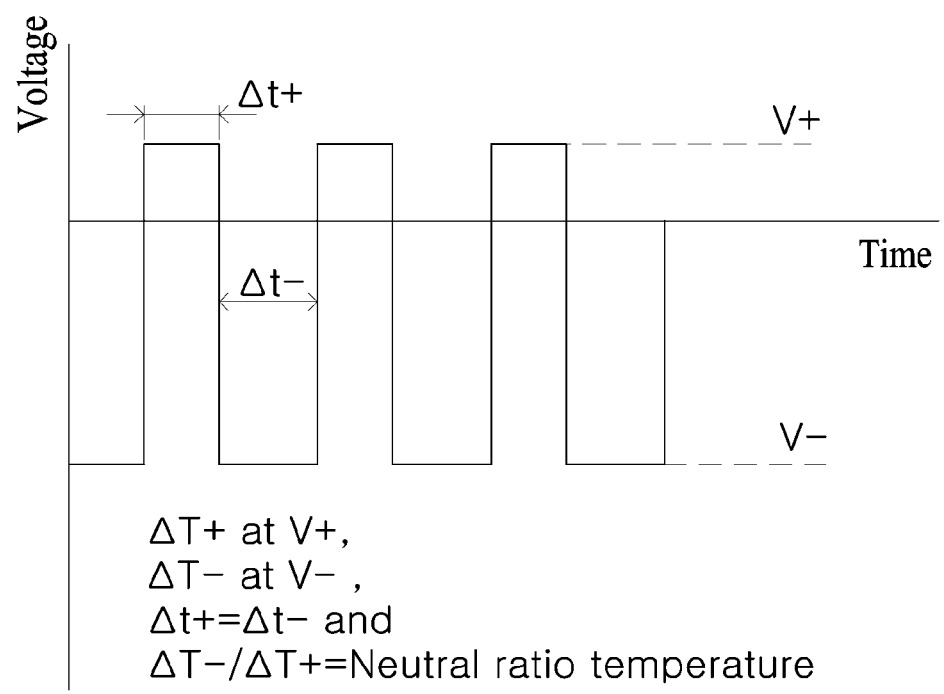
$\Delta T+$ at $V+$,
$\Delta T-$ at $V-$,
$\Delta t+=\Delta t-$ and
$\Delta T-/\Delta T+=$Neutral ratio temperature FIG. 24
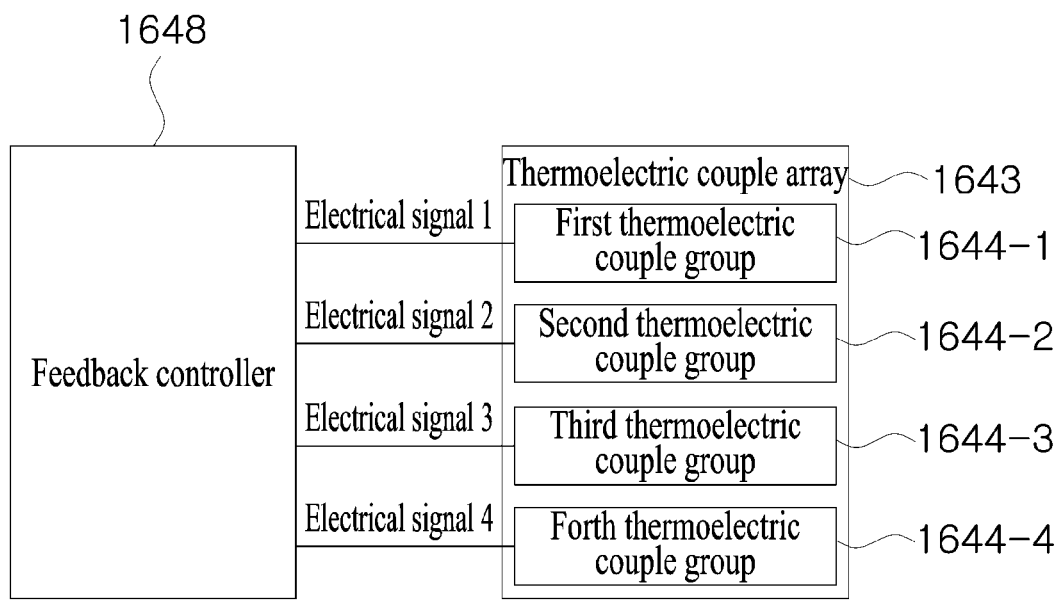
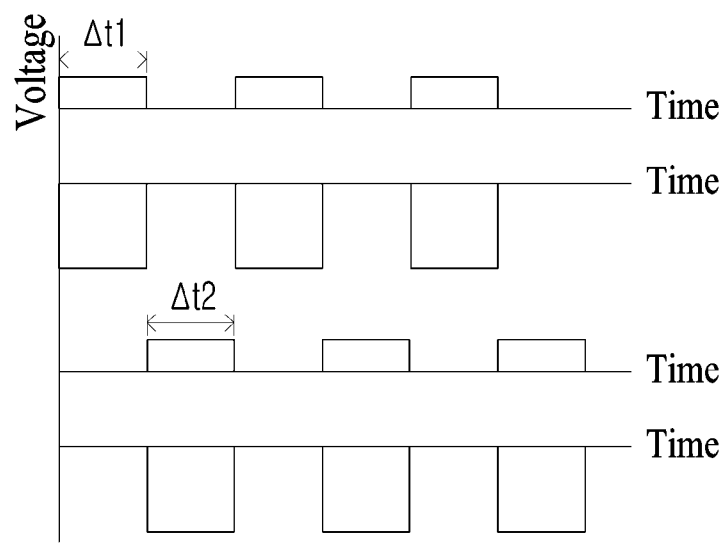

FIG. 40

| Neutral ratio | Voltage applied to first thermoelectric couple group | Voltage applied to second thermoelectric couple group |
|---|---|---|
| 2 | $V_{H-1}$ | $V_{C-2}$ |
| 3 | $V_{H-1}$ | $V_{C-3}$ |
| 4 | $V_{H-1}$ | $V_{C-4}$ |
| 5 | $V_{H-1}$ | $V_{C-5}$ |

FIG. 41

| Reference intensity | Voltage applied to first thermoelectric couple group | Voltage applied to second thermoelectric couple group |
|---|---|---|
| 1 | $V_{H-1}$ | $V_{C-2}$ |
| 2 | $V_{H-2}$ | $V_{C-4}$ |
| 3 | $V_{H-3}$ | $V_{C-6}$ |
| 4 | $V_{H-4}$ | $V_{C-8}$ |
| 5 | $V_{H-5}$ | $V_{C-10}$ |

FIG. 42

| Final intensity | Voltage applied to first thermoelectric couple group | Voltage applied to second thermoelectric couple group |
|---|---|---|
| 1 (Lowest intensity) | $V_{H-2}$ | $V_{C-4}$ |
| 2 (Intermediate intensity) | $V_{H-3}$ | $V_{C-6}$ |
| 3 (Highest intensity) | $V_{H-4}$ | $V_{C-8}$ |

FIG. 43

| Specific intensity | Voltage applied to first thermoelectric couple group | Voltage applied to second thermoelectric couple group |
|---|---|---|
| 1-1 | $V_{H-1}$ | $V_{C-2}$ |
| 1-2 | $V_{H-1}$ | $1.1V_{C-2}$ |
| 1-3 | $V_{H-1}$ | $0.9V_{C-2}$ |
| 1-4 | $1.1V_{H-1}$ | $V_{C-2}$ |
| 1-5 | $1.1V_{H-1}$ | $1.1V_{C-2}$ |
| 1-6 | $1.1V_{H-1}$ | $0.9V_{C-2}$ |
| 1-7 | $0.9V_{H-1}$ | $V_{C-2}$ |
| 1-8 | $0.9V_{H-1}$ | $1.1V_{C-2}$ |
| 1-9 | $0.9V_{H-1}$ | $0.9V_{C-2}$ |

FIG. 44

| Neutral ratio | Area of thermoelectric couple group performing exothermic operation / Forward voltage application time | Area of thermoelectric couple group performing endothermic operation / Reverse voltage application time |
|---|---|---|
| 2 | 1/20ms | 2/40ms |
| 3 | 1/20ms | 3/60ms |
| 4 | 1/20ms | 4/80ms |
| 5 | 1/20ms | 5/100ms |

FIG. 45

| Reference intensity | Voltage applied to thermoelectric couple group performing exothermic operation / Voltage in forward voltage application time | Voltage applied to thermoelectric couple group performing endothermic operation / Voltage in reverse voltage application time |
|---|---|---|
| 1 | $V_{H-1}$ | $V_{C-2}$ |
| 2 | $V_{H-2}$ | $V_{C-4}$ |
| 3 | $V_{H-3}$ | $V_{C-6}$ |
| 4 | $V_{H-4}$ | $V_{C-8}$ |

FIG. 46

| Reference intensity | Voltage applied to thermoelectric couple group performing exothermic operation / Voltage in forward voltage application time | Voltage applied to thermoelectric couple group performing endothermic operation / Voltage in reverse voltage application time |
|---|---|---|
| 1-1 | $V_{H-1}$ | $V_{C-2}$ |
| 1-2 | $V_{H-1}$ | $1.1 V_{C-2}$ |
| 1-3 | $V_{H-1}$ | $0.9 V_{C-2}$ |
| 1-4 | $1.1 V_{H-1}$ | $V_{C-2}$ |
| 1-5 | $1.1 V_{H-1}$ | $1.1 V_{C-2}$ |
| 1-6 | $1.1 V_{H-1}$ | $0.9 V_{C-2}$ |
| 1-7 | $0.9 V_{H-1}$ | $V_{C-2}$ |
| 1-8 | $0.9 V_{H-1}$ | $1.1 V_{C-2}$ |
| 1-9 | $0.9 V_{H-1}$ | $0.9 V_{C-2}$ |

FIG. 49

| Number of identical thermal feedback output regions | Thermoelectric couple group | | | | | | | | | |
|---|---|---|---|---|---|---|---|---|---|---|
| | #1 | #2 | #3 | #4 | #5 | #6 | #7 | #8 | #9 | #10 |
| 10 | a | b | c | d | e | f | g | h | i | j |
| 5 | a | a | b | b | c | c | d | d | e | e |
| 3 | a | a | a | b | b | b | c | c | c | c |
| 2 | a | a | a | a | a | b | b | b | b | b |
| 1 | a | a | a | a | a | a | a | a | a | a |

FIG. 50

| Number of inactive regions | Thermoelectric couple group | | | | | | | | | |
|---|---|---|---|---|---|---|---|---|---|---|
| | #1 | #2 | #3 | #4 | #5 | #6 | #7 | #8 | #9 | #10 |
| 0 | O | O | O | O | O | O | O | O | O | O |
| 2 | O | O | O | O | X | O | O | O | O | X |
| 4 | O | O | O | X | X | O | O | O | X | X |
| 6 | O | O | X | X | X | O | O | X | X | X |
| 8 | O | X | X | X | X | O | X | X | X | X |
| 10 | X | X | X | X | X | X | X | X | X | X |

FIG. 59A

| Output region | Level |
|---|---|

FIG. 59B

| First output region | First level | Second output region | Second level | . . . |
|---|---|---|---|---|

FIG. 59C

| Output region | Level | Type |
|---|---|---|

FIG. 59D

| Device ID | Output region | Level | Type |
|---|---|---|---|

FIG. 85
FIG. 85A
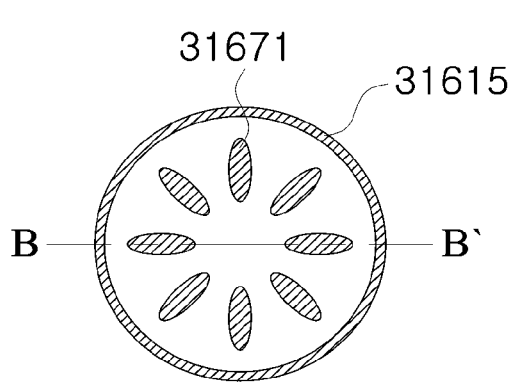
FIG. 85B
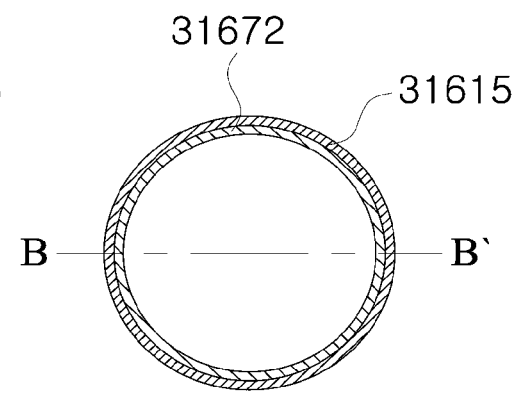
FIG. 85C
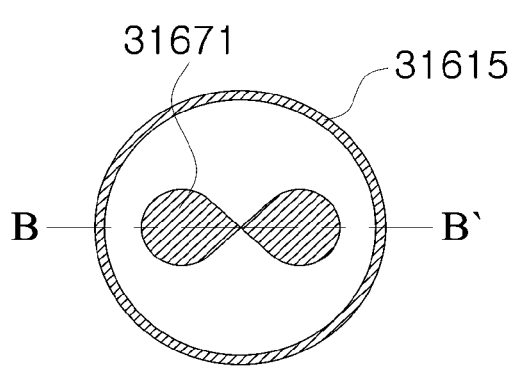
FIG. 85D
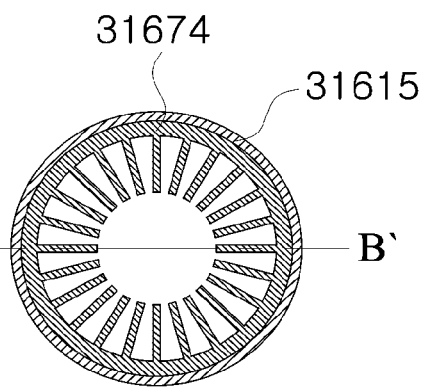

FEEDBACK DEVICE AND THERMAL FEEDBACK PROVIDING METHOD USING SAME

TECHNICAL FIELD

The present invention relates to a feedback device and a method of providing thermal feedback using the same.

BACKGROUND ART

Recently, with the development of technologies for virtual reality (VR) and augmented reality (AR), demands for providing feedback through various senses to improve user's immersion in content have been increasing. In particular, in the 2016 Consumer Electronics Show (CES), virtual reality technology was introduced as one of future promising technologies. With this trend, research is being actively carried out to provide a user experience with respect to all human senses including an olfactory sense and a tactile sense beyond a user experience (UX) which is mainly limited to a visual sense and an auditory sense.

A thermoelement (TE) is a device which produces an exothermic reaction or an endothermic reaction through a Peltier effect by receiving electric energy. The thermoelement is expected to be used for providing thermal feedback to a user. However, a conventional thermoelement mainly using a flat substrate has been limited in application thereof because it is difficult to press the conventional thermoelement against a user's body part.

However, in recent years, as development of a flexible thermoelement (FTE) has reached a successful stage, the flexible thermoelement is expected to overcome the problems of the conventional thermoelectric devices and to effectively transfer thermal feedback to a user.

Meanwhile, in recent years, a 4D theater which aims to maximize enjoyment of multimedia content using various senses, such as a tactile sense, has gained popularity over a conventional theater or movie theater which only depends on visual and auditory senses.

Examples of various effects used in the 4D theater include an effect, referred to as a personal effect or a chair effect, which is applied to each audience member, and an environment effect which creates an overall atmosphere instead of being applied to each chair. Water jet, face jet, seat drop, vibration, leg tickler, neck attack, seat pull-down, or the like are known as the personal effects, and smoke & fog, virtual fire, air bubbles, moving light, strobe, scent machine, or the like are known as the environment effects.

Although there are cases where a thermal effect is used in a 4D theater, currently, the thermal effect merely uses a method in which the surrounding air is heated or cooled and a fan is driven to cause the heated or cooled air to circulate so that heat is transferred. In such a convection type heat transfer method, since it is difficult to accurately adjust the amount of heat transferred to a user, it is difficult to transfer heat only to a local portion of the user's body, and various steps including heating and convection have to be controlled and thus a response speed decreases, and there is a problem in that connection with multimedia being reproduced decreases.

DISCLOSURE

Technical Problem

It is an aspect of the present invention to provide a feedback device configured to provide a thermal feedback to a user and a thermal feedback providing method using the same.

It is another aspect of the present invention to provide a method for calibration of intensities of hot feedback and cold feedback corresponding to characteristics of a user or characteristics of the feedback device.

It is still another aspect of the present invention to provide a method for calibration of an intensity of thermal grill feedback corresponding to characteristics of a user or characteristics of the feedback device.

It is yet another aspect of the present invention to provide a method for calibration that prevents damage to a user's body in a process for calibration of thermal feedback.

It is yet another aspect of the present invention to provide a method of providing thermal feedback capable of improving compatibility between a content reproduction device which reproduces multimedia content and a feedback device which provides thermal feedback to a user.

It is yet another aspect of the present invention to provide a method of providing thermal feedback for outputting thermal feedback from a plurality of feedback devices without an error even when the plurality of feedback devices have different instruction systems.

It is yet another aspect of the present invention to provide a feedback device capable of providing a thermal experience according to multimedia content reproduced in a mobile device and a method of providing thermal feedback using the same.

It is yet another aspect of the present invention to provide a feedback device capable of improving user immersion into content by mounting a mobile device and linking multimedia content reproduced in the mobile device and thermal feedback to each other and a method of providing thermal feedback using the same.

It is yet another aspect of the present invention to provide a special effect control system and a special effect chair capable of providing a thermal experience to a user by outputting thermal feedback while reproducing multimedia content.

It is yet another aspect of the present invention to provide, while screening multimedia content in a 4D theater or a theater providing special effects, direct thermal feedback including coldness, hotness, or a sensation of pain to a user in real time using a method of conduction due to contact between the user and a thermoelectric element at a time point at which a special effect is necessary in sync with the multimedia content being screened.

It is yet another aspect of the present invention to maintain a high level of thermal feedback sensitivity and safely provide thermal feedback by effectively dissipating waste heat generated according to provision of thermal feedback to outside of a special effect providing device.

The technical problem of the present invention is not limited to the aforementioned problems, and other problems which are not mentioned here can be clearly understood by those skilled in the art from the following description and the accompanying drawings.

Technical Solution

According to an aspect of the present invention, a method for calibration of an intensity of a thermal feedback of a feedback device transferring the thermal feedback to a user by using a heat output module performing a thermoelectric operation including an exothermic operation or an endothermic operation, the method may comprise: outputting the thermal feedback in order from a weak intensity to a strong intensity among a plurality of intensities of the thermal feedback; obtaining a first user input indicating user recognition for the thermal feedback; setting an intensity of the thermal feedback outputted at the time of the obtaining the first user input to a lowest intensity of the thermal feedback; when the thermal feedback is outputted at a certain intensity among the plurality of intensities after obtaining the first user input, obtaining a second user input; setting an intensity of the thermal feedback outputted at the time of the obtaining the second user input to a highest intensity of the thermal feedback; setting at least one intermediate intensity for the thermal feedback between the lowest intensity and the highest intensity; and outputting the thermal feedback by using the lowest intensity, the highest intensity and the at least one intermediate intensity.

According to another aspect of the present invention, there is provided a method for calibration of thermal feedback of a feedback device transferring the thermal feedback to a user by using a heat output module performing a thermoelectric operation including an exothermic operation, an endothermic operation, or a combination thereof, the method including obtaining intensity information on hot feedback output as the exothermic operation is performed, obtaining intensity information on cold feedback output as the endothermic operation is performed, and setting an intensity of thermal grill feedback performed according to the combination of the exothermic operation and the endothermic operation by using the intensity information on the hot feedback and the intensity information on cold feedback.

According to another aspect of the present invention, there is provided a method of controlling a control unit providing thermal feedback control data to a feedback device outputting thermal feedback by transferring heat, which is generated by a thermoelectric operation including at least one of an exothermic operation and an endothermic operation of a thermoelectric element which has received power, to a user through a contact surface contacting a body part of the user, the method including: when a thermal event that causes the thermal feedback occurs in an application providing a thermal experience through thermal feedback, obtaining thermal feedback data including information on at least one of a type, an intensity, and an output region of the thermal feedback caused by the thermal event; obtaining the thermal feedback control data configured in a format understandable by the feedback device based on the thermal feedback data; and providing the thermal feedback control data to the feedback device so that the feedback device outputs the thermal feedback according to the information on at least one of the type, the intensity, and the output region of the thermal feedback included in the thermal feedback data.

According to another aspect of the present invention, there is provided a feedback device for providing a thermal experience corresponding to a thermal event to a user when multimedia content including the thermal event is driven in a mobile device, the feedback device including: a casing including a mounting portion mounting the mobile device and a body portion providing a grip portion gripped by the user; a communication module performing communication with the mobile device; a heat output module including a contact surface disposed at the grip portion to provide thermal feedback corresponding to the thermal event to a hand of the user and a thermoelectric element performing a thermoelectric operation for the thermal feedback, the heat output module outputting the thermal feedback by transferring heat generated by the thermoelectric operation to the user through the contact surface; and a feedback controller configured to control the communication module and the heat output module, wherein, when the thermal event occurs during the driving of the multimedia content in the mobile device mounted by the mounting portion, the feedback controller receives a thermal feedback signal for output of the thermal feedback from the mobile device and applies power for the thermoelectric operation of the thermoelectric element to the heat output module so that the thermal feedback according to the thermal feedback signal is output.

According to another aspect of the present invention, there is provided a special effect chair providing thermal feedback to a user by being linked to reproduction of multimedia content, the special effect chair including: a communication unit receiving thermal feedback data; a seating portion sittable for a user; a heat output module including a thermoelectric element generating heat by a thermoelectric operation and a power terminal applying power to the thermoelectric element; a contact portion transferring heat generated by the thermoelectric element to a portion of the user's body using a heat conduction method by contacting the portion of the user's body and touching the thermoelectric element; a heat dissipation module for dissipating waste heat generated in the special effect chair, wherein the waste heat is different from the thermal feedback provided to the user; and a controller controlling operations of the heat output module and the heat dissipation module so that the thermal feedback is provided on the basis of the thermal feedback data.

Technical solutions of the present invention are not limited to the aforementioned solutions, and other solutions which are not mentioned here can be clearly understood by those skilled in the art from the following description and the accompanying drawings.

Advantageous Effects

According to the present invention, it is possible to provide a thermal feedback to a user.

Further, according to the present invention, by providing thermal pain using warmth and coldness, a sensation of pain as well as warmth can be provided.

Further, according to the present invention, by outputting hot feedback, cold feedback, and thermal grill feedback having an intensity suitable for characteristics of a user or characteristics of a feedback device, a user experience can be improved.

Further, according to the present invention, by preventing damage due to thermal feedback to user's skin, user safety can be guaranteed.

Further, according to the present invention, compatibility between a content reproduction device which reproduces multimedia content and a feedback device which provides thermal feedback to a user can be improved.

Further, according to the present invention, thermal feedback can be output from a plurality of feedback devices without an error even when the plurality of feedback devices have different instruction systems.

Further, according to the present invention, a thermal experience can be provided as one user experience with multimedia content.

Further, according to the present invention, in reproducing multimedia content, by linking a thermal experience to visual and auditory experiences or outputting thermal feedback in a form suitable for a situation presented to a user by the multimedia content, immersion into the multimedia content can be improved.

Further, according to the present invention, since a mobile device is mounted on a feedback device, since a thermal event of multimedia content provided by the mobile device is changed according to movement of the feedback device, and since thermal feedback corresponding to the changed thermal event is output, immersion into multimedia content can be improved.

Further, according to the present invention, by outputting thermal feedback while reproducing multimedia content in a 4D theater, a thermal experience can be provided to a user.

Further, according to the present invention, by improving connection between visual and auditory outputs of multimedia content and thermal feedback, user immersion into the content can be improved.

Further, according to the present invention, by transferring heat using a method in which a thermoelectric element comes into contact with a user's body, thermal feedback can be precisely controlled.

Further, according to the present invention, by effectively dissipating waste heat, feedback sensitivity can be maintained to a predetermined level and a user can be protected from an accident that may occur due to accumulated waste heat.

Advantageous effects of the invention are not limited to the aforementioned effects, and other advantageous effects which are not mentioned here will be clearly understood by those skilled in the art from the following description and the accompanying drawings.

DESCRIPTION OF DRAWINGS

FIG. 18 is a table regarding a voltage for providing a neutral thermal grill feedback through voltage adjustment according to an embodiment of the present invention.

FIG. 21 is a view related to an example of a thermal grill operation using a time division method according to an embodiment of the present invention.

FIG. 22 is a view related to another example of a thermal grill operation using the time division method according to an embodiment of the present invention.

FIG. 24 is a view related to another example of a thermal grill operation using the method in which region adjustment and time division are combined according to an embodiment of the present invention.

FIG. 40 is a table related to voltages for providing thermal grill feedback based on neutral ratios according to an embodiment of the present invention.

FIG. 41 is a table related to voltages for providing thermal grill feedback based on reference intensities according to an embodiment of the present invention.

FIG. 42 is a table related to voltages for providing thermal grill feedback based on final intensities according to an embodiment of the present invention.

FIG. 43 is a table related to voltages for providing thermal grill feedback based on specific intensities according to an embodiment of the present invention.

FIG. 44 is a table related to voltages for providing thermal grill feedback based on neutral ratios and application times of the voltage according to an embodiment of the present invention.

FIG. 45 is a table related to voltages for providing thermal grill feedback based on reference intensities according to an embodiment of the present invention.

FIG. 46 is a table related to voltages for providing thermal grill feedback based on specific intensities according to an embodiment of the present invention.

FIG. 49 is a table for describing settings of identical thermoelectric feedback output regions according to an embodiment of the present invention.

FIG. 50 is a table for describing settings of inactive regions according to an embodiment of the present invention.

FIGS. 58 and 59A-59D are views for describing packet structures of thermal feedback control data according to an embodiment of the present invention.

FIGS. 85 and 85A-85D are schematic diagrams of an implementation of a heat dissipation member according to an embodiment of the present invention.

BEST MODE OF THE INVENTION

Figure 1:
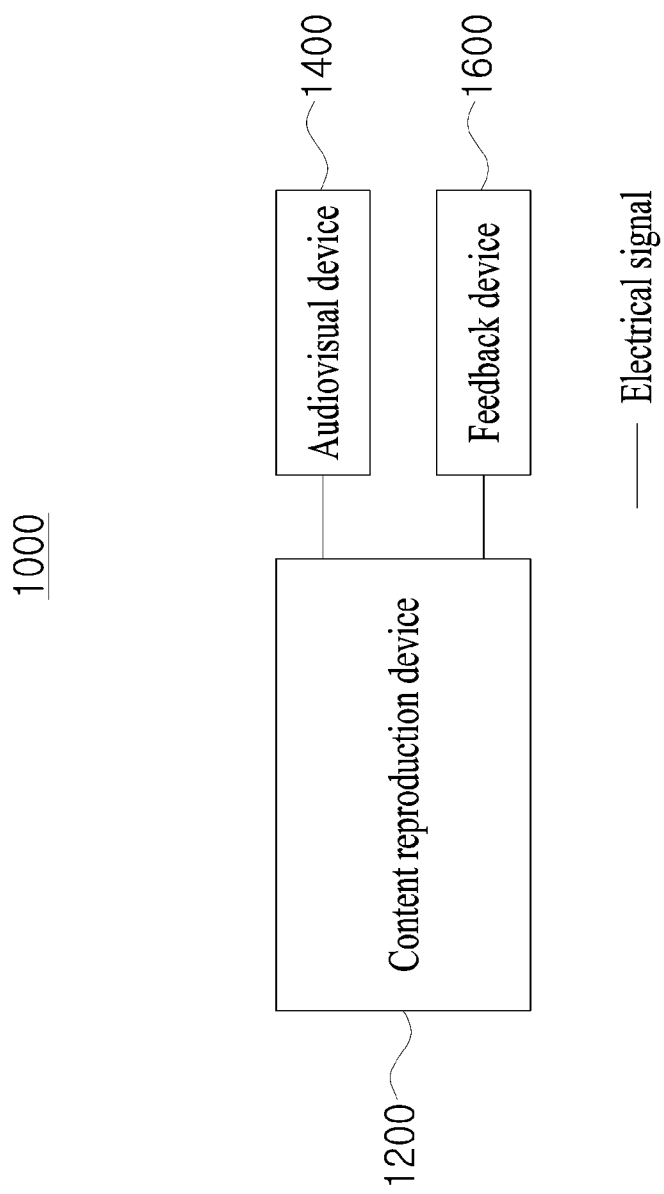
FIG. 1 is a block diagram showing a configuration of a thermal experience providing system 1000 according to an embodiment of the present invention.

To achieve the above aspects, according to an embodiment of the present invention, there is provided a method for calibration of an intensity of a thermal feedback of a feedback device transferring the thermal feedback to a user by using a heat output module performing a thermoelectric operation including an exothermic operation or an endothermic operation, the method may comprise: outputting the thermal feedback in order from a weak intensity to a strong intensity among a plurality of intensities of the thermal feedback; obtaining a first user input indicating user recognition for the thermal feedback; setting an intensity of the thermal feedback outputted at the time of the obtaining the first user input to a lowest intensity of the thermal feedback; when the thermal feedback is outputted at a certain intensity among the plurality of intensities after obtaining the first user input, obtaining a second user input; setting an intensity of the thermal feedback outputted at the time of the obtaining the second user input to a highest intensity of the thermal feedback; setting at least one intermediate intensity for the thermal feedback between the lowest intensity and the highest intensity; and outputting the thermal feedback by using the lowest intensity, the highest intensity and the at least one intermediate intensity.

MODES OF THE INVENTION

Because embodiments described herein are for clearly describing the spirit of the present invention to one of ordinary skill in the art to which the present invention pertains, the present invention is not limited by the embodiments described herein, and the scope of the present invention should be construed as including modifications that do not depart from the spirit of the present invention.

Terms used herein are currently widely used general terms that are selected in consideration of functions in the present invention, but the terms may vary depending on an intention, and practice of one of ordinary skill in the art to which the present invention pertains or the advent of new technology. However, to the contrary, when a specific term is arbitrarily defined and used, a definition of the term will be separately given. Consequently, the terms used herein should be interpreted on the basis of substantial meanings thereof and entire content herein instead of being interpreted simply on the basis of the names of the terms.

The accompanying drawings are for facilitating description of the present invention. Because shapes illustrated in the drawings may be exaggerated as necessary to assist in understanding the present invention, the present invention is not limited by the drawings.

When detailed descriptions of known configurations or functions related to the present invention are deemed as having the possibility of blurring the gist of the present invention, the detailed descriptions thereof will be omitted as necessary.

According to an aspect of the present invention, a method for calibration of an intensity of a thermal feedback of a feedback device transferring the thermal feedback to a user by using a heat output module performing a thermoelectric operation including an exothermic operation or an endothermic operation, the method may comprise: outputting the thermal feedback in order from a weak intensity to a strong intensity among a plurality of intensities of the thermal feedback; obtaining a first user input indicating user recognition for the thermal feedback; setting an intensity of the thermal feedback outputted at the time of the obtaining the first user input to a lowest intensity of the thermal feedback; when the thermal feedback is outputted at a certain intensity among the plurality of intensities after obtaining the first user input, obtaining a second user input; setting an intensity of the thermal feedback outputted at the time of the obtaining the second user input to a highest intensity of the thermal feedback; setting at least one intermediate intensity for the thermal feedback between the lowest intensity and the highest intensity; and outputting the thermal feedback by using the lowest intensity, the highest intensity and the at least one intermediate intensity.

Herein, when the thermal feedback is a hot feedback according to the exothermic operation, a temperature of a contact surface of the heat output module at the time of outputting the hot feedback may be lower than a critical temperature set for user's body protection, and a temperature of the contact surface at the time of outputting the hot feedback of the highest intensity may be lower than the critical temperature.

Herein, when the thermal feedback is a cold feedback according to the endothermic operation, a temperature of a contact surface of the heat output module at the time of outputting the cold feedback may be higher than a critical temperature set for user's body protection, and a temperature of the contact surface at the time of outputting the cold feedback of the highest intensity may be higher than the critical temperature.

Herein, the method may further comprise: stopping an output of the thermal feedback after the first user input is obtained; and outputting the thermal feedback at an intensity stronger than an intensity of the thermal feedback outputted at the time of obtaining the first user input after a predetermined time after an output of the thermal feedback is stopped.

Herein, the method may further comprise: outputting the thermal feedback successively at an intensity stronger than an intensity of the thermal feedback outputted at the time of obtaining the first user input after the first user input is obtained.

Herein, the method may further comprise: stopping an output of the thermal feedback when the second user input is obtained.

Herein, the setting at least one intermediate intensity may be comprising: calculating at least one interpolated voltage value by interpolating a first voltage value applied from the heat output module at the time of outputting the thermal feedback of the lowest intensity and a second voltage value applied from the heat output module at the time of outputting the thermal feedback of the highest intensity; and setting an intensity corresponding to each of the at least one interpolated voltage value to the at least one intermediate intensity.

Herein, the setting at least one intermediate intensity may be comprising: calculating at least one interpolated temperature by interpolating a first temperature at a contact surface of the heat output module at the time of outputting the thermal feedback of the lowest intensity and a second temperature at a contact surface of the heat output module at the time of outputting the thermal feedback of the highest intensity; and setting an intensity corresponding to each of the at least one interpolated temperature to the at least one intermediate intensity.

Herein, the setting at least one intermediate intensity may be comprising: setting a preset intensity to the at least one intermediate intensity, and wherein a voltage value applied from the heat output module or a temperature at a contact surface of the heat output module at the time of outputting the thermal feedback of the at least one intermediate intensity may be greater than a first voltage value applied from the heat output module at the time of outputting the thermal feedback of the lowest intensity, or higher than a first temperature at a contact surface of the heat output module at the time of outputting the thermal feedback of the lowest intensity, and less than a second voltage value applied from the heat output module at the time of outputting the thermal feedback of the highest intensity, or lower than a second temperature at a contact surface of the heat output module at the time of outputting the thermal feedback of the highest intensity.

Herein, the number of the at least one intermediate intensity may be determined according to the number of the plurality of intensities.

Herein, the first user input and the second user input may be obtained by a user input module, and the user input module may include one of a button or a pressure sensor.

Herein, the outputting the thermal feedback by using the lowest intensity, the highest intensity and the at least one intermediate intensity may be comprising: checking whether the thermal feedback of the lowest intensity, the highest intensity and the at least one intermediate intensity are distinguished or not; and outputting the thermal feedback by using the lowest intensity, the highest intensity and the at least one intermediate intensity when the thermal feedback of the lowest intensity, the highest intensity and the at least one intermediate intensity are distinguished.

Herein, the method may further comprise: providing at least one of a video signal or an audio signal related to the calibration to an audiovisual device to obtain the first user input and the second user input from the user.

Herein, the feedback device may comprise: a plurality of thermoelectric couple groups performing a thermoelectric operation for the thermal feedback, wherein power is individually applied to each of the plurality of thermoelectric couple groups so that the plurality of thermoelectric couple groups are individually controlled; and a contact surface transferring heat generated by individual thermoelectric operation in each of the plurality of thermoelectric couple groups to the user by contacting the user's body, and the outputting the thermal feedback by using the lowest intensity, the highest intensity and the at least one intermediate intensity may be comprising: applying power to each of the plurality of thermoelectric couple groups to output a thermal feedback at an intensity of one of the lowest intensity, the highest intensity and the at least one of intermediate intensity; obtaining a third user input indicating an inactive thermoelectric couple group which does not output the thermal feedback among the plurality of thermoelectric couple groups; and not applying the power to the inactive thermoelectric couple group so that the thermal feedback is not outputted from the inactive thermoelectric couple group indicated by the third user input.

Herein, the feedback device may comprise: a thermoelectric element performing a thermoelectric operation for the thermal feedback, wherein power is applied to the thermoelectric element for the thermoelectric operation; and a contact surface transferring heat generated by a thermoelectric operation to the user by contacting the user's body, and wherein a thermal experience is provided to a user in reproducing a multimedia content including a video data related to a video and a thermal feedback data related to a thermal feedback interlocked with a specific scene of the video, and wherein the outputting the thermal feedback by using the lowest intensity, the highest intensity and the at least one intermediate intensity may be comprising: applying power to the thermoelectric element at a predetermined time point to output the thermal feedback at an intensity of one of the lowest intensity, highest intensity and the at least one of intermediate intensity; obtaining a fourth user input indicating an experiencing time point, which is a time point at which the contact surface reaches a temperature experienced by the user and thus the user experiences the thermal feedback; calculating a correction time indicating a time required from the start of the thermoelectric operation until the contact surface reaches a temperature experienced by the user by using the predetermined time point and the experiencing time point; and applying the power to the thermoelectric element when a thermoelectric operation start time point set at a time point preceding an output time point of the specific scene is reached by considering the correction time so that the specific scene and the thermal feedback are interlocked and provided to the user at an output time point of the specific scene.

According to another aspect of the present invention, a feedback device transferring a thermal feedback to a user by using a heat output module performing a thermoelectric operation including an exothermic operation or an endothermic operation, the feedback device may comprise: a thermoelectric element performing a thermoelectric operation for the thermal feedback; and a feedback controller controlling the thermoelectric element, and wherein the feedback controller may output the thermal feedback in order from a weak intensity to a strong intensity among a plurality of intensities of the thermal feedback by applying power to the thermoelectric element, obtain a first user input indicating user recognition for the thermal feedback, and set an intensity of the thermal feedback outputted at the time of obtaining the first user input to a lowest intensity of the thermal feedback, when the thermal feedback is outputted to a certain intensity among the plurality of intensities after obtaining the first user input, obtain a second user input, and set an intensity of the thermal feedback outputted at the time of obtaining the second user input to a highest intensity of the thermal feedback, and set at least one intermediate intensity for the thermal feedback between the lowest intensity and the highest intensity, and apply power to the thermoelectric element to output the thermal feedback by using the lowest intensity, the highest intensity and the at least one intermediate intensity.

According to another aspect of the present invention, a thermal experience providing system, the system may comprise: a feedback device transferring a thermal feedback to a user by using a heat output module performing a thermoelectric operation including an exothermic operation or an endothermic operation; and an audiovisual device outputting video or audio using a video signal or an audio signal from the feedback device, wherein the feedback device may output the thermal feedback in order from a weak intensity to a strong intensity among a plurality of intensities of the thermal feedback, obtain a first user input indicating user recognition for the thermal feedback, and set an intensity of the thermal feedback outputted at the time of the obtaining the first user input to a lowest intensity of the thermal feedback, wherein the feedback device provides a video signal or an audio signal related to an output of the thermal feedback to the audiovisual device so that the first user input is obtained from the user, obtain a second user input when the thermal feedback is outputted at a certain intensity among the plurality of intensities after obtaining the first user input, and set an intensity of the thermal feedback outputted at the time of the obtaining the second user input to a highest intensity of the thermal feedback, wherein the feedback device provides a video signal or an audio signal related to an output of a thermal feedback outputted after the audiovisual device obtains the first user input to the audiovisual device so that the second user input is obtained from the user, and set at least one intermediate intensity for the thermal feedback between the lowest intensity and the highest intensity, and output the thermal feedback by using the lowest intensity, the highest intensity and the at least one intermediate intensity.

According to another aspect of the present invention, there is provided a method for calibration of thermal feedback in a feedback device transferring the thermal feedback to a user by using a heat output module performing a thermoelectric operation including an exothermic operation, an endothermic operation, or a combination thereof, the method including: obtaining intensity information on hot feedback output as the exothermic operation is performed; obtaining intensity information on cold feedback output as the endothermic operation is performed; and setting an intensity of thermal grill feedback performed according to the combination of the exothermic operation and the endothermic operation by using the intensity information on the hot feedback and the intensity information on cold feedback.

Here, the setting of the intensity of the thermal grill feedback may include: setting a neutral ratio indicating a ratio between hotness according to the exothermic operation and coldness according to the endothermic operation by using the intensity information on the hot feedback and the intensity information on the cold feedback and setting an intensity of the thermal feedback on the basis of the set neutral ratio.

Here, the setting of the neutral ratio may include: applying the intensity information on the hot feedback and the intensity information on the cold feedback to a plurality of preset neutral ratios; outputting the thermal grill feedback according to the plurality of preset neutral ratios; obtaining a first user input indicating user recognition for the thermal grill feedback; and setting, among the plurality of preset neutral ratios, a neutral ratio output at the time of the obtaining of the first user input as the neutral ratio of the thermal feedback.

Here, the applying of the intensity information on the hot feedback and the intensity information on the cold feedback to the preset neutral ratios may include applying an intensity lower than an intensity of the cold feedback applied to the preset neutral ratios as an intensity of the hot feedback applied to the preset neutral ratios.

Here, the applying of the intensity information on the hot feedback and the intensity information on the cold feedback to the preset neutral ratios may include applying an intensity equal to an intensity of the cold feedback applied to the preset neutral ratios as an intensity of the hot feedback applied to the preset neutral ratios, wherein a ratio between a region in which the hot feedback is output and a region in which the cold feedback is output is adjusted to be different for each of the preset neutral ratios.

Here, the applying of the intensity information on the hot feedback and the intensity information on the cold feedback to the preset neutral ratios may include applying an intensity equal to an intensity of the cold feedback applied to the preset neutral ratios as an intensity of the hot feedback applied to the preset neutral ratios, wherein a time at which the hot feedback is output and a time at which the cold feedback is output are adjusted to be different for each of the preset neutral ratios.

Here, the setting of the intensity of the thermal grill feedback may include setting a plurality of reference intensities on the basis of the preset neutral ratios and setting final intensities of the thermal feedback on the basis of the set plurality of reference intensities.

Here, the setting of the intensity of the thermal feedback on the basis of the set plurality of reference intensities may include: outputting the thermal grill feedback in order from a weak intensity to a strong intensity among the set plurality of reference intensities; obtaining a second user input indicating user recognition for the thermal grill feedback; setting a reference intensity of the thermal grill feedback output at the time of the second user input to a lowest intensity among the final intensities of the thermal grill feedback; when the thermal grill feedback is output at a certain intensity among the reference intensities after the obtaining of the second user input, obtaining a third user input indicating a strongest reference intensity acceptable by the user; setting an intensity of the thermal grill feedback output at the time of the obtaining of the third user input to a highest intensity among the final intensities of the thermal grill feedback; and setting at least one intermediate intensity for the thermal grill feedback between the lowest intensity and the highest intensity.

Here, the plurality of reference intensities may be lower than a critical intensity of the thermal grill feedback set for the user's body protection.

Here, the at least one intermediate intensity may indicate, among the reference intensities, a reference intensity between a reference intensity corresponding to the lowest intensity and a reference intensity corresponding to the highest intensity.

Here, when, among the reference intensities, a reference intensity between the reference intensity corresponding to the lowest intensity and the reference intensity corresponding to the highest intensity does not exist, the at least one intermediate intensity may not be set.

Here, the setting of the intensity of the thermal feedback on the basis of the set plurality of reference intensities may include when the thermal grill feedback is output at a certain intensity among the reference intensities prior to the obtaining of the third user input after the obtaining of the second user input, obtaining at least one fourth user input and setting an intensity of the thermal grill feedback output at the time of the obtaining of the at least one fourth user input to the at least one intermediate intensity among the final intensities of the thermal grill feedback.

Here, the setting of the intensity of the thermal feedback on the basis of the set plurality of reference intensities may include: setting a plurality of specific intensities for at least one reference intensity among the set plurality of reference intensities, wherein the plurality of specific intensities refer to reference intensities when a temperature output by thermal grill feedback at the at least one reference intensity or a voltage value applied to a thermoelectric couple group of the heat output module performing the thermoelectric operation for the thermal grill feedback at the at least one reference intensity is changed; outputting thermal grill feedback at the plurality of specific intensities; obtaining a fifth user input indicating user recognition for the thermal grill feedback; and setting specific intensities of the thermal grill feedback output at the time of the fifth user input as the final intensities of the thermal grill feedback.

Here, the setting of the specific intensities of the thermal grill feedback output at the time of the fifth user input as the final intensities of the thermal grill feedback may include: when at least one piece of reference information is the lowest intensity based on the second user input, setting a specific intensity of the thermal grill feedback output at the time of the fifth user input to the lowest intensity among the final intensities.

Here, the setting of the specific intensities of the thermal grill feedback output at the time of the fifth user input as the final intensities of the thermal grill feedback may include: when at least one piece of reference information is the highest intensity based on the third user input, setting a specific intensity of the thermal grill feedback output at the time of the fifth user input to the highest intensity among the final intensities.

Here, the setting of the specific intensities of the thermal grill feedback output at the time of the fifth user input as the final intensities of the thermal grill feedback may include: when at least one piece of reference information is at least one intermediate intensity based on the fourth user input, setting a specific intensity of the thermal grill feedback output at the time of the fifth user input to the at least one intermediate intensity among the final intensities.

Here, the setting of the intensity of the thermal feedback on the basis of the set plurality of reference intensities may include: checking whether thermal grill feedback of the lowest intensity, thermal grill feedback of the highest intensity, and thermal grill feedback of the at least one intermediate intensity are distinguished; and when the thermal grill feedback of the lowest intensity, the thermal grill feedback of the highest intensity, and the thermal grill feedback of the at least one intermediate intensity are distinguished, maintaining settings of the lowest intensity, the highest intensity, and the at least one intermediate intensity.

Here, the first user input may be obtained by a user input module, and the user input module may include one of a button or a pressure sensor.

Here, the method for calibration of the intensity of the thermal feedback may further include providing at least one of a video signal or an audio signal related to the calibration of the thermal feedback to an audiovisual device to obtain the first user input from the user.

According to another aspect of the present invention, there is provided a feedback device transferring thermal feedback to a user by using a heat output module performing a thermoelectric operation including an exothermic operation, an endothermic operation, or a combination thereof, wherein the feedback device obtains intensity information on hot feedback output as the exothermic operation is performed, obtains intensity information on cold feedback output as the endothermic operation is performed, and sets an intensity of thermal grill feedback performed according to the combination of the exothermic operation and the endothermic operation by using the intensity information on the hot feedback and the intensity information on cold feedback.

According to another aspect of the present invention, there is provided a feedback device providing a thermal experience corresponding to a thermal event to a user when multimedia content including the thermal event is driven in a mobile device, the feedback device including: a casing including a mounting portion mounting the mobile device and a body portion providing a grip portion gripped by the user; a communication module performing communication with the mobile device; a heat output module including a contact surface disposed at the grip portion to provide thermal feedback corresponding to the thermal event to a hand of the user and a thermoelectric element performing a thermoelectric operation for the thermal feedback, the heat output module outputting the thermal feedback by transferring heat generated by the thermoelectric operation to the user through the contact surface; and a feedback controller configured to control the communication module and the heat output module, wherein, when the thermal event occurs during the driving of the multimedia content in the mobile device mounted by the mounting portion, the feedback controller receives a thermal feedback signal for output of the thermal feedback from the mobile device and applies power for the thermoelectric operation of the thermoelectric element to the heat output module so that the thermal feedback according to the thermal feedback signal is output.

Here, when the thermal event changes according to movement of the mobile device, movement of the mobile device and movement of the feedback device may be interlocked with each other by the mounting portion so that at least one of a type and an intensity of the thermal feedback is changed according to the movement of the feedback device.

Here, the mounting portion may include a pressure member mounting the mobile device by applying pressure to at least one surface of the mobile device.

Here, the mounting portion may include a magnetic member for coupling the mobile device to the feedback device by using a magnetic force.

Here, the body portion may be formed in the shape of a stick extending in one direction, wherein one end surface of the stick-shaped body portion is connected to the mounting portion, and the grip portion is provided in one region of the stick-shaped body portion.

Here, the body portion may be formed in the shape of a pad to be gripped by both hands of the user, wherein the grip portion may be provided in two spaced-apart regions of the pad-shaped body portion, and the contact surface is formed at each of the grip portions provided in the two spaced-apart regions.

Here, the body portion may be formed in the shape of a handle, wherein the body portion includes a ring member, the grip portion may be provided in at least two regions of the ring member, and the contact surface is formed at the grip portions provided at the ring member.

Here, the body portion may be formed in the shape of a gun, wherein one end surface of the gun-shaped body portion may be connected to the mounting portion, and the contact surface may be formed in a handle region of the gun-shaped body portion.

Here, the body portion may be formed in the shape of a case for protecting the mobile device from an external force, wherein the mounting portion may include an accommodating member formed at an inner surface of the body portion to accommodate the mobile device, and the contact surface may be formed in at least one region of a side surface of the body portion or in at least one region of a rear surface of the body portion.

Here, when the mobile device is disposed within a predetermined distance from the feedback controller, the feedback controller may control the communication module so that a communication channel with the mobile device is established.

Here, when the mobile device is disposed within a predetermined distance from the feedback controller, the feedback controller may transmit a request signal for turning off a vibration output of the mobile device to the mobile device through the communication module.

Here, the feedback device may further include a power module for supplying power required for operation of the feedback device, wherein the power module may receive power required for the operation of the feedback device from the mobile device or an external device other than the mobile device and stores the received power.

Here, the thermoelectric element may include a first thermoelectric couple group and a second thermoelectric couple group, and the contact surface may include a first contact surface corresponding to the first thermoelectric couple group and a second contact surface corresponding to the second thermoelectric couple group, wherein the feedback controller may provide pieces of thermal feedback of different types or intensities through the first contact surface and the second contact surface by separately controlling the first thermoelectric couple group and the second thermoelectric couple group.

Here, the feedback device may further include a heat dissipation member dissipating waste heat, which means remaining heat except for heat for providing the thermal feedback from the heat generated by the thermoelectric element, to an outside of the feedback device.

Here, the feedback device may further include a heat transfer member transferring the waste heat from the thermoelectric element to the heat dissipation member.

Here, the heat dissipation member may include a cavity portion including at least one hollow formed in at least one region of the body portion, wherein the waste heat may be dissipated to an outside of the body portion through the cavity portion.

Here, the heat dissipation member may include a heat dissipation fin disposed on the cavity portion, wherein the waste heat may be dissipated from the heat dissipation fin to the outside of the body portion through the cavity portion.

Here, the heat dissipation member may include a heat dissipation sheet disposed in at least a partial region inside the body portion, wherein the waste heat may be dissipated from the heat dissipation sheet to the outside of the body portion via the body portion.

Here, the heat dissipation member may include a heat dissipation fan circulating air inside the body portion, wherein the waste heat may be dissipated to the outside of the body portion according to circulation of air by the heat dissipation fan.

According to another aspect of the present invention, there is provided a thermal experience providing system including: a mobile device including a memory storing data, a camera capturing an object, and a controller obtaining multimedia content including a thermal event from the memory and reproducing the obtained multimedia content; and a feedback device including a casing including a mounting portion mounting the mobile device and a body portion providing a grip portion gripped by a user, and a heat output module including a contact surface disposed at the grip portion to provide thermal feedback corresponding to the thermal event to a hand of the user and a thermoelectric element performing a thermoelectric operation for the thermal feedback, the heat output module outputting the thermal feedback by transferring heat generated by the thermoelectric operation to the user through the contact surface; and a feedback controller configured to control the heat output module, wherein the controller generates a virtual object related to the captured object, obtains thermal feedback information on the basis of properties of the virtual object, and provides a thermal feedback signal according to the thermal feedback information to the feedback device so that the thermal feedback is output from the feedback device on the basis of the thermal feedback information, and the feedback controller applies power for the thermoelectric operation of the thermoelectric element to the heat output module so that the thermal feedback according to the thermal feedback signal is output.

According to another aspect of the present invention, there is provided a method of providing a thermal experience by a feedback device including: a casing including a mounting portion mounting a mobile device and a body portion providing a grip portion gripped by a user; a communication module performing communication with the mobile device; a heat output module including a contact surface disposed at the grip portion to provide thermal feedback corresponding to a thermal event in the mobile device to a hand of the user and a thermoelectric element performing a thermoelectric operation for the thermal feedback, the heat output module outputting the thermal feedback by transferring heat generated by the thermoelectric operation to the user through the contact surface; and a feedback controller configured to control the communication module and the heat output module, the method including: when the thermal event occurs during driving of multimedia content in the mobile device mounted by the mounting portion, receiving a thermal feedback signal for output of the thermal feedback from the mobile device; obtaining feedback information from the thermal feedback signal, wherein the feedback information is determined by the thermal event in the mobile device; and generating an electrical signal for the thermoelectric operation of the thermoelectric element on the basis of the feedback information and applying the electrical signal to the heat output module so that the thermal feedback corresponding to the thermal event is output.

According to an aspect of the present invention, there is provided a special effect chair providing thermal feedback to a user by being linked to reproduction of multimedia content, the special effect chair including: a communication unit receiving thermal feedback data; a seating portion sittable for a user; a heat output module including a thermoelectric element generating heat by a thermoelectric operation and a power terminal applying power to the thermoelectric element; a contact portion transferring heat generated by the thermoelectric element to a portion of the user's body using a heat conduction method by contacting the portion of the user's body and touching the thermoelectric element; a heat dissipation module for dissipating waste heat generated in the special effect chair, wherein the waste heat is different from the thermal feedback provided to the user; and a controller controlling operations of the heat output module and the heat dissipation module so that the thermal feedback is provided on the basis of the thermal feedback data.

Here, the thermoelectric element may include thermoelectric couple groups, and the power terminal may be separately provided for each of the thermoelectric couple groups, wherein the controller may separately control power applied to the thermoelectric element for each of the thermoelectric couple groups on the basis of the thermal feedback data.

Here, the thermal feedback data may include thermal feedback type information, thermal feedback intensity information, and thermal feedback timing information.

Here, the contact portion may include one surface of the heat output module.

Here, the contact portion may be disposed at one surface facing the user of the seating portion and be bent along a curve of the one surface.

Here, the seating portion may include a stick grippable by the user sat on the seating portion, wherein the contact portion may be disposed on at least one surface of the stick.

Here, the seating portion may include a safety bar for preventing the user from falling off from the seating portion due to movement of the seating portion according to a special effect, wherein the contact portion may be disposed on at least one surface of the safety bar.

Here, the seating portion may include a neck rest disposed at a portion contacting a neck of the user sat on the seating portion, wherein the contact portion may be disposed on at least one surface of the neck rest.

According to another aspect of the present invention, there is provided a method of controlling a heat dissipating operation of a special effect chair, which provides thermal feedback by using a thermoelectric element, for dissipating waste heat generated as the special effect chair provides the thermal feedback, the method including: obtaining information; determining, on the basis of the obtained information, whether a necessary condition for heat dissipation is satisfied; determining, on the basis of the obtained information, whether a condition for permitting heat dissipation is satisfied; and when the necessary condition for heat dissipation and the condition for permitting heat dissipation are satisfied, dissipating the waste heat.

Here, the information may include information on a current time, a heat dissipation start time point, and a heat dissipation stop time point, wherein the necessary condition for heat dissipation may be a condition in which the current time is the heat dissipation start time point or later and before the heat dissipation stop time point.

Here, the information may include a temperature value of one portion of the special effect chair, wherein the necessary condition for heat dissipation may be a condition in which the temperature value is a reference temperature value or higher.

Here, the reference temperature value may include a first reference temperature value and a second reference temperature value higher than the first reference temperature value, wherein the necessary condition for heat dissipation may be a condition in which the temperature value is the first reference temperature value or higher, and the condition for permitting heat dissipation may further include a condition in which the temperature value is the second reference temperature value or higher.

Here, the information may include a noise value of surroundings of the special effect chair, wherein the condition for permitting heat dissipation may be a condition in which the noise value is a reference noise value or higher.

Here, the information may include motion information of the special effect chair, wherein the condition for permitting heat dissipation may be a condition in which the seating portion is in motion when determined on the basis of the motion information.

Here, the motion information may include an acceleration value of the special effect chair, wherein the condition for permitting heat dissipation may be a condition in which the acceleration value is a reference acceleration value or higher.

Here, the motion information may include information on a current time, a motion start time point, and a motion stop time point, wherein the condition for permitting heat dissipation may be a condition in which the current time is the motion start time point or later and before the motion stop time point.

According to still another aspect of the present invention, there is provided a special effect control system providing thermal feedback by being linked to reproduction of multimedia content, the special effect control system including: a special effect chair including a seating portion sittable for a user, a heat output module providing thermal feedback to the user, a heat dissipation module dissipating waste heat generated from the heat output module to outside, and a controller controlling the heat output module and the heat dissipation module; and a central control device controlling a video output device so that the video output device reproduces multimedia content and connected to the special effect chair, which includes one or more special effect chairs, in terms of communication, wherein the central control device transmits thermal feedback data to the special effect chair, and the controller provides thermal feedback on the basis of the thermal feedback data.

Here, the central control device may transmit heat dissipation data to the special effect chair, and the controller may control the heat dissipation module on the basis of the heat dissipation data.

I. Thermal Experience Providing System and Heat Output Module

1. Thermal Experience Providing System

A thermal experience providing system 1000 according to an embodiment of the present invention will be described below.

1.1. Overview of Thermal Experience Providing System

A thermal experience providing system 1000 according to an exemplary embodiment of the present invention is a system which allows a user to experience a thermal experience (TX). Specifically, the thermal experience providing system 1000 may allow a user to experience a thermal experience by outputting thermal feedback as a part of a formed of a representation of content when multimedia content is reproduced.

Herein, the thermal feedback is a kind of thermal stimulation which allows a user to feel a thermal sensation by stimulating thermal sensory organs mainly distributed in a user's body and in the present specification the thermal feedback should be interpreted to include all the thermal stimuli which stimulate a thermal sensory system of the user.

Representative examples of the thermal feedback include hot feedback and cold feedback. The hot feedback means thermal feedback which allows a user to feel a hot sensation by applying hot heat to a hot spot distributed on a user's skin and the cold feedback means thermal feedback which allows a user to feel a cold sensation by applying cold heat to a cold spot distributed on a user's skin.

Herein, since the heat is a physical quantity represented by a scalar form, the expression, "applying cold heat," or "transferring cold heat," may not be an exact expression from a physical point of view. However, for convenience of description in the present description, a phenomenon in which heat is applied or transferred is expressed as "applying hot heat" or "transferring hot heat", and a phenomenon opposite to the phenomenon, i.e., a phenomenon in which heat is absorbed is expressed as "applying cold heat" or "transferring cold heat".

In addition, the thermal feedback in the present specification may further include thermal grill feedback in addition to the hot feedback and the cold feedback. When the hot heat and the cold heat are applied at the same time, a user perceives a pain sensation instead of individually perceiving a hot sensation and a cold sensation. The pain sensation is referred to as a so-called thermal grill illusion (TGI) (hereinafter, referred to as a "thermal pain sensation"). That is, thermal grill feedback means thermal feedback in which a combination of hot heat and cold heat is applied, and may be provided mainly by concurrently outputting the hot feedback and the cold feedback. In addition, the thermal grill feedback may be referred to as "thermal pain sensation feedback" in terms of providing a sensation close to pain. The thermal feedback will be described below in detail.

Herein, the multimedia content may include various kinds of content including a video, a game, a virtual reality application, and an augmented reality application.

In general, the multimedia content is provided to a user mainly in accordance with an audiovisual expression form based on an image and a voice. However, in the present invention, a thermal expression based on the above-mentioned thermal feedback may be included as an essential expression form.

Meanwhile, the "reproduction" of multimedia content should be interpreted to include all operations of executing and representing the multimedia content to a user. Therefore, the term "reproduction" in the present specification should be interpreted to include not only an operation of simply playing a video through a media player but also all operations of executing a game program, a training program, a virtual reality application, an augmented reality application, and the like.

1.2. Configuration of Thermal Experience Providing System

FIG. 1 is a block diagram showing a configuration of a thermal experience providing system 1000 according to an embodiment of the present invention.

Referring to FIG. 1, the thermal experience providing system 1000 may include a content reproduction device 1200, an audiovisual device 1400, and a feedback device 1600.

Herein, the content reproduction device 1200 may reproduce multimedia content, the audiovisual device 1400 may output an image or voice according to content reproduction, and the feedback device 1600 may output a thermal feedback according to content reproduction.

For example, the content reproduction device 1200 may decode video content including image data, voice data, or thermal feedback data and may deliver an image signal, a voice signal, or a thermal feedback signal to the audiovisual device 1400 and the feedback device 1600. The audiovisual device 1400 may receive an image signal and a voice signal and then output images and voice, and the feedback device 1600 may receive a thermal feedback signal and then output a thermal feedback.

The components of the thermal experience providing system 1000 will be described below in more detail.

1.2.1. Content Reproduction Device

The content reproduction device 1200 reproduces multimedia content.

Figure 2:
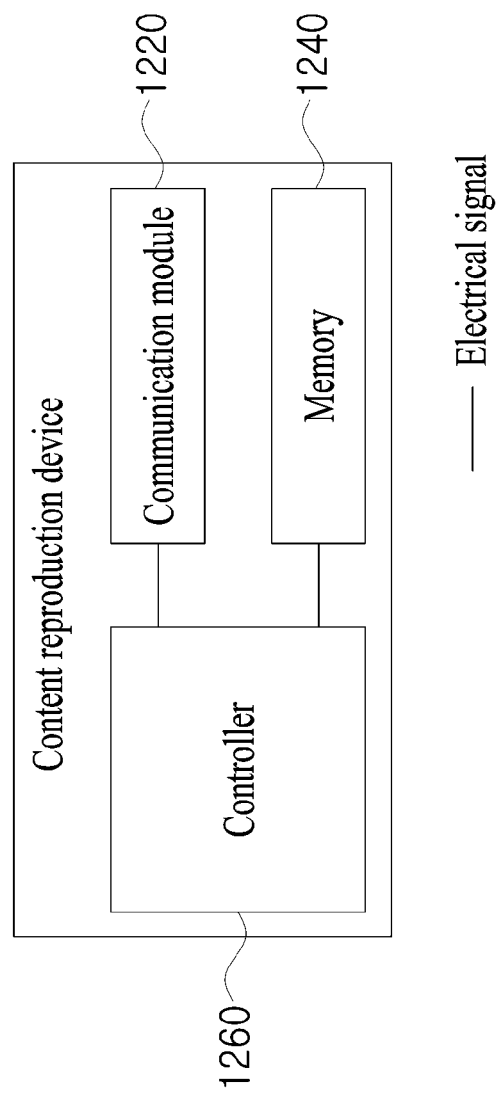
FIG. 2 is a block diagram showing a content reproduction device 1200 according to an embodiment of the present invention.

FIG. 2 is a block diagram showing the content reproduction device 1200 according to an embodiment of the present invention.

Referring to FIG. 2, the content reproduction device 1200 may include a communication module 1220, a memory 1240, and a controller 1260.

The communication module 1220 may communicate with an external apparatus. The content reproduction device 1200 may transmit or receive data to or from the audiovisual device 1400 or the feedback device 1600 through the communication module 1220. For example, through the communication module 1220, the content reproduction device 1200 may deliver an A/V signal to the audiovisual device 1400 or deliver a thermal feedback signal to the feedback device 1600. In addition, the content reproduction device 1200 may access the Internet through the communication module 1220 and then download multimedia content.

The communication module 1220 is largely divided into a wired communication module and a wireless communication module. Since the wired communication module and the wireless communication module each have advantages and disadvantages, the content reproduction device 1200 may be provided with both of the wired communication module and the wireless communication module.

Typically, the wired communication module may use, for example, local area network (LAN), universal serial bus (USB) communication, or other schemes.

The wireless communication module may use a wireless personal area network (WPAN)-based communication scheme such as Bluetooth or Zigbee. However, since a wireless communication protocol is not limited thereto, the wireless communication module may use a wireless local area network (WLAN)-based communication scheme such as Wi-Fi or other known communication schemes.

Meanwhile, as the wired/wireless communication protocol, an independent protocol developed by a game console manufacturer may be used.

The memory 1240 may store various kinds of information. The memory 1240 may temporarily or semi-permanently store data. Examples of the memory 1240 may include a hard disk drive (HDD), a solid state drive (SSD), a flash memory, a read-only memory (ROM), a random access memory (RAM), etc. The memory 1240 may be built into, or detachable from, the content reproduction device 1200.

An operating system (OS) for driving the content reproduction device 1200 or various kinds of data needed for operation of the content reproduction device 1200 in addition to content to be executed by the content reproduction device 1200 may be stored in the memory 1240.

In addition, values which are calibrated to output thermal feedback from the feedback device 1600, e.g., pieces of information on the lowest intensity of hot/cold/thermal pain feedback, the highest intensity of hot/cold/thermal pain feedback, and an intermediate intensity of the hot/cold/thermal pain feedback, may be stored in the memory 1240. This will be described below.

The controller 1260 may control overall operation of the content reproduction device 1200. For example, the controller 1260 may load or reproduce multimedia content from the memory 1240 or may generate a control signal for controlling an image or voice or a thermal feedback output according to content reproduction.

The controller 1260 may be implemented as a central processing unit (CPU) or the like in hardware, software, or a combination thereof. The controller 1260 may be provided in the form of an electronic circuit for processing an electric signal to perform a control function when being implemented in hardware and may be provided in the form of a program or codes for driving a hardware circuit when being implemented in software.

1.2.2. Audiovisual Device

The audiovisual device 1400 may output images and voice according to multimedia reproduction.

Figure 3:
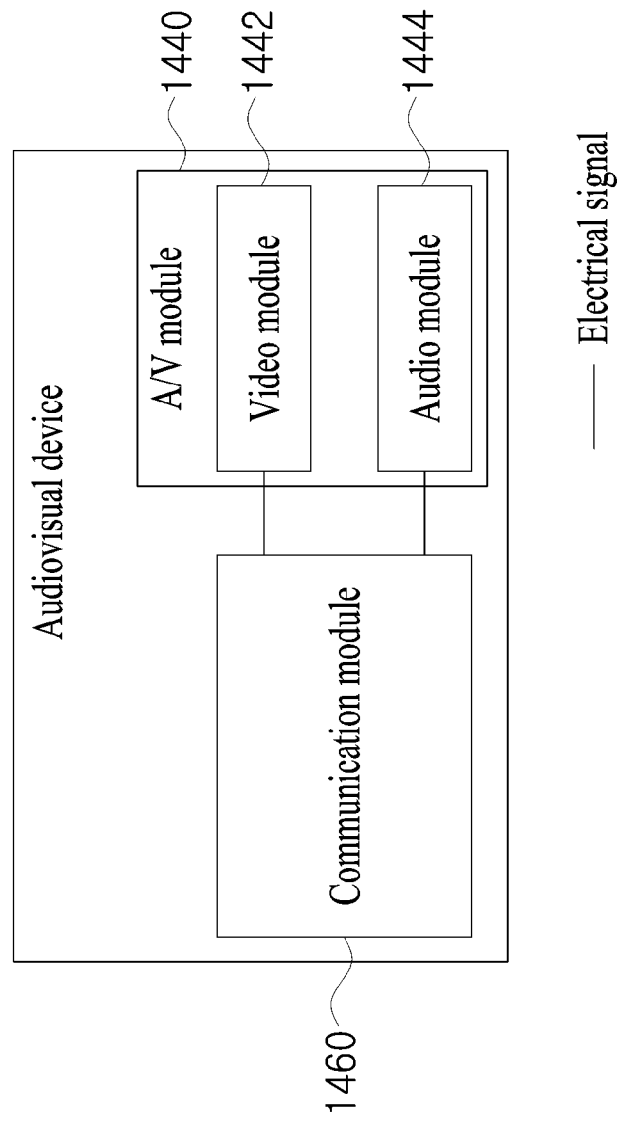
FIG. 3 is a block diagram showing a configuration of an audiovisual device 1400 according to an embodiment of the present invention.

FIG. 3 is a block diagram showing a configuration of the audiovisual device 1400 according to an embodiment of the present invention.

Referring to FIG. 3, the audiovisual device 1400 may include a communication module 1420 and an A/V module 1440.

The communication module 1420 may communicate with an external apparatus. The audiovisual device 1400 may transmit or receive data to or from the content reproduction device 1200 through the communication module 1420. For example, the audiovisual device 1400 may receive an A/V signal from the content reproduction device 1200 or the feedback device 1600 through the communication module 1420.

The communication module 1420 of the audiovisual device 1400 may be similar to the communication module 1220 of the content reproduction device 1200, and thus a detailed description thereof will be omitted.

The A/V module 1440 may provide images or voice to a user. To this end, the A/V module 1440 may include a video module 1442 and an audio module 1444.

The video module 1442 may be generally provided in the form of a display and may output an image according to an image signal received from the content reproduction device 1200 or the feedback device 1600. The audio module 1444 may be generally provided in the form of a speaker and may output voice according to a voice signal received from the content reproduction device 1200 or the feedback device 1600.

1.2.3. Feedback Device

The feedback device 1600 may output a thermal feedback according to multimedia reproduction.

Figure 4:
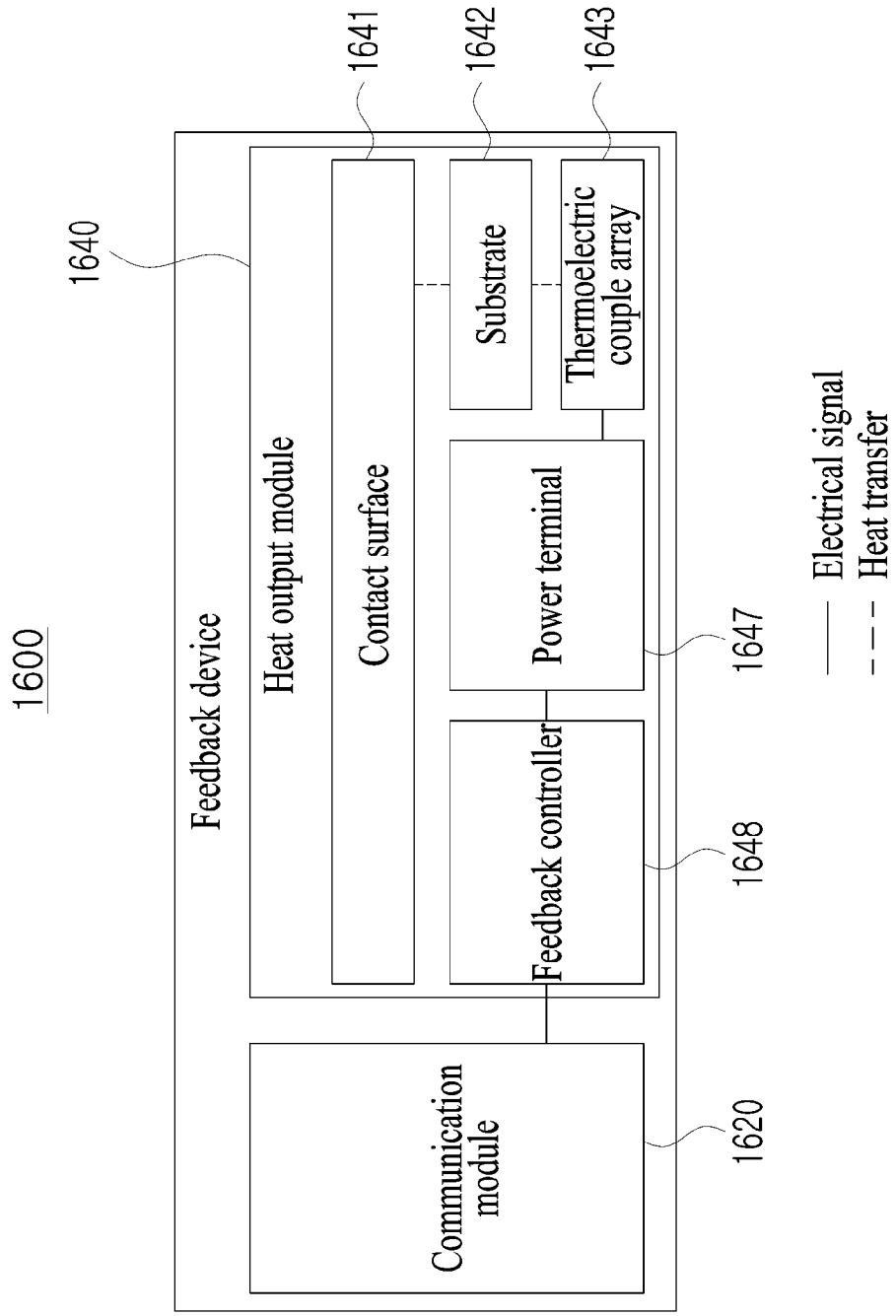
FIG. 4 is a block diagram showing a configuration of a feedback device 1600 according to an embodiment of the present invention.

FIG. 4 is a block diagram showing a configuration of the feedback device 1600 according to an embodiment of the present invention.

Referring to FIG. 4, the feedback device 1600 may include a communication module 1620 and a heat output module 1640.

According to an embodiment of the present invention, a feedback controller 1648 may be either separate from or included in the heat output module 1640. Also, the present invention is not limited thereto, and when the feedback controller 1648 is present outside the heat output module 1640, a separate feedback controller may be present inside the heat output module 1640 independently of the feedback controller 1648. In this specification, for convenience of description, it will be presumed that the feedback controller 1648 is included in the heat output module 1640.

The communication module 1620 may communicate with an external apparatus. The feedback device 1600 may transmit or receive data to or from the content reproduction device 1200 through the communication module 1620. For example, the feedback device 1600 may receive thermal feedback data from the content reproduction device 1200 through the communication module 1620. As another example, the feedback device 1600 may transmit a voice signal and/or an image signal to the audiovisual device 1400 through the communication module 1620.

The heat output module 1640 may output a thermal feedback. The thermal feedback may be output by the heat output module 1640, which includes a contact surface 1641 brought into contact with a user's body and a thermoelectric element connected to the contact surface 1641, applying hot heat or cold heat, which is generated in the thermoelectric element when power is applied, to the user's body through the contact surface 1641.

The heat output module 1640 may perform an exothermic operation, endothermic operation, or thermal grill operation according to the thermal feedback data received from the content reproduction device 1200 through the communication module 1620 to output a thermal feedback, and the user may experience a thermal experience by the output thermal feedback.

A detailed configuration or operation scheme of the heat output module 1640 will be described below in more detail.

2. Heat Output Module

The heat output module 1640 according to an embodiment of the present invention will be described below.

2.1. Overview of Heat Output Module

A heat output module 1640 may output thermal feedback for transferring hot heat and cold heat to a user by performing an exothermic operation, an endothermic operation, or a thermal grill operation. In a thermal experience providing system 1000, when a feedback device 1600 receives a thermal feedback signal, the heat output module 1640 mounted on the feedback device 1600 may output thermal feedback to allow the thermal experience providing system 1000 to provide thermal experience to a user.

In order to perform the above-described exothermic operation, endothermic operation, or thermal grill operation, the heat output module 1640 may use a thermoelectric element such as a Peltier element.

The Peltier effect is a thermoelectric phenomenon discovered by Jean Peltier in 1834. According to the Peltier effect, when an electric current is made to flow through a junction between dissimilar metals, an exothermic reaction occurs at one side of the junction and an endothermic reaction occurs at the other side of the junction according to a current direction. The Peltier element is an element which causes such a Peltier effect. The Peltier element was originally made of a joined body of dissimilar metals such as bismuth and antimony. However, recently, the Peltier element has been manufactured through a method of disposing N-P semiconductors between two metal plates so as to have higher thermoelectric efficiency.

When a current is applied to the Peltier element, heat generation and heat absorption may instantaneously occur at both metal plates, a switching between the heat generation and the heat absorption may be made according to a current direction, and a degree of the heat generation or absorption may be relatively precisely adjusted according to a current amount. Thus, the Peltier element is suitable to be used for an exothermic operation or an endothermic operation for thermal feedback. In particular, recently, as a flexible thermoelectric element has been developed, it has been possible to manufacture the flexible thermoelectric element in a form with which a user's body easily comes into contact therewith such that commercial availability of the flexible thermoelectric element as the feedback device 1600 has been increasing.

Therefore, as electricity is applied to the above-described thermoelectric element, the heat output module 1640 may perform an exothermic operation or an endothermic operation. Physically, an exothermic reaction and an endothermic reaction concurrently occur in the thermoelectric element to which electricity is applied. However, in the present specification, in the case of the heat output module 1640, an operation in which a surface in contact with a user's body generates heat is defined as an exothermic operation, and an operation in which the surface in contact with the user's body absorbs heat is defined as an endothermic operation. For example, the thermoelectric element may be manufactured by disposing N-P semiconductors on a substrate 1642. When a current is applied to the thermoelectric element, heat generation occurs at one side of the thermoelectric element, and heat absorption occurs at the other side of the thermoelectric element. When one side of the thermoelectric element facing the user's body is defined as a front side and a side opposite to the one side is defined as a rear side, an operation in which the heat generation occurs at the front side and an operation in which the heat absorption occurs at the rear side may be defined as an operation in which the heat output module 1640 performs an exothermic operation. On the contrary, an operation in which the heat absorption occurs at the front side and the heat generation occurs at the rear side may be defined as an operation in which the heat output module 1640 performs an endothermic operation.

In addition, since a thermoelectric effect is induced by electric charges flowing in the thermoelectric element, it is possible to describe electricity inducing the exothermic operation or the endothermic operation of the heat output module 1640 in terms of a current. In the present specification, however, for convenience of description, description will be made mainly in terms of a voltage. This is merely for convenience of description, and inventive thinking is not required for a person having ordinary skill in the art to which the present invention belongs (hereinafter referred to as "a person skilled in the art") to interpret the exothermic operation or the endothermic operation in terms of a current. Therefore, the present invention is not limited to expression in terms of the voltage.

2.2. Configuration of Heat Output Module

Figure 5:
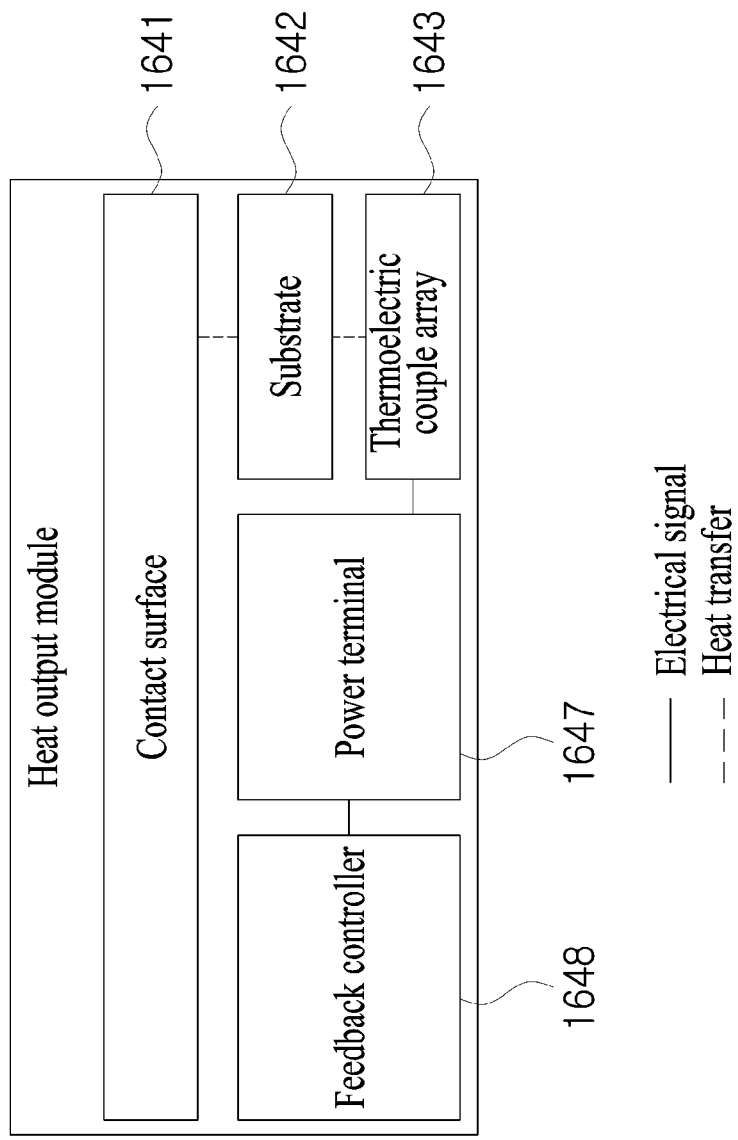
FIG. 5 is a block diagram showing a configuration of a heat output module 1640 according to an embodiment of the present invention.

FIG. 5 is a block diagram showing a configuration of the heat output module 1640 according to an embodiment of the present invention.

Referring to FIG. 5, the heat output module 1640 may include a contact surface 1641, a substrate 1642, a thermoelectric couple array 1643 disposed on the substrate 1642, a power terminal 1647 configured to apply power to the heat output module 1640, and a feedback controller 1645.

The contact surface 1641 is directly brought into contact with the user's body to transfer hot heat or cold heat generated in the heat output module 1640 to the user's skin. In other words, a portion of the outer surface of the feedback device 1600 that is directly brought into contact with the user's body may be used as the contact surface 1641. For example, the contact surface 1641 may be formed in a grip part, which is a part of the casing of the feedback device 1600 the user grasps.

As an example, the contact surface 1641 may be provided as a layer that is directly or indirectly attached to the outer surface (toward the user's body) of the thermoelectric couple array 1643 of the heat output module 1640 where an exothermic operation or endothermic operation is performed. This type of contact surface 1641 may be disposed between the user's skin and the thermoelectric couple array to perform heat transfer. To this end, the contact surface 1641 may be made of a material with high thermal conductivity to facilitate transfer of heat from the thermoelectric couple array 1643 to the user's body. Also, the layer-type contact surface 1641 also prevents direct exposure of the thermoelectric couple array 1643, thereby protecting the thermoelectric couple array 1643 from external impacts.

In the above description, the contact surface 1641 is disposed on the outer surface of the thermoelectric couple array 1643. However, the outer surface of the thermoelectric couple array 1643 itself may be the contact surface 1641. In other words, some or all of the front surface of the thermoelectric couple array 1643 may be used as the contact surface 1641.

The substrate 1642 serves to support a unit thermoelectric couple 1645 and is made of an insulating material. For example, ceramic may be selected as the material of the substrate 1642. The substrate 1642 may be of a flat plate shape, but it is not necessarily so.

The substrate 1642 may be made of a flexible material to have flexibility that may be used universally for several kinds of feedback devices 1600 having contact surfaces 1641 of various shapes. For example, for a gaming controller-type feedback device 1600, generally, a portion of the gamming controller a user grasps with the palm may be curved. In order to use the heat output module 1640 at the curved portion, it may be important that the heat output module 1640 has flexibility. To this end, the flexible material used for the substrate 1642 may be, for example, glass fiber or flexible plastic.

The thermoelectric couple array 1643 may be composed of a plurality of unit thermoelectric couples 1645 disposed on the substrate 1642. The unit thermoelectric couples 1645 may use different metal couples (e.g., Bismuth and Antimony, etc.), but N-type and P-type semiconductor couples may be used mainly.

In the unit thermoelectric couples 1645, the semiconductor couples may be electrically connected to each other at one end and may be electrically connected to the unit thermoelectric couples 1645 at the other end. Electrical connection between a couple of semiconductors 1645a and 1645b or with an adjacent semiconductor may be accomplished by a conductor member 1646 disposed on the substrate 1642. The conductor member 1646 may be a lead or an electrode made of copper, silver, or the like.

Electrical connection of the unit thermoelectric couples 1645 may be mainly accomplished as a serial connection, and the unit thermoelectric couples 1645 connected in series to one another may form the thermoelectric couple group 1644, and such thermoelectric couple groups 1644 may form the thermoelectric couple array 1643.

The power terminal 1647 may apply power to the heat output module 1640. The thermoelectric couple array 1643 may dissipate or absorb heat according to a voltage magnitude and a current direction of the power applied to the power terminal 1647. In more detail, two such power terminals 1647 may be connected to each of the thermoelectric couple groups 1644. Accordingly, when there are several thermoelectric couple groups 1644, two power terminals 1647 may be disposed for each of the thermoelectric couple groups 1644. According to such a connection scheme, a voltage magnitude or a current direction may be individually controlled for each of the thermoelectric couple groups 1644 to determine whether to perform an exothermic operation or an endothermic operation and adjust a degree to which the exothermic operation or endothermic operation is performed.

As will be described later, the power terminal 1647 may receive an electric signal output by the feedback controller 1645. As a result, the feedback controller 1648 may adjust the direction or size of the electric signal to control the exothermic operation and the endothermic operation of the heat output module 1640. Also, when there are a plurality of thermoelectric couple groups 1644, electric signals applied to power terminals 1647 may be individually adjusted to individually control the thermoelectric couple groups 1644.

The feedback controller 1648 may apply electric signals to the thermoelectric couple array 1643 through the power terminals 1647. In detail, the feedback controller 1648 may receive information regarding a thermal feedback from the controller 1260 of the content reproduction device 1200 through the communication module 1620, interpret the information regarding the thermal feedback to determine the type or intensity of the thermal feedback, and allow the thermoelectric couple array 1643 to output the thermal feedback by generating an electric signal and applying the electric signal to the power terminals 1647 according to a result of the determination.

To this end, the feedback controller 1648 may compute and process various kinds of information and output an electric signal to the thermoelectric couple array 1643 according to a result of the processing to control operation of the thermoelectric couple array 1643. Accordingly, the feedback controller 1648 may be implemented as a computer or the like in hardware, software, or a combination thereof. The feedback controller 1648 may be provided in the form of an electronic circuit for processing an electric signal to perform a control function when being implemented in hardware and may be provided in the form of a program or codes for driving a hardware circuit when being implemented in software.

Such a plurality of heat output modules 1640 may be provided to the feedback device 1600. For example, when the feedback device 1600 has a plurality of grip parts, each of the grip parts of the feedback device 1600 may be equipped with the heat output module 1640. When a plurality of heat output modules 1640 are provided to a single feedback device 1600, a feedback controller may be provided for each of the heat output modules 1640 of the feedback device 1600 or a single feedback controller for managing all the heat output modules 1640 may be provided in an integrated manner. Also, when a plurality of feedback devices 1600 are provided in the thermal experience providing system 1000, one or more heat output modules 1640 may be disposed in each of the feedback devices 1600.

2.3. Aspect of Heat Output Module

Some exemplary aspects of the heat output module 1640 will be described based on the above description of the configuration of the heat output module 1640.

Figure 6:
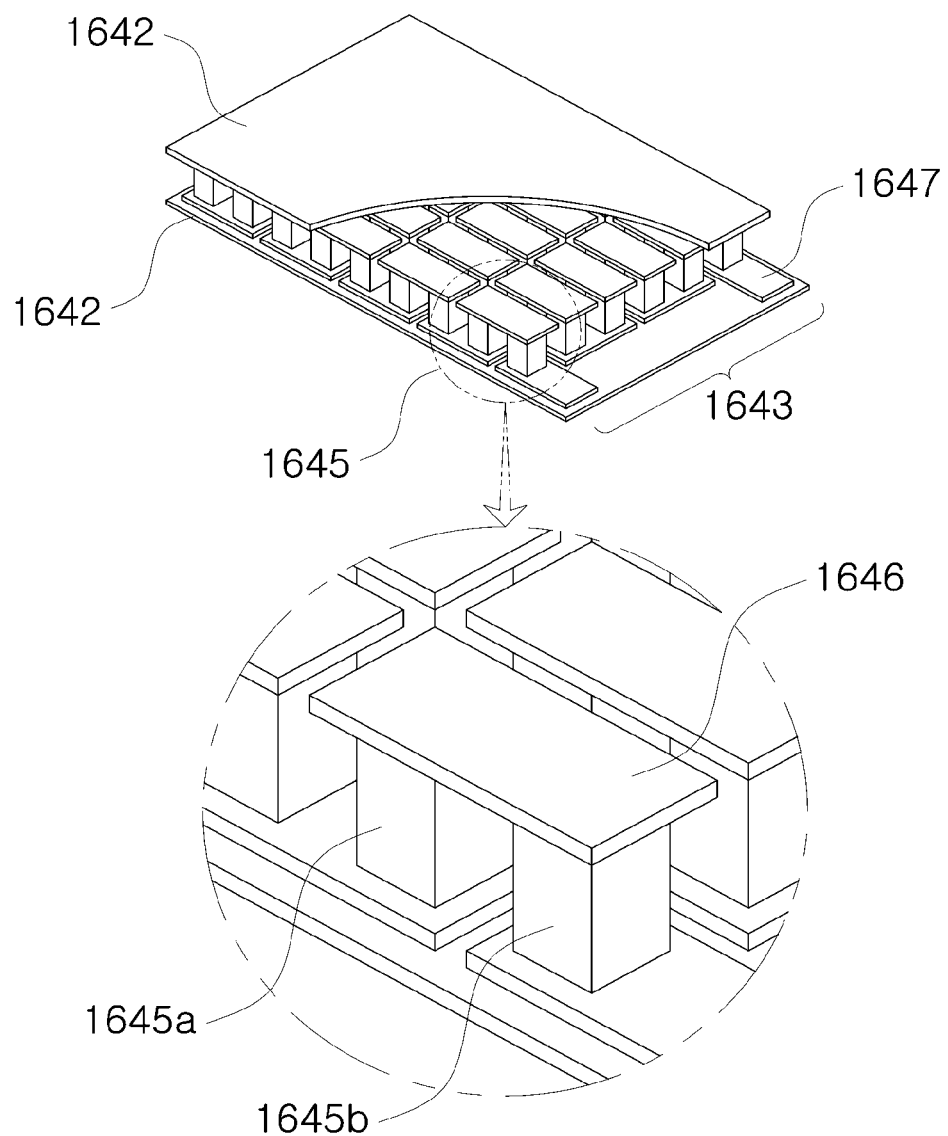
FIG. 6 is a diagram showing an aspect of the heat output module 1640 according to an embodiment of the present invention.

FIG. 6 is a diagram showing an aspect of the heat output module 1640 according to an embodiment of the present invention.

Referring to FIG. 6, according to an aspect of the heat output module 1640, a pair of substrates 1642 may be provided to face each other. A contact surface 1641 may be located outside one of the two substrates 1642 to transfer heat generated in the heat output module 1640 to a user's body. Also, when a flexible substrate 1642 is used as the substrate 1642, flexibility may be imparted to the heat output module 1640.

A plurality of unit thermoelectric couples 1645 are located between the substrates 1642. Each of the unit thermoelectric couples 1645 may be composed of a semiconductor couple of an N-type semiconductor and a P-type semiconductor. In each of the unit thermoelectric couples 1645, the N-type semiconductor and the P-type semiconductor are electrically connected to each other at one ends by a conductor member 1646. Also, the other ends of the N-type semiconductor and the P-type semiconductor of any unit thermoelectric couple 1645 are connected to the other ends of N-type semiconductor and the P-type semiconductor of an adjacent unit thermoelectric couple 1645, and thus electrical connection between the unit devices is accomplished through the conductor member 1646. Thus, the unit connection devices are connected in series to form a single thermoelectric couple group 1644. According to this aspect, the entire thermoelectric couple array 1643 is formed as a single thermoelectric couple group 1644, and all the unit thermoelectric couples 1645 are connected in series to each other between power terminals 1647. Thus, the heat output module 1640 performs the same operation over the entire front surface. That is, the heat output module 1640 may perform an exothermic operation when power is applied to the power terminals 1647 in one direction and may perform an endothermic operation when power is applied to the power terminals 1647 in the opposite direction.

Figure 7:
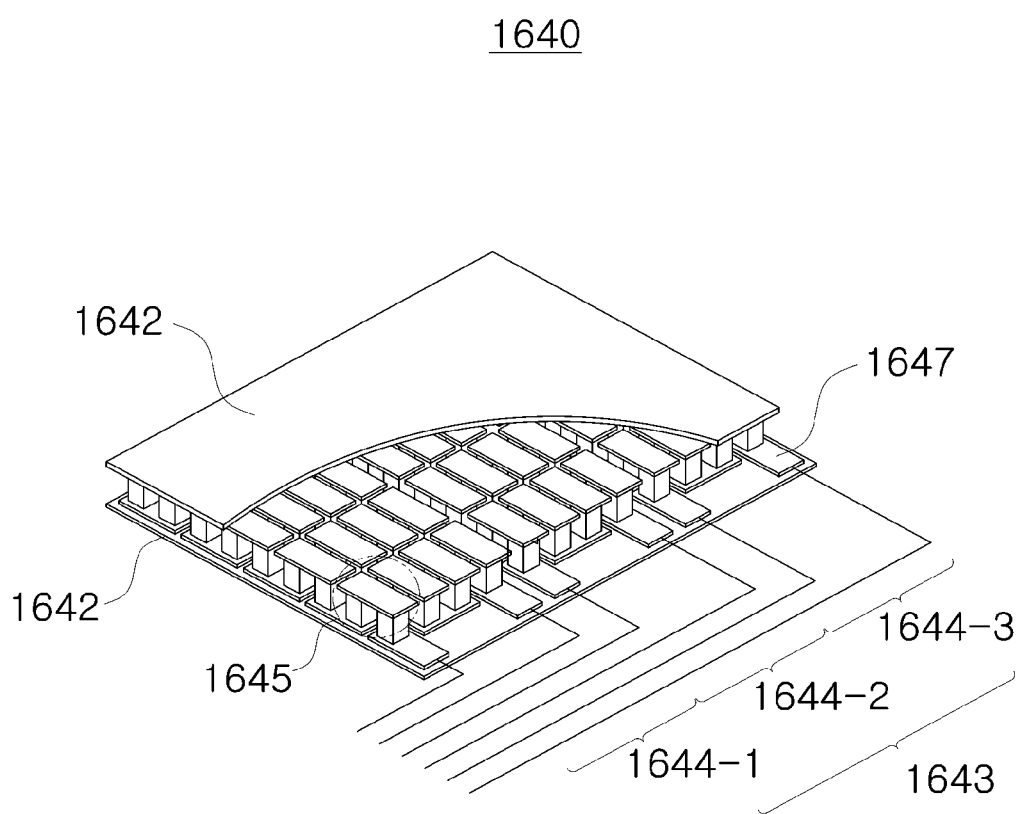
FIG. 7 is a diagram showing another aspect of the heat output module 1640 according to an embodiment of the present invention.

FIG. 7 is a diagram showing another aspect of the heat output module 1640 according to an embodiment of the present invention.

Referring to FIG. 7, the other aspect of the heat output module 1640 is similar to the above-described one aspect. However, according to this aspect, a thermoelectric couple array 1643 has a plurality of thermoelectric couple groups 1644, each of which is connected to a corresponding power terminal 1647. Thus, the thermoelectric couple groups 1644 may be individually controlled. For example, referring to FIG. 7, by applying electric current to a first thermoelectric couple group 1644 and a second thermoelectric couple group 1644 in different directions, the first thermoelectric couple group 1644 may perform an exothermic operation (in this case, the direction of electric current is set to "forward"), and also the second thermoelectric couple group 1644 may perform an endothermic operation (in this case, the direction of electric current is set to "reverse"). As another example, by applying different voltage magnitudes to a power terminal 1647 of the first thermoelectric couple group 1644 and a power terminal 1647 of the second thermoelectric couple group 1644, the first thermoelectric couple group 1644 and the second thermoelectric couple group 1644 may perform an exothermic operation or an endothermic operation to different degrees.

Figure 8:
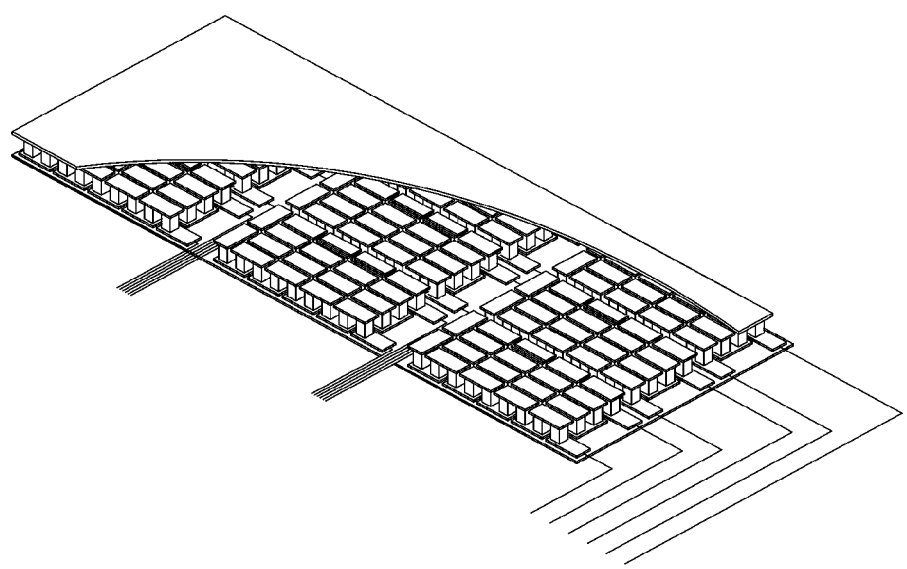
FIG. 8 is a diagram showing still another aspect of the heat output module 1640 according to an embodiment of the present invention.

In FIG. 7, it is shown that the thermoelectric couple groups 1644 are arranged in the thermoelectric couple array 1643 in one dimension. However, the thermoelectric couple groups 1644 may be arranged in two dimensions. FIG. 8 is a diagram showing still another aspect of the heat output module 1640 according to an embodiment of the present invention. Referring to FIG. 8, when thermoelectric couple groups 1644 disposed in two dimensions are used, operation control may be performed individually for more-segmented regions.

Figure 9:
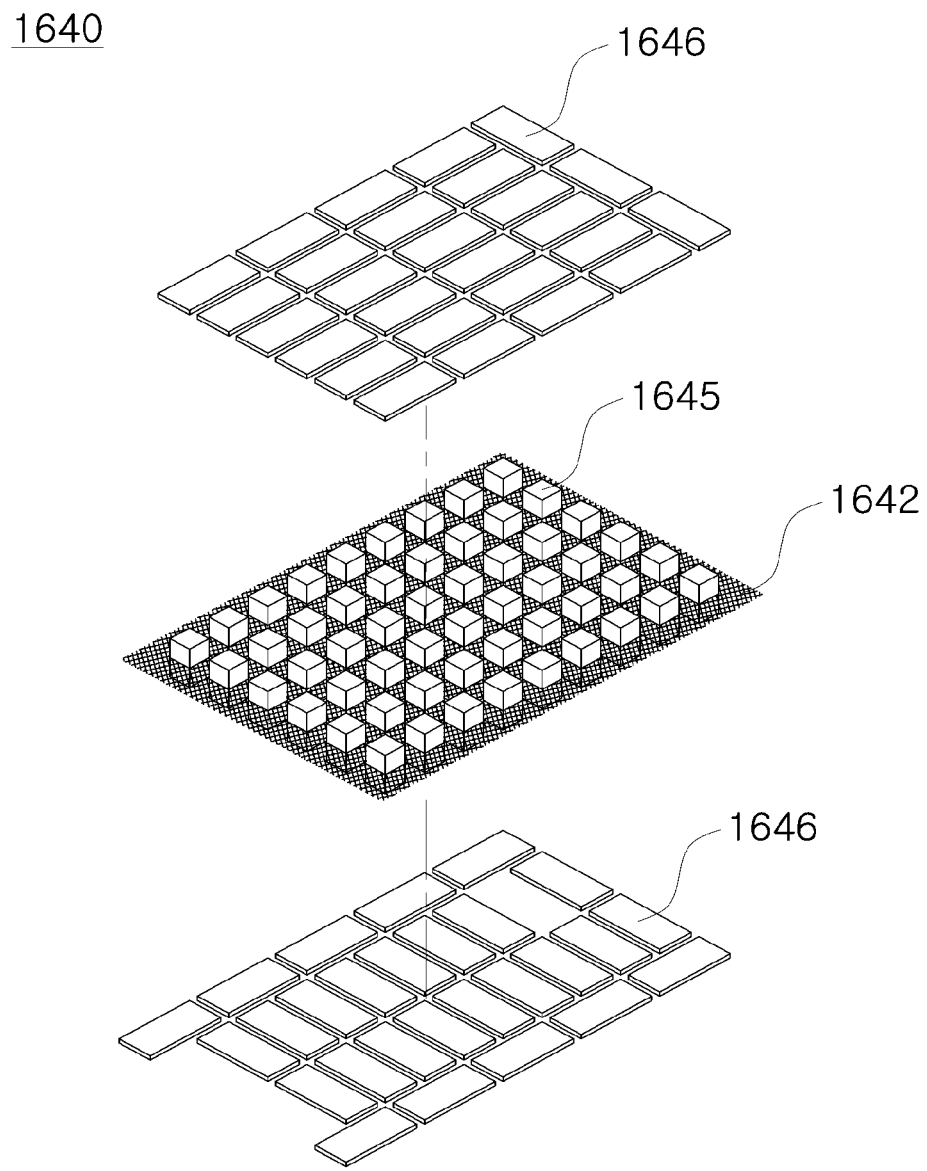
FIG. 9 is a diagram showing yet another aspect of the heat output module 1640 according to an embodiment of the present invention.

Also, according to the aspects of the heat output module 1640, it has been described that a pair of substrates 1642 facing each other are used, but a single substrate 1642 may be used. FIG. 9 is a diagram showing still another aspect of the heat output module 1640 according to an embodiment of the present invention. Referring to FIG. 9, unit thermoelectric couples 1656 and conductor members 1646 may be disposed in a single substrate 1642 by being buried into the substrate 1642. To this end, glass fiber may be used as the substrate 1642. When the single substrate 1642 according to this aspect is used, higher flexibility may be imparted to the heat output module 1640.

The various aspects of the heat output module 1640 may be combined or modified within the scope of what is obvious to those skilled in the art. For example, according to each aspect of the heat output module 1640, it has been described that the contact surface 1641 is formed on the front surface of the heat output module 1640 as a layer separate from the heat output module 1640, but the front surface of the heat output module 1640 itself may be used as the contact surface 1641. For example, according to an aspect of the heat output module 1640, an outer surface of the substrate 1642 may be used as the contact surface 1641.

2.4. Output of Thermal Feedback

A thermal feedback output operation performed by the feedback device 1600 will be described below.

The feedback device 1600 may output a thermal feedback as the heat output module 1640 performs an exothermic operation or an endothermic operation. The thermal feedback may include a hot feedback, a cold feedback, and a thermal grill feedback.

Herein, the hot feedback may be output by the heat output module 1640 performing an exothermic operation, and the cold feedback may be output by the heat output module 1640 performing an endothermic operation. Also, the thermal grill feedback may be output through a thermal grill operation in which the exothermic operation and the endothermic operation are combined.

The feedback device 1600 may output the thermal feedback at various intensities. The intensity of the thermal feedback may be adjusted by a feedback controller 1648 of the heat output module 1640 adjusting the magnitude of a voltage applied to a thermoelectric couple array 1643 through a power terminal 1647. Here, the method of adjusting the magnitude of a voltage includes a method of smoothing a duty signal and then applying power to a thermoelectric element. That is, the adjustment of the magnitude of a voltage may be regarded as including adjustment of the magnitude of a voltage by adjusting a duty rate of the duty signal.

The exothermic operation, the endothermic operation, and the thermal grill operation will be described below in more detail.

2.4.1. Exothermic/Endothermic Operation

The feedback device 1600 may perform an exothermic operation with the heat output module 1640 to provide a hot feedback to a user. Similarly, the feedback device 1600 may perform an endothermic operation to provide a cold feedback to a user.

Figure 10:
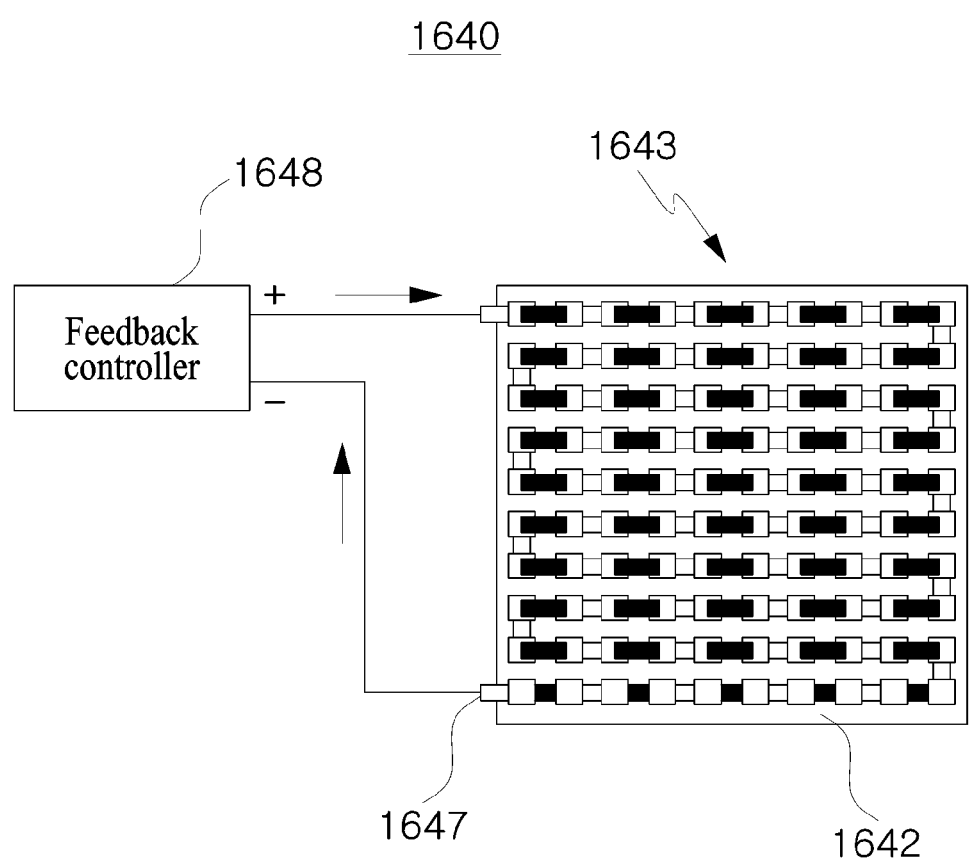
FIG. 10 is a diagram showing an exothermic operation for providing a hot feedback according to an embodiment of the present invention.
Figure 11:
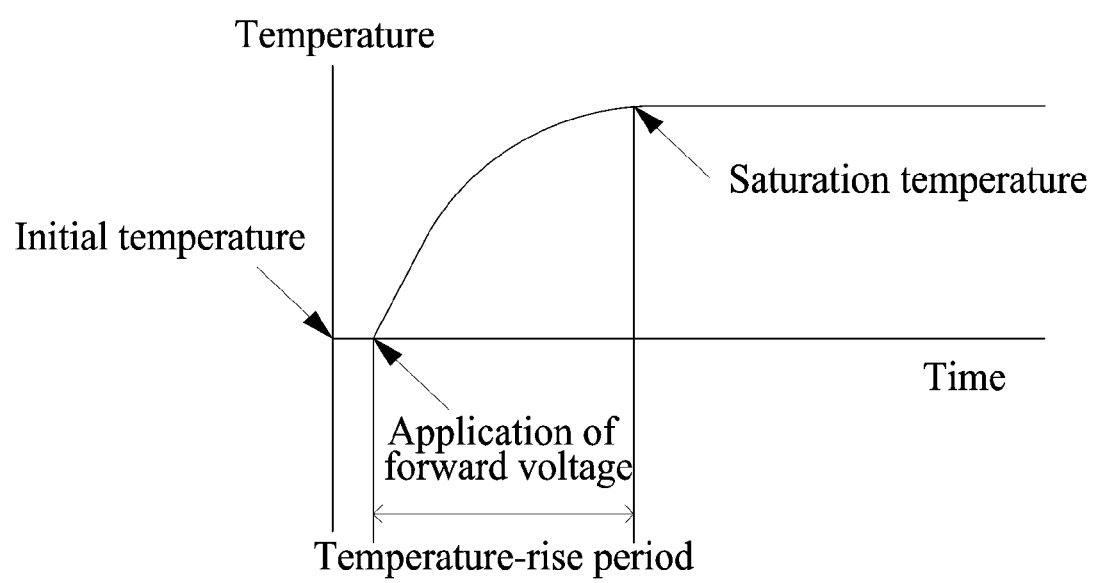
FIG. 11 is a graph showing the intensity of a hot feedback according to an embodiment of the present invention.

FIG. 10 is a diagram showing an exothermic operation for providing a hot feedback according to an embodiment of the present invention, and FIG. 11 is a graph showing the intensity of a hot feedback according to an embodiment of the present invention.

Referring to FIG. 10, the exothermic operation may be performed by the feedback controller 1648 applying a forward electric current to the thermoelectric couple array 1643 to induce an exothermic reaction toward the contact surface 1641. Here, when the feedback controller 1648 applies a certain voltage (hereinafter, a voltage causing the exothermic operation is referred to as a "forward voltage"), to the thermoelectric couple array 1643, the thermoelectric couple array 1643 initiates the exothermic operation, and the temperature of the contact surface 1641 reaches a saturation temperature over time, as shown in FIG. 11. Accordingly, a user feels no sensation or a weak hot sensation at the beginning of the exothermic operation, feels an increase in hot sensation when the saturation temperature is reached, and then receives a hot feedback corresponding to the saturation temperature after a certain period of time elapses.

Figure 12:
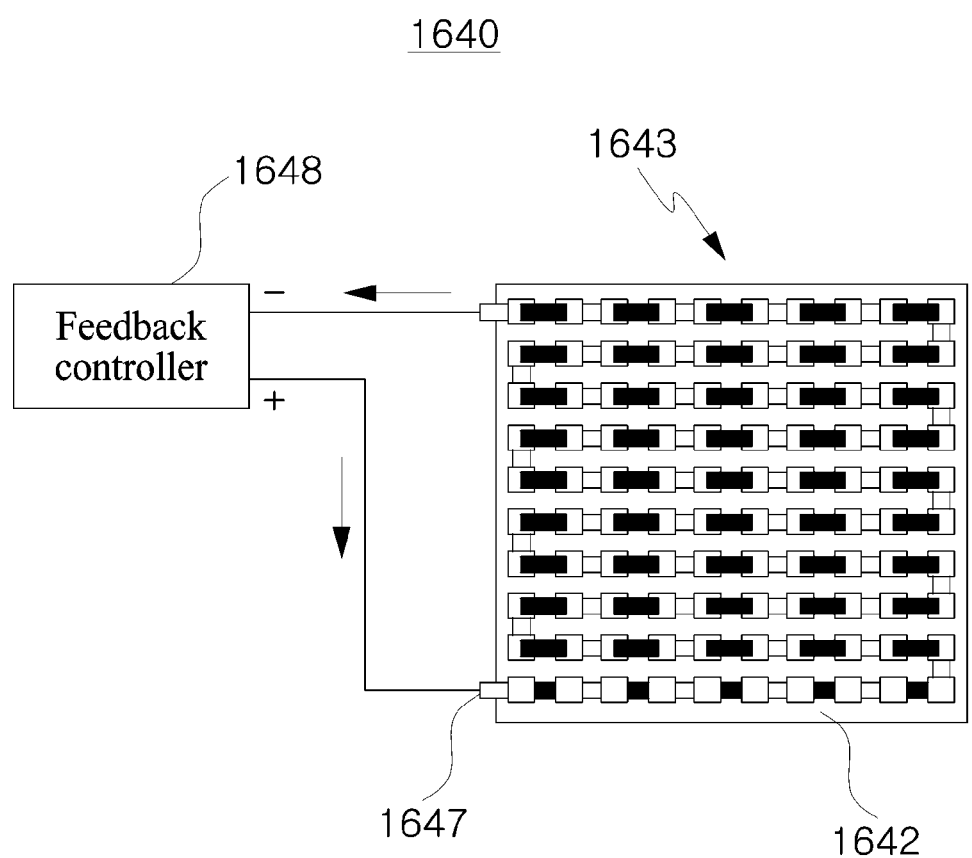
FIG. 12 is a diagram showing an exothermic operation for providing a cold feedback according to an embodiment of the present invention.
Figure 13:
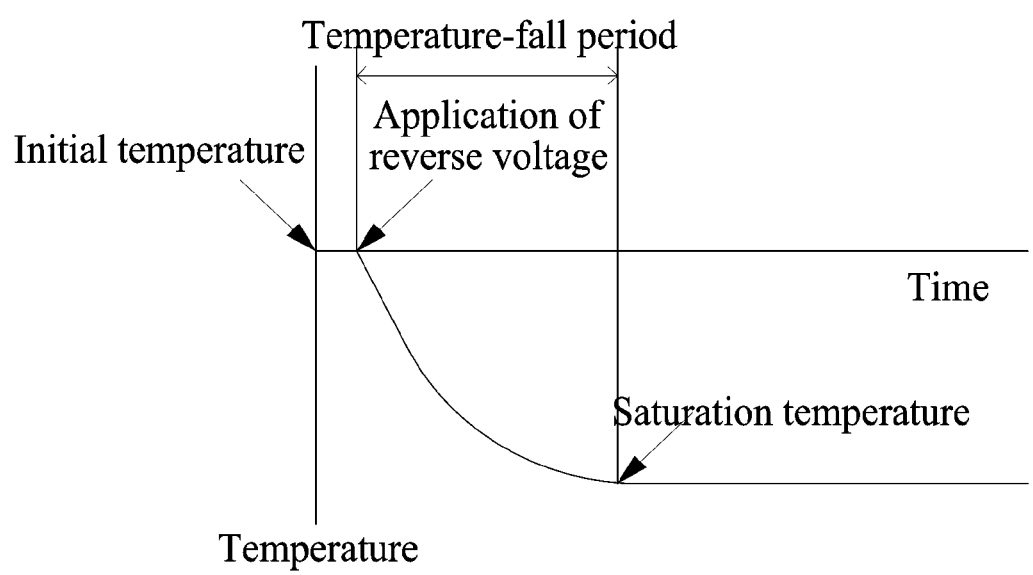
FIG. 13 is a graph showing the intensity of a cold feedback according to an embodiment of the present invention.

FIG. 12 is a diagram showing an exothermic operation for providing a cold feedback according to an embodiment of the present invention, and FIG. 13 is a graph showing the intensity of a cold feedback according to an embodiment of the present invention.

Referring to FIG. 12, the endothermic operation may be performed by the feedback controller 1648 applying a reverse electric current to the thermoelectric couple array 1643 to induce an endothermic reaction toward the contact surface 1641. Here, when the feedback controller 1648 applies a certain voltage to the thermoelectric couple array 1643 (hereinafter, a voltage causing the endothermic operation is referred to as a "reverse voltage"), the thermoelectric couple array 1643 initiates the endothermic operation, and the temperature of the contact surface 1641 reaches a saturation temperature over time, as shown in FIG. 13. Accordingly, a user feels no sensation or a weak cold sensation at the beginning of the endothermic operation, feels an increase in cold sensation when the saturation temperature is reached, and then receives a cold feedback corresponding to the saturation temperature after a certain period of time elapses.

When power is applied to the thermoelectric element, the thermoelectric element generates heat by converting electric energy into heat energy in addition to the exothermic reaction and endothermic reaction which are generated at both sides of the thermoelectric element. Accordingly, when a voltage with the same magnitude and the opposite current direction is applied to the thermoelectric couple array 1643, a temperature variation caused by the exothermic operation may be greater than a temperature variation caused by the endothermic operation. Here, the temperature variation denotes a difference between an initial temperature and a saturation temperature while the heat output module 1640 is not working.

Hereinafter, the exothermic operation and the endothermic operation, which are performed by a thermoelectric element using electric energy, are collectively referred to as a thermoelectric operation. Additionally, the thermal grill operation, which will be described below, may be interpreted as a kind of "thermoelectric operation" because the thermal grill operation is an operation into which the exothermic operation and the endothermic operation are combined.

2.4.2. Intensity Control for Exothermic/Endothermic Operation

When the heat output module 1640 performs an exothermic operation or an endothermic operation as described above, the feedback controller 1648 may control an exothermic level or an endothermic level of the heat output module 1640 by adjusting the magnitude of applied voltage. Accordingly, the feedback controller 1648 may adjust the intensity of a hot feedback or a cold feedback by adjusting the magnitude of a voltage as well as by adjusting the direction of current to select the type of a heat feedback to be provided between the hot feedback and the cold feedback.

Figure 14:
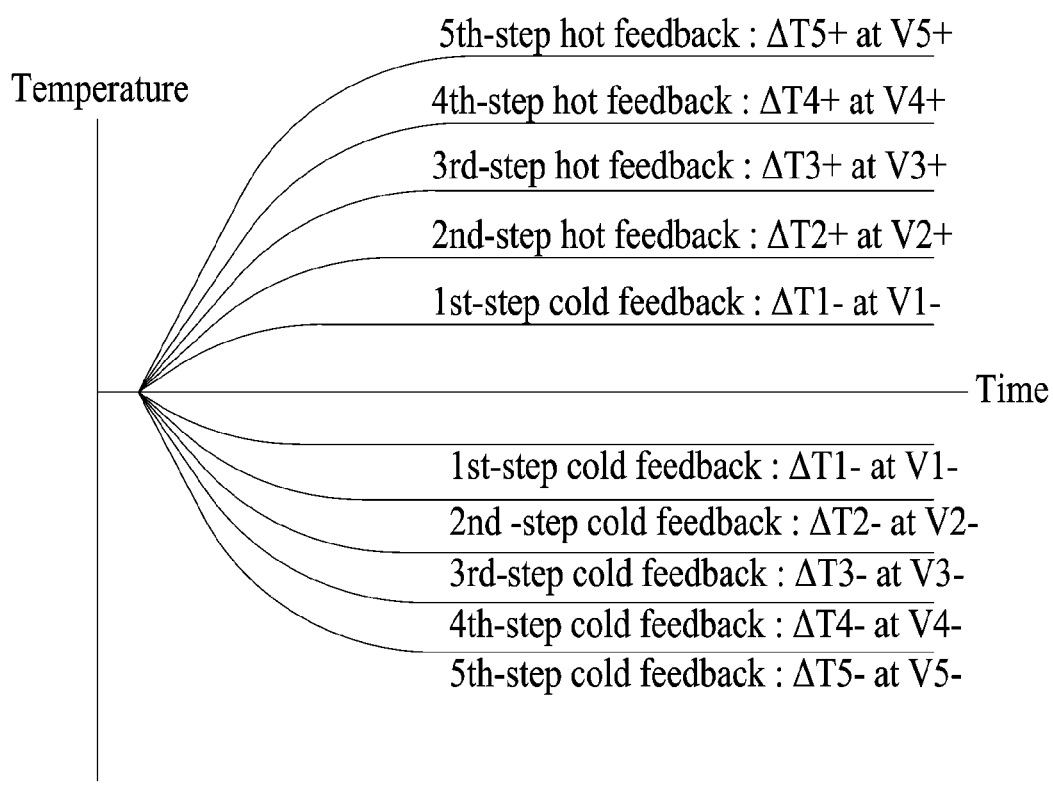
FIG. 14 is a graph showing the intensity of a hot/cold feedback using voltage adjustment according to an embodiment of the present invention.

FIG. 14 is a graph showing the intensity of a hot/cold feedback using voltage adjustment according to an embodiment of the present invention.

For example, as shown in FIG. 14, the feedback device 1600 may provide thermal feedbacks with a total of ten intensities (i.e., five intensities for the hot feedback and five intensities for the cold feedback) by the feedback controller 1648 applying voltage magnitudes with five intensities in a forward or reverse direction.

FIG. 14 shows that the hot feedback has the same number of intensities as the cold feedback. However, the number of intensities of the hot feedback and the number of intensities of the cold feedback do not necessarily have to be the same and may be different from each other.

Also, it is shown that the hot feedback and the cold feedback are implemented by changing the current direction while using the same voltage magnitude. However, the magnitude of the voltage applied for the hot feedback and the magnitude of the voltage applied for the cold feedback need not be the same.

In particular, when the exothermic operation and the endothermic operation are performed by applying the same voltage, the temperature variation of the hot feedback caused by the exothermic operation is greater than the temperature variation caused by the endothermic operation. Thus, by applying a voltage for the cold feedback, which is higher than the voltage applied for the hot feedback, the same temperature variation may appear at the same intensity.

The magnitude of the voltage applied to the heat output module 1640, which is controlled in order to control the intensity of the thermal feedback, has been described above, but the intensity of the thermal feedback may be controlled in other ways.

As an example, when the thermoelectric couple array 1643 of the heat output module 1640 has a plurality of individually controllable thermoelectric couple groups 1644, the feedback controller 1648 may control operation for each thermoelectric couple group 1644 to adjust the intensity of the thermal feedback.

Figure 15:
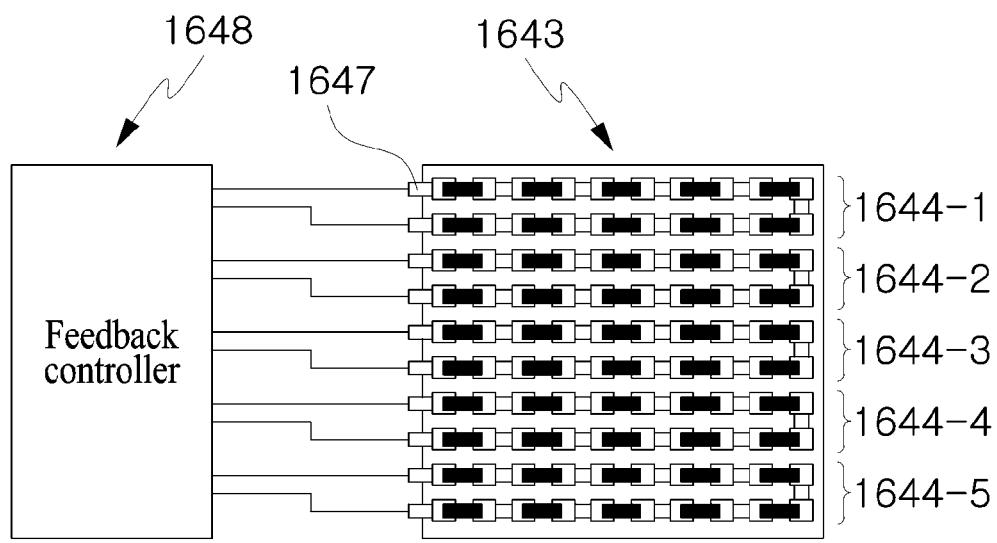
FIG. 15 is a graph showing adjustment of the intensity of a hot/cold feedback through operation control for each thermoelectric couple group 1644 according to an embodiment of the present invention.

FIG. 15 is a graph showing adjustment of the intensity of a hot/cold feedback through operation control for each thermoelectric couple group 1644 according to an embodiment of the present invention. Referring to FIG. 15, when the thermoelectric couple array 1643 is composed of five thermoelectric groups 1644-1, 1644-2, 1644-3, 1644-4, and 1644-5, the feedback controller 1648 may adjust the intensity of the thermal feedback by applying a voltage to some or all of the thermoelectric couple groups 1644. For example, the feedback controller 1648 may apply a voltage to all of the thermoelectric couple groups 1644 to provide a thermal feedback with the highest intensity to the user, may apply a voltage to only four of the thermoelectric couple groups 1644 to provide a thermal feedback with an upper middle intensity, may apply a voltage to only three of the thermoelectric couple groups 1644 to provide a thermal feedback with a middle intensity to the user, may apply a voltage to only two of the thermoelectric couple groups 1644 to provide a thermal feedback with a lower middle intensity to the user, or may apply a voltage to only one of the thermoelectric couple groups 1644 to provide a thermal feedback with the lowest intensity to the user.

When the intensity of the thermal feedback is adjusted depending on whether to apply a voltage to each of the thermoelectric couple groups 1644, the feedback controller 1648 may select a thermoelectric couple group 1644 to receive the voltage such that heat distribution is as uniform as possible within allowable limits. To this end, the feedback controller 1648 may determine whether to apply a voltage to the thermoelectric couple groups 1644 by minimizing the number of consecutive thermoelectric couple groups 1644 to which the voltage is applied or the number of consecutive thermoelectric couple groups 1644 to which the voltage is not applied. Since the table shown in FIG. 15 takes into consideration uniformity of the heat distribution, the above description will be more clearly understood with reference to the above table.

As another example, the feedback controller 1648 may adjust the intensity of the thermal feedback by controlling power application timing. In detail, the feedback controller 1648 may adjust the intensity of the thermal feedback by applying power to the thermoelectric couple arrays 1643 using an electric signal in the form of a duty signal with a duty cycle.

Figure 16:
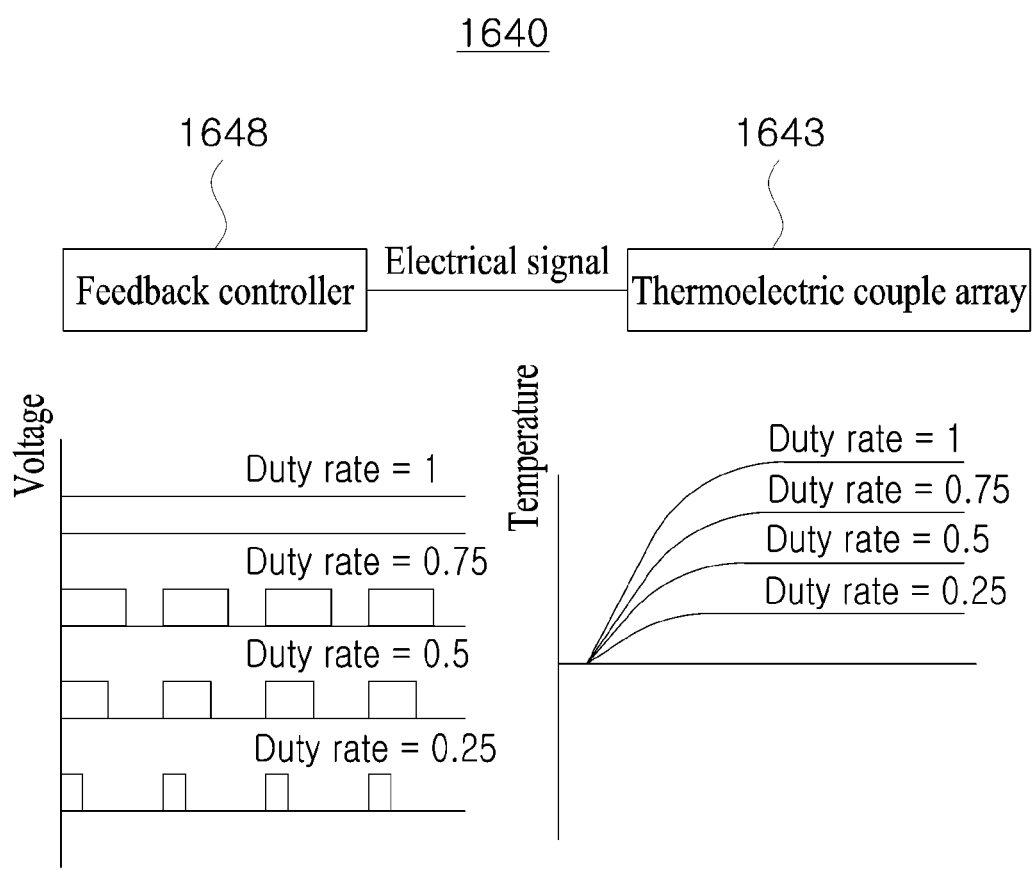
FIG. 16 is a graph showing adjustment of the intensity of a hot/cold feedback through power application timing control according to an embodiment of the present invention.

FIG. 16 is a graph showing adjustment of the intensity of a hot/cold feedback through power application timing control according to an embodiment of the present invention. Referring to FIG. 16, it can be seen that the intensity of the thermal feedback is controlled by adjusting the duty rate of the electric signal.

As described above, by adjusting the thermal feedback, it is possible to provide segmented thermal feedback such as a strong hot sensation, a weak hot sensation, a strong cold sensation, a weak cold sensation, and the like as well as to just provide a hot sensation and a cold sensation to the user. By using variously segmented thermal feedback, it is possible to provide a higher degree of immersion to the user under game environments or virtual/augmented reality environments, and it is also possible to accurately inspect a patient's sensation when the present invention is applied to medical devices.

Also, the intensity of the thermal feedback may be adjusted by combination of a voltage adjustment scheme, an adjustment scheme for each thermoelectric couple group 1644 (i.e., a region-based adjustment scheme), and an adjustment scheme using a duty cycle in addition to the above-described intensity adjustment method of thermal feedback. The combination is obvious to those skilled in the art, and thus a detailed description thereof will be omitted.

2.4.2. Thermal Grill Operation

The feedback device 1600 may provide a thermal grill feedback in addition to the hot feedback and the cold feedback. A thermal pain sensation denotes that when a hot spot and a cold spot of a human body are simultaneously stimulated, this stimulus is recognized as a pain sensation instead of being recognized as a hot sensation and a cold sensation. Accordingly, the feedback device 1600 may provide the head grill feedback to the user through a thermal grill operation into which the exothermic operation and the endothermic operation are combined.

The feedback device 1600 may perform various thermal grill operations to provide thermal grill feedback. This will be described below after the types of thermal grill feedback are described.

2.4.2.1. Types of Thermal Grill Feedback

The thermal grill feedback may include a neutral thermal grill feedback, a hot grill feedback, and a cold grill feedback.

Here, the neutral thermal grill feedback, the hot grill feedback, and the cold grill feedback cause the user to experience a neutral heat sensation, a hot pain sensation, and a cold pain sensation. The neutral heat pain sensation may refer to only a pain sensation without a hot sensation and a cold sensation, the hot pain sensation may refer to a pain sensation in addition to a hot sensation, and the cold pain sensation may refer to a pain sensation in addition to a cold sensation.

The neutral heat pain sensation is caused when the intensity of the hot sensation and the intensity of the cold sensation that the user feels correspond to predetermined ratio ranges. A ratio at which the user feels the neutral heat pain sensation (hereinafter referred to as a "neutral ratio") may be different for each body part that receives a thermal feedback, and the neutral ratio may be slightly different for each individual despite the same human body. In most cases, however, the neutral heat pain sensation tends to be felt while the intensity of the cold sensation is given greater than the intensity of the hot sensation.

Here, the intensity of the thermal feedback may be the amount of heat that the feedback device 1600 applies to a human body brought into contact with the contact surface 1600 or the amount of heat that the feedback device 1600 absorbs from the corresponding human body. Accordingly, when the thermal feedback is applied to a certain area for a certain period of time, the intensity of the thermal feedback may be represented as a difference between the temperature of the hot sensation or the cold sensation and the temperature of a target portion to which the thermal feedback is applied.

On the other hand, human body temperature is usually between 36.5° C. and 36.9° C., and skin temperature is known to be about 30° C. to 32° C. on average but varies for each individual or body part. Palm temperature is about 33° C., which is slightly higher than the average skin temperature. It will be appreciated that the above-mentioned temperature values may be somewhat different for each individual and may somewhat vary despite the same person.

According to an experiment example, it was confirmed that a neutral heat pain sensation was felt when a hot sensation of about 40° C. and a cold sensation of about 20° C. were applied to a palm of 33° C. Based on the palm temperature, a hot sensation of about +7° C. and a cold sensation of about −13° C. are applied, and thus the neutral ratio may correspond to 1.86 in terms of temperature.

As can be seen from the above, for most people, the neutral ratio is represented as a ratio of a temperature difference caused by the cold sensation to a temperature difference caused by the hot sensation with respect to a contact target, i.e., a ratio ranges from about 1.5 to 5 when the hot sensation and the cold sensation are each continuously applied to a human area of the same size. Also, the hot pain sensation may be felt when the hot sensation is stronger than the neutral ratio, and the cold pain sensation may be felt when the cold sensation is stronger than the neutral ratio.

2.4.2.2. Thermal Grill Operation According to Voltage Adjustment

The feedback device 1600 may perform a voltage adjustment-based thermal grill operation. The voltage adjustment-based thermal grill operation may be applied to the feedback device 1600 with the thermoelectric couple array 1643 being composed of the plurality of thermoelectric couple groups 1644.

In detail, the voltage adjustment-based thermal grill operation may be performed by the feedback controller 1648 applying a forward voltage to some of the thermoelectric couple groups 1644 to perform an exothermic operation and applying a reverse voltage to the others to perform an endothermic operation and by the heat output module 1640 providing both of a hot feedback and a cold feedback.

Figure 17:
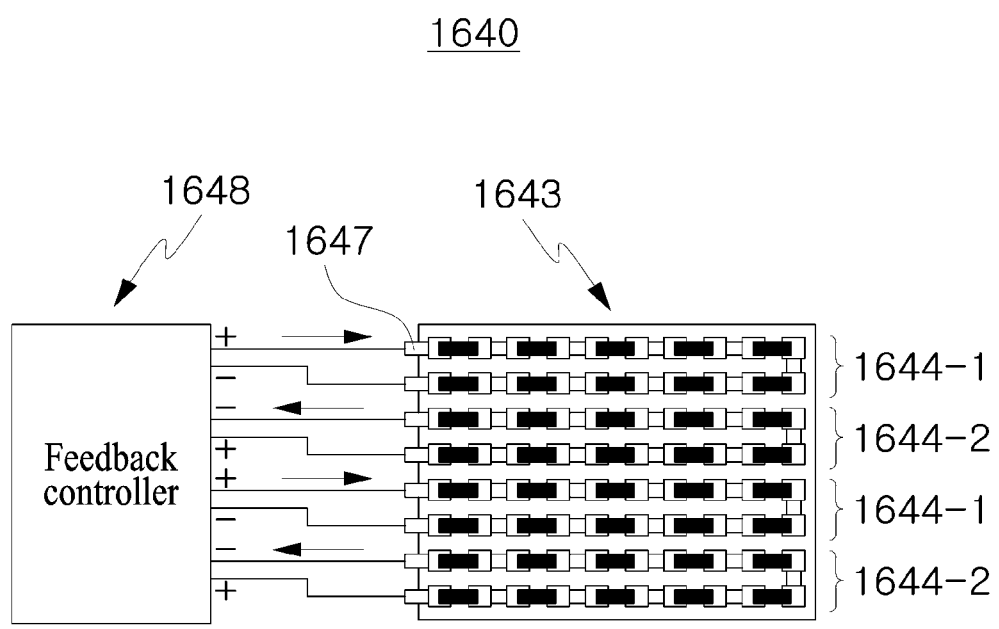
FIG. 17 is a diagram showing a voltage adjustment-based thermal grill operation according to an embodiment of the present invention.

FIG. 17 is a diagram showing a voltage adjustment-based thermal grill operation according to an embodiment of the present invention.

Referring to FIG. 17, a thermoelectric couple array 1643 includes a plurality of thermoelectric couple groups 1644 disposed to form a plurality of lines. Here, a feedback controller 1648 may apply power so that first thermoelectric couple groups 1644-1 (e.g., thermoelectric couple groups in odd lines) perform an exothermic operation and second thermoelectric couple groups 1644-2 (e.g., thermoelectric couple groups in even lines) perform an endothermic operation. By the thermoelectric couple groups 1644 alternately performing the exothermic operation and the endothermic operation according to line arrangement as described above, the user may simultaneously receive a hot sensation and a cold sensation and thus receive a thermal grill feedback. Here, a distinction between the odd lines and the even lines is arbitrary, and thus the order of the odd lines and the even lines may be reversed.

Here, the feedback device 1600 may provide a neutral thermal grill feedback by performing control such that a saturation temperature caused by the exothermic operation of the first thermoelectric couple groups 1644-1 and a saturation temperature caused by the endothermic operation of the second thermoelectric couple groups 1644-2 follow the neutral ratio.

FIG. 18 is a table regarding a voltage for providing a neutral thermal grill feedback through voltage adjustment according to an embodiment of the present invention.

For example, referring to FIG. 18, a feedback controller 1648 may apply five forward voltages and five reverse voltages to a heat output module 1640, and thus the heat output module 1640 performs the exothermic operation at five levels and the endothermic operation at five levels. At the same level, a temperature variation caused by the exothermic operation is the same as that of the endothermic operation. The following description assumes that the feedback device 1600 has a constant temperature variation interval of each level. When the neutral ratio is set to 3, the feedback controller 1648 may apply a forward voltage with the first level, which is the smallest level, to the first thermoelectric couple groups 1644-1 and apply a reverse voltage with the third level to the second thermoelectric couple groups 1644-2, and thus the heat output module 1640 may provide a neutral heat pain sensation feedback. Similarly, when the neutral ratio is 2.5, the feedback controller 1648 may apply a forward voltage with the second level to the first thermoelectric couple groups 1644-1 and apply a reverse voltage with the fifth level to the second thermoelectric couple groups 1644-2 in order to provide a neutral thermal grill feedback. Alternatively, when the neutral ratio is 4, the feedback controller 1648 may apply a forward voltage with the first level to the first thermoelectric couple groups 1644-1 and apply a reverse voltage with the fourth level to the second thermoelectric couple groups 1644-2 to generate a neutral thermal grill feedback. Alternatively, when the neutral ratio is 2, the feedback controller 1648 may apply either a forward voltage with the first level and a reverse voltage with the second level or a forward voltage with the second level and a reverse voltage with the fourth level to provide a neutral heat pain sensation. In this case, the former neutral heat pain sensation (when the forward voltage with the first level and the reverse voltage with the second level are used) may be stronger than the latter neutral heat pain sensation (when the forward voltage with the second level and the reverse voltage with the fourth level are used). That is, even for the thermal grill feedback, the intensity of the thermal grill feedback may be adjusted. On the other hand, the above description regarding the method of providing the neutral heat pain sensation is illustrative, and thus the present invention is not limited thereto. For example, it is not necessary for the number of levels of the thermal feedback to be five, and the number of levels of the cold feedback may be different from that of the hot feedback. Also, it is not necessary that the temperature variation interval of each level should be constant, and for example, a voltage interval of each level may be constant.

Also, the feedback controller 1648 may provide a hot grill feedback by adjusting the forward voltage and the reverse voltage to be equal to or less than the neutral ratio and may provide a cold grill feedback by adjusting the forward voltage and the reverse voltage to be equal to or greater than the neutral ratio.

For example, referring to FIG. 18 again, when the neutral ratio is set to 3, the feedback controller 1648 may apply a forward voltage with the first level to the first thermoelectric couple groups 1644-1 and apply a reverse voltage with the first level or the second level to the second thermoelectric couple groups 1644-2. Then, the heat output module 1640 may generate a heat sensation and a pain sensation at a ratio lower than the neutral ratio and thus may provide a hot grill feedback to enable a user to simultaneously feel a hot sensation and a pain sensation. In this case, the forward voltage need not necessarily be the forward voltage used for the neutral thermal grill feedback. In other words, the feedback controller 1648 may allow the heat output module 1640 to provide a hot grill feedback using a forward voltage with the fourth level and a reverse voltage with the fourth level.

For the cold grill feedback, when the neutral ratio is set to 3, the feedback controller 1648 may apply either a forward voltage with the first level and a reverse voltage with the fourth level or a forward voltage with the first level and a reverse voltage with the fifth level to the heat output module 1640.

However, when the hot grill feedback or the cold grill feedback is intended to be provided and the forward voltage and the reverse voltage are applied at a ratio significantly different from the neutral ratio, the user may not feel a pain sensation. Thus, it may be preferable that the levels of the forward voltage/the reverse voltage be adjusted such that the ratio becomes close to the neutral ratio.

2.4.2.3 Thermal Grill Operation According to Region Adjustment

It has been described above that the feedback device 1600 provides thermal grill feedback by adjusting a voltage applied to the thermoelectric couple groups 1644 in a state in which regions performing an exothermic operation and regions performing an endothermic operation, which have the same sizes, are alternately arranged in the thermoelectric couple array 1643. However, thermal grill feedback may also be generated by adjusting sizes of exothermic regions and endothermic regions.

Specifically, the thermal grill operation using the region adjustment method may be performed by adjusting areas of the thermoelectric couple groups 1644 to which a forward voltage is applied and areas of the thermoelectric couple groups 1644 to which a reverse voltage is applied.

Figure 19:
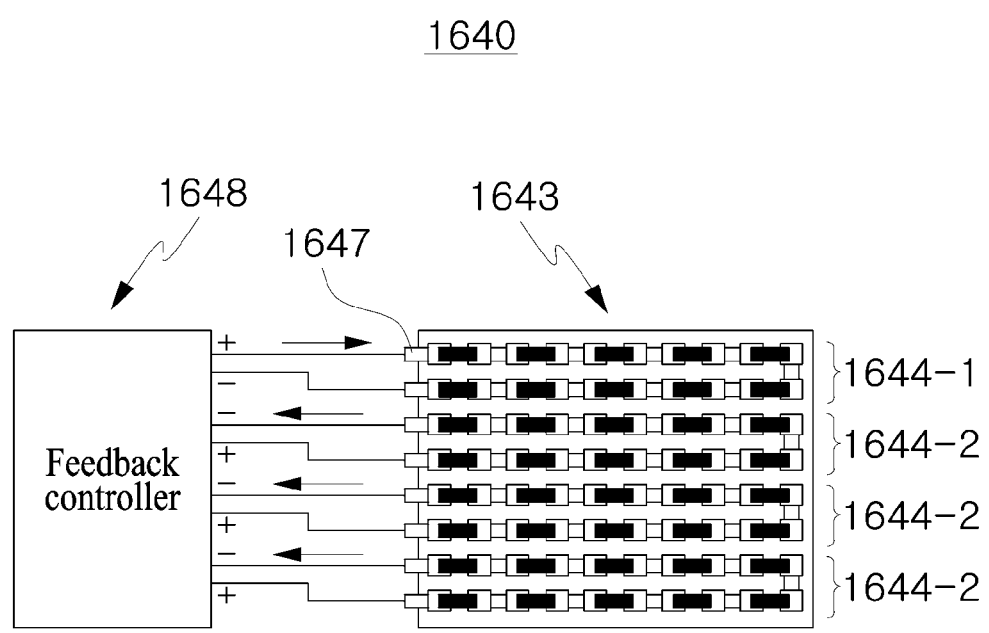
FIG. 19 is a view related to a thermal grill operation using a region adjustment method according to an embodiment of the present invention.

FIG. 19 is a view related to a thermal grill operation using a region adjustment method according to an embodiment of the present invention.

Referring to FIG. 19, the thermoelectric couple array 1643 includes a plurality of thermoelectric couple groups 1644 arranged to form a plurality of lines. Here, if it is assumed that sizes of areas of the lines are equal and that the forward voltage and the reverse voltage are set to voltage values which cause temperature variations of hot feedback and cold feedback to be equal, when a neutral ratio is 3, the feedback controller 1648 may apply a forward voltage and a reverse voltage to the heat output module 1640 so that three thermoelectric couple groups 1644-2 perform the endothermic operation per a single thermoelectric couple group 1644-1 performing the exothermic operation, and thus the area of the contact surface 1600 providing the cold feedback is three times the area of the contact surface 1600 providing the hot feedback. In this way, the feedback device 1600 may be allowed to provide neutral thermal pain.

However, here, the neutral ratio may refer to a ratio of an area to which cold feedback is provided to an area to which hot feedback is provided instead of a ratio between temperature variations at times of hot feedback and cold feedback. The neutral ratio in terms of area may be equal to the neutral ratio in terms of temperature but may also be somewhat different therefrom. In addition, the feedback controller 1648 may also decrease or increase the number of thermoelectric couple groups 1644-2 performing the endothermic operation per a single thermoelectric couple group 1644-1 performing the exothermic operation so that the feedback device 1600 performs hot thermal grill feedback or cold thermal grill feedback.

Meanwhile, although the thermoelectric couple groups 1644 have been described as having the same areas with reference to FIG. 19, to the contrary, the thermoelectric couple groups 1644 may also be designed in consideration of a neutral ratio.

Figure 20:
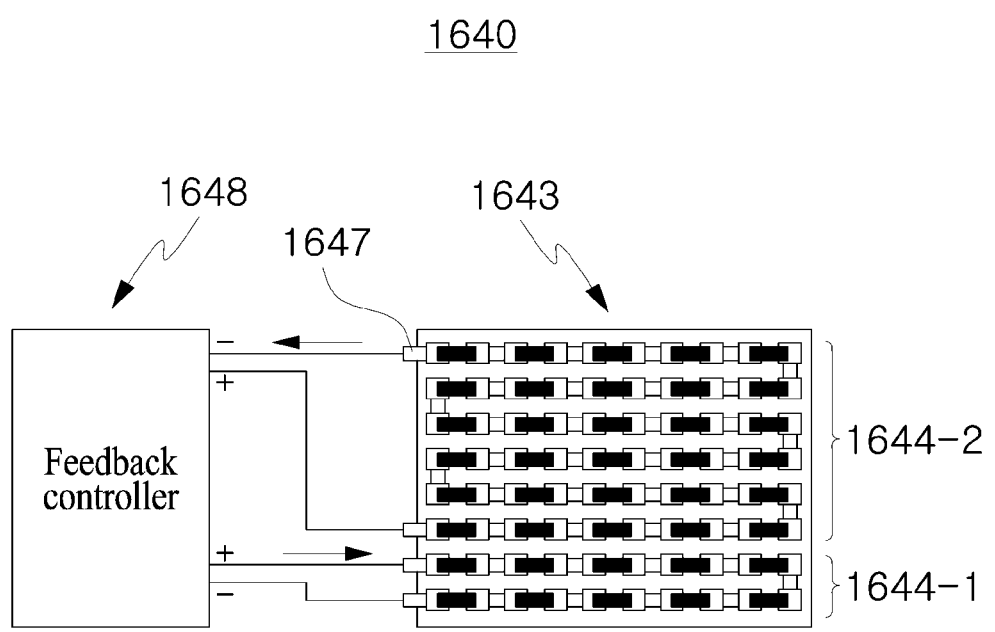
FIG. 20 is a view illustrating a thermoelectric couple array (1640) formed of thermoelectric couple groups (1644) having different areas for a thermal adjustment method according to an embodiment of the present invention.

FIG. 20 is a view illustrating a thermoelectric couple array 1643 formed of thermoelectric couple groups 1644 having different areas for a thermal adjustment method according to an embodiment of the present invention.

Referring to FIG. 20, a first thermoelectric couple group 1644-1 and a second thermoelectric couple group 1644-2 may be designed to have different areas, and a ratio between the areas may be a neutral ratio. When such a thermoelectric couple array 1643 is used, a feedback controller 1648 may apply a forward voltage and a reverse voltage to each of the first thermoelectric couple group 1644-1 and the second thermoelectric couple group 1644-2 and allow a feedback device 1600 to provide neutral thermal grill feedback.

In relation to providing thermal grill feedback by adjusting an exothermic area and an endothermic area, description has been given above by assuming that a forward voltage and a reverse voltage are used while temperature variations at times of hot feedback and cold feedback are equal. However, when, unlike the above, the temperature variations at the times of hot feedback and cold feedback are different, the ratio between the areas should be adjusted by further taking into consideration an effect according to the different temperature variations.

In other words, to provide neutral thermal pain, a value calculated from two variables, a ratio of an endothermic area to an exothermic area and a ratio of a temperature variation of coldness to a temperature variation of hotness, may be caused to become a neutral ratio. For example, by causing a product of a ratio between temperature variations and a ratio between area variations to become a neutral ratio, the feedback device 1600 may provide thermal grill feedback.

As compared with a thermal grill operation using a voltage, the above-described thermal grill operation according to the region adjustment method has an advantage in that it is easy to adjust an intensity of feedback.

When an exothermic operation and an endothermic operation are performed by applying equal voltages to a thermoelectric element, generally, a temperature variation of the exothermic operation is larger than a temperature variation of the endothermic operation. When this aspect is combined with an aspect wherein, in the case of the thermal grill operation using voltage adjustment, a temperature variation of cold feedback has to be made larger than a temperature variation of hot feedback by an amount which is as much as a neutral ratio, a ratio of a magnitude of a reverse voltage to a magnitude of a forward voltage becomes a numerical value that is significantly greater than a neutral ratio in terms of temperature. Therefore, to provide neutral thermal grill feedback by using a voltage adjustment method, the feedback controller 1648 has to output an electrical signal in a wide voltage range. Therefore, when a voltage range of applied power is limited, it may be substantially difficult to adjust an intensity of thermal grill feedback.

On the other hand, since, in the region adjustment method, neutral thermal grill feedback is processed by adjusting an area of a hot feedback region and an area of a cold feedback region, an intensity of the neutral thermal grill feedback may be simply adjusted by increasing and decreasing a temperature variation according to an exothermic operation in the hot feedback region and a temperature variation according to an endothermic operation in the cold feedback region.

Specifically, in the part of the description with reference to FIG. 18, the feedback controller 1648 may simultaneously increase magnitudes of a forward voltage and a reverse voltage so that the heat output module 1640 provides strong neutral thermal grill feedback or may simultaneously decrease the magnitudes of the forward voltage and the reverse voltage so that the heat output module 1640 provides weak thermal grill feedback. Since, as already mentioned in the description above with reference to FIG. 18, the neutral ratio for neutral thermal grill feedback is already satisfied by the exothermic area and the endothermic area, the feedback controller 1648 may control an intensity of thermal grill feedback by relatively freely adjusting magnitudes of a forward voltage and a reverse voltage.

2.4.2.4. Thermal Grill Operation According to Time Division

In addition, a thermal grill operation may be implemented according to a time division method. Specifically, the thermal grill operation according to the time division method may be implemented by performing an exothermic operation and an endothermic operation alternately in time. This is because, when hot feedback and cold feedback are alternately transferred within a relatively short time interval, one's sensory organ may mistake the alternating of the hot feedback and cold feedback for thermal pain.

The feedback controller 1648 may cause an exothermic operation and an endothermic operation to be alternately performed by alternately applying a forward voltage and a reverse voltage to the heat output module 1640. Here, neutral thermal grill feedback may be performed by adjusting at least one of a voltage magnitude or a time interval.

FIG. 21 is a view related to an example of a thermal grill operation using a time division method according to an embodiment of the present invention.

If it is assumed that a forward voltage and a reverse voltage are set such that temperature variations of hot feedback and cold feedback are equal, the feedback controller 1648 may control an output timing of an electrical signal so that a ratio of a time during which a reverse voltage is applied to a time during which a forward voltage is applied becomes a neutral ratio. For example, referring to FIG. 21, when a neutral ratio is 3, the feedback controller 1648 may provide neutral thermal grill feedback by applying a forward voltage for 20 ms and applying a reverse voltage for 60 ms. Here, hot thermal grill feedback or cold thermal grill feedback may be performed according to adjusting a ratio of signal output timings. Meanwhile, when a time interval is set to a neutral ratio, the feedback controller 1648 may adjust an intensity of a thermal grill operation by simultaneously increasing or simultaneously decreasing magnitudes of a forward voltage and a reverse voltage.

FIG. 22 is a view related to another example of a thermal grill operation using the time division method according to an embodiment of the present invention. If it is assumed that application times of hot feedback and cold feedback are set to equal lengths, the feedback controller 1648 may adjust a voltage value of an electrical signal so that temperature variations of hot feedback and cold feedback performed during an equal amount of time have a neutral ratio. For example, referring to FIG. 22, when a neutral ratio is 3, the feedback controller 1648 may provide neutral thermal grill feedback by adjusting magnitudes of a forward voltage and a reverse voltage so that a temperature variation in a cold operation section becomes three times a temperature variation in an exothermic operation section while alternately applying the forward voltage and the reverse voltage at 20 ms intervals. Here, hot thermal grill feedback or cold thermal grill feedback may be performed by adjusting magnitudes of a forward voltage and a reverse voltage.

Of course, the feedback controller 1648 may simultaneously adjust a time interval and a voltage magnitude.

Meanwhile, the thermal grill operation using the voltage adjustment method or the region adjustment method causes a sensation of pain sensately but simultaneously applies hot heat and cold heat to the user's body physically. However, when the user's sensory organ is continuously stimulated by such thermal pain, the user's body senses remnants of sensations for a predetermined period of time even after the thermal grill feedback is removed. Since the thermal grill feedback is mostly a sense similar to pain, the user may feel uncomfortable due to the remnants of sensations. A reason for such remnants of sensations is that, to provide effective thermal grill feedback, a hot spot and a cold spot of skin are exposed to warmth and coldness, which are delivered at a somewhat high intensity, for a long period of time. On the other hand, since a hot spot and a cold spot of the skin are not continuously stimulated in the thermal grill operation according to the time division method, the thermal grill operation according to the time division method has an advantage in that the afterimage effect is somewhat eliminated.

2.4.2.5. Thermal Grill Operation in which Region Adjustment and Time Division are Combined In addition, a thermal grill operation may also be performed by combining the concept of the region adjustment method with the thermal grill operation according to the time division method.

Here, the thermal grill operation may be performed such that an exothermic operation and an endothermic operation are alternately performed in one region and another region of a thermoelectric couple array 1643 with relation to time, wherein different operations are performed in one region and the other region.

Figure 23:
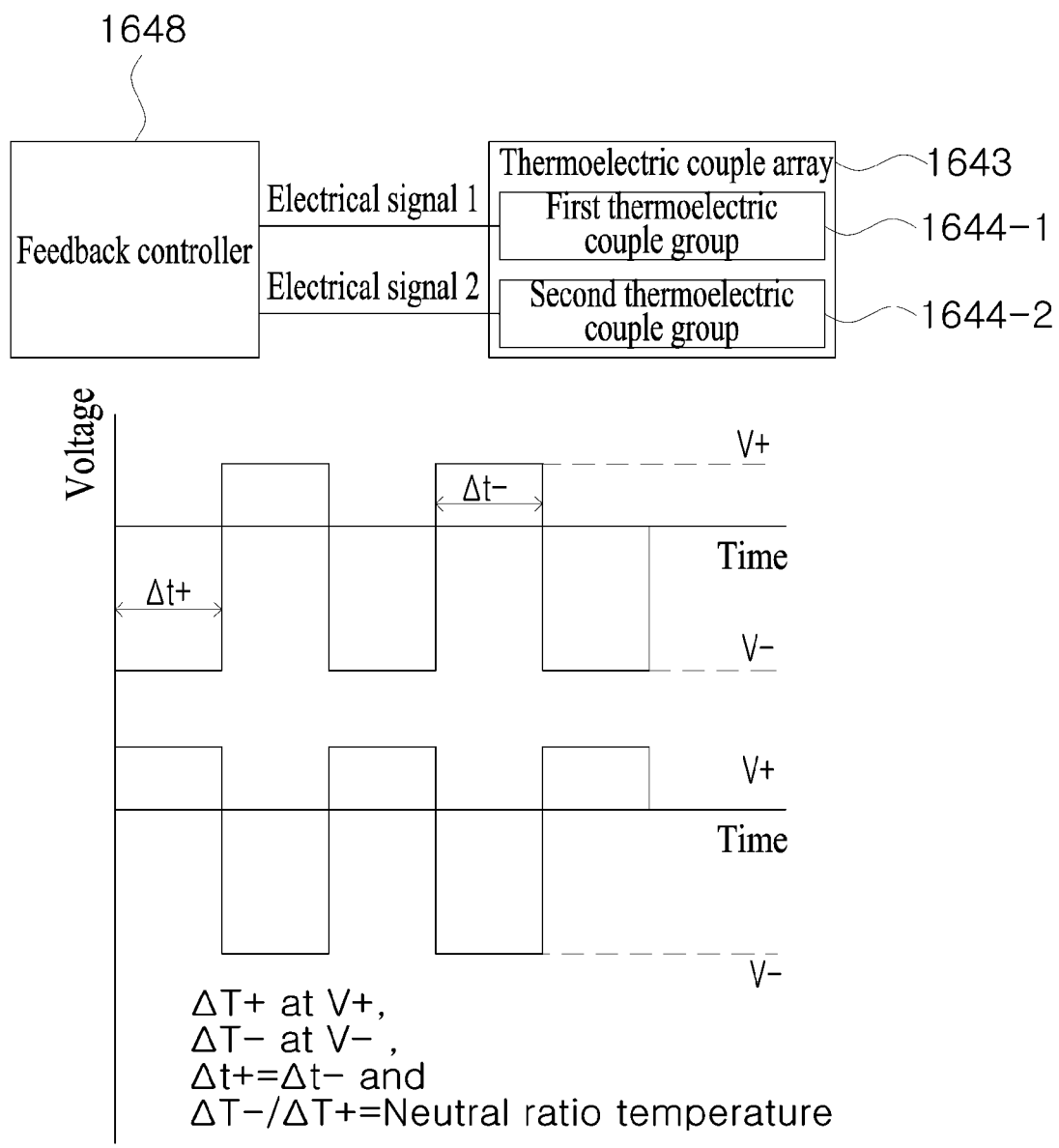
FIG. 23 is a view related to an example of a thermal grill operation using a method in which region adjustment and time division are combined according to an embodiment of the present invention.

FIG. 23 is a view related to an example of a thermal grill operation using a method in which region adjustment and time division are combined according to an embodiment of the present invention.

Referring to FIG. 23, a thermoelectric couple array 1643 may include a first thermoelectric couple group 1644-1 performing a first operation and a second thermoelectric couple group 1644-2 performing a second operation. Here, the first operation and the second operation are the same in that the exothermic operation and the endothermic operation are alternately performed with time but are operations in which the exothermic operation and the endothermic operation are performed at alternate timings. The feedback controller 1648 may sequentially apply a forward voltage and a reverse voltage in that order to the first thermoelectric couple group 1644-1 to control the first thermoelectric couple group 1644-1 to perform the first operation and may sequentially apply a reverse voltage and a forward voltage in that order to the second thermoelectric couple group 1644-2 to control the second thermoelectric couple group 1644-2 to perform the second operation. Accordingly, since the heat output module 1640 simultaneously outputs hot heat feedback and cold feedback from a region of the first thermoelectric couple group 1644-1 and a region of the second thermoelectric couple group 1644-2, the feedback device 1600 may provide thermal grill feedback. When the first thermoelectric couple group 1644-1 and the second thermoelectric couple group 1644-2 have the same areas, and a length of time of the exothermic operation and a length of time of the endothermic operation are the same in the first operation and the second operation, the feedback device 1600 may provide neutral thermal grill feedback or provide hot thermal grill feedback or cold thermal grill feedback due to a ratio between voltage values of a forward voltage and a reverse voltage.

Meanwhile, here, the lengths of time of the exothermic operation and the endothermic operation may also be a relatively long time interval unlike the case in which a thermal grill operation is performed using a simple time division method. This is because, while it is required to cause an illusion to one's sensory organ by being dependent on a time division interval in the case of the simple time division method, a sensation of pain may be felt due to simultaneous provision of hot feedback and cold feedback even if a time interval is long in the case of the combined method. That is, while each of an application time of the forward voltage and an application time of the reverse voltage has to be adjusted to an application time less than or equal to that required for the user to sense hotness according to the exothermic operation or sense coldness according to the endothermic operation in the case of the simple time division method, the combined method in which the exothermic operation and the endothermic operation are alternately performed for each region has an advantage in that there is little or no time limit.

Further, since the thermal grill operation using the combined method periodically provides hot heat and cold heat alternately instead of continuously providing hot heat or cold heat to one's skin, damage to the skin may be minimized. To this end, it may not be good for the time interval to be too long.

Although description has been given above with reference to FIG. 23 that the thermoelectric couple array 1643 has two thermoelectric couple groups 1644 which operate alternately, the combined method may also be applied to the thermoelectric couple array 1643 having various other forms.

FIG. 24 is a view related to another example of a thermal grill operation using the method in which region adjustment and time division are combined according to an embodiment of the present invention.

Referring to FIG. 24, a thermoelectric couple array 1643 may include four thermoelectric couple groups 1644-1, 1644-2, 1644-3, and 1644-4. Here, a feedback controller 1648 may apply the following electrical signals to each thermoelectric couple group 1644. First, during a first time section, the feedback controller 1648 applies a forward voltage to the first thermoelectric couple group 1644-1 so that an exothermic operation is performed and applies a reverse voltage to the second thermoelectric couple group 1644-2 so that an endothermic operation is performed but does not apply a voltage to the remaining groups 1644-3 and 1644-4. Next, during a second time section, the feedback controller 1648 applies a forward voltage to the third thermoelectric couple group 1644-3 so that the exothermic operation is performed and applies a reverse voltage to the fourth thermoelectric couple group 1644-4 so that the endothermic operation is performed but does not apply a voltage to the remaining groups 1644-1 and 1644-2. Then, during a third time section, the feedback controller 1648 applies a reverse voltage to the first thermoelectric couple group 1644-1 so that the endothermic operation is performed and applies a forward voltage to the second thermoelectric couple group 1644-2 so that the exothermic operation is performed but does not apply a voltage to the remaining groups 1644-3 and 1644-4. Next, during a fourth time section, the feedback controller 1648 may apply a reverse voltage to the third thermoelectric couple group 1644-3 so that the endothermic operation is performed and apply a forward voltage to the fourth thermoelectric couple group 1644-4 so that the exothermic operation is performed. Then, the feedback controller 1648 may repeat the first time section to the fourth time section. Alternatively, embodiments may be modified, and the feedback controller 1648 may also repeat only the first time section and the second time section. According to such an operation, the feedback device 1600 may alternately perform provision of thermal grill feedback by cooperation between the first thermoelectric couple group 1644-1 and the second thermoelectric couple group 1644-2 and provision of thermal grill feedback by cooperation between the third thermoelectric couple group 1644-3 and the fourth thermoelectric couple group 1644-4, and thus, from the user's viewpoint, an effect which is the same as being provided with continuous thermal grill feedback may be achieved. Here, Meanwhile, although description has been given above with reference to FIG. 24 that the period in which the thermal grill operation is performed by the first and second thermoelectric couple groups 1644-1 and 1644-2 and the period in which the thermal grill operation is performed by the third and fourth thermoelectric couple groups 1644-3 and 1644-4 do not overlap each other, the two thermal grill operations may also have temporally overlapping sections.

Figure 25:
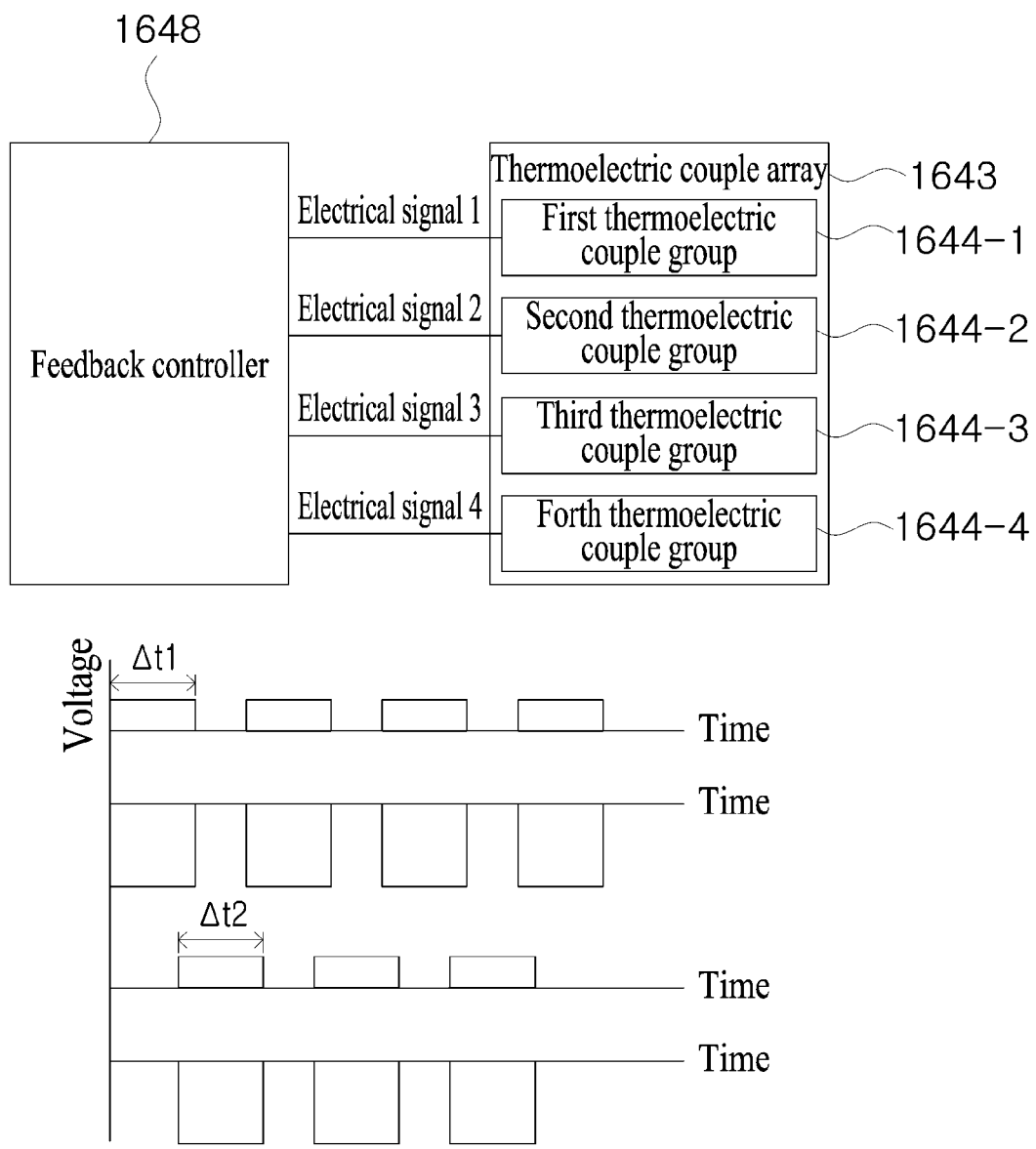
FIG. 25 is a view related to still another example of a thermal grill operation using the method in which region adjustment and time division are combined according to an embodiment of the present invention.

FIG. 25 is a view related to still another example of a thermal grill operation using the method in which region adjustment and time division are combined according to an embodiment of the present invention.

Referring to FIG. 25, the time sections described above with reference to FIG. 24 may be spaced apart from each other and overlapping sections may be inserted therebetween. An overlapping section is a section in which thermal grill operations which have to be performed in an operation of a previous time section and an operation of a subsequent time section are performed together. The thermal grill operation having the form including the overlapping section may mitigate the phenomenon in which thermal grill feedback is not transferred to the user during time taken for a temperature of the actual thermoelectric element to rise up to a saturation temperature from a time point at which a voltage is applied for an exothermic/endothermic operation.

The thermal grill feedback operation may be implemented using various other methods by combining time division and region adjustment, and the present invention should be interpreted as including modifications in which the examples mentioned herein are combined.

2.5. Heat Transfer Operation

The heat transfer operation will be described below. Here, the heat transfer operation is an operation of transferring heat in an area of the heat output module and may be performed using a heat output module 1640 composed of a plurality of individually controllable thermoelectric couple groups 1644.

Figure 26:
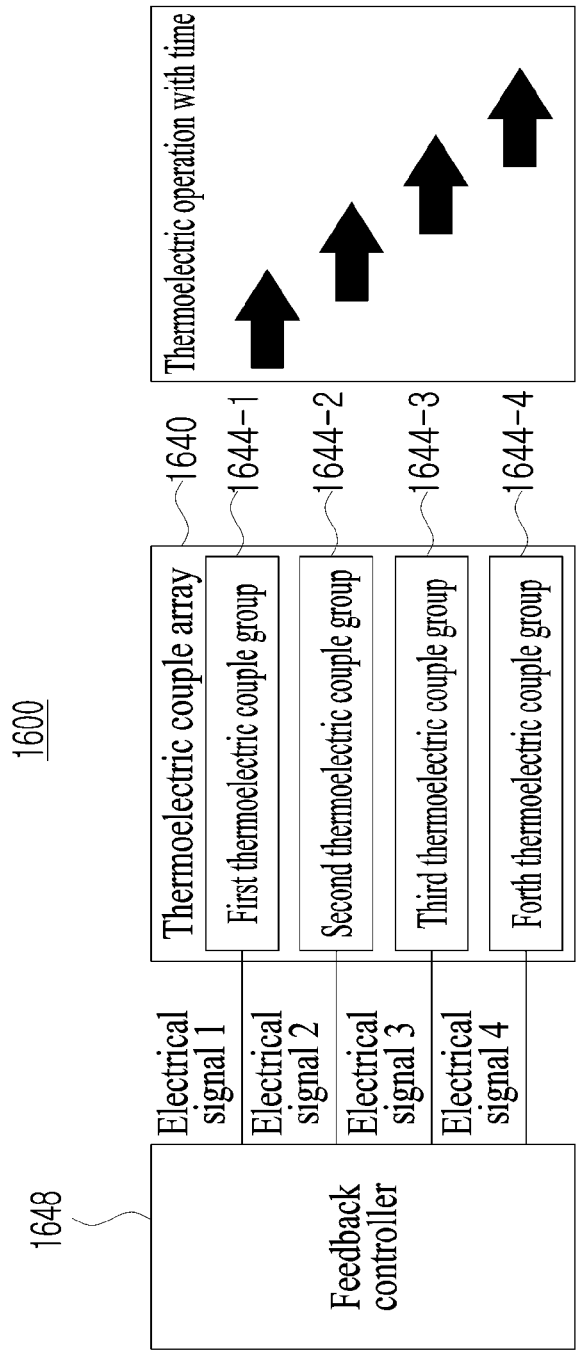
FIG. 26 is a schematic diagram showing an example electric signal for a heat transfer operation according to an embodiment of the present invention.
Figure 27:
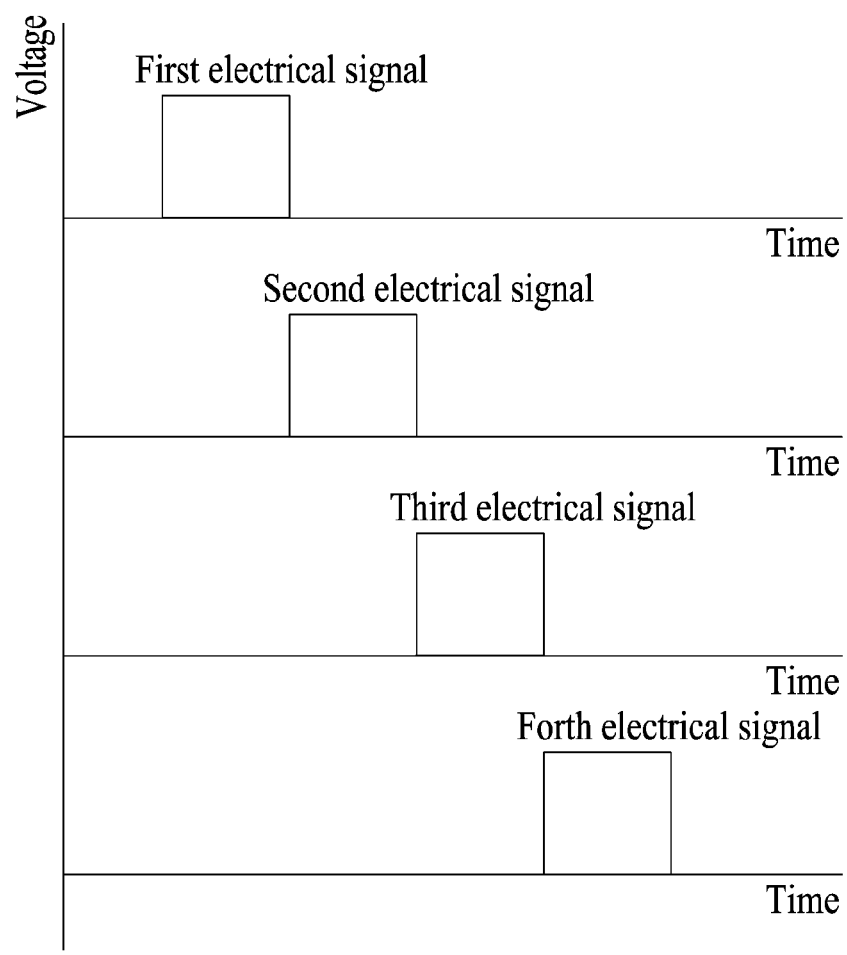
FIG. 27 is a diagram showing the heat transfer operation of FIG. 26 according to an embodiment of the present invention.

FIG. 26 is a schematic diagram showing an example electric signal for a heat transfer operation according to an embodiment of the present invention, and FIG. 26 is a diagram showing the heat transfer operation of FIG. 27.

Referring to FIGS. 26 and 27, the heat output module 1640 may include a first thermoelectric couple group 1644-1, a second thermoelectric couple group 1644-2, a third thermoelectric couple group 1644-3, and a fourth thermoelectric couple group 1644-4.

In this case, the feedback controller 1648 may sequentially apply power to the thermoelectric element groups. Accordingly, first, the first thermoelectric couple group may perform a thermoelectric operation (here, the thermoelectric operation includes the exothermic operation, the endothermic operation, and the thermal grill operation). Subsequently, the thermoelectric operation may be performed in the order of the second, third, and fourth thermoelectric couple groups 1644-2, 1644-3, and 1644-4.

Also, when powering on a specific thermoelectric couple group 1644, the feedback controller 1648 may power off a previous thermoelectric couple group 1644. Thus, the first thermoelectric couple group 1644-1 may stop the thermoelectric operation when the second thermoelectric couple group 1644-2 initiates the thermoelectric operation, the second thermoelectric couple group 1644-2 may stop the thermoelectric operation when the third thermoelectric couple group 1644-3 initiates the thermoelectric operation, and the third thermoelectric couple group 1644-3 may stop the thermoelectric operation when the fourth thermoelectric couple group 1644-4 initiates the thermoelectric operation.

Thus, a user may feel a transfer of heat from a region where the first thermoelectric couple group 1644-1 is disposed on a contact surface to a region where the fourth thermoelectric couple group 1644-4 is disposed on the contact surface.

The aforementioned example may be utilized as follows.

For example, when a plurality of thermoelectric element groups are horizontally arranged in the feedback device while being gripped by a user, the user may be provided with a feeling that a cool wind is passing by transferring cold heat from one side to another. Also, a user may be provided with a feeling that a heat source is passing by transferring hot heat.

Figure 28:
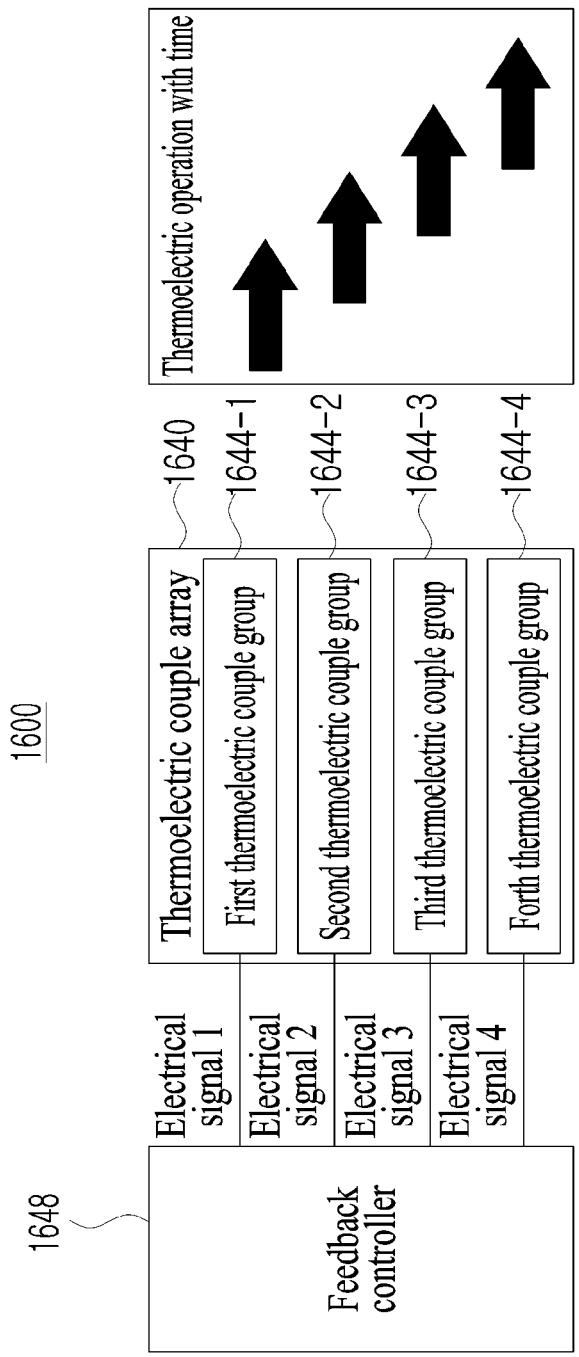
FIG. 28 is a schematic diagram showing another example electric signal for the heat transfer operation according to an embodiment of the present invention.
Figure 29:
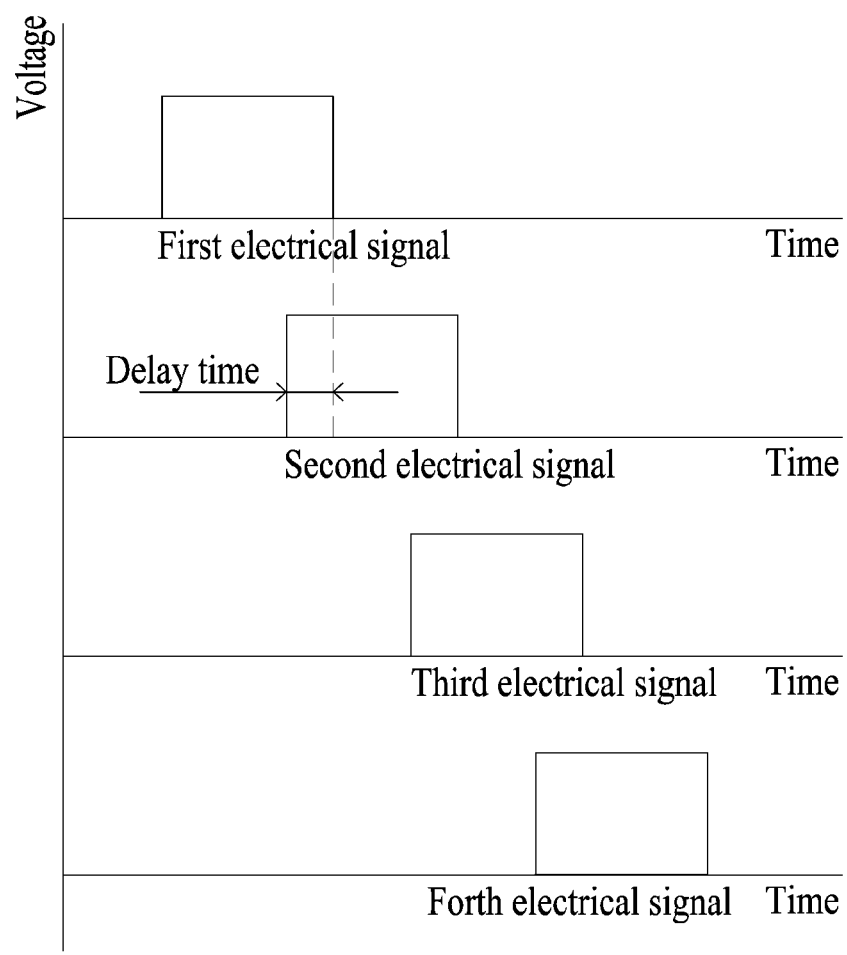
FIG. 29 is a diagram showing the heat transfer operation of FIG. 28 according to an embodiment of the present invention.

FIG. 28 is a schematic diagram showing another example electric signal for a heat transfer operation according to an embodiment of the present invention, and FIG. 29 is a diagram showing the heat transfer operation of FIG. 28.

Referring to FIGS. 28 and 29, the heat output module 1640 may include a first thermoelectric couple group 1644-1, a second thermoelectric couple group 1644-2, a third thermoelectric couple group 1644-3, and a fourth thermoelectric couple group 1644-4.

In this case, the feedback controller 1648 may sequentially apply power to the thermoelectric couple groups 1644. Accordingly, first, the first thermoelectric couple group 1644-1 may perform the thermoelectric operation. Subsequently, the thermoelectric operation may be performed in the order of the second, third, and fourth thermoelectric couple groups 1644-2, 1644-3, and 1644-4.

Also, at a predetermined time after powering on a specific thermoelectric couple group 1644, the feedback controller 1648 may power off a previous thermoelectric couple group. Thus, a user may sense a thermal sensation caused by the second thermoelectric couple group 1644-2 when the thermal sensing caused by the first thermoelectric couple group 1644-1 ends, may sense a thermal sensation caused by the third thermoelectric couple group 1644-3 when the thermal sensing caused by the second thermoelectric couple group 1644-1 ends, and may sense a thermal sensation caused by the fourth thermoelectric couple group 1644-4 when the thermal sensing caused by the third thermoelectric couple group 1644-3 ends.

This takes into consideration that a predetermined time is required until the contact surface reaches a temperature at which the user feel a hot sensation after power is applied to the thermoelectric couple group. That is, the predetermined time may correspond to a delay time required until the temperature of the contact surface reaches a temperature suitable for transferring a hot sensation after power is applied to the thermoelectric element.

Thus, a user may naturally feel a transfer of heat from a region where the first thermoelectric couple group 1644-1 is disposed on the contact surface to a region where the fourth thermoelectric couple group 1644-4 is disposed on the contact surface.

Figure 30:
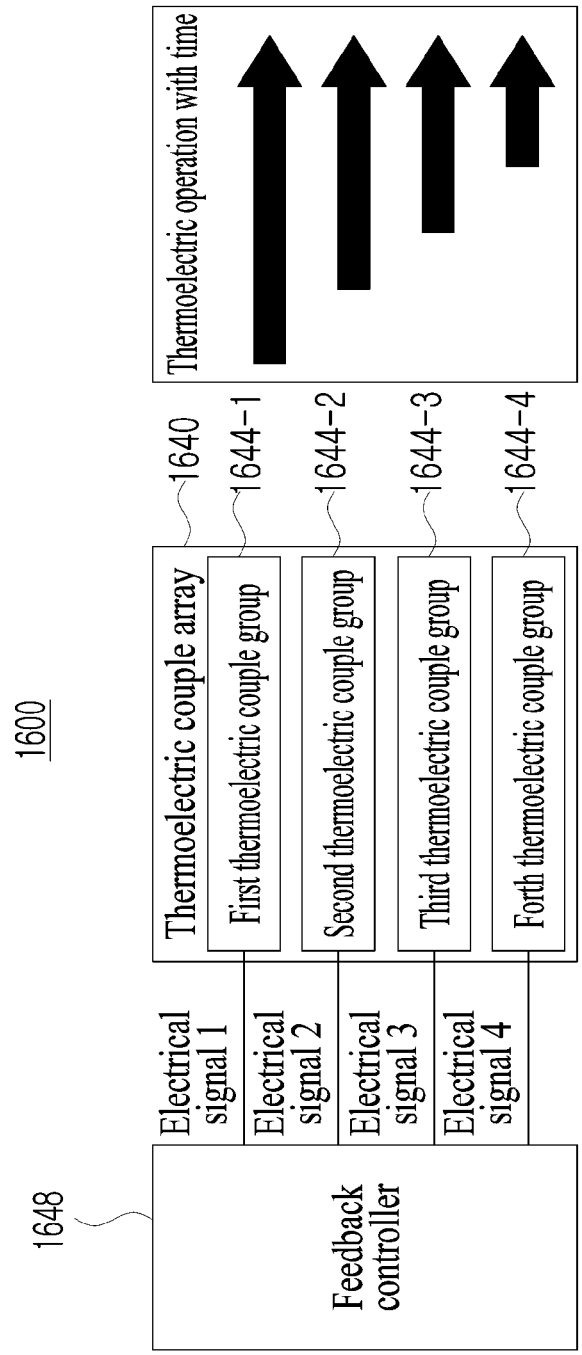
FIG. 30 is a schematic diagram showing yet another example electric signal for the heat transfer operation according to an embodiment of the present invention.
Figure 31:
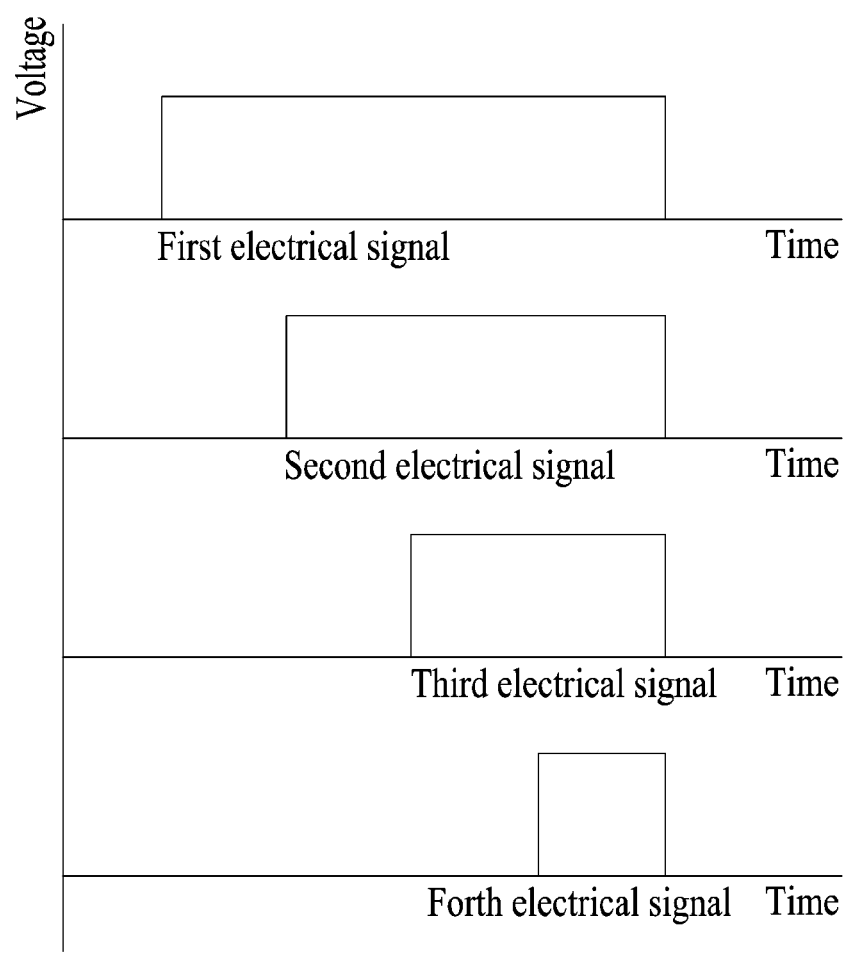
FIG. 31 is a diagram showing a heat transfer operation according to an embodiment of the present invention.

FIG. 30 is a schematic diagram showing still another example electric signal for a heat transfer operation according to an embodiment of the present invention, and FIG. 31 is a diagram showing the heat transfer operation according to an embodiment of the present invention.

Referring to FIGS. 30 and 31, the heat output module 1640 may include a first thermoelectric couple group 1644-1, a second thermoelectric couple group 1644-2, a third thermoelectric couple group 1644-3, and a fourth thermoelectric couple group 1644-4.

In this case, the feedback controller 1648 may sequentially apply power to the thermoelectric couple groups 1644. Accordingly, first, the first thermoelectric couple group 1644-1 may perform the thermoelectric operation. Subsequently, the thermoelectric operation may be performed in the order of the second, third, and fourth thermoelectric couple groups 1644-2, 1644-3, and 1644-4.

Also, the feedback controller 1648 may not power off a thermoelectric element which is already powered on. Thus, a user may feel a transfer of heat from a region where the first thermoelectric couple group 1644-1 is disposed on the contact surface to a region where the fourth thermoelectric couple group 1644-4 is disposed on the contact surface.

The aforementioned example may be utilized as follows.

For example, when a plurality of thermoelectric couple groups 1644 are vertically arranged in the feedback device while being gripped by a user, the user may be provided with a feeling that he or she is immersed in cold water starting from the bottom of the body by transferring cold heat from a lower side to an upper side.

Figure 32:
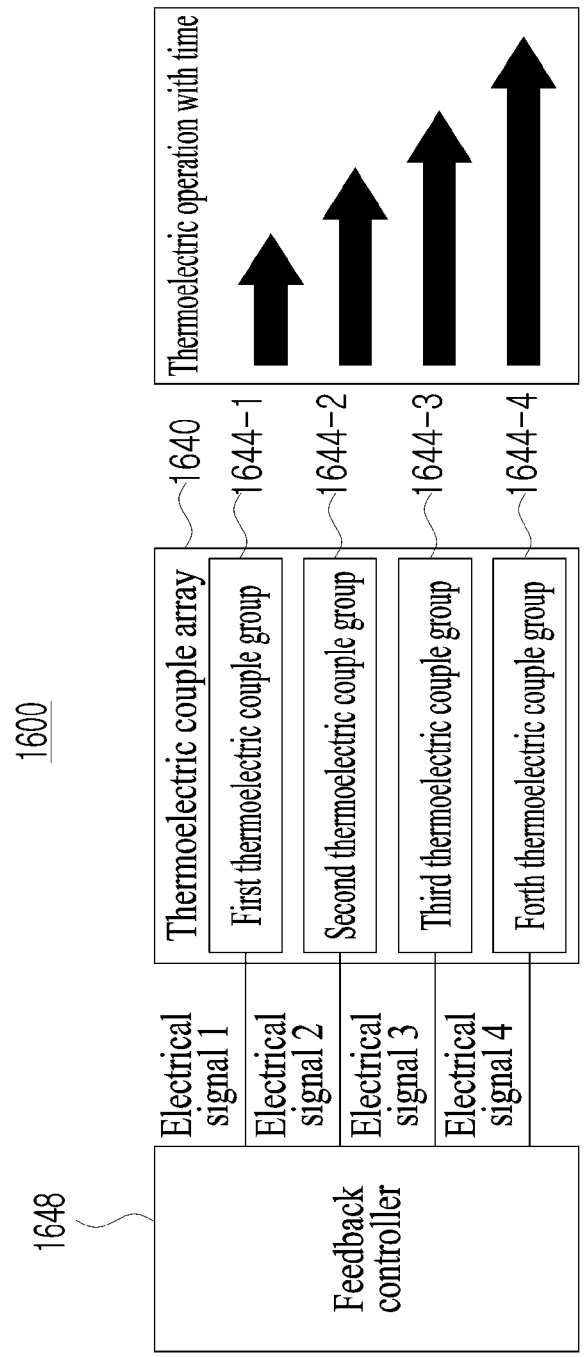
FIG. 32 is a schematic diagram showing yet another example electric signal for the heat transfer operation according to an embodiment of the present invention.
Figure 33:
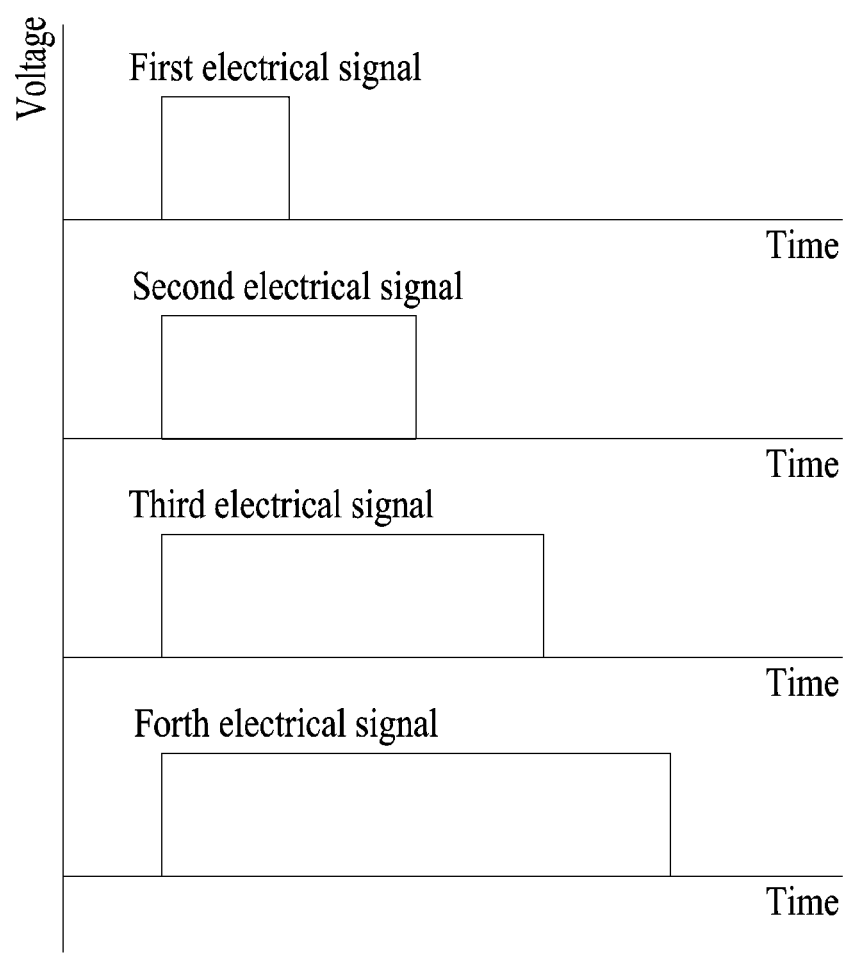
FIG. 33 is a diagram showing the heat transfer operation of FIG. 32 according to an embodiment of the present invention.

FIG. 32 is a schematic diagram showing still another example electric signal for the heat transfer operation according to an embodiment of the present invention, and FIG. 33 is a diagram showing the heat transfer operation of FIG. 32.

Referring to FIGS. 32 and 33, the heat output module 1640 may include a first thermoelectric couple group 1644-1, a second thermoelectric couple group 1644-2, a third thermoelectric couple group 1644-3, and a fourth thermoelectric couple group 1644-4.

In this case, all the thermoelectric couple groups are powered on to perform the thermoelectric operation.

In this case, the feedback controller 1648 may sequentially power off the thermoelectric couple groups 1644. Accordingly, first, the first thermoelectric couple group 1644-1 may stop the thermoelectric operation. Subsequently, the thermoelectric operation may be stopped in the order of the second, third, and fourth thermoelectric couple groups 1644-2, 1644-3, and 1644-4.

Thus, a user may feel a transfer of heat from a region where the first thermoelectric couple group 1644-1 is disposed on the contact surface to a region where the fourth thermoelectric couple group 1644-4 is disposed on the contact surface.

The aforementioned example may be utilized as follows.

For example, when a plurality of thermoelectric couple groups 1644 are vertically arranged in the feedback device while being gripped by a user, the user may be provided with a feeling that he or she is separated from cold water starting from the bottom of the body by transferring cold heat from a lower side to an upper side.

In the above-described example of the heat transfer operation, the four thermoelectric couple groups 1644 have been described as being arranged in a one-dimensional array. However, the number and arrangement of thermoelectric couple groups 1644 in the heat transfer operation according to an embodiment of the present invention are not limited to the above example.

II. Calibration Method

1. Calibration

Hereinafter, calibration according to an embodiment of the present invention will be described.

1.1. Outline of Calibration

Hereinafter, calibration may be understood as an operation in which parameters related to thermal feedback are adjusted corresponding to characteristics of the user or the feedback device 1600.

As described above, the feedback device 1600 may output thermal feedback at various intensities. However, even if the feedback device 1600 outputs thermal feedback at the same intensities, an experiencing intensity of thermal feedback actually felt by each user may be different. For example, when a feedback controller 1648 applies a forward voltage of a first level, which is a level at which the magnitude is the lowest, to a thermoelectric couple group 1644 and thus a heat output module 1640 performs an exothermic operation, a first user may not sense hot heat, a second user may sense hot heat slightly, and a third user may sense hot heat strongly.

This may be due to various reasons. For example, the experiencing intensity felt by each user may be different due to differences in the degree of distribution of hot spots and cold spots, positions at which the hot spots and cold spots are distributed, and the like for each user. In addition, as another example, the experiencing intensity felt by each user may be different due to differences in the degree to which each user grasps the feedback device 1600 (for example, the user may tightly grasp or lightly grasp the feedback device 1600). In addition, the experiencing intensity felt by each user may be different due to various other characteristics of each user.

Meanwhile, a content reproduction device 1200 may transmit a thermal feedback signal to the feedback device 1600, and the feedback device 1600 may output thermal feedback on the basis of the corresponding thermal feedback signal. For example, the thermal feedback signal output by the content reproduction device 1200 may include information on an intensity of thermal feedback, and the feedback device 1600 may output the thermal feedback at an intensity corresponding to the information on the intensity of the thermal feedback. As a specific example, in reproducing a specific part of content, the content reproduction device 1200 may output a thermal feedback signal including an instruction to output hot heat feedback of a first intensity level, and the feedback device 1600 may output the hot heat feedback of the first intensity level according to the thermal feedback signal. However, depending on the user, a temperature of the hot heat feedback corresponding to the first intensity level (that is, a saturation temperature) may not be recognized. In this case, since the user fails to recognize the temperature of the hot heat feedback corresponding to the first intensity level, the user may not experience a thermal experience during reproduction of the specific part of the content despite provision of the thermal feedback from the feedback device 1600.

However, if, in this case, the temperature of the hot heat feedback corresponding to the first intensity level output from the feedback device 1600 has been adjusted in advance to a temperature recognizable by the user, the feedback device 1600 may output the thermal feedback at a temperature recognizable by the user, and accordingly, the user may have a thermal experience during reproduction of the specific part of the content. Therefore, calibration is required for an intensity of thermal feedback.

In addition, although calibration of an intensity of thermal feedback has been described above, calibration may also be possible for various other parameters such as a region and time in addition to the intensity.

Hereinafter, for convenience of description, the calibration will be described as being performed by the feedback device 1600. However, embodiments are not limited thereto, and the calibration may also be performed by the content reproduction device 1200 or be performed by a third device other than the feedback device 1600 and the content reproduction device 1200.

1.2. User Input for Calibration

In an embodiment of the present invention, the feedback device 1600 may perform calibration of thermal feedback by obtaining a user input from the user. That is, the feedback device 1600 may obtain a user input related to a specific intensity, a specific region, and a specific time point of thermal feedback and perform calibration of the thermal feedback on the basis of the user input.

For example, while intensity calibration is performed, the feedback device 1600 may sequentially output pieces of thermal feedback according to a plurality of intensities and receive a selection on a specific intensity among the plurality of intensities through a user input. Then, the feedback device 1600 may adjust an intensity of thermal feedback to the selected intensity. In order to obtain the user input as described above, the feedback device 1600 may include a user input module.

The user input module may obtain a user input from the user. For example, the user input module may be formed in various shapes including shapes of a touch panel, a button, and a stick. For example, the user input module may include a pressure sensor (for example, a decompression sensor). Of course, the user input module is not limited to the above-described exemplary forms.

As a specific example, a pressure sensor may be disposed as the user input module in a specific region of the casing of the feedback device 1600. For intensity calibration, the feedback device 1600 may sequentially output pieces of thermal feedback at a plurality of intensities while the user's body is in contact with the specific region, and the user may detach the user's body from the specific region at a specific intensity. In this case, the feedback device 1600 may detect a time point at which the user's body is detached from the specific region by using the pressure sensor and set the specific intensity output at the time point at which the user's body is detached as the intensity selected by the user. Then, the feedback device 1600 may adjust an intensity of thermal feedback to the specific intensity.

In addition, although the user input module has been described above as being included in the feedback device 1600, embodiments are not limited thereto, and the user input module may also be configured as a device independent from the feedback device 1600 or be included in the content reproduction device 1200 or an audiovisual device 1400.

In addition, in an embodiment of the present invention, the feedback device 1600 may perform calibration of thermal feedback by using the audiovisual device 1400. For example, when calibration is performed, the feedback device 1600 may transmit a video signal and/or an audio signal to the audiovisual device 1400. In this case, the video signal and/or audio signal is related to the calibration of thermal feedback and, for example, may include calibration start information, calibration progress information, calibration end information, and the like. In addition, the video signal and/or audio signal may also include information on an intensity of thermal feedback currently being output from the feedback device 1600, information on a region of the contact surface 1641 currently outputting thermal feedback, and information on a time point at which thermal feedback is output.

The audiovisual device 1400 may receive the video signal and/or audio signal from the feedback device 1600 and output a video and/or sound, and the user may perform a user input for calibration by being assisted by the video and/or sound.

Of course, embodiments are not limited thereto, and the video and/or sound may also be output from the feedback device 1600 itself.

In addition, in an embodiment of the present invention, the feedback device 1600 may output thermal feedback at a plurality of intensities for calibration. In this case, the feedback controller 1648 may sequentially apply voltage values corresponding to each intensity to the thermoelectric couple group 1644, wherein a predetermined time interval may exist between time points at which the voltage values corresponding to each intensity are applied. For example, in an example of FIG. 36A which will be described below, the feedback controller 1648 may apply a voltage value corresponding to $LV_{H-m1}$ to the thermoelectric couple group 1644 and then, after a predetermined amount of time (for example, one second) has elapsed, apply a voltage value corresponding to $LV_{H-m2}$ to the thermoelectric couple group 1644. This is because, when thermal feedback corresponding to a plurality of intensities is continuously output, the user's senses may be disturbed, and thus accuracy of calibration may be lowered. Therefore, to eliminate disturbance to the user's senses, a predetermined time interval may exist between the time points at which the thermal feedback at the plurality of intensities are applied.

In addition, in order to eliminate the disturbance to the user's senses, the feedback device 1600 may induce different parts of the user's body to be in contact with the contact surface 1641 at each time point at which the thermal feedback corresponding to the plurality of intensities is output. For example, the feedback device 1600 may provide the video signal and/or audio signal to the audiovisual device 1400 or output a video and/or sound by itself to induce the user's thumb to be in contact with the contact surface 1641 when thermal feedback is output at a first intensity and induce the user's index finger to be in contact with the contact surface 1641 when thermal feedback is output at a second intensity. By different parts of the user's body being in contact with the contact surface 1641 every time thermal feedback is output at each intensity, disturbance to the user's senses may be eliminated, and accordingly, accuracy of calibration may be improved.

1.3. Intensity Calibration

Figure 34:
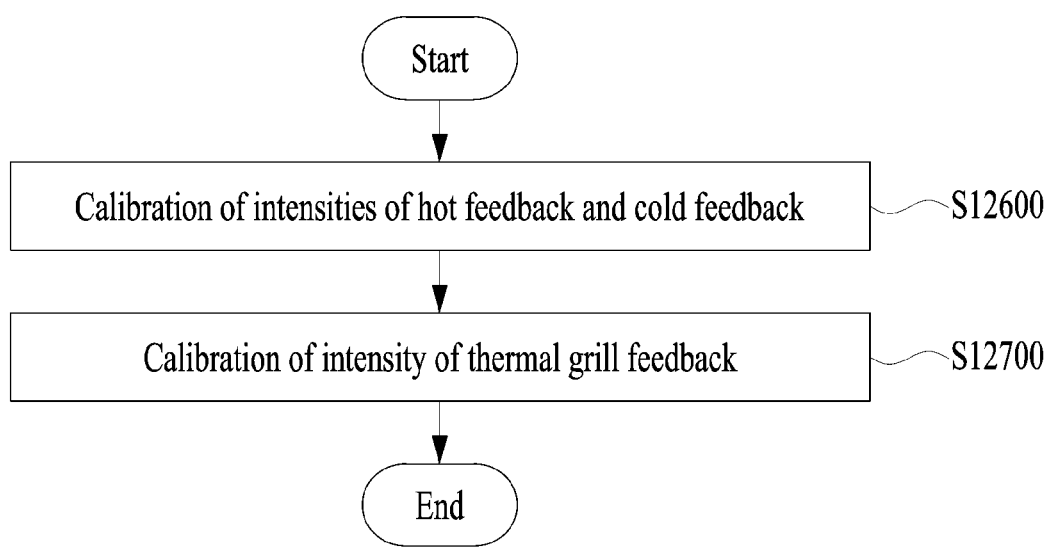
FIG. 34 is a flowchart related to a method for calibration of an intensity of thermal feedback according to an embodiment of the present invention.

FIG. 34 is a flowchart related to a method for calibration of an intensity of thermal feedback according to an embodiment of the present invention.

An intensity calibration method according to FIG. 34 may include calibration of intensities of hot feedback and cold feedback (S12600) and calibration of an intensity of thermal grill feedback (S12700).

Hereinafter, each of the above-mentioned steps will be described in more detail.

First, the feedback device 1600 may perform calibration of intensities of hot feedback and cold feedback (S12600).

Which thermal feedback, either hot feedback or cold feedback, will be calibrated first may not be important. Hereinafter, for convenience of description, it will be described that hot feedback is calibrated first and then cold feedback is calibrated. However, embodiments are not limited thereto, and cold feedback may be calibrated first and then hot feedback may be calibrated. In addition, the feedback device 1600 may set at least one intermediate intensity after performing calibration of the lowest intensity and the highest intensity of hot feedback and cold feedback.

In addition, the feedback device 1600 may perform calibration of an intensity of thermal grill feedback (S12700).

The thermal grill feedback may be generated according to a ratio between an intensity of hot feedback and an intensity of cold feedback at a predetermined body part. Accordingly, it may be preferable that calibration of the intensity of the thermal grill feedback be performed by adjusting the intensity of the hot feedback and/or the intensity of the cold feedback after the intensity of the hot feedback and the intensity of the cold feedback are calibrated in advance. However, embodiments are not limited thereto, and even if the intensity of the hot feedback and the intensity of the cold feedback are not calibrated in advance, the calibration of the intensity of the thermal grill feedback may be performed using preset values of the intensity of the hot feedback and the intensity of the cold feedback.

steps S12600 and S12700 will be described in more detail below. !

1.3.1. Calibration of Intensities of Hot Feedback and Cold Feedback 1.3.1.1. Setting Lowest Intensities of Hot Feedback and Cold Feedback FIG. 35 is a flowchart related to a method for calibration of intensities of hot feedback and cold feedback according to an embodiment of the present invention.

Figure 35:
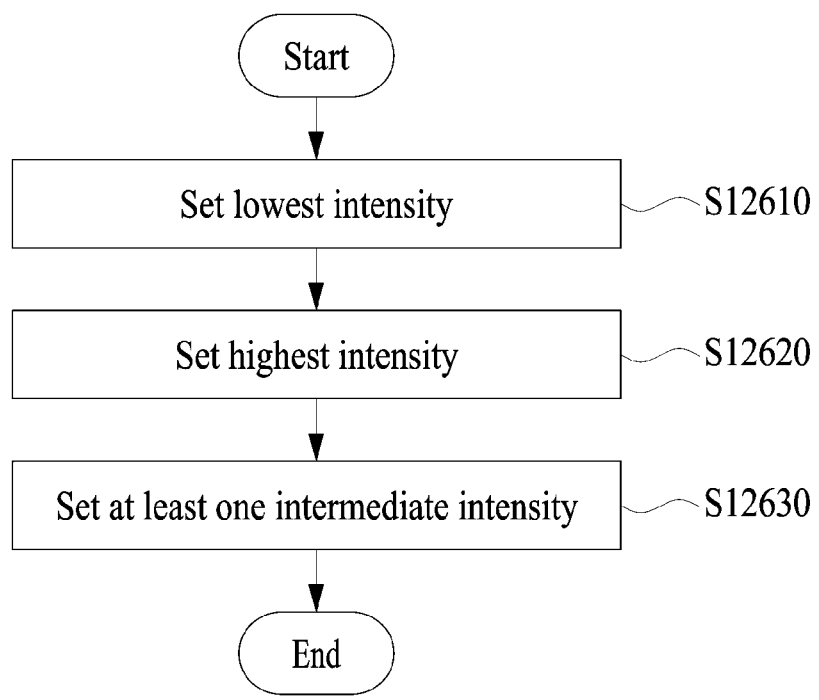
FIG. 35 is a flowchart related to a method for calibration of intensities of hot feedback and cold feedback according to an embodiment of the present invention.

An intensity calibration method according to FIG. 35 may include setting lowest intensities of hot feedback and cold feedback (S12610), setting highest intensities of the hot feedback and the cold feedback (S12620), and setting at least one intermediate intensity of the hot feedback and the cold feedback (S12630).

An intensity of which thermal feedback, either the hot feedback or the cold feedback of the present invention, will be set first does not have much influence on accuracy of calibration.

In addition, intensity calibration for the cold feedback may be performed after all of the lowest intensity, the highest intensity, and the intermediate intensity of the hot feedback are set, or, after the lowest intensities of the hot feedback and the cold feedback are set, the highest intensities of the hot feedback and the cold feedback may be set and then the intermediate intensities of the hot feedback and the cold feedback may be set.

Hereinafter, for convenience of description, intensity calibration of the hot feedback and the cold feedback will be described as being performed in the order in which the lowest intensities of the hot feedback and the cold feedback are set first, the highest intensities of the hot feedback and the cold feedback are set, and then the intermediate intensities of the hot feedback and the cold feedback are set.

Hereinafter, each of the above-mentioned steps will be described in more detail.

First, the feedback device 1600 may set lowest intensities of hot feedback and cold feedback (S12610).

In addition, in an embodiment of the present invention, the feedback device 1600 may perform calibration of the lowest intensities of hot feedback and cold feedback first and then perform calibration of the highest intensities of the hot feedback and the cold feedback. This is due to taking the user's senses into consideration according to the intensity calibration. If the calibration of the lowest intensities is performed after the calibration of the highest intensities, thermal feedback according to the calibration of the highest intensities may be transmitted to the user, and thresholds of the hot spots and the cold spots of the user become high due to thermal feedback according to the calibration of the highest intensities during a predetermined amount of time. Accordingly, if the calibration of the lowest intensities is performed during the predetermined amount of time, the user may fail to sense thermal feedback according to the calibration of the lowest intensities even if the thermal feedback according to the calibration of the lowest intensities is transferred to the user.

On the other hand, if the calibration of the highest intensities is performed after the calibration of the lowest intensities, the thresholds of the hot spots and cold spots of the user may be relatively low even if thermal feedback according to the calibration of the lowest intensities is transferred to the user, and when, afterwards, thermal feedback according to the calibration of the highest intensities is transferred to the user, the user may sense the thermal feedback according to the calibration of the highest intensities.

Therefore, in the present invention, preferably, the calibration of the lowest intensities may be performed first and then the calibration of the highest intensities may be performed when performing calibration of the intensities of the hot feedback and cold feedback.

However, the thresholds of the hot spots and cold spots of the user may return to their original states after a predetermined amount of time. Therefore, embodiments are not limited to the above, and the calibration of the highest intensities may be performed first and then the calibration of the lowest intensities may be performed when performing the calibration of the intensities of the hot feedback and cold feedback.

In an embodiment of the present invention, the feedback device 1600 may set the lowest intensity of hot feedback.

Figure 36A:
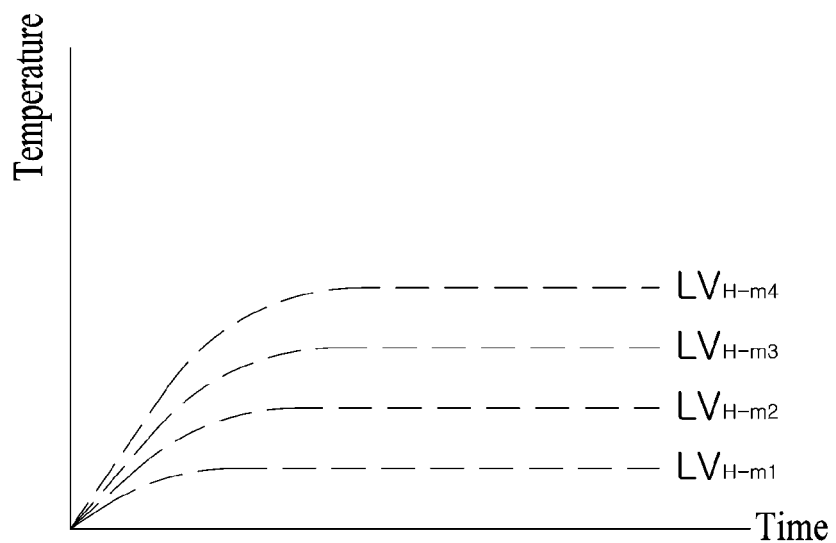
FIGS. 36A and 36B are graphs related to a lowest intensity setting of hot feedback and cold feedback according to an embodiment of the present invention.

FIG. 36 is a graph related to a lowest intensity setting of hot feedback and cold feedback according to an embodiment of the present invention. Referring to FIG. 36A, the feedback device 1600 may preset a plurality of intensities $LV_{H-m1}$ to $LV_{H-m4}$ of hot feedback and output the hot feedback in order from $LV_{H-m1}$, which is the weakest intensity among the plurality of intensities, to $LV_{H-m4}$, which is the strongest intensity. That is, voltage values corresponding to the plurality of intensities $LV_{H-m1}$ to $LV_{H-m4}$ may be different, and the feedback controller 1648 may sequentially apply the voltage values corresponding to each intensity to the thermoelectric couple group 1644.

In an embodiment of the present invention, temperatures of the plurality of intensities $LV_{H-m1}$ to $LV_{H-m4}$ may be lower than that of a first stage of hot feedback described above with reference to FIG. 14. Of course, the temperatures of the plurality of intensities $LV_{H-m1}$ to $LV_{H-m4}$ may be irrelevant to the stages of hot feedback described above with reference to FIG. 14.

In addition, although the plurality of intensities $LV_{H-m1}$ to $LV_{H-m4}$ are shown as four stages in the example of FIG. 36, embodiments are not limited thereto, and the plurality of intensities may be set to various numbers of stages.

The feedback device 1600 may obtain a user input for any one intensity among the plurality of intensities $LV_{H-m1}$ to $LV_{H-m4}$. For example, when hot feedback is output from the weakest intensity to the strongest intensity, the user may fail to sense hotness at first and then sense hotness when hot feedback is output at a specific intensity from the feedback device 1600. In this case, the feedback device 1600 may obtain a user input for the specific intensity and set the specific intensity as the lowest intensity of the hot feedback.

In addition, in an embodiment of the present invention, when the user input is obtained, the feedback device 1600 may stop output of hot feedback.

In addition, in another embodiment of the present invention, when the user input is obtained, the feedback device 1600 may not stop the output of the hot feedback.

For example, the plurality of intensities $LV_{H-m1}$ to $LV_{H-m4}$ may also be used in setting the highest intensity of the hot feedback as well as setting the lowest intensity of the hot feedback. In this case, even if the hot feedback is output from the weakest intensity to the strongest intensity and a user input is obtained for any one intensity among the plurality of intensities $LV_{H-m1}$ to $LV_{H-m4}$, the feedback device 1600 may continue to sequentially output pieces of hot feedback and then obtain a user input for an intensity different from an intensity which has already been obtained through the user input. In this case, the intensity obtained later through the user input may be set as the highest intensity of the hot feedback.

Figure 36B:
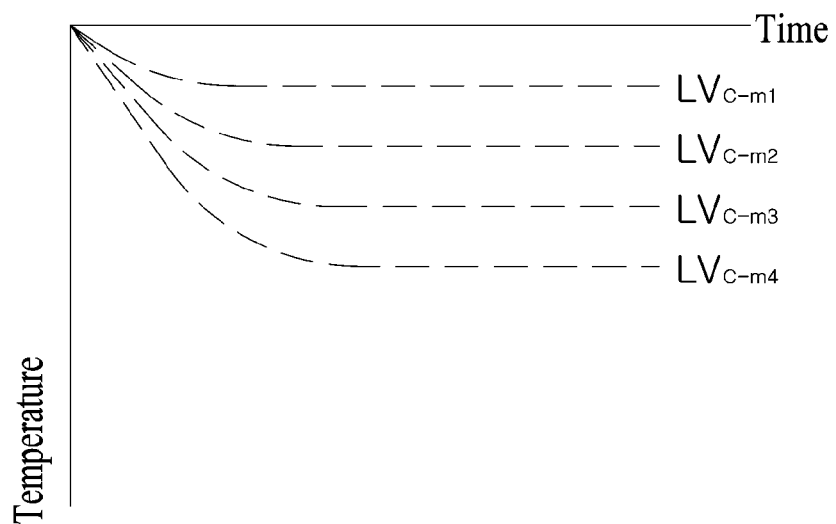

In addition, in an embodiment of the present invention, the feedback device 1600 may set the lowest intensity of cold feedback. Referring to FIG. 36B, the feedback device 1600 may preset a plurality of intensities $LV_{C-m1}$ to $LV_{C-m4}$ of cold feedback and output the cold feedback in order from $LV_{C-m1}$, which is the weakest intensity among the plurality of intensities, to $LV_{C-m4}$, which is the strongest intensity. That is, voltage values corresponding to the plurality of intensities $LV_{C-m1}$ to $LV_{C-m4}$ may be different, and the feedback controller 1648 may sequentially apply the voltage values corresponding to each intensity to the thermoelectric couple group 1644.

Like the setting of the lowest intensity of the hot feedback, the feedback device 1600 may obtain a user input for any one intensity among the plurality of intensities $LV_{C-m1}$ to $LV_{C-m4}$. The feedback device 1600 may set an intensity input by the user among the plurality of intensities $LV_{C-m1}$ to $LV_{C-m4}$ as the lowest intensity of the cold feedback. Since description given above in relation to the setting of the lowest intensity of the hot feedback may be applied as it is to the setting of the lowest intensity of the cold feedback, description overlapping that given above in relation to the setting of the lowest intensity of the hot feedback will be omitted.

1.3.1.2. Setting Highest Intensities of Hot Feedback and Cold Feedback

Figure 37A:
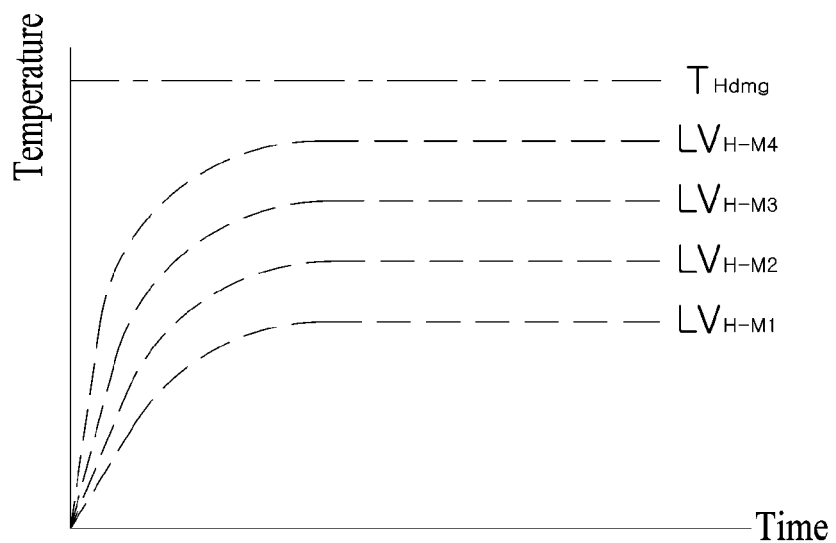
FIGS. 37A and 37B are graphs related to a highest intensity setting of hot feedback and cold feedback according to an embodiment of the present invention.

In an embodiment of the present invention, the feedback device 1600 may set highest intensities of hot feedback and cold feedback (S12620). FIG. 37 is a graph related to a highest intensity setting of hot feedback and cold feedback according to an embodiment of the present invention. Referring to FIG. 37A, the feedback device 1600 may preset a plurality of intensities $LV_{H-m1}$ to $LV_{H-m4}$ of hot feedback and output the hot feedback in order from $LV_{H-m1}$, which is the weakest intensity among the plurality of intensities, to $LV_{H-m4}$, which is the strongest intensity. That is, voltage values corresponding to the plurality of intensities $LV_{H-m1}$ to $LV_{H-m4}$ may be different, and the feedback controller 1648 may sequentially apply the voltage values corresponding to each intensity to the thermoelectric couple group 1644.

In this case, the feedback device 1600 may determine temperatures of the plurality of intensities $LV_{H-m1}$ to $LV_{H-m4}$ in consideration to damage to the user's body according to thermal feedback.

Specifically, since the above-described thermoelectric operation stimulates hot spots/cold spots of the skin, damage to the skin or a sensory organ may be caused when an amount of heat of a predetermined level or higher is transferred to the user. For example, denaturation of skin tissue may occur due to heat when thermal feedback is provided at an extremely high intensity to the user, or confusion may be caused to sensory organs when thermal feedback is continuously provided to the user over a long period of time.

Accordingly, in order to prevent damage to the user according to thermal feedback, in the present invention, a critical temperature $T_{Hdmg}$ of hot feedback and a critical temperature $T_{Cdmg}$ of cold feedback may be set. In this case, a temperature of a contact surface 1641 due to output of hot feedback may be lower than the critical temperature $T_{Hdmg}$, and a temperature of the contact surface 1641 due to output of cold feedback may be higher than the critical temperature $T_{Cdmg}$.

Therefore, in setting the highest temperature of hot feedback, the temperatures of the plurality of intensities $LV_{H-m1}$ to $LV_{H-m4}$ may be set to be lower than the critical temperature $T_{Hdmg}$.

In an embodiment of the present invention, the temperatures of the plurality of intensities $LV_{H-m1}$ to $LV_{H-m4}$ may be temperatures lower than a fifth stage of hot feedback described above with reference to FIG. 14. Of course, the temperatures of the plurality of intensities $LV_{H-m1}$ to $LV_{H-m4}$ may be irrelevant to the stages of hot feedback described above with reference to FIG. 14. In addition, according to circumstances, the plurality of intensities $LV_{H-m1}$ to $LV_{H-m4}$ may be the same as, or different from, the plurality of intensities $LV_{H-m1}$ to $LV_{H-m4}$ described above with reference to FIG. 36.

In addition, although the plurality of intensities $LV_{H-m1}$ to $LV_{H-m4}$ are shown as four stages in the example of FIG. 37, embodiments are not limited thereto, and the plurality of intensities may be set to various numbers of stages.

In addition, the feedback device 1600 may obtain a user input for any one intensity among the plurality of intensities $LV_{H-m1}$ to $LV_{H-m4}$. For example, when hot feedback is output from the weakest intensity to the strongest intensity, an intensity at the highest temperature may be selected according to the user's determination, and the feedback device 1600 may obtain a user input for the intensity at the highest temperature and set the received intensity as the highest intensity of the hot feedback.

In addition, in an embodiment of the present invention, when the user input is obtained, the feedback device 1600 may stop output of hot feedback.

Figure 37B:
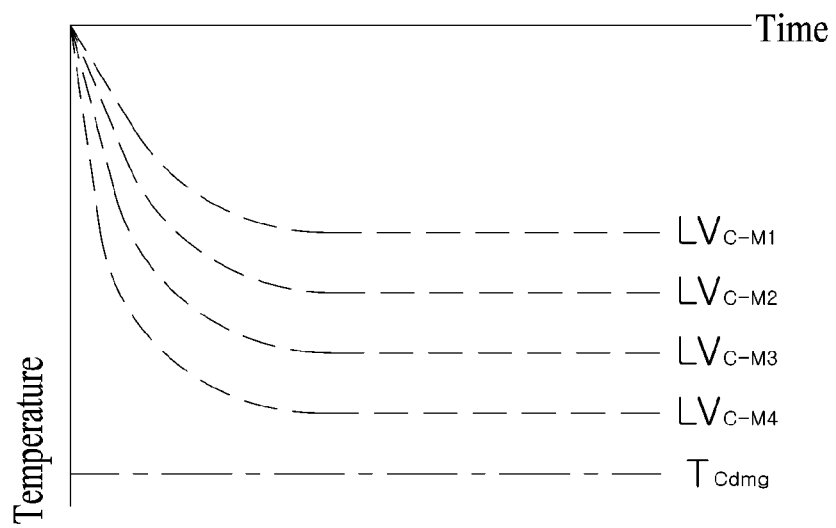

In addition, in an embodiment of the present invention, the feedback device 1600 may set the highest intensity of cold feedback. Referring to FIG. 37B, the feedback device 1600 may preset a plurality of intensities $LV_{C-m1}$ to $LV_{C-m4}$ of cold feedback and output the cold feedback in order from $LV_{C-m1}$, which is the weakest intensity among the plurality of intensities, to $LV_{C-m4}$, which is the strongest intensity. That is, voltage values corresponding to the plurality of intensities $LV_{C-m1}$ to $LV_{C-m4}$ may be different, and the feedback controller 1648 may sequentially apply the voltage values corresponding to each intensity to the thermoelectric couple group 1644.

Like the setting of the highest intensity of the hot feedback, in order to protect the user's body from cold feedback, the temperatures of the plurality of intensities $LV_{C-m1}$ to $LV_{C-m4}$ may be set to be higher than the critical temperature $T_{Cdmg}$ of the cold feedback when setting the highest intensity of the cold feedback. In addition, the feedback device 1600 may obtain a user input for any one intensity among the plurality of intensities $LV_{C-m1}$ to $LV_{C-m4}$. The feedback device 1600 may set an intensity input by the user among the plurality of intensities $LV_{C-m1}$ to $LV_{C-m4}$ as the highest intensity of the cold feedback. Since description given above in relation to the setting of the highest intensity of the hot feedback may be applied as it is to the setting of the highest intensity of the cold feedback, description overlapping that given above in relation to the setting of the highest intensity of the hot feedback will be omitted.

1.3.1.3. Setting Intermediate Intensities of Hot Feedback and Cold Feedback

In an embodiment of the present invention, the feedback device 1600 may set intermediate intensities of hot feedback and cold feedback (S12630).

As described above with reference to FIG. 14, the feedback device 1600 may output thermal feedback at a plurality of intensities (for example, five stages of hot feedback, five stages of cold feedback).

The lowest intensities and highest intensities of hot feedback and cold feedback have been set in steps S12610 and S12620, and the intermediate intensities between the lowest intensity and the highest intensity are set in step S12630.

In an embodiment of the present invention, the number of intermediate intensities, which is at least one or more, may be preset by the feedback device 1600 or may be determined according to the number of intermediate intensities preset by the content reproduction device 1200. In addition, the number of intermediate intensities may be determined by the number of intensities of thermal feedback output by the feedback device 1600 for intensity calibration. For example, the number of intermediate intensities may be equal to the number of intensities remaining after excluding the lowest intensity and the highest intensity from the number of intensities of thermal feedback output by the feedback device 1600 for intensity calibration.

Of course, according to circumstances, the intermediate intensity may not exist, and in this case, step S12630 may not be performed.

In an embodiment of the present invention, the feedback device 1600 may set at least one intermediate intensity of hot feedback.

FIG. 38 is a graph related to an intermediate intensity setting of hot feedback and cold feedback according to an embodiment of the present invention.

Figure 38A:
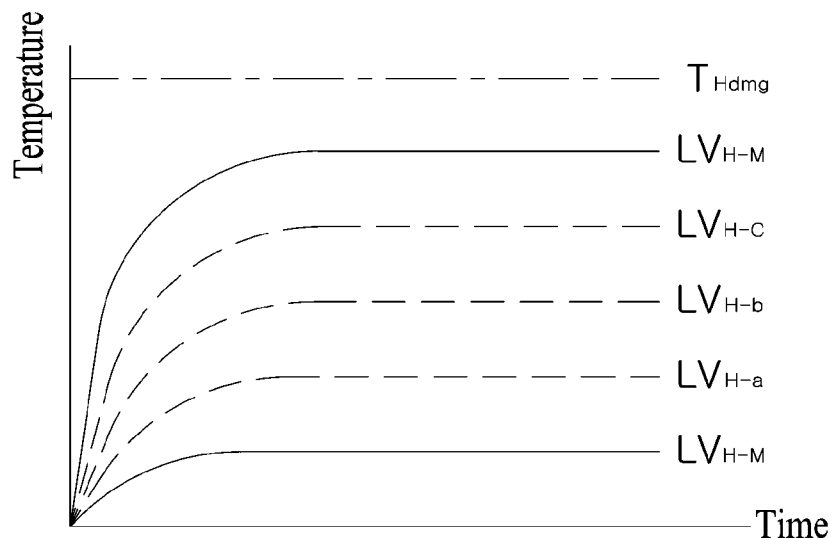
FIGS. 38A and 38B are graphs related to an intermediate intensity setting of hot feedback and cold feedback according to an embodiment of the present invention.

Referring to FIG. 38A, a lowest intensity $LV_{H-m}$ and a highest intensity $LV_{H-M}$ of hot feedback may be preset. In addition, the number of intermediate intensities of hot feedback may be set to three. In this case, the feedback device 1600 may set three intermediate intensities $LV_{H-a}$, $LV_{H-b}$, and $LV_{H-c}$ by using the lowest intensity $LV_{H-m}$ and the highest intensity $LV_{H-M}$ of the hot feedback. In this case, a temperature of the highest intensity $LV_{H-M}$ may be lower than a preset predetermined critical temperature $T_{Hdmg}$.

In an embodiment of the present invention, the feedback device 1600 may set the intermediate intensities $LV_{H-a}$, $LV_{H-b}$, and $LV_{H-c}$ by interpolating voltage values or temperatures corresponding to the lowest intensity $LV_{H-m}$ and the highest intensity $LV_{H-m}$ of the hot feedback.

For example, the feedback device 1600 may calculate three voltage values by interpolating a voltage value corresponding to the lowest intensity $LV_{H-m}$ and a voltage value corresponding to the highest intensity $LV_{H-M}$ and set intensities respectively corresponding to the three voltage values (interpolated voltage values) as the intermediate intensities $LV_{H-a}$, $LV_{H-b}$, and $LV_{H-c}$.

As another example, the feedback device 1600 may check a temperature corresponding to the lowest intensity $LV_{H-m}$ and a temperature corresponding to the highest intensity $LV_{H-M}$, interpolate the temperature corresponding to the lowest intensity $LV_{H-m}$ and the temperature corresponding to the highest intensity $LV_{H-M}$, and calculate three temperatures (interpolated temperatures). In this case, the feedback device 1600 may set the three calculated temperatures as each of temperatures corresponding to the intermediate intensities $LV_{H-a}$, $LV_{H-b}$, and $LV_{H-c}$. Then, the feedback device 1600 may calculate voltage values corresponding to each of the set temperatures of the intermediate intensities $LV_{H-a}$, $LV_{H-b}$, and $LV_{H-c}$ and, when outputting hot feedback at any one intermediate intensity among the intermediate intensities $LV_{H-a}$, $LV_{H-b}$, and $LV_{H-c}$, the feedback device 1600 may apply a voltage value corresponding to the intermediate intensity to the heat output module 1640.

In addition, in another embodiment of the present invention, the feedback device 1600 may set preset intensities as the intermediate intensities $LV_{H-a}$, $LV_{H-b}$, and $LV_{H-c}$.

For example, the feedback device 1600 may set, among one or more intensities having preset voltage values, intensities having voltage values between the voltage value of the lowest intensity $LV_{H-m}$ and the voltage value of the highest intensity $LV_{H-M}$, which have been set in steps S12610 and S12620, as the intermediate intensities $LV_{H-a}$, $LV_{H-b}$, and $LV_{H-c}$.

As another example, the feedback device 1600 may set, among one or more intensities having preset temperatures, intensities having temperatures between the temperature of the lowest intensity $LV_{H-m}$ and the temperature of the highest intensity $LV_{H-m}$ as the intermediate intensities $LV_{H-a}$, $LV_{H-b}$, and $LV_{H-c}$.

In addition, the feedback device 1600 may check whether preset voltage values or temperatures of the intermediate intensities $LV_{H-a}$, $LV_{H-b}$, and $LV_{H-c}$ fall within the range of the voltage values or temperatures of the lowest intensity $LV_{H-m}$ and the highest intensity $LV_{H-M}$ of the hot feedback. When the preset voltage values or temperatures of the intermediate intensities $LV_{H-a}$, $LV_{H-b}$, and $LV_{H-c}$ fall within the range of the voltage values or temperatures of the lowest intensity $LV_{H-m}$ and the highest intensity $LV_{H-m}$ of the hot feedback, the feedback device 1600 may maintain the preset voltage values or temperatures of the intermediate intensities $LV_{H-a}$, $LV_{H-b}$, and $LV_{H-c}$. On the other hand, when the preset voltage values or temperatures of the intermediate intensities $LV_{H-a}$, $LV_{H-b}$, and $LV_{H-c}$ do not fall within the range of the voltage values or temperatures of the lowest intensity $LV_{H-m}$ and the highest intensity $LV_{H-M}$ of the hot feedback, the feedback device 1600 may reset the voltage values or temperatures of the intermediate intensities $LV_{H-a}$, $LV_{H-b}$, and $LV_{H-c}$ so that the voltage values or temperatures fall within the range of voltage values or temperatures of the lowest intensity $LV_{H-m}$ and the highest intensity $LV_{H-M}$ of the hot feedback.

In addition, in an embodiment of the present invention, the feedback device 1600 may set at least one intermediate intensity of cold feedback.

Figure 38B:
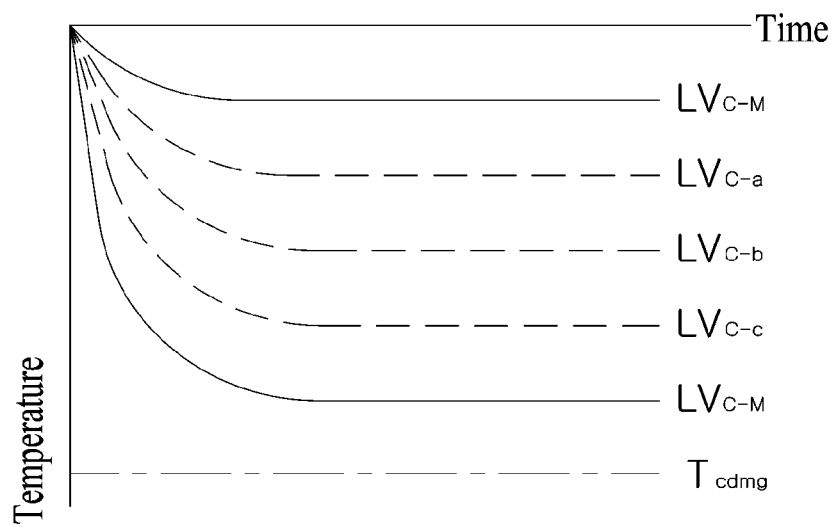

Referring to FIG. 38B, a lowest intensity $LV_{C-m}$ and a highest intensity $LV_{C-m}$ of cold feedback may be preset. In addition, the number of intermediate intensities of cold feedback may be set to three. In this case, the feedback device 1600 may set three intermediate intensities $LV_{C-a}$, $LV_{C-b}$, and $LV_{C-c}$ by using the lowest intensity $LV_{C-m}$ and the highest intensity $LV_{C-m}$ of the cold feedback. In this case, a temperature of the highest intensity $LV_{C-m}$ may be higher than a preset predetermined critical temperature $T_{Cdmg}$.

In an embodiment of the present invention, the feedback device 1600 may set the intermediate intensities $LV_{C-a}$, $LV_{C-b}$, and $LV_{C-c}$ by interpolating voltage values or temperatures corresponding to the lowest intensity $LV_{C-m}$ and the highest intensity $LV_{C-m}$ of the cold feedback.

In addition, in another embodiment of the present invention, the feedback device 1600 may set the intermediate intensities $LV_{C-a}$, $LV_{C-b}$, and $LV_{C-c}$ regardless of the lowest intensity $LV_{C-m}$ and the highest intensity $LV_{C-m}$ of the cold feedback which have been set in steps S12610 and S12620.

Since description given above in relation to the setting of the intermediate intensities of the hot feedback may be applied as it is to the setting of the intermediate intensities of the cold feedback, description overlapping that given above in relation to the setting of the intermediate intensities of the hot feedback will be omitted.

1.3.2. Calibration of Intensity of Thermal Grill Feedback

Figure 39:
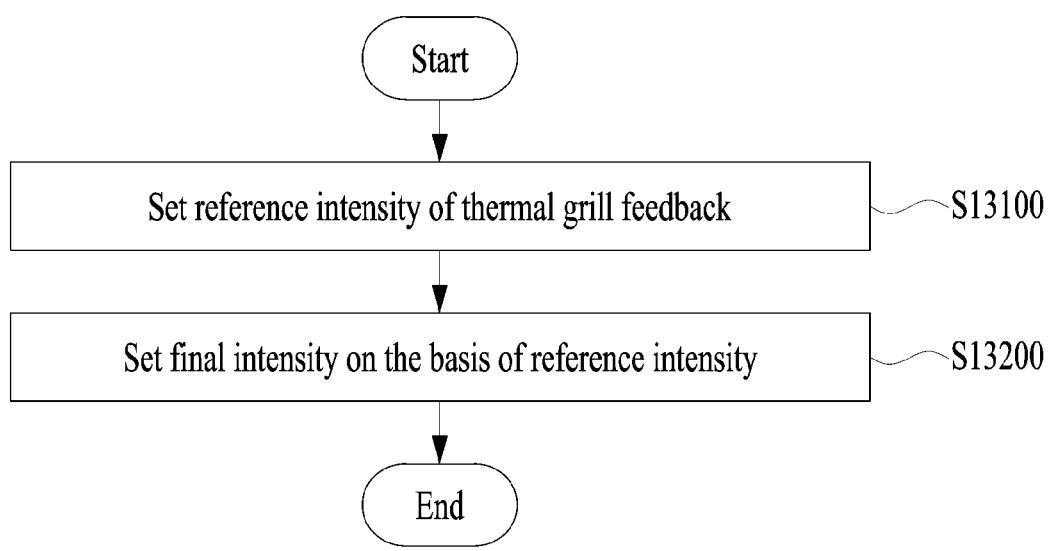
FIG. 39 is a flowchart related to a method for calibration of an intensity of thermal grill feedback according to an embodiment of the present invention.

FIG. 39 is a flowchart related to a method for calibration of an intensity of thermal grill feedback according to an embodiment of the present invention.

An intensity calibration method according to FIG. 39 may include setting reference intensities of thermal grill feedback (S13100) and setting final intensities of thermal grill feedback on the basis of the reference intensities (S13200).

As described above, the feedback device 1600 may provide thermal grill feedback to the user through the thermal grill operation in which the exothermic operation and the endothermic operation are performed in combination. The thermal grill feedback provides thermal pain to the user. When hot spots and cold spots of the user's body are simultaneously stimulated, the user fails to sense hotness and coldness and senses thermal pain.

Specifically, whether thermal pain will be perceived may be determined according to an intensity at which hotness and coldness are perceived and a ratio between hotness and coldness, and such an intensity/ratio of the hotness and coldness may be different for each person. Accordingly, even if the feedback device 1600 outputs thermal grill feedback, some users may not perceive thermal pain, and even if the user senses thermal pain, an intensity of thermal pain sensed by each user may be different. In addition, even for the same user, an intensity of thermal pain sensed by the user may be different for each body part of the user.

If thermal grill feedback output from the feedback device 1600 is pre-adjusted corresponding to characteristics of the user and each body part, the user may sense thermal pain at an intensity intended by the feedback device 1600 and/or the content reproduction device 1200. Therefore, calibration is also required for thermal grill feedback.

In an embodiment of the present invention, the thermal grill feedback may include neutral thermal grill feedback, hot thermal grill feedback, and cold thermal grill feedback, and whether the thermal grill feedback is neutral/hot/cold thermal grill feedback may be determined according to a ratio between an intensity of hot feedback and an intensity of cold feedback.

Hereinafter, for convenience of description, description will be given mainly on the basis of calibration of neutral thermal grill feedback. However, embodiments are not limited thereto, and since a difference exists in terms of a ratio between an intensity of hot feedback and an intensity of cold feedback between the neutral thermal grill feedback and the hot/cold thermal grill feedback, the details which will be described below may also be applied to calibration of hot thermal grill feedback and cold thermal grill feedback.

In addition, it has been confirmed above that the thermal grill operation may be performed by voltage adjustment, region adjustment, and time division. Accordingly, calibration methods according to voltage adjustment, region adjustment, and time division will be described below.

1.3.2.1. Calibration According to Voltage Adjustment

The feedback device 1600 may perform calibration of thermal grill feedback by using a voltage adjustment method.

In an embodiment of the present invention, the feedback device 1600 may perform calibration of thermal grill feedback by using the lowest intensity, the highest intensity, and/or at least one intermediate intensity set in the above-described calibration of intensities of hot feedback and cold feedback. This is because, since the thermal grill feedback is performed with a combination of hot feedback and cold feedback, calibration of thermal grill feedback may be more accurately and promptly performed when pieces of intensity information of hot feedback and cold feedback which have been adjusted corresponding to characteristics of the user are used.

Of course, embodiments are not limited thereto, and calibration of thermal grill feedback may also be performed using pieces of intensity information of hot feedback and cold feedback which have not been calibrated.

Hereinafter, for convenience of description, it will be assumed that intensity information on an n-th level (intensity) of hot feedback (temperature at the contact surface 1641 for each intensity, voltage value applied to the thermoelectric couple group 1644 for each intensity) and intensity information on an n-th level of cold feedback are preset through calibration of the hot feedback and cold feedback. Accordingly, the feedback controller 1648 may apply n forward voltages and n reverse voltages to the thermoelectric couple groups 1644, and accordingly, each thermoelectric couple group 1644 may perform an exothermic operation and an endothermic operation of level n, wherein sizes of temperature variations according to the exothermic operation and the endothermic operation of the same level are assumed to be the same.

In an embodiment of the present invention, the feedback device 1600 may set reference intensities of thermal grill feedback (S13100). This may be caused when a ratio between intensities of hotness and coldness sensed by the user corresponds to a predetermined ratio range, that is, a neutral ratio. In addition, even for the same neutral ratio, an intensity of thermal grill feedback may become stronger as a difference between hot heat according to hot feedback and cold heat according to cold feedback becomes greater.

First, the feedback device 1600 may set a neutral ratio for output of thermal grill feedback.

In an embodiment of the present invention, a neutral ratio may be preset. For example, the neutral ratio may be set to any one ratio from 2 to 5.

In addition, according to another embodiment of the present invention, the feedback device 1600 may obtain a user input for a neutral ratio.

FIG. 40 is a table related to voltages for providing thermal grill feedback based on neutral ratios according to an embodiment of the present invention.

Referring to FIG. 40, $V_{H-1}$ indicates a voltage applied to a thermoelectric couple group at the time of outputting hot feedback at a first level (intensity), and $V_{C-2}$, $V_{C-3}$, $V_{C-4}$, and $V_{C-5}$ indicate voltages applied to the thermoelectric couple group at the time of outputting cold feedback at a second level to a fifth level. In addition, for output of thermal grill feedback, the feedback device 1600 may apply power so that a first thermoelectric couple group performs an exothermic operation and a second thermoelectric couple group performs an endothermic operation.

In an embodiment of the present invention, the feedback device 1600 may output thermal pain feedback in order from a low neutral ratio to a high neutral ratio. Of course, the feedback device 1600 may also output thermal pain feedback in order from a high neutral ratio to a low neutral ratio. The feedback device 1600 may obtain a user input for any one neutral ratio among the plurality of neutral ratios. For example, when thermal grill feedback is output in order from a low neutral ratio to a high neutral ratio, the user may not sense thermal pain at first and then sense thermal pain when hot feedback is output at a specific neutral ratio from the feedback device 1600. In this case, the feedback device 1600 may obtain a user input for the specific neutral ratio and set the specific neutral ratio as a neutral ratio for thermal grill feedback.

In addition, in an embodiment of the present invention, the feedback device 1600 may set reference intensities of thermal grill feedback by using set neutral ratios (preset neutral ratios or neutral ratios set on the basis of user inputs) and resulting values of intensity calibration of hot feedback and cold feedback.

Also referring to FIG. 41, FIG. 41 is a table related to voltages for providing thermal grill feedback based on reference intensities according to an embodiment of the present invention.

In FIG. 41, $V_{H-1}$, $V_{H-2}$, $V_{H-3}$, $V_{H-4}$, and $V_{H-5}$ indicate voltages applied to a thermoelectric couple group at the time of outputting hot feedback at a first level (intensity) to a fifth level, and $V_{C-2}$, $V_{C-4}$, $V_{C-6}$, $V_{C-8}$, and $V_{C-10}$ indicate voltages applied to a thermoelectric couple group at the time of outputting cold feedback at a second level, a fourth level, a sixth level, an eighth level, and a tenth level. In the example of FIG. 41, it is assumed that the neutral ratio is set to 2. The $V_{H-1}$ to $V_{H-5}$ and $V_{C-2}$ to $V_{C-10}$ may be resulting values of the intensity calibration of hot feedback and cold feedback.

Corresponding to the neutral ratio of 2, the feedback device 1600 may set a voltage applied to a first thermoelectric couple group in relation to thermal grill feedback at a first reference intensity as $V_{H-1}$ corresponding to hot feedback at a first level and set a voltage applied to a second thermoelectric couple group as $V_{C-2}$ corresponding to hot feedback at a second level. Likewise, the feedback device 1600 may set voltages applied to the first thermoelectric couple group and voltages applied to the second thermoelectric couple group in relation to thermal grill feedback at a second reference intensity to a fifth reference intensity according to FIG. 41. In other words, when hot feedback at a first level is hot feedback at the lowest intensity and cold feedback at a tenth level is hot feedback at the highest intensity, the feedback device 1600 may set reference intensities of thermal grill feedback by using the lowest intensity of the hot feedback, the highest intensity of the cold feedback, and intermediate intensities of the hot feedback/cold feedback.

As described above, the intensity of thermal pain feedback may become stronger as a value of a temperature difference between hot heat output to the first thermoelectric couple group and cold heat output from the second thermoelectric couple group is greater. In the example of FIG. 41, a value of a temperature difference between hot heat output to the first thermoelectric couple group and cold heat output from the second thermoelectric couple group at the time of outputting thermal grill feedback at the fifth reference intensity may be greater than a value of a temperature difference between hot heat output to the first thermoelectric couple group and cold heat output from the second thermoelectric couple group at the time of outputting thermal grill feedback at the first reference intensity. Accordingly, the first reference intensity may become the lowest reference intensity of thermal grill feedback, the fifth reference intensity may become the highest reference intensity of the thermal grill feedback, and the second reference intensity to the fourth reference intensity may become intermediate reference intensities of the thermal grill feedback.

Although the reference intensities when the neutral ratio is 2 have been described above with reference to the example of FIG. 41, the embodiment described above with reference to FIG. 41 may also be applied to other neutral ratios. For example, when the neutral ratio is 3, the feedback device 1600 may set a voltage applied to the first thermoelectric couple group in relation to thermal grill feedback at the first reference intensity as $V_{H-1}$ corresponding to the hot feedback at the first level and set a voltage applied to the second thermoelectric couple group as $V_{C-3}$ corresponding to the hot feedback at the second level. In addition, the feedback device 1600 may set a voltage applied to the first thermoelectric couple group in relation to the thermal grill feedback at the first reference intensity as $V_{H-5}$ corresponding to the hot feedback at the fifth level and set a voltage applied to the second thermoelectric couple group as $V_{C-15}$ corresponding to hot feedback at a fifteenth level.

In addition, in an embodiment of the present invention, the feedback device 1600 may set final intensities on the basis of the reference intensities (S13200).

As described above, the reference intensities may be generated on the basis of the preset lowest intensities, highest intensities, and intermediate intensities of hot feedback and cold feedback. This is because the preset intensities of hot feedback and cold feedback have been adjusted corresponding to characteristics of the user. However, despite the adjustment, depending on characteristics of the user, the user may fail to perceive thermal pain or only slightly perceive thermal pain due to thermal grill feedback according to the reference intensities. Therefore, in step S13200, final intensities indicating intensities of thermal grill feedback suitable for the user may be set by more finely adjusting the reference intensities so that the reference intensities fit characteristics of the user. Here, the final intensities may include the lowest intensity, the highest intensity, and at least one intermediate intensity of thermal grill feedback.

In an embodiment of the present invention, the feedback device 1600 may receive selections on final intensities suitable for the user among the reference intensities through user inputs.

Specifically, in an embodiment of the present invention, the feedback device 1600 may sequentially output pieces of thermal grill feedback at a first reference intensity to a fifth reference intensity.

In this case, the feedback device 1600 may set the lowest intensity among the final intensities through a user input. More specifically, when the pieces of thermal grill feedback are sequentially output from the feedback device 1600, the user may perform a user input when the user senses thermal pain, and the feedback device 1600 may set a reference intensity of thermal grill feedback output at a time point at which the user input is obtained as the lowest intensity among the final intensities.

In addition, the feedback device 1600 may set the highest intensity among the final intensities through a user input. More specifically, when the pieces of thermal grill feedback are sequentially output from the feedback device 1600, the user may perform a user input when it is difficult for the user to tolerate thermal pain, and the feedback device 1600 may set a reference intensity of thermal grill feedback at a time point at which the user input is obtained or a reference intensity which is one stage lower than the reference intensity of thermal grill feedback at the time point at which the user input is obtained as the highest intensity among the final intensities.

In addition, in another embodiment, the contact surface 1641 of the heat output module 1640 may be disposed in a specific region of the casing of the feedback device 1600, and a pressure sensor may be disposed in the specific region or surroundings thereof. The feedback device 1600 may sequentially output pieces of thermal grill feedback according to reference intensities, and the user may keep the user's body in contact with the specific region until the user can tolerate thermal pain. However, it may be difficult for the user to tolerate thermal pain as the intensity of the thermal grill feedback becomes stronger, and in this case, the user's body may be detached from the specific region.

The feedback device 1600 may detect a time point at which the user's body is detached from the specific region by using the pressure sensor, and the feedback device 1600 may set a reference intensity of thermal grill feedback output at a time point at which the user's body is detached from the specific region or a reference intensity which is one stage lower than the reference intensity of thermal grill feedback at the time point at which the user's body is detached from the specific region as the highest intensity among the final intensities.

In an embodiment of the present invention, in order to prevent damage to the user's body, a critical intensity of thermal pain feedback may be preset, and the first reference intensity to the fifth reference intensity may be lower than the critical intensity. For example, the feedback device 1600 may set a critical intensity of thermal grill feedback on the basis of the highest intensity of hot feedback and/or the highest intensity of cold feedback. In addition, as another example, the feedback device 1600 may set an intensity of thermal grill feedback at which a temperature difference between hot heat and cold heat output for thermal grill feedback at a specific intensity becomes a predetermined temperature difference as the critical intensity. In addition, the critical intensity may also be determined on the basis of the critical temperature $T_{Hdmg}$ of hot feedback and/or the critical temperature $T_{Cdmg}$ of cold feedback. Of course, the critical intensity may also be set using various other methods.

In an embodiment, the feedback device 1600 may determine whether the first reference intensity to the fifth reference intensity are less than or equal to the critical intensity, and when some of the first reference intensity to the fifth reference intensity are higher than the critical intensity, the feedback device 1600 may not output thermal grill feedback at such reference intensities.

In addition, the feedback device 1600 may set at least one intermediate intensity among the final intensities through a user input.

More specifically, the user may perform a user input every time different degrees of thermal pain are sensed. For example, when pieces of thermal grill feedback are sequentially output from the feedback device 1600, the user may perform a user input every time thermal pain due to thermal grill feedback becomes stronger, and the feedback device 1600 may set reference intensities at time points at which the user inputs are obtained as intermediate intensities of thermal grill feedback.

In a specific embodiment of the present invention, while pieces of thermal grill feedback at the first reference intensity to the fifth reference intensity are output sequentially from the feedback device 1600, when user inputs are obtained during the output at the second reference intensity, the output at the third reference intensity, and the output at the fourth reference intensity, the feedback device 1600 may set the second reference intensity as the lowest intensity of the final intensities, set the fourth reference intensity as the highest intensity of the final intensities, and set the third reference intensity as an intermediate intensity of the final intensities. Accordingly, the three levels of final intensities may be set as shown in FIG. 42.

In addition, in another embodiment of the present invention, the feedback device 1600 may set at least one intermediate intensity by using the lowest intensity and the highest intensity among the final intensities without using a user input.

For example, the feedback device 1600 may obtain the lowest intensity and the highest intensity among the final intensities through a user input. The feedback device 1600 may set at least one reference intensity which exists between a reference intensity corresponding to the lowest intensity and a reference intensity corresponding to the highest intensity as the at least one intermediate intensity.

In another embodiment of the present invention, the feedback device 1600 may set the final intensities by adjusting temperatures (or voltage values) of the reference intensities.

FIG. 43 is a table related to voltages for providing thermal grill feedback based on specific intensities according to an embodiment of the present invention. Here, the specific intensities may refer to intensities of thermal grill feedback when temperatures of the contact surface 1641 according to thermal grill feedback at specific intensities or voltage values applied to a thermoelectric couple group for thermal grill feedback at specific intensities are adjusted.

Although FIG. 43 only shows specific intensities related to the first reference intensity, specific intensities applicable to other reference intensities (for example, the second reference intensity to the fifth reference intensity) may also be set.

In FIG. 43, a first-first intensity to a first-ninth intensity may indicate specific intensities of the first reference intensity. At the first-first intensity, $V_{H-1}$ may be applied to the first thermoelectric couple group and $V_{C-2}$ may be applied to the second thermoelectric couple group as with the first reference intensity. However, at the first-second intensity to the first-ninth intensity, voltage values applied to the first thermoelectric couple group and the second thermoelectric couple group may be changed, and as a result, temperatures in the first thermoelectric couple group and the second thermoelectric couple group may be changed. For example, $1.1V_{H-1}$ may be applied to the first thermoelectric couple group and $0.9V_{C-2}$ may be applied to the second thermoelectric couple group at the first-sixth intensity, and $0.9V_{H-1}$ may be applied to the first thermoelectric couple group and $1.1V_{C-2}$ may be applied to the second thermoelectric couple group at the first-eighth intensity. Here, coefficients such as 1.1 and 0.9 in front of voltage values do not only refer to ratios such as 1.1 times and 0.9 times the voltage values. The coefficients indicate an increase or decrease of the voltage values. $1.1V_{H-n}$ indicates that the voltage value is higher than $V_{H-n}$, and $0.9V_{H-n}$ indicates that the voltage value is lower than $V_{H-n}$. In addition, a value of a difference between $1.1V_{H-n}$ and $V_{H-n}$ or a value of a difference between $0.9V_{H-n}$ and $V_{H-n}$ may be preset or determined according to a value of $V_{H-n}$ (or a value of $V_{C-n}$).

In an embodiment, the feedback device 1600 may output thermal grill feedback of at least one intensity among the first-second intensity to the first-ninth intensity. For example, the feedback device 1600 may sequentially output pieces of thermal grill feedback at the first-first intensity to the first-ninth intensity. In addition, for example, the feedback device 1600 may output pieces of thermal grill feedback at the first-sixth intensity and the first-eighth intensity at which a temperature difference between hot heat and cold heat in the thermal grill feedback at the first-first intensity may be maintained.

The feedback device 1600 may receive a user input for any one intensity among the one or more output intensities, and in this case, the feedback device 1600 may determine selected intensities as final intensities.

For example, the feedback device 1600 may output specific intensities at the first reference intensity to the fifth reference intensity for each of the first reference intensity to the fifth reference intensity and may receive selections on specific intensities for each of the first reference intensity to the fifth reference intensity through user inputs. In this case, the feedback device 1600 may set a specific intensity selected through a user input among the specific intensities of the first reference intensity as the lowest intensity among the final intensities, set a specific intensity selected through a user input among the specific intensities of the fifth reference intensity as the highest intensity among the final intensities, and set specific intensities selected through user inputs among the specific intensities of the second reference intensity to the fourth reference intensity as intermediate intensities among the final intensities.

In addition, the feedback device 1600 may adjust temperature values of preset final intensities to adjust the final intensities. Specifically, the feedback device 1600 may set specific intensities for the preset final intensities. The feedback device 1600 may output pieces of thermal grill feedback at the specific intensities, receive selections on particular specific intensities among the specific intensities through user inputs, and adjust the final intensities to the particular specific intensities.

For example, the feedback device 1600 may set the lowest intensity, the intermediate intensities, and the highest intensity by receiving selections on final intensities suitable for the user among the reference intensities through user inputs. In this case, the feedback device 1600 may set a plurality of specific intensities for the lowest intensity, the intermediate intensities, and the highest intensity by adjusting temperatures or voltage values of the lowest intensity, the intermediate intensities, and the highest intensity and may output the set plurality of specific intensities. For example, the feedback device 1600 may output nine specific intensities for each of the lowest intensity, the intermediate intensities, and the highest intensity. The feedback device 1600 may receive selections on a particular specific intensity of the lowest intensity, particular specific intensities of the intermediate intensities, and a particular specific intensity of the highest intensity through user inputs and may set the selected specific intensities as the lowest intensity, the intermediate intensities, and the highest intensity of the final intensities.

1.3.2.2. Calibration According to Region Adjustment

The feedback device 1600 may perform calibration of thermal grill feedback by using a region adjustment method.

It has been described above that the feedback device 1600 may perform a thermal grill operation by using the region adjustment method. The feedback device 1600 may output thermal grill feedback by adjusting areas of thermoelectric couple groups 1644 to which a forward voltage is applied and areas of thermoelectric couple groups 1644 to which a reverse voltage is applied.

Specifically, in the thermal grill operation according to region adjustment, a neutral ratio may refer to a ratio of an area to which cold feedback is provided to an area to which hot feedback is provided, and a degree of thermal pain sensed by the user may be different according to the neutral ratio.

In addition, even for the same neutral ratio, degrees of thermal pain sensed by the user may be different due to a temperature difference between hot heat caused by hot feedback and cold heat caused by cold feedback. Therefore, calibration of thermal pain feedback is also required in the thermal grill operation according to region adjustment.

In an embodiment of the present invention, the feedback device 1600 may set reference intensities of thermal grill feedback (S13100).

First, the feedback device 1600 may set a neutral ratio for output of thermal grill feedback.

In an embodiment of the present invention, the feedback device 1600 may obtain a user input for the neutral ratio.

FIG. 44 is a table related to voltages for providing thermal grill feedback based on neutral ratios and application times of the voltage according to an embodiment of the present invention.

Referring to FIG. 44, the feedback device 1600 may output thermal grill feedback according to neutral ratios. For example, when a neutral ratio is 2, the feedback device 1600 may set an area ratio between a thermoelectric couple group performing an exothermic operation and a thermoelectric couple group performing an endothermic operation to a ratio of 1:2 and may output thermal grill feedback according to the area ratio. In addition, when a neutral ratio is n, an area ratio between a thermoelectric couple group performing an exothermic operation and a thermoelectric couple group performing an endothermic operation may be set to a ratio of 1:n.

In an embodiment, the feedback device 1600 may output thermal pain feedback in order from a low neutral ratio to a high neutral ratio. Of course, the feedback device 1600 may also output thermal pain feedback in order from a high neutral ratio to a low neutral ratio. In addition, the feedback device 1600 may obtain a user input for any one neutral ratio among the plurality of neutral ratios. The feedback device 1600 may set a neutral ratio selected through a user input as a neutral ratio for thermal grill feedback.

Of course, the neutral ratio may be preset by the feedback device 1600.

In addition, in an embodiment of the present invention, the feedback device 1600 may set reference intensities of thermal grill feedback by using set neutral ratios (preset neutral ratios or neutral ratios set on the basis of user inputs) and resulting values of intensity calibration of hot feedback and cold feedback FIG. 45 is a table related to voltages for providing thermal grill feedback based on reference intensities according to an embodiment of the present invention.

Referring to FIG. 45, $V_{H-1}$, $V_{H-2}$, $V_{H-3}$, $V_{H-4}$, and $V_{H-5}$ indicate voltages applied to a thermoelectric couple group during output of pieces of hot feedback of a first level to a fifth level, and $V_{C-1}$, $V_{C-2}$, $V_{C-3}$, $V_{C-4}$, and $V_{C-5}$ indicate voltages applied to a thermoelectric couple group during output of pieces of cold feedback of a first level, a second level, a third level, a fourth level, and a fifth level.

In an embodiment, the feedback device 1600 may apply voltages corresponding to hot feedback/cold feedback of the same level for each reference intensity. Of course, the feedback device 1600 may also apply voltages corresponding to hot feedback/cold feedback of different levels for each reference intensity.

As reference intensities become higher, magnitudes of voltages applied to the thermoelectric couple group performing an exothermic operation and the thermoelectric couple group performing an endothermic operation may become higher, and accordingly, intensities of thermal grill feedback may become stronger. Accordingly, in the example of FIG. 45, a first reference intensity may become the lowest reference intensity of thermal grill feedback, a fourth reference intensity may become the highest reference intensity of thermal grill feedback, and a second reference intensity and a third reference intensity may become intermediate reference intensities of thermal grill feedback. Since description given above in relation to step S13100 of the calibration according to voltage adjustment may be applied to the setting of reference intensities, detailed description thereof will be omitted.

In addition, in an embodiment of the present invention, the feedback device 1600 may set final intensities on the basis of the reference intensities (S13200).

As described above in relation to step S13200 of the calibration according to voltage adjustment, in an embodiment of the present invention, the feedback device 1600 may sequentially output pieces of thermal grill feedback at a first reference intensity to a fifth reference intensity and may receive selections on final intensities suitable for the user among the output reference intensities through user inputs.

In addition, in an embodiment of the present invention, the feedback device 1600 may set the final intensities by adjusting temperatures (or voltage values) of the reference intensities. FIG. 46 is a table related to voltages for providing thermal grill feedback based on specific intensities according to an embodiment of the present invention. Referring to FIG. 46, the feedback device 1600 may output one or more specific intensities as in FIG. 46, receive selections on one or more specific intensities among the output specific intensities through user inputs, and set final intensities on the basis of the selected specific intensities. Since description given above in relation to step S13200 of the calibration according to voltage adjustment may be applied to step S13200 of the calibration according to region adjustment, detailed description thereof will be omitted.

1.3.2.3. Calibration According to Time Division

The feedback device 1600 may perform calibration of thermal grill feedback by using a time division method.

It has been described above that the feedback device 1600 may perform a thermal grill operation by using the time division method. Specifically, the feedback device 1600 may perform the thermal grill operation by performing an exothermic operation and an endothermic operation alternately in time.

Specifically, in the thermal grill operation according to time division, a neutral ratio may refer to a ratio of a time during which a reverse voltage is applied to a time during which a forward voltage is applied, and a degree of thermal pain sensed by the user may be different according to the neutral ratio.

In addition, even for the same neutral ratio, degrees of thermal pain sensed by the user may be different due to a temperature difference between hot heat caused by hot feedback and cold heat caused by cold feedback. Therefore, calibration of thermal pain feedback is also required in the thermal grill operation according to time division.

In an embodiment of the present invention, the feedback device 1600 may set reference intensities of thermal grill feedback (S13100).

First, the feedback device 1600 may set a neutral ratio for output of thermal grill feedback. In an embodiment of the present invention, the feedback device 1600 may obtain a user input for the neutral ratio.

Referring to FIG. 44, the feedback device 1600 may output thermal grill feedback according to the neutral ratio. For example, when the neutral ratio is n, the feedback device 1600 may set a ratio between a time during which a forward voltage is applied and a time during which a reverse voltage is applied at a ratio of 1:n and may output thermal grill feedback according to the time ratio.

In an embodiment, the feedback device 1600 may output thermal pain feedback in order from a low neutral ratio to a high neutral ratio. Of course, the feedback device 1600 may also output thermal pain feedback in order from a high neutral ratio to a low neutral ratio. In addition, the feedback device 1600 may obtain a user input for any one neutral ratio among the plurality of neutral ratios. The feedback device 1600 may set a neutral ratio selected through a user input as a neutral ratio for thermal grill feedback.

Of course, the neutral ratio may be preset by the feedback device 1600.

In addition, in an embodiment of the present invention, the feedback device 1600 may set reference intensities of thermal grill feedback by using set neutral ratios (preset neutral ratios or neutral ratios set on the basis of user inputs) and resulting values of intensity calibration of hot feedback and cold feedback.

Referring to FIG. 45, the feedback device 1600 may apply voltages corresponding to hot feedback/cold feedback of the same level for each reference intensity. Of course, the feedback device 1600 may also apply voltages corresponding to hot feedback/cold feedback of different levels for each reference intensity.

As reference intensities become higher, magnitudes of voltages applied to the thermoelectric couple group performing an exothermic operation and the thermoelectric couple group performing an endothermic operation may become higher, and accordingly, intensities of thermal grill feedback may become stronger. Accordingly, in the example of FIG. 45, a first reference intensity may become the lowest reference intensity of thermal grill feedback, a fourth reference intensity may become the highest reference intensity of thermal grill feedback, and a second reference intensity and a third reference intensity may become intermediate reference intensities of thermal grill feedback. Since description given above in relation to step S13100 of the calibration according to voltage adjustment may be applied to the setting of reference intensities, detailed description thereof will be omitted.

In addition, in an embodiment of the present invention, the feedback device 1600 may set final intensities on the basis of the reference intensities (S13200).

As described above in relation to step S13200 of the calibration according to voltage adjustment, in an embodiment of the present invention, the feedback device 1600 may sequentially output pieces of thermal grill feedback at a first reference intensity to a fifth reference intensity and may receive selections on final intensities suitable for the user among the output reference intensities through user inputs.

In addition, in an embodiment of the present invention, the feedback device 1600 may set the final intensities by adjusting temperatures (or voltage values) of the reference intensities. For example, the feedback device 1600 may output one or more specific intensities as in FIG. 46, receive selections on one or more specific intensities among the output specific intensities through user inputs, and set final intensities on the basis of the selected specific intensities. Since description given above in relation to step S13200 of the calibration according to voltage adjustment may be applied to step S13200 of the calibration according to time division, detailed description thereof will be omitted.

1.3.3. Checking Result of Intensity Calibration

Figure 47:
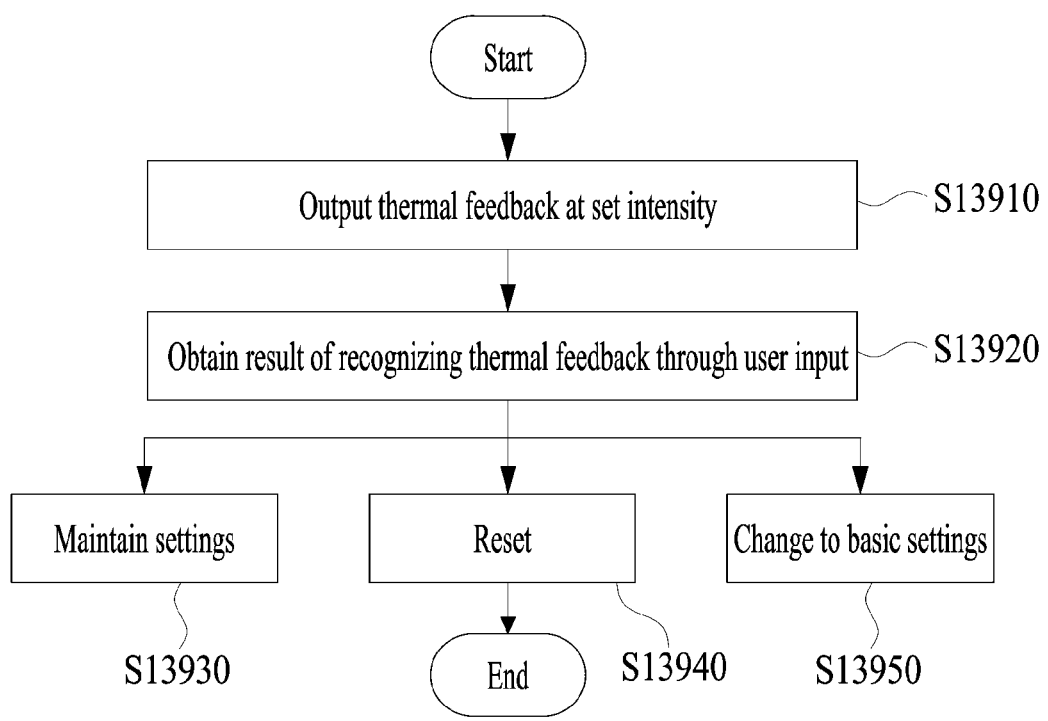
FIG. 47 is a flowchart related to a method of checking a result of intensity calibration according to an embodiment of the present invention.

FIG. 47 is a flowchart related to a method of checking a result of intensity calibration according to an embodiment of the present invention.

Referring to FIG. 47, the feedback device 1600 may check results of the calibration in step S12600 and/or step S12700.

Specifically, the feedback device 1600 may output pieces of thermal feedback at intensities set in step S12600 and/or step S12700 (S13910).

In an embodiment of the present invention, in the cases of hot feedback and cold feedback, the feedback device 1600 may output hot feedback and cold feedback at the lowest intensity, the highest intensity, and at least one intermediate intensity.

For example, the feedback device 1600 may output hot feedback and cold feedback in order from the lowest intensity to the highest intensity or may only output hot feedback and cold feedback of at least one intermediate intensity.

In addition, in another embodiment of the present invention, in the case of thermal grill feedback, the feedback device 1600 may output pieces of thermal grill feedback at the lowest intensity, the highest intensity, and at least one intermediate intensity among final intensities.

In addition, in an embodiment of the present invention, the feedback device 1600 may obtain a result of perceiving thermal feedback output in step S13910 through a user input (S13920).

Specifically, when hot feedback/cold feedback/thermal grill feedback at the lowest intensity is output in step S13910, the feedback device 1600 may receive confirmation on whether the hot feedback/cold feedback/thermal grill feedback is sensed through a user input. For example, when hot feedback at the lowest intensity is output, the user may check whether hotness is sensed and perform a user input when hotness is sensed (or hotness is not sensed), and the feedback device 1600 may obtain the user input.

As another example, when hot feedback/cold feedback/thermal grill feedback at the highest intensity is output, the feedback device 1600 may check, through a user input, whether the hot feedback/cold feedback/thermal grill feedback is too strong. For example, when thermal grill feedback at the highest intensity is output, the user may check whether thermal pain is too strong and perform a user input when the thermal pain is too strong (or the thermal pain is at a tolerable level), and the feedback device 1600 may obtain the user input.

As still another example, when hot feedback/cold feedback/thermal grill feedback of at least one intermediate intensity is output, the feedback device 1600 may receive confirmation on whether one or more intermediate intensities are distinguished from each other. For example, when pieces of cold feedback at a plurality of intensities are output, the user may check whether the intensities of the output cold feedback are distinguished from each other and perform a user input when the intensities of cold feedback are distinguished from each other (or when the intensities of cold feedback are not distinguished from each other), and the feedback device 1600 may obtain the user input.

In addition, in an embodiment of the present invention, the feedback device 1600 may maintain or change the intensities set in step S12600 and/or step S12700 according to the result of perceiving thermal feedback obtained in step S13920.

In an embodiment of the present invention, the feedback device 1600 may determine whether the intensities set in step S12600 and/or step S12700 are suitable on the basis of the result of perceiving thermal feedback through the user input. For example, when it is confirmed that the user may perceive thermal feedback at the lowest intensity, when it is confirmed that the user may tolerate thermal feedback at the highest intensity, or when it is confirmed that the user may distinguish one or more intermediate intensities, the feedback device 1600 may determine that the intensities set in step S12600 and/or step S12700 are suitable. In this case, the feedback device 1600 may maintain the intensities set in step S12600 and/or step S12700 (S13930).

As another example, when it is confirmed that the user cannot perceive thermal feedback at the lowest intensity, when it is confirmed that the user cannot tolerate thermal feedback at the highest intensity, or when it is confirmed that the user cannot distinguish one or more intermediate intensities, the feedback device 1600 may determine that the intensities set in step S12600 and/or step S12700 are not suitable. In this case, the feedback device 1600 may reset intensities of thermal feedback by re-performing step S12600 and/or step S12700 (S13940) or may change the intensities of thermal feedback to predetermined basic settings regardless of steps S12600 and S12700 (S13950).

1.4. Region Calibration

In an embodiment of the present invention, calibration may also be performed for regions of thermal feedback. As described above, when, for example, the thermoelectric couple array 1643 includes a plurality of thermoelectric couple groups, the feedback controller 1648 may control output of thermal feedback separately for each of the plurality of thermoelectric couple groups. In this case, depending on the user, the user may want the first thermoelectric couple group 1644-1 and the second thermoelectric couple group 1644-2 to output thermal feedback separately or want the first thermoelectric couple group 1644-1 and the second thermoelectric couple group 1644-2 to output thermal feedback identically like a single thermoelectric couple group. In addition, the user may want at least one of a plurality of thermoelectric couple groups to not output thermal feedback. In order to satisfy such user needs, calibration of regions of thermal feedback, that is, resolutions of thermal feedback, of the feedback device may be performed.

Figure 48:
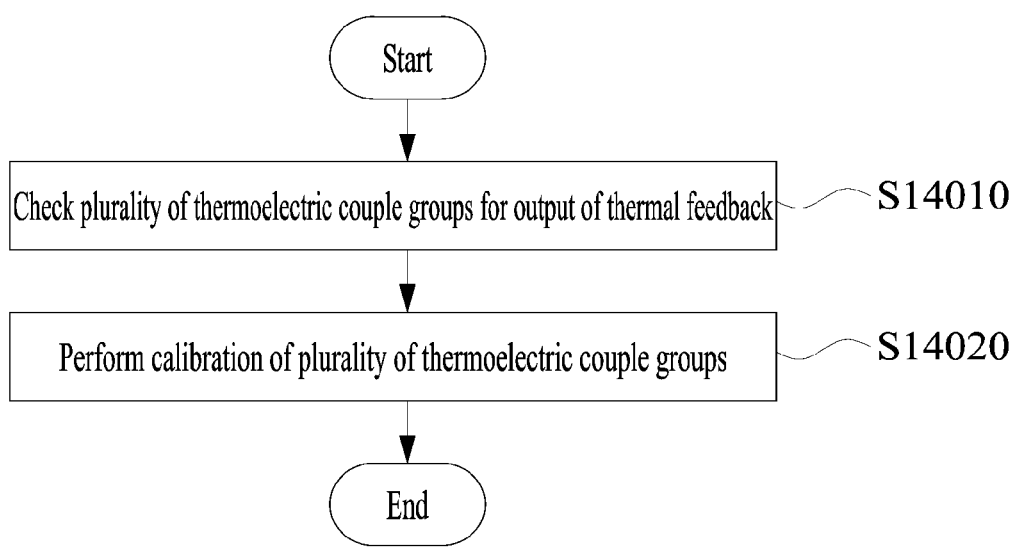
FIG. 48 is a flowchart related to a method for calibration of regions of thermal feedback according to an embodiment of the present invention.

FIG. 48 is a flowchart related to a method for calibration of regions of thermal feedback according to an embodiment of the present invention.

The region calibration method according to FIG. 48 may include checking a plurality of thermoelectric couple groups for output of thermal feedback (S14010) and performing calibration of the plurality of thermoelectric couple groups (S14020).

Hereinafter, each of the above-mentioned steps will be described in more detail.

In an embodiment of the present invention, the feedback device 1600 may check a plurality of thermoelectric couple groups (S14010).

As described above, the thermoelectric couple array 1643 of the heat output module 1640 has a plurality of thermoelectric couple groups 1644, and separate control for each thermoelectric couple group 1644 is possible since each thermoelectric couple group 1644 is connected to each power terminal 1647.

Referring to the example of FIG. 15, the thermoelectric couple array 1643 may include five thermoelectric couple groups 1644-1, 1644-2, 1644-3, 1644-4, and 1644-5, and separate control may be possible for each of the thermoelectric couple groups 1644-1, 1644-2, 1644-3, 1644-4, and 1644-5. The feedback device 1600 may check the plurality of thermoelectric couple groups 1644 and whether separate control is possible for each of the plurality of thermoelectric couple groups 1644. Hereinafter, description will be given by assuming that separate control is possible for the plurality of thermoelectric couple groups 1644.

In addition, in an embodiment of the present invention, the feedback device 1600 may perform calibration of the plurality of thermoelectric couple groups (S14020).

Specifically, in an embodiment of the present invention, the feedback device 1600 may set identical thermoelectric feedback output regions which indicate thermoelectric couple groups to which the same voltage is applied among the plurality of thermoelectric couple groups.

Although, as described above, the feedback device 1600 may perform separate control for each of the plurality of thermoelectric couple groups 1644, according to circumstances, some of the plurality of thermoelectric couple groups 1644 may have to output thermal feedback like a single thermoelectric couple group. For example, although ten thermoelectric couple groups are included in the feedback device 1600, and the feedback device 1600 may perform separate control for each of the ten thermoelectric couple groups, depending on characteristics of the user, the user may desire for each set of five thermoelectric couple groups or all of the ten thermoelectric couple groups to output thermal feedback identically like a single thermoelectric couple group. In order to satisfy such user needs, the feedback device 1600 may set identical thermoelectric feedback output regions for the plurality of thermoelectric couple groups.

FIG. 49 is a table for describing settings of identical thermoelectric feedback output regions according to an embodiment of the present invention.

Referring to FIG. 49, the thermoelectric couple array 1643 of the feedback device 1600 may include ten thermoelectric couple groups 1644. In FIG. 49, the letters a to j may indicate identical thermoelectric feedback output regions.

In an embodiment of the present invention, the feedback device 1600 may set the number of identical thermoelectric feedback output regions. For example, the feedback device 1600 may obtain the number of identical thermoelectric feedback output regions through a user input. In addition, as another example, the feedback device 1600 may obtain the number of identical thermoelectric feedback output regions from the content reproduction device 1200, or the number of identical thermoelectric feedback output regions may also be pre-stored in the feedback device 1600.

The feedback device 1600 may set identical thermoelectric feedback output regions for the plurality of thermoelectric couple groups according to the set number of identical thermoelectric feedback output regions. For example, when, as shown in FIG. 49, the number of identical thermoelectric feedback output regions is set to ten, the feedback device 1600 may set the plurality of thermoelectric couple groups as different identical thermoelectric feedback output regions. In addition, when the number of identical thermoelectric feedback output regions is set to three, the feedback device 1600 may set a first thermoelectric couple group to a third thermoelectric couple group as a first identical thermoelectric feedback output region, set a fourth thermoelectric couple group to a sixth thermoelectric couple group as a second identical thermoelectric feedback output region, and set a seventh thermoelectric couple group to a tenth thermoelectric couple group as a third identical thermoelectric feedback output region. In addition, when the number of identical thermoelectric feedback output regions is set to one, the feedback device 1600 may set all of the plurality of thermoelectric couple groups as a single identical thermoelectric feedback output region.

The same voltage may be applied to thermoelectric couple groups which correspond to an identical thermoelectric feedback output region. For example, when the number of identical thermoelectric feedback output regions is set to two, at a first time point, the same forward voltage may be applied to the first thermoelectric couple group to the fifth thermoelectric couple group, and the same reverse voltage may be applied to the sixth thermoelectric couple group to the tenth thermoelectric couple group.

In an embodiment of the present invention, the feedback device 1600 may set inactive regions which indicate thermoelectric couple groups to which a voltage is not applied among the plurality of thermoelectric couple groups.

As described above, the user may want at least one of the plurality of thermoelectric couple groups to not output thermal feedback. In order to satisfy such user need, the feedback device 1600 may set inactive regions for the plurality of thermoelectric couple groups.

FIG. 50 is a table for describing settings of inactive regions according to an embodiment of the present invention. In FIG. 50, 0 may indicate regions to which a voltage is applied among thermoelectric couple groups, and X may indicate inactive regions to which a voltage is not applied among the thermoelectric couple groups.

In an embodiment of the present invention, the feedback device 1600 may set the number of inactive regions. For example, the feedback device 1600 may obtain the number of inactive regions through a user input. In addition, as another example, the feedback device 1600 may obtain the number of inactive regions from the content reproduction device 1200, or the number of inactive regions may also be pre-stored in the feedback device 1600.

The feedback device 1600 may set inactive regions for the plurality of thermoelectric couple groups according to the set number of inactive regions. For example, when, as shown in FIG. 50, the number of inactive regions is set to two, the feedback device 1600 may set two thermoelectric couple groups among the plurality of thermoelectric couple groups as inactive regions. Although the fifth thermoelectric couple group and the tenth thermoelectric couple group are indicated as inactive regions in FIG. 50, embodiments are not limited thereto, and which of the plurality of thermoelectric couple groups will be set as inactive regions may be determined using various other methods. For example, the feedback device 1600 may receive selections on thermoelectric couple groups which will become inactive regions through user inputs, or thermoelectric couple groups which will become inactive regions may also be preset corresponding to the numbers of inactive regions.

In addition, when the number of inactive regions is set to ten, the feedback device 1600 may set all of the first thermoelectric couple group to the tenth thermoelectric couple group as inactive regions. This is the same as a state in which the thermal feedback output function of the heat output module 1640 is turned off.

A voltage for output of thermal feedback is not applied to thermoelectric couple groups which correspond to inactive regions. For example, when the number of inactive regions is set to six, at the first time point, a voltage for thermal feedback may not be applied to the third thermoelectric couple group to the fifth thermoelectric couple group and the eighth thermoelectric couple group to the tenth thermoelectric couple group.

1.5. Time Calibration

When linking thermal feedback to a video or sound during reproduction of video content, it may be important that thermal feedback and a specific scene or sound to which the thermal feedback is attempted to be linked are in sync. For example, when attempting to cause hot feedback to be sensed during reproduction of an explosion scene, it is preferable that a video output time point of the explosion scene and an experiencing time point of the hot feedback coincide, and otherwise, a user experience may be degraded.

However, when the feedback controller 1645 applies power for output of thermal feedback at an output time point of a specific scene, a time difference may be generated between the output time point of the specific scene and an experiencing time point of the thermal feedback.

One reason for this is that, even when power is applied to the thermoelectric couple array 1643, some amount of time is required for the temperature of the contact surface 1641 to reach a temperature at which the user may experience thermal feedback. That is, since a time point at which power is applied and an experiencing time point at which the user experiences thermal feedback may not coincide, a video and thermal feedback become out of sync when an output time point of a specific scene and a time point at which power is applied are caused to coincide with each other. In addition, time taken for the temperature of the contact surface 1641 to reach the temperature at which the user may experience thermal feedback may not be uniform. This is because the time taken for the temperature of the contact surface 1641 to reach the temperature at which the user may experience thermal feedback may vary according to a degree of deterioration of the heat output module 1640. In addition, another reason may be that, even for the same temperature, an experienced temperature perceived by the user may be different according to characteristics of the user.

Due to these various reasons, a time difference may be generated between the output time point of the specific scene and the experiencing time point of the thermal feedback.

To solve such a problem, in the present invention, the feedback device 1600 may obtain an output time point of thermal feedback from the content reproduction device 1200 and output the thermal feedback at the output time point, wherein the thermal feedback may be output on the basis of the output time point and a correction time. Here, the correction time may be a time interval from a power application time point, at which power is applied to the thermoelectric couple array 1643, to an experiencing time point, at which the temperature of the contact surface 1641 reaches a temperature at which the user may experience thermal feedback. As the thermal feedback is output on the basis of the output time point and the correction time, it is possible to cause the user to experience the thermal feedback at the output time point of the specific scene.

However, the correction time may vary according to characteristics of the user or the heat output module 1640. That is, for the user to more suitably experience the thermal feedback at the output time point of the specific scene, the correction time has to be calibrated corresponding to the user or the heat output module 1640. Therefore, in the present invention, a method of performing calibration of the output time point of thermal feedback, that is, a method of performing calibration of the correction time, will be described.

Figure 51:
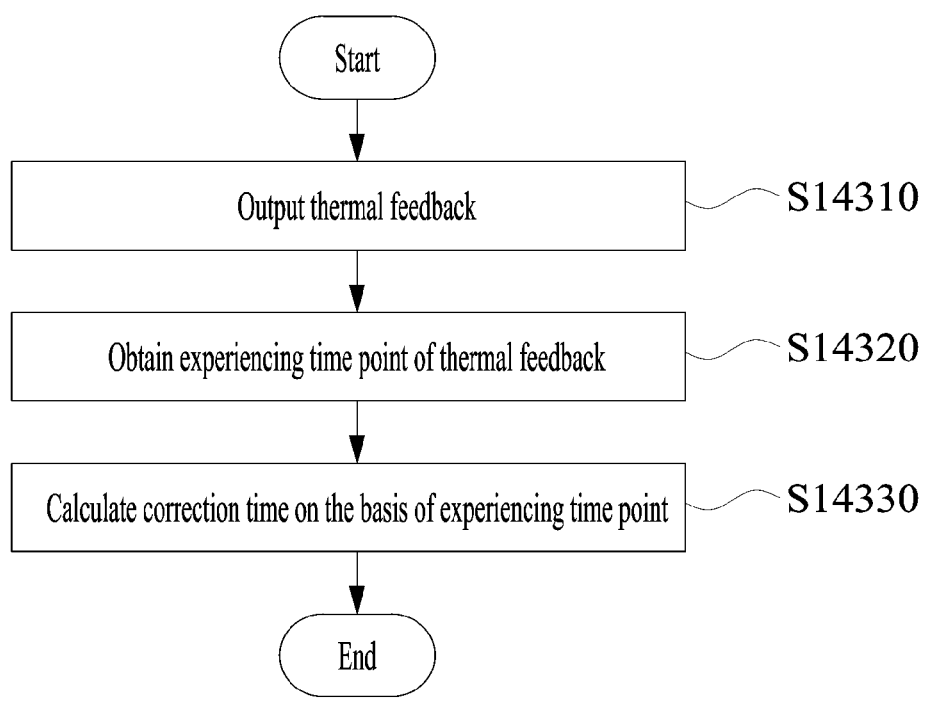
FIG. 51 is a flowchart related to a method for time calibration of thermal feedback according to an embodiment of the present invention.

FIG. 51 is a flowchart related to a method for time calibration of thermal feedback according to an embodiment of the present invention.

The time calibration method according to FIG. 51 may include outputting thermal feedback (S14310), obtaining an experiencing time point at which the user experiences the thermal feedback (S14320), and calculating a correction time on the basis of the experiencing time point (S14330).

Hereinafter, each of the above-mentioned steps will be described in more detail.

In an embodiment of the present invention, the feedback device 1600 may output thermal feedback (S14310). In this case, the feedback device 1600 may inform the user of an output time point of the thermal feedback. For example, the feedback device 1600 may output the thermal feedback at a reproduction time point of a thermal event. In addition, even regardless of the reproduction time point of the thermal feedback, the feedback device 1600 may provide a video signal and/or an audio signal including information, which indicates that thermal feedback is output, to the audiovisual device 1400 to inform the user of the reproduction time point of the thermal feedback.

In addition, the feedback device 1600 may obtain the experiencing time point of the thermal feedback (S14320). In an embodiment, the feedback device 1600 may obtain the experiencing time point through a user input. The user may perform a user input when the user senses warmth, and the feedback device 1600 may obtain the user input.

In addition, the feedback device 1600 may calculate a correction time on the basis of the experiencing time point.

FIG. 52 is a view for describing calculation of a correction time according to an embodiment.

Figures 52A, 52B:
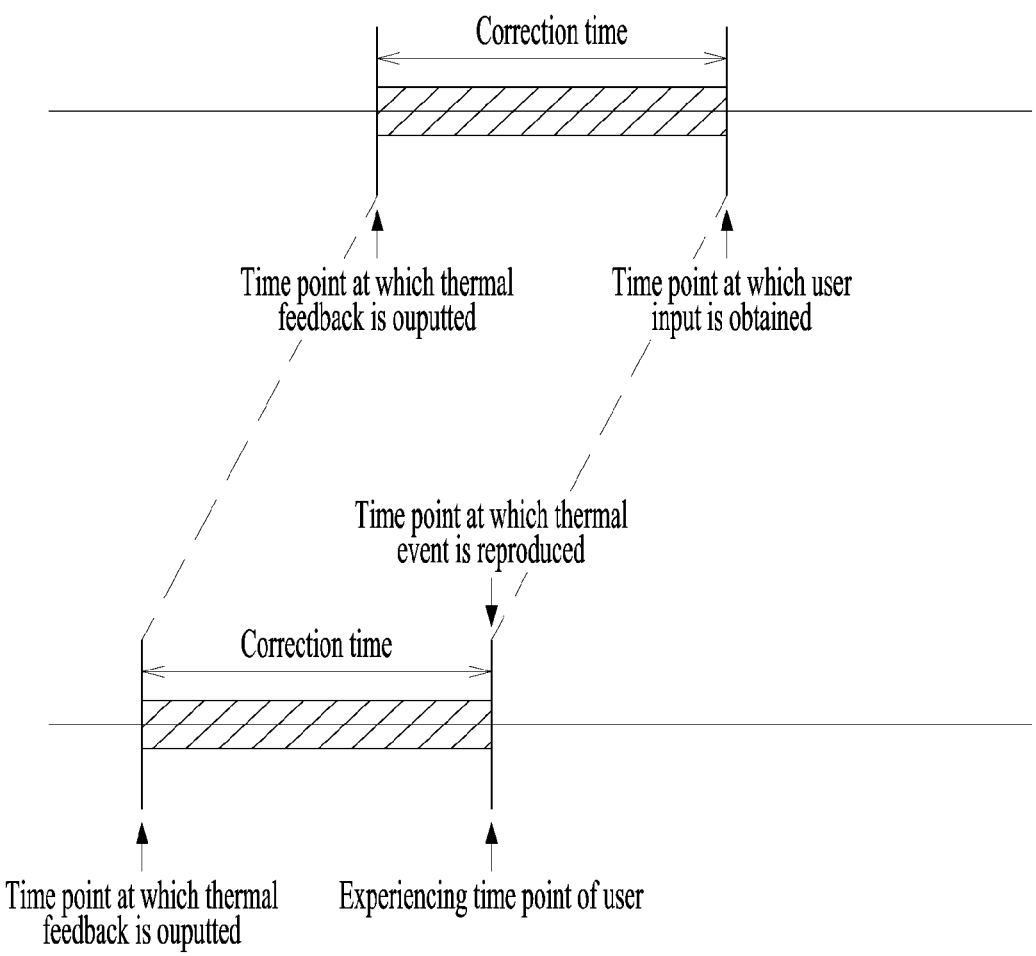
FIGS. 52A and 52B are a view for describing calculation of a correction time according to an embodiment.

Referring to FIG. 52A, the feedback device 1600 may check an output time point of thermal feedback and obtain an experiencing time point through a user input. The feedback device 1600 may calculate a time between the experiencing time point and the output time point of the thermal feedback as a correction time.

In another embodiment of the present invention, the correction time may be set to be different for each type of thermal feedback, for each intensity of thermal feedback, or for each type and intensity of thermal feedback. In this case, the feedback device 1600 may obtain a correction time for each type of thermal feedback, for each intensity of thermal feedback, or for each type and intensity of thermal feedback by performing steps S14310 to S14330 for each type of thermal feedback, for each intensity of thermal feedback, or for each type and intensity of thermal feedback.

In an embodiment of the present invention, the feedback device 1600 may output thermal feedback by reflecting a correction time. Specifically, as shown in FIG. 52B, the feedback device 1600 may output thermal feedback at a time point which is earlier than a thermal event reproduction time point or a preset thermal feedback output time point by the correction time. Accordingly, the user may experience the thermal feedback at the thermal event reproduction time point, and since the thermal event reproduction time point coincides with the time point at which the user experiences the thermal feedback, the user experience may be improved.

III. Thermal Feedback Control System

1. Thermal Feedback Control System

Hereinafter, a thermal feedback control system 22000 according to an embodiment of the present invention will be described.

1.1. Outline of Thermal Feedback Control System

The thermal feedback control system 22000 according to an embodiment of the present invention is a system controlling information related to thermal feedback between the content reproduction device 1200 and the feedback device 1600 so that thermal feedback is appropriately output from the feedback device 1600. The thermal feedback control system 22000 may be included in the thermal experience providing system 1000.

As described above, the content reproduction device 1200 provides thermal feedback data to the feedback device 1600, and the feedback device 1600 outputs thermal feedback by performing a thermoelectric operation according to the thermal feedback data. However, thermal feedback data from the content reproduction device 1200 may not be understandable in some cases. For example, when manufacturers of the content reproduction device 1200 and the feedback device 1600 are different or when languages and operating systems thereof are different, there may be no compatibility between an instruction used in the content reproduction device 1200 and an instruction used in the feedback device 1600. In this case, since the feedback device 1600 is unable to interpret thermal feedback from the content reproduction device 1200, the feedback device 1600 is unable to appropriately output thermal feedback of a type intended by the content reproduction device 1200 at a time point and an intensity intended by the content reproduction device 1200.

To solve such a problem, the thermal feedback control system 22000 according to the present invention will be described herein. According to the thermal feedback control system 22000, compatibility between instructions of the content reproduction device 1200 and the feedback device 1600 may be improved, and accordingly, thermal feedback may be output from the feedback device 1600 according to thermal feedback data provided from the content reproduction device 1200.

1.2. Configuration of Thermal Feedback Control System

Figure 53:
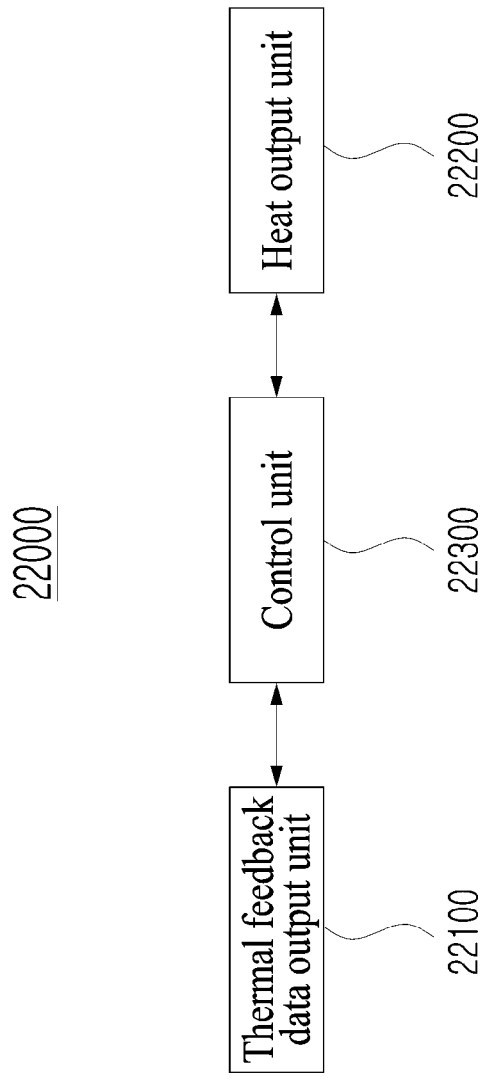
FIG. 53 is a block diagram related to a configuration of a thermal feedback control system according to an embodiment of the present invention.

FIG. 53 is a block diagram related to a configuration of a thermal feedback control system according to an embodiment of the present invention.

Referring to FIG. 53, the thermal feedback control system 22000 may include a thermal feedback data output unit 22100, a heat output unit 22200, and a control unit 22300.

The thermal feedback data output unit 22100 may obtain thermal feedback data and provide the thermal feedback data to the control unit 22300. Here, the thermal feedback data may include information related to thermal feedback, that is, thermal feedback information. For example, the thermal feedback information may include information on a target of thermal feedback, a type of thermal feedback, an intensity of thermal feedback, and an experiencing time point of thermal feedback.

In addition, the thermal feedback data may be configured with a format and/or an instruction understandable by the thermal feedback data output unit 22100.

In addition, in some embodiments of the present invention, the thermal feedback data output unit 22100 may be implemented in a form included in the content reproduction device 1200. As a specific embodiment, the thermal feedback data output unit 22100 may be implemented in a form included in the controller 1260. In addition, the thermal feedback data output unit 22100 may be implemented in a form included in an application capable of reproducing multimedia content.

However, embodiments are not limited thereto, and the thermal feedback data output unit 22100 may be implemented in a form included in any device capable of obtaining and providing thermal feedback data. For example, the thermal feedback data output unit 22100 may be implemented in a form included in the feedback device 1600, the audiovisual device 1400, or another external device.

In addition, the heat output unit 22200 may obtain thermal feedback control data and provide thermal feedback according to the thermal feedback control data. Here, the thermal feedback control data may refer to data in which information related to thermal feedback is configured with a format and/or an instruction understandable by the heat output unit 22200 (hereinafter, an understandable format).

In addition, in some embodiments of the present invention, the heat output unit 22200 may be implemented in a form included in the feedback device 1600. In this case, the format of the thermal feedback control data may be the same as or different from the format of the thermal feedback data.

As a specific embodiment, the heat output unit 22200 may be implemented in a form included in the feedback controller 1648. However, embodiments are not limited thereto, and the heat output unit 22200 may be implemented in a form included in any device capable of obtaining thermal feedback control data and providing thermal feedback according to the thermal feedback control data.

In addition, the control unit 22300 may obtain thermal feedback data, generate thermal feedback control data on the basis of the thermal feedback data, and provide the thermal feedback control data.

In an embodiment of the present invention, the format of the thermal feedback control data may be different from the format of the thermal feedback data. In this case, even when the thermal feedback data is provided to a heat output module 2300, the heat output module 2300 may fail to interpret the thermal feedback data. The control unit 22300 may convert the thermal feedback data to the thermal feedback control data so that the heat output module 2300 may output thermal feedback according to thermal feedback information included in the thermal feedback data.

In addition, in some embodiments of the present invention, the control unit 22300 may be implemented in a form included in the feedback device 1600, the audiovisual device 1400, or the content reproduction device 1200.

In addition, embodiments are not limited thereto, and the control unit 22300 may be implemented in a form included in any device capable of providing thermal feedback control data on the basis of thermal feedback data.

Hereinafter, each element of the thermal feedback control system 22000 will be described in more detail.

1.2.1. Thermal Feedback Data Output Unit

Figure 54:
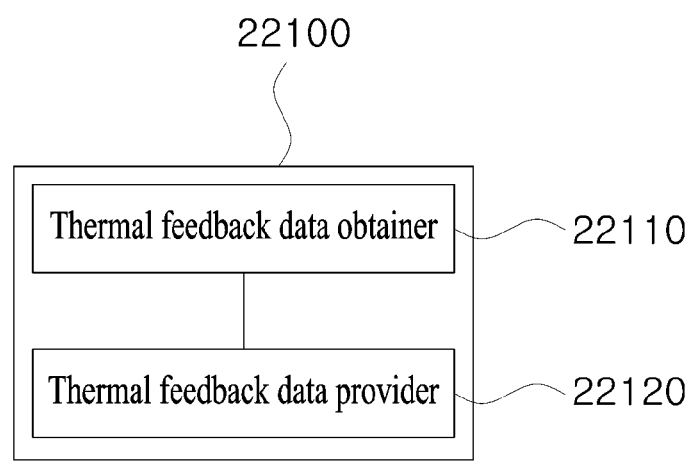
FIG. 54 is a block diagram related to a configuration of a thermal feedback data output unit according to an embodiment of the present invention.

FIG. 54 is a block diagram related to a configuration of a thermal feedback data output unit according to an embodiment of the present invention.

Referring to FIG. 54, the thermal feedback data output unit 22100 may include a thermal feedback data obtainer 22110 and a thermal feedback data provider 22120.

The thermal feedback data obtainer 22110 may obtain thermal feedback data. The thermal feedback data includes thermal feedback information, and the thermal feedback information will be described in detail using FIGS. 55 and 56.

In an embodiment of the present invention, the thermal feedback data obtainer 22110 may generate thermal feedback data. As a specific embodiment, when a thermal event occurs and thermal feedback information corresponding to the thermal event is determined, the thermal feedback data obtainer 22110 may generate thermal feedback data according to the thermal feedback information. Here, the thermal event may refer to a specific event of which a user experience is improved by linkage with thermal feedback. For example, when content is game content, and a specific thermal event has occurred in the game content (for example, when a character in the game content has reached a specific location), the thermal feedback data obtainer 22110 may determine specific thermal feedback information corresponding to the specific thermal event. For example, for every thermal event, a table in which thermal feedback information on the corresponding thermal event is designated may be stored, and the thermal feedback data obtainer 22110 may determine the specific thermal feedback information on the basis of the table. As another example, an algorithm for calculating thermal feedback information related to the corresponding thermal event may be stored. In this case, the thermal feedback data obtainer 22110 may determine a situation of the specific thermal event (a moving speed of the character, heat resistance of the character, and the like) on the basis of the algorithm and may determine the specific thermal feedback information on the basis of a result of the determination. In addition, the thermal feedback data obtainer 22110 may generate thermal feedback data on the basis of the specific thermal feedback information.

In an embodiment of the present invention, a data format (or instruction) of thermal feedback data may be standardized. In this case, according to the standardized data format, the thermal feedback data may also be understood by units and/or devices other than the thermal feedback data output unit 22100. The standardized data format may be stored in the thermal feedback data output unit 22100 or a device (for example, the memory 1240) accessible by the thermal feedback data output unit 22100. The thermal feedback data obtainer 22110 may obtain a predesignated data format and generate thermal feedback data according to the predesignated data format by using thermal feedback information.

In addition, in another embodiment of the present invention, the data format (or instruction) of the thermal feedback data may be diverse instead of being standardized. In this case, according to the diverse data formats, thermal feedback data generated on the basis of a specific data format is not understandable by other units and/or devices which are unable to understand the specific data format. Of course, units and/or devices capable of understanding the specific data format may understand the thermal feedback data. In an embodiment of the present invention, the thermal feedback data obtainer 22110 generates thermal feedback data by calling for a thermal feedback data generating function for generating thermal feedback data (that is, a function including information on the specific data format (or specific data instruction). Specifically, the thermal feedback data obtainer 22110 may access a library including a plurality of thermal feedback data generating functions, obtain information on a specific data format from the library, and generate thermal feedback data on the basis of the information on the specific data format. For example, a thermal feedback data generating function may be added to the library, and accordingly, the thermal feedback data obtainer 22110 may use the added thermal feedback data generating function to generate thermal feedback data having a new data format. In addition, in an embodiment, the thermal feedback data obtainer 22110 may call for an application programming interface (API) for accessing the thermal feedback data generating function (or an API for generating thermal feedback data) and access the library through the API to obtain information on the specific data format.

In addition, in an embodiment of the present invention, the thermal feedback data obtainer 22110 may receive thermal feedback data from the outside. For example, when multimedia content is video content, the thermal feedback data obtainer 22110 may receive thermal feedback data corresponding to the corresponding video content from an external device. In this case, the received thermal feedback data may have a data format understandable by the thermal feedback data obtainer 22110.

In addition, in an embodiment of the present invention, the thermal feedback data obtainer 22110 may obtain thermal feedback data at various time points. For example, when a thermal event occurs in real time in multimedia content, the thermal feedback data obtainer 22110 may obtain thermal feedback data in real time every time the thermal event occurs. As another example, the thermal feedback data obtainer 22110 may obtain thermal feedback data according to a predetermined cycle. For example, the thermal feedback data obtainer 22110 may periodically receive thermal feedback data from an external device.

As still another example, the thermal feedback data obtainer 22110 may obtain thermal feedback data one time while multimedia content is being reproduced. For example, when the multimedia content is video content, the thermal feedback data obtainer 22110 may obtain a piece of thermal event data including a plurality of pieces of thermal feedback information corresponding to a plurality of thermal events that occur in the video content.

In addition, the thermal feedback data provider 22120 may provide thermal feedback data to the control unit 22300. In this case, the thermal feedback data provider 22120 may provide thermal feedback at various cycles. For example, the thermal feedback data provider 22120 may provide thermal feedback data in real time to the thermal feedback data provider 22120 every time thermal feedback data is obtained by the thermal feedback data obtainer 22110, may provide thermal feedback data according to a predetermined cycle even when thermal feedback data is generated by the thermal feedback data provider 22120, or may provide thermal feedback data every time a request is received from the control unit 22300.

1.2.1.1. Thermal Feedback Data

Hereinafter, thermal feedback data obtained by the thermal feedback data output unit 22100 will be described.

Although, for convenience of description, thermal feedback data will be described mainly on the basis of embodiments of FIGS. 55 and 56 herein, the thermal feedback data is not solely configured by the embodiments of FIGS. 55 and 56 and may also be configured by combining pieces of thermal feedback information, which will be described below, in various ways. For example, thermal feedback data may include pieces of information on a mode of thermal feedback, a target of thermal feedback, and an intensity of thermal feedback. Since combining the pieces of information is self-evident to those of ordinary skill in the art, description thereof will be omitted.

Figure 55:
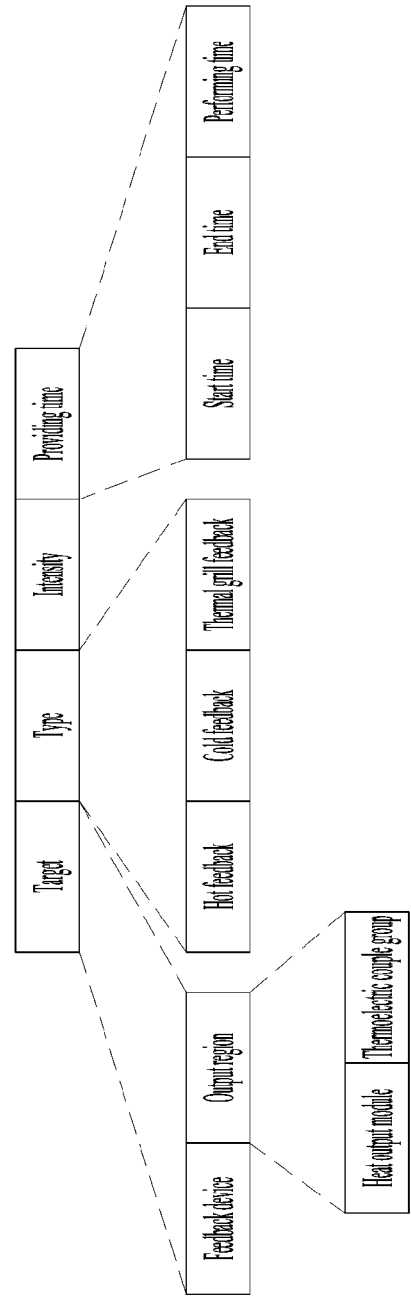
FIGS. 55 and 56 are views for describing thermal feedback information according to an embodiment of the present invention.
Figure 56:
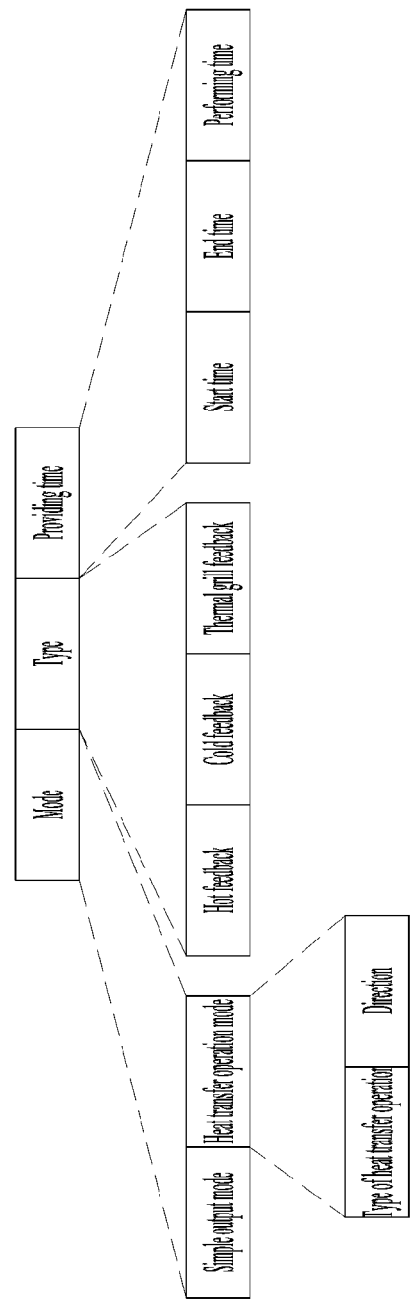

FIGS. 55 and 56 are views for describing thermal feedback information according to an embodiment of the present invention.

Referring to FIG. 55, thermal feedback data may include, as thermal feedback information, pieces of information on a target of thermal feedback, a type of thermal feedback, an intensity of thermal feedback, and a time point at which thermal feedback is provided.

Here, the target of thermal feedback may refer to a target to which the thermal feedback will be applied. For example, a target of thermal feedback may indicate a target on which thermal feedback will be performed when a plurality of feedback devices 1600 are used in the thermal experience providing system 1000, when a plurality of heat output modules 1640 are present in the feedback device 1600, or when each thermoelectric couple group 1644 is separately controlled and thus the heat output module 1640 is controlled for each region.

Specifically, when a plurality of feedback devices 1600 are used in the thermal experience providing system 1000, thermal feedback data may include identification information on the feedback devices 1600. For example, the identification information on the feedback devices 1600 may be information on, in a VR system using two bar type gaming controllers, through which gaming controller thermal feedback will be output.

In addition, when thermal feedback is output for each region from a single feedback device 1600, thermal feedback data may include information on an output region to which the thermal feedback is output. For example, when a thermoelectric element of the feedback device 1600 is provided as the thermoelectric couple array 1643 including a plurality of thermoelectric couple groups 1644, which are separately controllable, in the thermal experience providing system 1000, the thermal feedback data may include identification information on the heat output module 1640 which will output thermal feedback and identification information on the thermoelectric couple array 1643 or the thermoelectric couple group 1644 to which thermal feedback will be output.

In addition, the type of thermal feedback may refer to a type of thermal feedback. For example, types of thermal feedback may include hot feedback, cold feedback, and thermal grill feedback. Also, the thermal grill feedback may include neutral thermal grill feedback, hot thermal grill feedback, and cold thermal grill feedback.

In addition, the intensity of thermal feedback may refer to a strength of thermal feedback. According to circumstances, information on an intensity of thermal feedback may include information on a type of thermal feedback. For example, intensities of thermal feedback may be classified into first to twelfth levels, cold feedback may be assigned to the first to fourth levels, hot feedback may be assigned to the fifth to eighth levels, and thermal grill feedback may be assigned to the ninth to twelfth levels. In addition, as another example, intensities of thermal feedback may be classified for each type of thermal feedback. For example, intensities of thermal feedback may be classified into first to fifth levels for hot feedback and classified into first to fifth levels for cold feedback.

In addition, a thermal feedback providing time may refer to time at which thermal feedback is provided. The thermal feedback providing time may include a start time, an end time, a time duration, and the like of thermal feedback output.

Referring to FIG. 56, thermal feedback data may include, as thermal feedback information, pieces of information on a thermal feedback mode, a type of thermal feedback, and a thermal feedback providing time.

Here, the mode of thermal feedback relates to a method in which thermal feedback is output. Specifically, the mode of thermal feedback, which relates to a method in which thermal feedback is output, may include a simple output mode and a heat transfer operation mode.

The simple output mode refers to a heat output mode in which, when thermal feedback is output from a plurality of output regions, pieces of thermal feedback output from the plurality of output regions have no relation to each other in a thermal experience of the user. That is, thermal feedback output from a specific output region may have no relation to thermal feedback output from another output region.

On the other hand, the heat transfer operation mode refers to a heat output mode in the case of an operation in which heat is transferred from a plurality of output regions. In this case, for the heat transfer operation, thermal feedback output from a specific output region may be related to thermal feedback output from another output region.

In addition, the heat transfer operation mode may include pieces of information on a type and a direction of a heat transfer operation. Types of the heat transfer operation may include a first heat transfer operation (see FIGS. 26 to 29) in which pieces of thermal feedback are sequentially output from output regions, wherein output of thermal feedback from a previous output region ends after a predetermined amount of time from a time point at which output of thermal feedback starts from a specific output region, a second heat transfer operation (see FIGS. 30 and 31) in which pieces of thermal feedback are sequentially output from output regions, wherein output of thermal feedback from each output region simultaneously ends, and a third heat transfer operation (see FIGS. 32 and 33) in which output of thermal feedback from each output region simultaneously starts, wherein the outputs of pieces of thermal feedback from the output regions sequentially end. Of course, any other pieces of thermal feedback in which thermal feedback output from a specific output region is related to thermal feedback output from another output region may be included in a heat transfer operation.

In addition, as types of the heat transfer operation, specific types of each heat transfer operation may be included. For example, types of the heat transfer operation and pieces of intensity information may be combined in the specific types. For example, a first-first specific type of the first heat transfer operation in which pieces of thermal feedback are sequentially output from output regions may be set such that an intensity is a high level in an output region from which thermal feedback is output firstly and an intensity is a low level in an output region from which thermal feedback is output lastly, and a first-second specific type may be set such that an intensity is a low level in an output region from which thermal feedback is output firstly and an intensity is a high level in an output region from which thermal feedback is output lastly.

In addition, a mode of a heat transfer operation may include direction information on the heat transfer operation. For example, direction information on a heat transfer operation may include information on a direction in which the heat transfer operation begins and a direction in which the heat transfer operation ends. For example, direction information on a heat transfer operation may include a first/second direction in which a heat transfer operation is performed in order from an output region disposed at the left/right to an output region disposed at the right/left and a third/fourth direction in which a heat transfer operation is performed in order from an output region disposed at the top/bottom to an output region disposed at the bottom/top. The direction information on the heat transfer operation is not limited thereto and may include any other pieces of information related to directions of a heat transfer operation.

In addition, the description given above with reference to FIG. 55 may be applied as it is to pieces of information on types of thermal feedback and thermal feedback providing times.

1.2.2. Heat Output Unit

Figure 57:
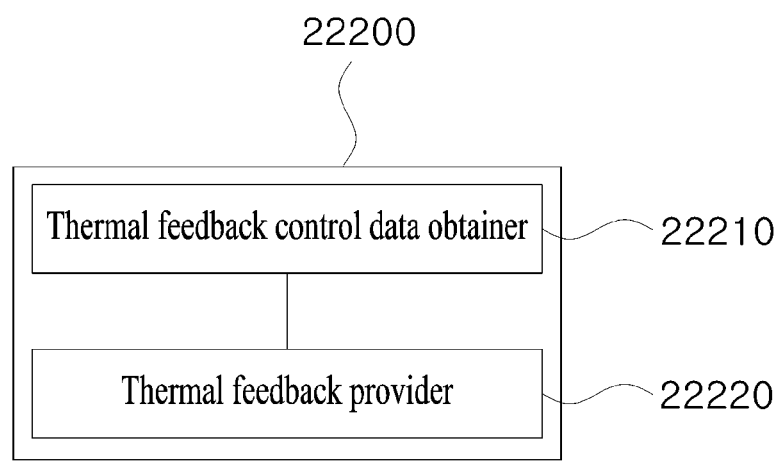
FIG. 57 is a block diagram related to a configuration of a heat output unit according to an embodiment of the present invention.

FIG. 57 is a block diagram related to a configuration of a heat output unit according to an embodiment of the present invention.

Referring to FIG. 57, the heat output unit 22200 may include a thermal feedback control data obtainer 22210 and a thermal feedback provider 22220.

The thermal feedback control data obtainer 22210 may obtain thermal feedback control data. As described above, thermal feedback control data may be configured with a format and/or an instruction (hereinafter, a format) understandable by the heat output unit 22200. In other words, the thermal feedback control data is not understandable by other units and/or devices having instruction systems not capable of interpreting the format. For example, when the format is not understandable by the thermal feedback data output unit 22100, the thermal feedback control data is not understandable by the thermal feedback data output unit 22100. In addition, when the format is not understandable by a heat output unit other than the heat output unit 22200, the thermal feedback control data is not understandable. That is, the thermal feedback control data may have a specification in that it is only understandable by a specific heat output unit. For example, thermal feedback control data may be configured with a predetermined packet structure. The thermal feedback control data and the packet structure of the thermal feedback control data will be described in detail below with reference to FIGS. 58 and 59.

Specifically, the thermal feedback control data obtainer 22210 may obtain thermal feedback control data from the control unit 22300. Of course, according to circumstances, the thermal feedback control data obtainer 22210 may obtain thermal feedback control data from the thermal feedback data output unit 22100. In this case, the thermal feedback control data obtainer 22210 obtains thermal feedback data output from the thermal feedback data output unit 22100 as the thermal feedback control data, wherein the thermal feedback data and the thermal feedback control data may be the same.

In addition, in an embodiment, the thermal feedback control data obtainer 22210 may transmit control request data to request the control unit 22300 for thermal feedback control data and may obtain the thermal feedback control data from the control unit 22300 according to the control request data. In this case, the thermal feedback control data obtainer 22210 may also transmit the control request data to the control unit 22300 according to a predetermined cycle or transmit the control request data to the control unit 22300 only when the heat output unit 22200 has received a request for output of thermal feedback from the outside.

In addition, in another embodiment, the thermal feedback control data obtainer 22210 may obtain thermal feedback control data from the control unit 22300 even without transmitting the control request data thereto. For example, when a thermal event occurs in real time in multimedia content, every time the control unit 22300 obtains thermal feedback data, the thermal feedback control data obtainer 22210 may respond thereto and obtain thermal feedback control data from the control unit 22300.

As still another example, the thermal feedback control data obtainer 22210 may obtain thermal feedback control data one time while multimedia content is being reproduced. For example, when the multimedia content is video content, the thermal feedback control data obtainer 22210 may obtain, from the control unit 22300, a single piece of thermal event data including a plurality of pieces of thermal feedback information corresponding to a plurality of thermal events connected in the video content.

In addition, the thermal feedback provider 22220 may provide thermal feedback according to thermal feedback control data. For example, when a heat output module 2220 is implemented in a form included in the feedback controller 1648, the heat output module 2220 may output thermal feedback by controlling other configurations in the heat output module 1640 according to thermal feedback control data. As another example, when the heat output module 2220 is not implemented in a form included in the feedback controller 1648, the heat output module 2220 may provide thermal feedback control data to the feedback controller 1648.

In addition, the thermal feedback provider 22220 may include interpretation information for interpreting thermal feedback control data. According to circumstances, the thermal feedback control data may be encoded using a predetermined method. For example, thermal feedback control data may be encoded using the predetermined method in order to reduce the size of the thermal feedback control data. This is because, if the size of the thermal feedback control data is large and thus time at which the thermal feedback control data obtainer 22210 obtains thermal feedback control data is delayed, provision of thermal feedback from the thermal feedback provider 22220 may also be delayed.

The thermal feedback provider 22220 may decode the thermal feedback control data by using the interpretation information so that the thermal feedback provider 22200 may understand the thermal feedback control data. For example, the interpretation information may be configured in the form of a table. Specifically, the table may include pieces of information indicating that hot feedback should be output when thermal feedback type information in thermal feedback control data is configured as "0001," cold feedback should be output when the thermal feedback type information is configured as "0011," and cold feedback should be output when the thermal feedback type information is configured as "0111." As another example, the interpretation information may include an algorithm for decoding the thermal feedback control data, and the thermal feedback provider 22220 may decode the thermal feedback control data according to the algorithm.

1.2.2.1. Thermal Feedback Control Data

Hereinafter, thermal feedback control data obtained by the heat output unit 22200 will be described.

Figure 58:
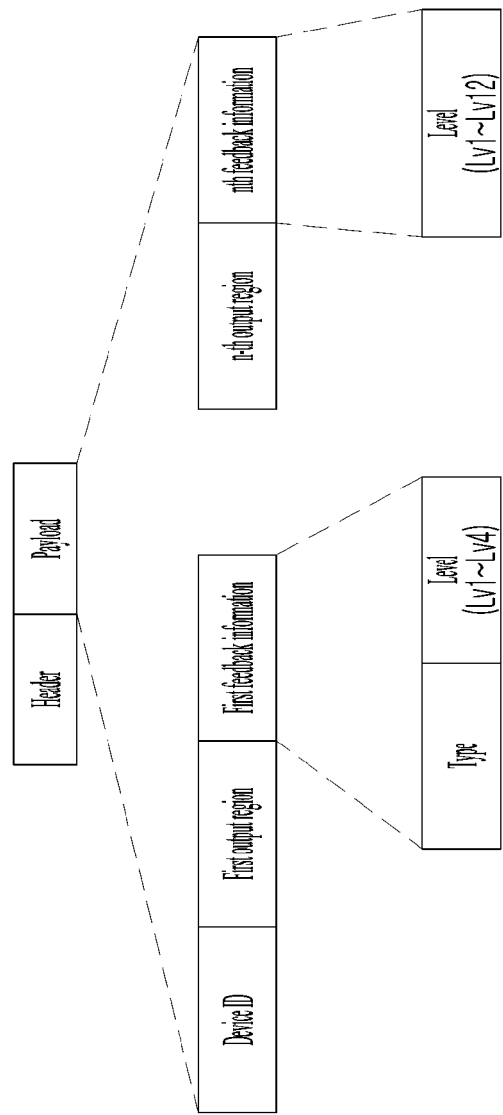

FIGS. 58 and 59 are views for describing packet structures of thermal feedback control data according to an embodiment of the present invention.

Referring to FIG. 58, a packet structure (hereinafter, a packet) of thermal feedback control data may be configured with a header and a payload.

The header may include information on a destination, that is, information on the heat output unit 22200. For example, the packet may be transmitted from the control unit 22300, and for the control unit 22300 to transmit the packet to the heat output unit 22200, the header may include information on the control unit 22300.

In addition, the payload may include thermal feedback information. In this case, in the payload, thermal feedback data may be arranged in a specific format according to a rule set in the heat output unit 22200. If the payload is arranged according to a rule other than the rule set in the heat output unit 22200, the heat output unit 22200 is unable to interpret thermal feedback control data including the payload. Therefore, prior to generating the packet, the control unit 22300 may obtain information on the rule set in the heat output unit 22200 in advance.

In this way, the payload may be configured in various formats. Various configurations of the payload will be described with reference to FIGS. 58 and 59.

Although, for convenience of description, the payload will be described mainly on the basis of embodiments of FIGS. 58 and 59 herein, the payload is not solely configured by the embodiments of FIGS. 58 and 59 and may also be configured by combining fields, which will be described below, in various ways. Since combining the fields is self-evident to those of ordinary skill in the art, description thereof will be omitted. In addition, various fields indicating thermal feedback information other than the fields which will be described below may also exist. For example, the payload may include a mode field related to a thermal feedback mode and heat transfer operation fields related to a heat transfer operation (for example, a field related to a type of the heat transfer operation, a field related to a direction of the heat transfer operation). Such various fields may also be applied to fields of the payload.

In FIG. 58, the payload may be configured with a device ID field indicating feedback device identification information, n output region fields indicating a first output region to a n-th output region, and n feedback information fields indicating thermal feedback information on each output region. The device ID field is information indicating, when a plurality of feedback devices 1600 are used in the thermal experience providing system 1000, to which feedback device 1600 the packet is related. In addition, the output region field is information related to a region to which thermal feedback is output in the feedback device 1600. When the feedback device 1600 includes a plurality of heat output modules 1640, the output region field indicates to which heat output module 1640 a feedback information field corresponding to the output region field is related. In addition, when thermoelectric couple arrays 1643 or thermoelectric couple groups 1644 are separately controlled in the feedback device 1600, the output region field indicates to which thermoelectric couple array 1643 or thermoelectric couple group 1644 a feedback information field corresponding to the output region field is related.

In addition, the feedback information field may include a type field indicating information on a type of thermal feedback and a level field indicating an intensity of thermal feedback. In this case, the type field may include information indicating hot feedback, cold feedback, and thermal grill feedback, and particularly for the thermal grill feedback, the type field may include information indicating neutral thermal grill feedback, hot thermal grill feedback, and cold thermal grill feedback. In addition, in the level field, a strength of thermal feedback indicated in the type field may be set.

In addition, depending on embodiments, the feedback information field may include the level field without including the type field. In this case, the level field may include information on thermal feedback. For example, in the level field, intensities of thermal feedback may be classified into first to twelfth levels, cold feedback may be assigned to the first to fourth levels, cold feedback may be assigned to the fifth to eighth levels, and thermal grill feedback may be assigned to the ninth to twelfth levels.

Referring to FIG. 59A, the payload of the packet may include an output region field and a level field. In the output region field, all of a plurality of output regions may be indicated when the plurality of output regions are identically controlled in the feedback device 1600, but only some of the plurality of output regions may be indicated when the plurality of output regions are separately controlled. For example, when n output regions are included in the feedback device 1600, the output region field may include field values indicating each of the n output regions. In addition, also in the level field, intensities of pieces of thermal feedback output from all of the plurality of output regions may be indicated when the plurality of output regions are identically controlled, but intensities of pieces of thermal feedback corresponding to only some of the plurality of output regions may be indicated when the plurality of output regions are separately controlled. For example, when n output regions are included in the feedback device 1600, the output region field may include field values indicating an intensity of thermal feedback of each of the n output regions.

In addition, as shown in FIG. 59B, the payload of the packet may include n output region fields indicating each of the n output regions and n level fields indicating intensities of thermal feedback of each of the plurality of output regions.

In addition, the payload of the packet may include an output region field, a level field, and a type field as shown in FIG. 59C or may include a device ID field, an output region field, a level field, and a time field as shown in FIG. 59D. Here, the time field may include information on a thermal feedback providing time. For example, the time field may include at least one field among a first time field indicating a start time of thermal feedback output, a second time field indicating an end time of thermal feedback output, and a third time field indicating a time duration of thermal feedback output. In addition, depending on embodiments, the start time, the end time, and the time duration may be expressed as unique field values within the time field instead of being expressed in a separate field. In addition, the time field may include information on at least one of the start time, the end time, and the time duration.

In addition, although the payloads illustrated in FIGS. 59C and 59D are shown as including a single output region field and a single level field, embodiments are not limited thereto, and the payloads illustrated in FIGS. 59C and 59D may also include n output region fields, n level fields and n type fields, and n time fields as shown in FIG. 59B.

The payload of the packet may also be expressed using various other methods capable of indicating thermal feedback information.

1.2.3. Control Unit

As described above, the control unit 22300 may obtain thermal feedback data, generate thermal feedback control data on the basis of the thermal feedback data, and provide the thermal feedback control data. The control unit 22300 may be implemented in the form of middleware since the control unit 22300 transmits and receives data between the thermal feedback data output unit 22100 and the heat output unit 22200 and improves compatibility between the thermal feedback data output unit 22100 and the heat output unit 22200.

Figure 60:
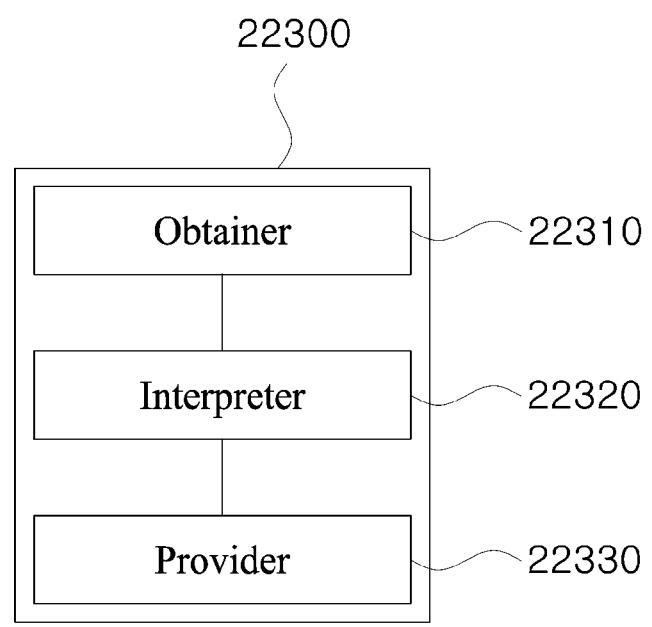
FIG. 60 is a block diagram related to a configuration of a control unit according to an embodiment of the present invention.

FIG. 60 is a block diagram related to a configuration of a control unit according to an embodiment of the present invention.

Referring to FIG. 60, the control unit 22300 may include an obtainer 22310, an interpreter 22320, and a provider 22330.

In addition, as described above, the control unit 22300 may be implemented in a form included in the feedback device 1600, the content reproduction device 1200, or an external device. For example, the control unit 22300 may be implemented in a form included in the feedback controller 1648 of the feedback device 1600 or another controller in the feedback device 1600 other than the feedback controller 1648. In addition, as another example, the control unit 22300 may be implemented in a form included in the controller 1260 of the content reproduction device 1200 or another controller in the content reproduction device 1200. In addition, as a specific example, the control unit 22300 may also be implemented as an external device of the feedback device 1600, e.g., in the form of a driver for controlling the feedback device 1600 or may also be implemented as software independent from multimedia content, e.g., in the form of a thermal engine providing thermal feedback information to the multimedia content.

In an embodiment of the present invention, the obtainer 22310 may obtain thermal feedback data provided from the thermal feedback data output unit 22100.

In addition, in an embodiment, the obtainer 22310 may transmit request data to request for thermal feedback data to the thermal feedback data output unit 22100 and obtain the thermal feedback data from the thermal feedback data output unit 22100 according to the request data. In this case, the obtainer 22310 may transmit the request data to the thermal feedback data output unit 22100 according to a predetermined cycle or transmit the request data to the thermal feedback data output unit 22100 only when the control unit 22300 has obtained control request data requesting for thermal feedback control data from the heat output unit 22200.

In addition, in another embodiment, the obtainer 22310 may obtain thermal feedback data from the thermal feedback data output unit 22100 even without transmitting the request data. For example, when a thermal event occurs in real time in multimedia content, the obtainer 22310 may obtain thermal feedback data from the thermal feedback data output unit 22100 every time the thermal feedback data output unit 22100 obtains the thermal feedback data.

As still another example, the obtainer 22310 may obtain thermal feedback data one time while multimedia content is being reproduced. For example, when the multimedia content is video content, the obtainer 22310 may obtain, from the thermal feedback data output unit 22100, a single piece of thermal event data including a plurality of pieces of thermal feedback information connected to a plurality of thermal events that occur in the video content.

In addition, the interpreter 22320 may interpret thermal feedback data. As described above, the thermal feedback data may be configured in a format understandable by the thermal feedback data output unit 22100. That is, according to circumstances, thermal feedback data is not understandable by other units or devices which do not have information on the format. The interpretation may refer to understanding, from thermal feedback data, pieces of information included in the thermal feedback data, that is, pieces of information related to thermal feedback. The interpretation may be referred to by using various terms such as analysis and parsing. Accordingly, the interpreter 22320 may be referred to by using various terms such as analyzer and parser.

For interpretation of thermal feedback data, the interpreter 22320 may obtain information on a format of the thermal feedback data in advance.

In an embodiment of the present invention, when thermal feedback data is configured in a standardized data format, the interpreter 22320 may store information for interpreting the standardized data format in a device (for example, the memory 1240) accessible by the obtainer 22310 and may use the information for interpreting the standardized data format to obtain information related to thermal feedback from the thermal feedback data.

In another embodiment of the present invention, thermal feedback data may be configured in various formats other than the standardized data format. In this case, the interpreter 22320 may access information for interpreting a data format (hereinafter, a specific data format) of thermal feedback data to interpret the specific data format. For example, the interpreter 22320 may call for an API for accessing the information on the specific data format and access a library including the information on the specific data format through the API to obtain the information on the specific data format.

In still another embodiment of the present invention, the interpreter 22320 may obtain information on a specific data format from the thermal feedback data output unit 22100.

The interpreter 22320 may interpret the thermal feedback data by using the information on the specific data format.

In addition, the provider 22330 may provide information on thermal feedback obtained by interpreting the thermal feedback data to the heat output unit 22200. In this case, the provider 22330 may provide the information on the thermal feedback in a format understandable by the heat output unit 22200.

Figure 61:
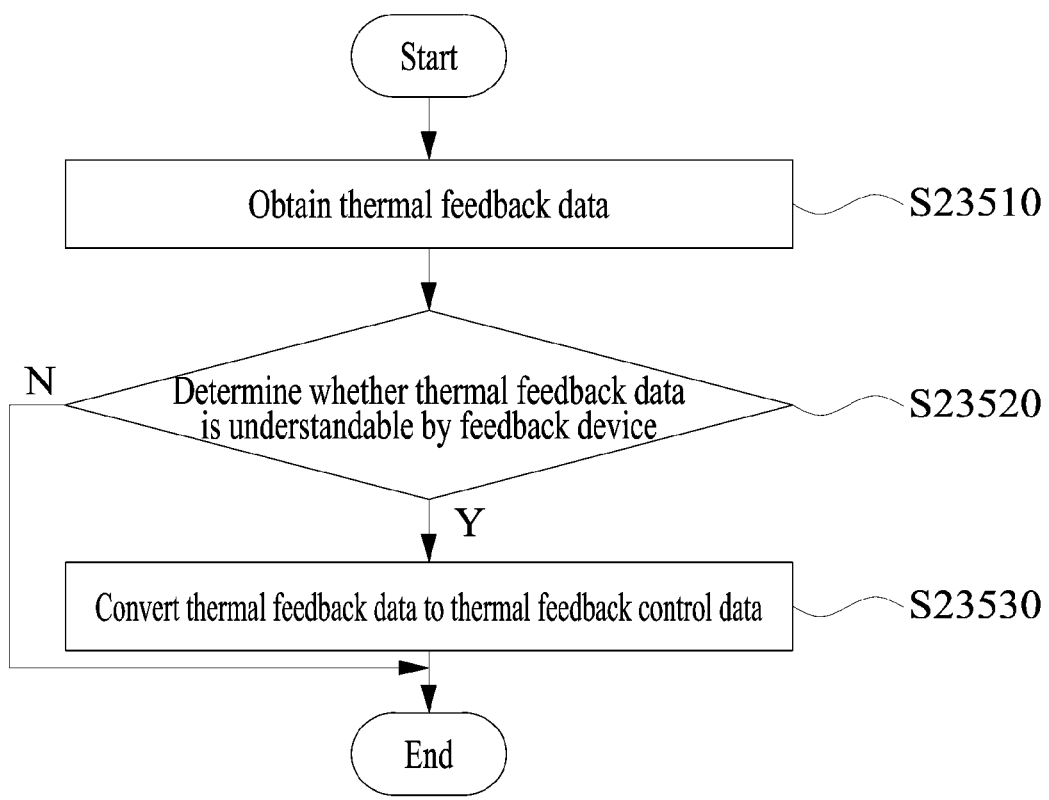
FIG. 61 is a flowchart related to a thermal feedback control data providing operation of the control unit according to an embodiment of the present invention.

Specifically, FIG. 61 is a flowchart related to a thermal feedback control data providing operation of the control unit according to an embodiment of the present invention.

Referring to FIG. 61, the thermal feedback control data providing operation of the control unit 22300 may include obtaining thermal feedback data (S23510), determining whether the thermal feedback data is understandable by the feedback device (S23520), and converting the thermal feedback data to thermal feedback control data (S23530).

The obtainer 22310 of the control unit 22300 may obtain thermal feedback data (S23510). Since the description given above in relation to the obtainer 22310 may be applied as it is to step S23510, detailed description thereof will be omitted for convenience of description.

In addition, the provider 22330 of the control unit 22300 may determine whether the thermal feedback data is understandable by the feedback device 1600 (S23520). Specifically, the provider 22330 may obtain information on a data format understandable by the heat output unit 22200. For example, the information on a data format understandable by the heat output unit 22200 may be stored in a device (for example, the memory 1240) accessible by the provider 22330. In addition, the information on a data format understandable by the heat output unit 22200 may be stored in a specific library, and the provider 22330 may access the library to obtain the information on a data format understandable by the heat output unit 22200. In addition, as another example, the provider 22330 may receive information on a data format understandable by the heat output unit 22200 from the heat output unit 22200.

In addition, heat output units 22200 capable of understanding data formats other than the data format used in the above-described heat output unit 22200 may exist, and, accordingly, the provider 22330 may provide, for each of the plurality of heat output units, thermal feedback control data understandable by the corresponding heat output unit. To this end, a table in which information on a data format understandable by each of the plurality of heat output units is stored may be stored, and the information on the data format understandable by each of the plurality of heat output units may be obtained from the table.

In addition, the provider 22330 may determine whether a data format of thermal feedback data is compatible with a data format understandable by the heat output unit 22200. When the data formats are compatible as a result of the determination, the provider 22330 may determine that the thermal feedback data is understandable by the feedback device 1600, and when the data formats are not compatible, the provider 22330 may determine that the thermal feedback data is not understandable by the feedback device 1600.

In addition, when it is determined that thermal feedback data is understandable by the feedback device 1600, the provider 22330 may provide the thermal feedback data as thermal feedback control data without separately processing the thermal feedback data. That is, the thermal feedback control data obtained by the heat output unit 22200 may be the same as thermal feedback data output by the thermal feedback data output unit 22100.

In addition, when it is determined that thermal feedback data is not understandable by the feedback device 1600, the provider 22330 may convert the thermal feedback data to thermal feedback control data (S23530). That is, the provider 22330 may process the thermal feedback data so that the thermal feedback data is understandable by the heat output unit 22200 and may provide the processed thermal feedback data, that is, the thermal feedback control data, to the heat output unit 22200. For example, the provider 22330 may use the previously-obtained information on a data format understandable by the heat output unit 22200 to generate thermal feedback control data on the basis of information related to thermal feedback extracted from the thermal feedback data. Accordingly, data formats, data sizes, packet structures, and the like of the thermal feedback data and the thermal feedback control data may become different.

In an embodiment of the present invention, the provider 22330 may simply convert thermal feedback data to thermal feedback control data but may also generate thermal feedback control data without the simple conversion so that the heat output unit 22200 may output thermal feedback from the heat output module 1640 according to functions (or states, specifications) of the heat output module 1640 (hereinafter, referred to as functions of the heat output module 1640) providing thermal feedback control data.

For example, in the heat output module 1640 in which the heat output unit 22200 provides thermal feedback control data, thermal feedback may not be output according to information on thermal feedback included in thermal feedback data. For example, although thermal feedback data includes information on a heat transfer operation, thermoelectric couple arrays 1643 or thermoelectric couple groups 1644 may not be separately controlled in the heat output module 1640, and all thermoelectric elements may be identically controlled. That is, it is not possible to perform the heat transfer operation in the heat output module 1640.

Therefore, the provider 22330 may convert thermal feedback data to thermal feedback control data so that thermal feedback may be output by the heat output module 1640.

Specifically, the provider 22330 may obtain information on functions of the heat output module 1640. For example, functions of the heat output module 1640 may be reflected in a data format understandable by the heat output unit 22200. For example, a packet related to a type of a heat transfer operation may not exist in a packet structure of a data format understandable by the heat output unit 22200, and the provider 22330 may check functions of the heat output module 1640 on the basis of the packet structure.

As another example, the provider 22330 may obtain information on functions of the heat output module 1640 from the heat output unit 22200.

As still another example, the provider 22330 may include a table indicating information on functions of the heat output module 1640 corresponding to each of the plurality of heat output units and may obtain the information on functions of the heat output module 1640 on the basis of the table.

In addition, in a process of generating thermal feedback control data on the basis of thermal feedback data, the provider 22330 may eliminate information on thermal feedback that is not outputtable by the heat output module 1640 (hereinafter, non-outputtable thermal feedback information) from information included in the thermal feedback data and generate the thermal feedback data or may also substitute the non-outputtable thermal feedback information with thermal feedback information similar thereto.

For example, when, in the case in which thermal grill feedback is not outputtable by the heat output module 1640, information on the thermal grill feedback is included in thermal feedback data, the provider 22330 may generate thermal feedback control data while ignoring the information on the thermal grill feedback or may generate thermal feedback control data by substituting the information on the thermal grill feedback with information indicating output of thermal feedback at a high intensity.

An implementation related to provision of thermal feedback control data of the control unit 22300 will be described in more detail below.

1.2.3.1. Implementation of Provision of Thermal Feedback Control Data by Control Unit (22300)

Figure 62:
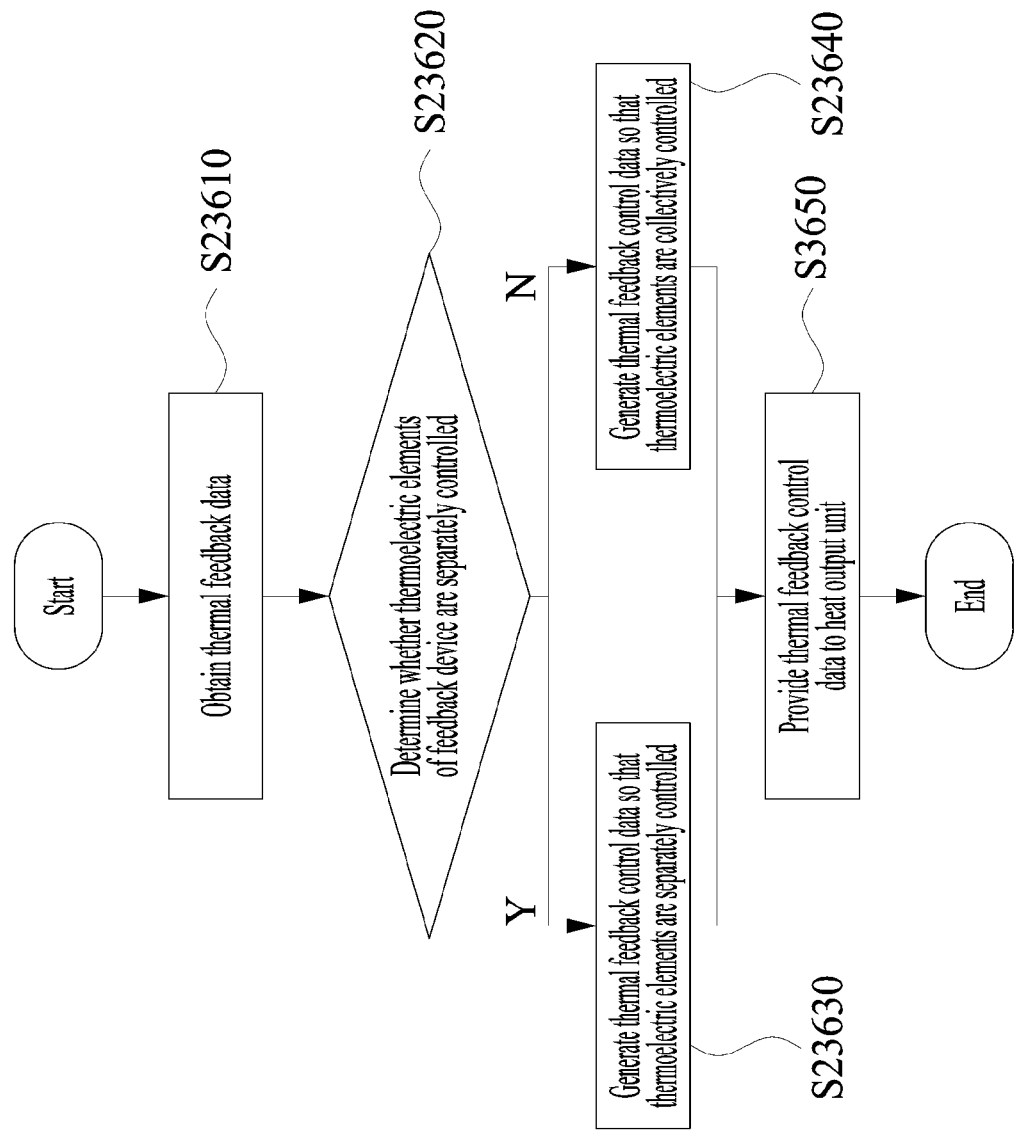
FIG. 62 is a flowchart for describing the provision of thermal feedback control data by the control unit when separate control is indicated for a plurality of output regions in thermal feedback data according to an embodiment of the present invention.

FIG. 62 is a flowchart for describing the provision of thermal feedback control data by the control unit when separate control is indicated for a plurality of output regions in thermal feedback data according to an embodiment of the present invention.

Referring to FIG. 62, the control unit 22300 may obtain thermal feedback data (S23610).

In addition, the control unit 22300 may interpret the thermal feedback data, and when information on output regions indicates separate control for the plurality of output regions, the control unit 22300 may determine whether thermoelectric elements of the feedback device 1600 are separately controlled (S23620). As described above, the control unit 22300 may obtain information on functions of the heat output module 1640 of the feedback device 1600. For example, the control unit 22300 may obtain information on functions of the heat output module 1640 on the basis of a data format understandable by the heat output unit 22200, obtain information on functions of the heat output module 1640 from the heat output unit 22200, or obtain information on functions of the heat output module 1640 from a table indicating information on functions of the heat output module 1640 corresponding to each of the plurality of heat output units. The control unit 22300 may determine, through the information on functions of the heat output module 1640, whether the thermoelectric elements of the heat output module 1640 are separately controlled.

When it is determined that the thermoelectric elements of the feedback device 1600 may be separately controlled, the control unit 22300 may generate thermal feedback control data so that the thermoelectric elements are separately controlled (S23630). For example, since the thermoelectric elements may be separately controlled in the feedback device 1600 according to thermal feedback information included in thermal feedback data, the control unit 22300 may generate thermal feedback control data from the thermal feedback data according to a data format of the thermal feedback control data without additional processing of information.

In addition, when it is determined that the thermoelectric elements of the feedback device 1600 are not separately controllable, the control unit 22300 may generate thermal feedback control data so that the thermoelectric elements are collectively controlled (S23640). Here, the collective control may refer to the case in which all of the thermoelectric elements of the heat output module 1640 are controlled as a single output region by the same thermal feedback signal.

The control unit 22300 may convert thermal feedback output information related to a plurality of output regions included in thermal feedback data to thermal feedback output information related to a single output region in thermal feedback control data. For example, when thermal feedback data includes thermal feedback information on a first output region and thermal feedback information on a second output region, depending on embodiments, the control unit 22300 may generate thermal feedback control data by using the thermal feedback information on the first output region without taking into consideration the thermal feedback information on the second output region or may also generate thermal feedback control data by combining the thermal feedback information on the first output region and the thermal feedback information on the second output region.

In addition, the control unit 22300 may provide the generated thermal feedback control data to the heat output unit 22200 (S23650).

Figure 63:
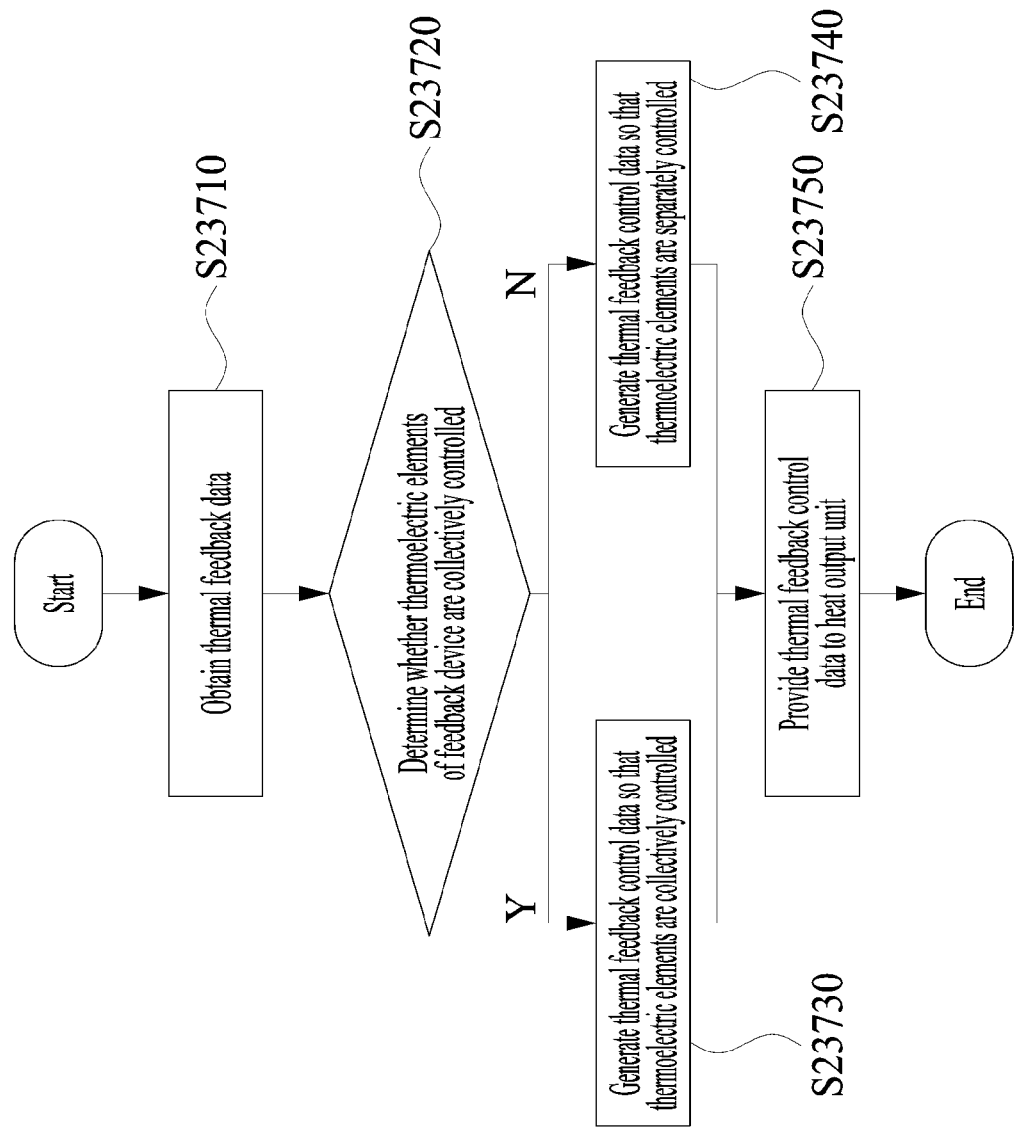
FIG. 63 is a flowchart for describing the provision of thermal feedback control data by the control unit when collective control for an output region is indicated in thermal feedback data according to an embodiment of the present invention.

FIG. 63 is a flowchart for describing the provision of thermal feedback control data by the control unit when collective control for an output region is indicated in thermal feedback data according to an embodiment of the present invention.

Referring to FIG. 63, the control unit 22300 may obtain thermal feedback data (S23710).

In addition, the control unit 22300 may interpret the thermal feedback data, and when information on output regions indicates collective control for the output regions, the control unit 22300 may determine whether thermoelectric elements of the feedback device 1600 are collectively controlled (S23720).

As described above, the control unit 22300 may obtain information on functions of the heat output module 1640 of the feedback device 1600 and determine, on the basis of the obtained information on functions of the heat output module 1640, whether the thermoelectric elements of the heat output module 1640 are collectively controlled.

When it is determined that the thermoelectric elements of the feedback device 1600 are collectively controlled, the control unit 22300 may generate thermal feedback control data so that the thermoelectric elements are collectively controlled (S23730). For example, the control unit 22300 may generate thermal feedback control data from the thermal feedback data according to a data format of the thermal feedback control data without additional processing of information.

In addition, when it is determined that the thermoelectric elements of the feedback device 1600 are separately controlled, the control unit 22300 may generate thermal feedback control data so that the thermoelectric elements are separately controlled (S23740). For example, the control unit 22300 may indicate the same thermal feedback information for the plurality of thermoelectric elements so that the plurality of thermoelectric elements operate like a single output region while the plurality of thermoelectric elements are separately controlled. For example, the control unit 22300 may generate, according to thermal feedback data, thermal feedback control data indicating all of types, intensities, and providing times of pieces of thermal feedback for the plurality of thermoelectric elements to be the same. As another example, the control unit 22300 may generate thermal feedback control data according to a preset rule so that the plurality of thermoelectric elements are separately controlled and different pieces of thermal feedback are controlled in the plurality of thermoelectric elements.

In addition, the control unit 22300 may provide the generated thermal feedback control data to the heat output unit 22200 (S23750).

Figure 64:
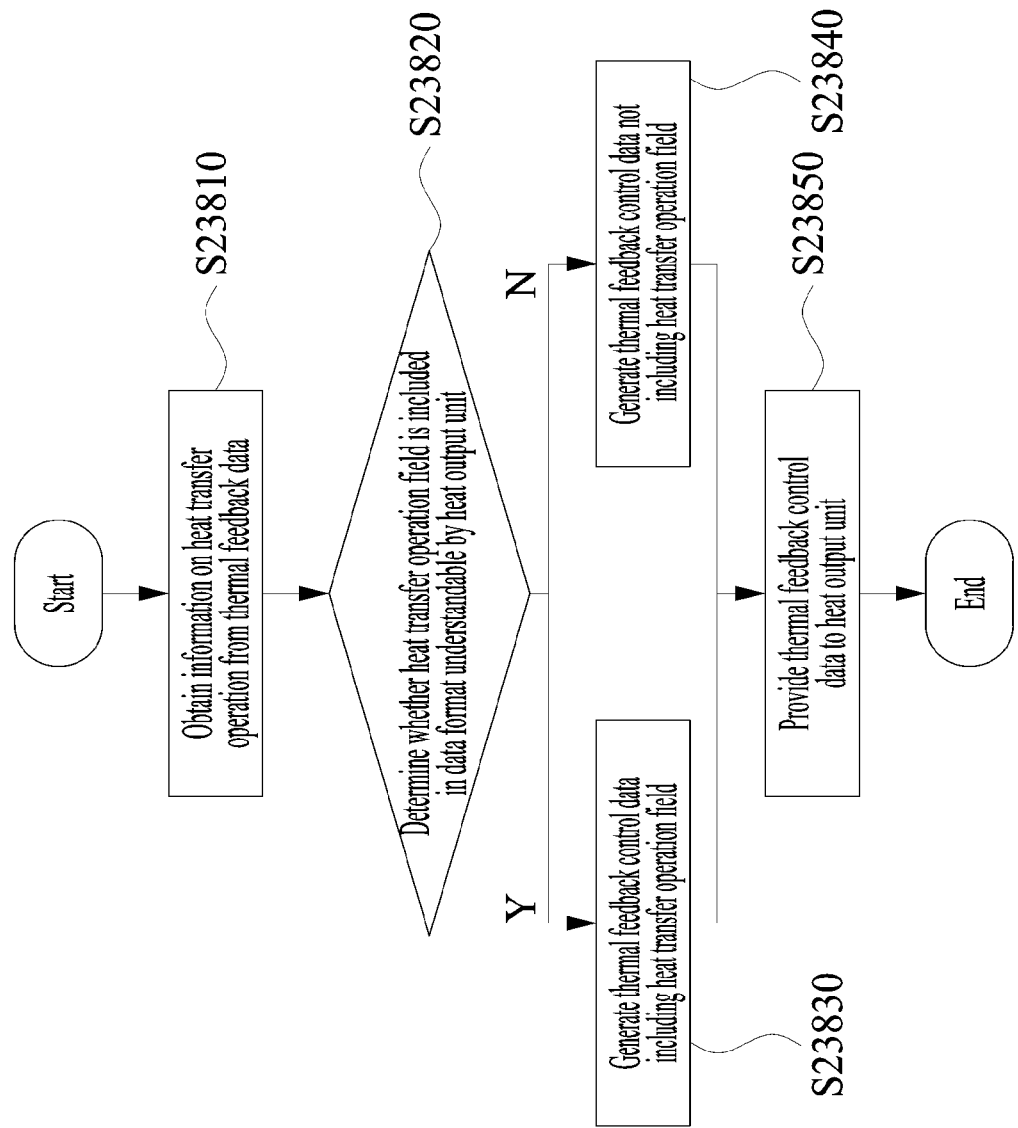
FIG. 64 is a flowchart for describing the provision of thermal feedback control data by the control unit when a heat transfer operation is indicated in thermal feedback data according to an embodiment of the present invention.

FIG. 64 is a flowchart for describing the provision of thermal feedback control data by the control unit when a heat transfer operation is indicated in thermal feedback data according to an embodiment of the present invention.

Referring to FIG. 64, the control unit 22300 may obtain thermal feedback data and obtain information on a heat transfer operation from the thermal feedback data (S23810). For example, the control unit 22300 may obtain, from heat transfer operation mode information included in the thermal feedback data, pieces of information on a type and a direction of the heat transfer operation.

In addition, the control unit 22300 may determine whether a heat transfer operation field is included in a data format understandable by the heat output unit 22200 (S23820). Here, the time field may refer to a field including information on a heat transfer operation in a packet structure of a data format understandable by the heat output unit 22200.

In addition, when the heat transfer operation field is included in the data format, the control unit 22300 may generate thermal feedback control data including the heat transfer operation field (S23830). For example, the control unit 22300 may generate a field related to a type of a heat transfer operation and/or a field related to a direction of a heat transfer operation on the basis of information on a heat transfer operation included in the thermal feedback data and may generate thermal feedback control data including the fields.

In addition, when the heat transfer operation field is not included in the data format, the control unit 22300 may generate thermal feedback control data which does not include the heat transfer operation field (S23840).

For example, although a heat transfer operation may be performed in the heat output module 1640 when the thermoelectric elements, that is, a plurality of output regions, of the heat output module 1640 are separately controlled, it is not possible to perform a heat transfer operation due to absence of a heat transfer operation field in the data format. In this case, the control unit 22300 may configure an output region field, a feedback information field, and a time field of thermal feedback control data on the basis of information on a heat transfer operation included in thermal feedback data so that the heat transfer operation is performed in the heat output module 1640. For example, when the information on a heat transfer operation indicates the first heat transfer operation in which pieces of thermal feedback are sequentially output from output regions, wherein output of thermal feedback from a previous output region ends after a predetermined amount of time from a time point at which output of thermal feedback starts from a specific output region, and information on a direction of the heat transfer operation indicates the first direction in which the heat transfer operation is performed in order from an output region disposed at the left of the feedback device 1600 to an output region disposed at the right, the control unit 22300 may configure an output region field, a feedback information field, and a time field of thermal feedback control data so that hot feedback at a first intensity is output for one second from a first output region disposed at the left of the feedback device 1600 to an n-th output region disposed at the right of the feedback device 1600. Accordingly, the heat output module 1640 may perform a heat transfer operation even when the thermal feedback control data does not include a heat transfer operation field.

As another example, since it is not possible to perform a heat transfer operation in the heat output module 1640 when thermoelectric elements, that is, a plurality of output regions, of the heat output module 1640 are collectively controlled, the control unit 22300 may generate thermal feedback control data without taking into consideration the information on a heat transfer operation.

In addition, the control unit 22300 may provide the generated thermal feedback control data to the heat output unit 22200 (S23850).

Figure 65:
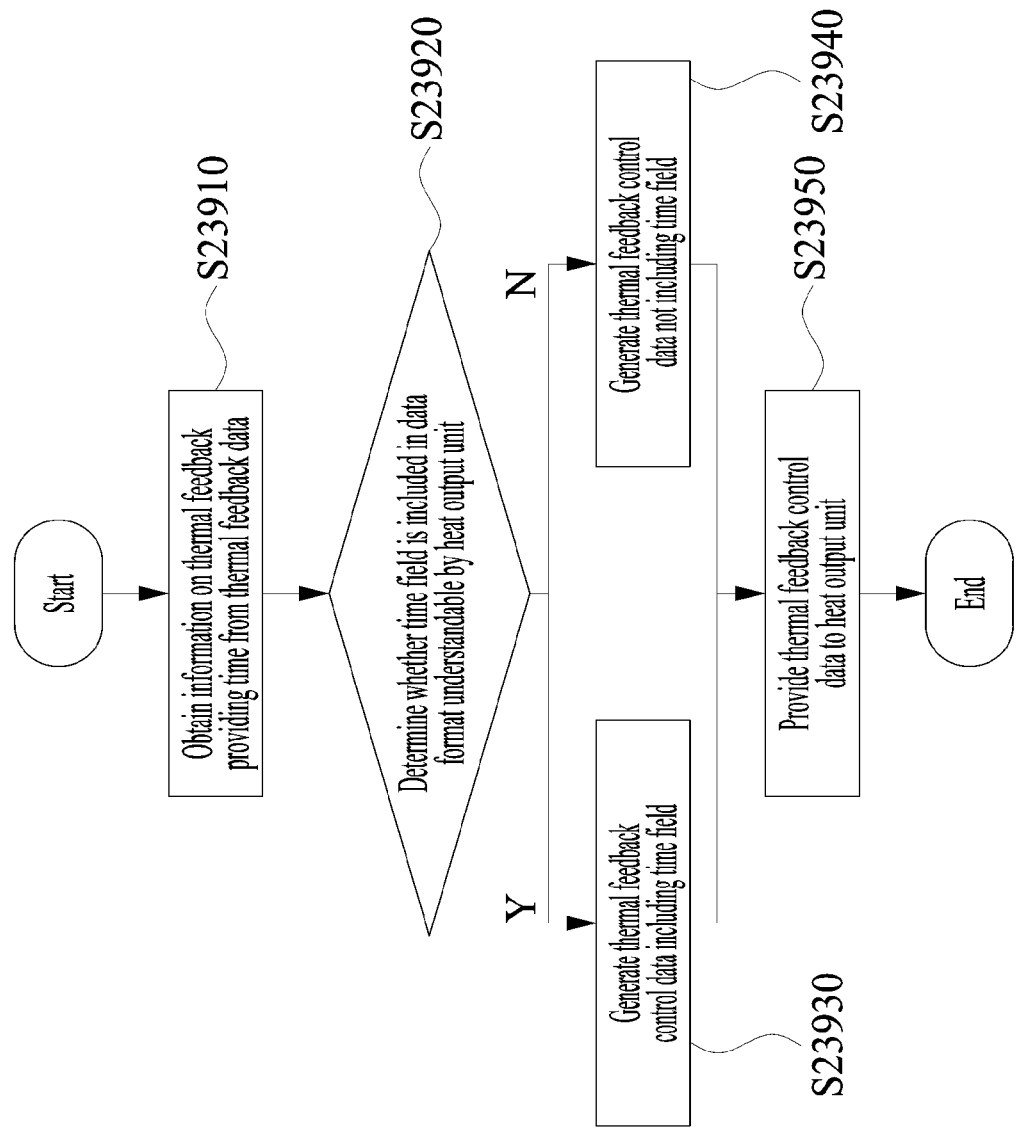
FIG. 65 is a flowchart for describing the provision of thermal feedback control data by the control unit when thermal feedback providing time is indicated in thermal feedback data according to an embodiment of the present invention.

FIG. 65 is a flowchart for describing the provision of thermal feedback control data by the control unit when thermal feedback providing time is indicated in thermal feedback data according to an embodiment of the present invention.

Referring to FIG. 65, the control unit 22300 may obtain thermal feedback data and obtain information on a thermal feedback providing time from the thermal feedback data (S23910). For example, the control unit 22300 may obtain at least one of a start time, an end time, and a time duration of thermal feedback output from the information on a thermal feedback providing time included in the thermal feedback data.

In addition, the control unit 22300 may determine whether a time field is included in a data format understandable by the heat output unit 22200 (S23920). Here, the time field may refer to a field including information on a thermal feedback providing time in a packet structure of a data format which is understandable by the heat output unit 22200.

In addition, when the time field is included in the data format, the control unit 22300 may generate thermal feedback control data including the time field (S23930). For example, the control unit 22300 may generate, on the basis of the information on a thermal feedback providing time included in the thermal feedback data, at least one of a first time field indicating a start time of thermal feedback output, a second time field indicating an end time of thermal feedback output, and a third time field indicating a time duration of thermal feedback output and may generate thermal feedback control data including the fields.

In addition, when the time field is not included in the data format, the control unit 22300 may generate thermal feedback control data which does not include the time field (S23940). For example, the control unit 22300 may check a start time point, an end time point, and a duration time point of an output region of thermal feedback on the basis of the information on a thermal feedback providing time in the data format and may generate thermal feedback control data at every predetermined cycle so that thermal feedback is output from the output region according to the output start time point, the output end time point, and the output duration time point. Accordingly, there may be a plurality of pieces of thermal feedback control data.

In addition, the control unit 22300 may provide the generated thermal feedback control data to the heat output unit 2200 (S23950).

Figure 66:
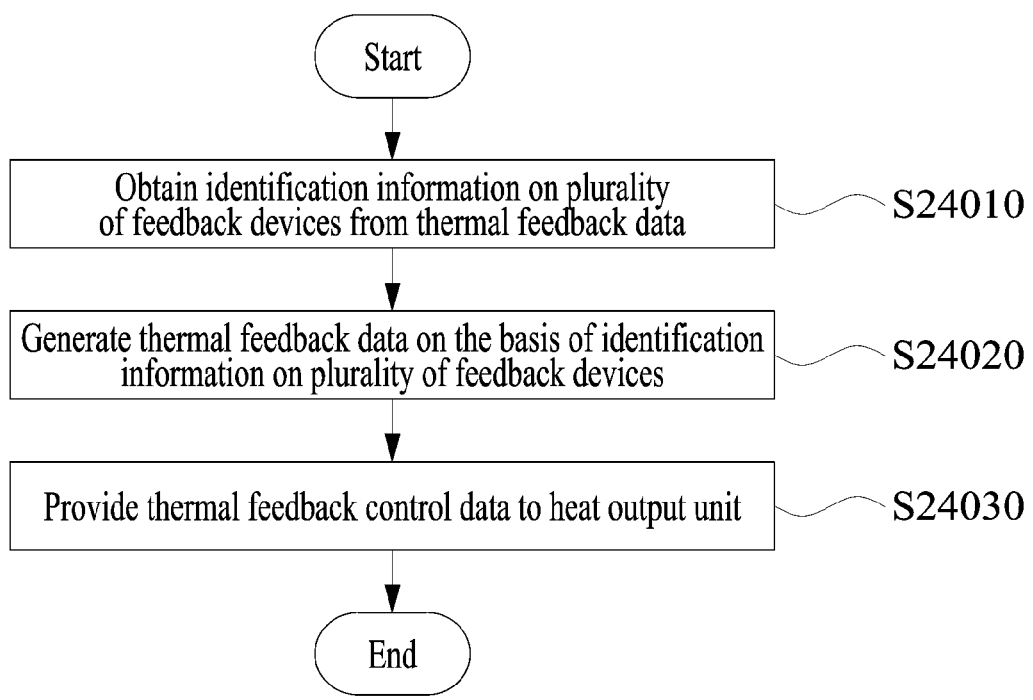
FIG. 66 is a flowchart for describing the provision of thermal feedback control data by the control unit when control is indicated for a plurality of feedback devices in thermal feedback data according to an embodiment of the present invention.

FIG. 66 is a flowchart for describing the provision of thermal feedback control data by the control unit when control is indicated for a plurality of feedback devices in thermal feedback data according to an embodiment of the present invention.

Referring to FIG. 66, the control unit 22300 may obtain thermal feedback data and obtain pieces of identification information of a plurality of feedback devices 1600 from the thermal feedback data (S24010). For example, the pieces of identification information of the plurality of feedback devices 1600 may be pieces of information on through which feedback device 1600 thermal feedback will be output when the plurality of feedback devices 1600 are used for a single piece of multimedia content.

In addition, the control unit 22300 may generate thermal feedback data on the basis of the pieces of identification information of the plurality of feedback devices 1600 (S24020).

In an embodiment of the present invention, the control unit 22300 may determine whether a device ID field is included in a data format understandable by the heat output unit 22200. Here, the device ID field may refer to a field indicating identification information of the feedback device 1600.

In an embodiment of the present invention, when the device ID field is included in the data format understandable by the heat output unit 22200, the control unit 22300 may generate thermal feedback control data including the device ID field on the basis of the pieces of identification information of the plurality of feedback devices 1600 from the thermal feedback data.

In an embodiment, the control unit 22300 may generate a single piece of thermal feedback control data which may be used in all of the plurality of feedback devices 1600. For example, thermal feedback control data may include a plurality of device ID fields. For example, thermal feedback control data may include a first device ID field indicating a first feedback device 1600, a first piece of thermal feedback information for output of thermal feedback from the first feedback device 1600, a second device ID field indicating a second feedback device 1600, and a second piece of thermal feedback information for output of thermal feedback from the second feedback device 1600. In this case, a single piece of thermal feedback control data may include all pieces of thermal feedback information on the plurality of feedback devices 1600.

In another embodiment, the control unit 22300 may generate as many pieces of thermal feedback control data, which may only be used in one of the plurality of feedback devices 1600, as there are feedback devices 1600. For example, the thermal feedback control data may include a single device ID field. For example, a first piece of thermal feedback control data may include a first device ID field indicating a first feedback device 1600 and a first piece of thermal feedback information for output of thermal feedback from the first feedback device 1600, and a second piece of thermal feedback control data may include a second device ID field indicating a second feedback device 1600 and a second piece of thermal feedback information for output of thermal feedback from the second feedback device 1600. In this case, a single piece of thermal feedback control data may only include thermal feedback information on a single feedback device 1600.

In another embodiment of the present invention, when a device ID field is not included in a data format understandable by the heat output unit 22200, the control unit 22300 may generate, from thermal feedback data, thermal feedback control data which does not include the device ID field on the basis of pieces of identification information on a plurality of feedback devices 1600.

In an embodiment, the control unit 22300 may check thermal feedback information on each of a plurality of feedback devices 1600 on the basis of pieces of identification information on the plurality of feedback devices 1600 and may generate, on the basis of the pieces of identification information, thermal feedback control data including information on thermal feedback for each feedback device 1600. In this case, since a device ID field is not included in a data format understandable by the heat output unit 22200, the thermal feedback control data does not include a device ID field.

In addition, the control unit 22300 may provide the generated thermal feedback control data to the heat output unit 22200 (S24030). For example, when a single piece of thermal feedback control data is generated in step S24020, the control unit 22300 may provide the single piece of thermal feedback control data to all of the plurality of feedback devices 1600. As another example, when a plurality of pieces of thermal feedback control data are generated in step S24020, the control unit 22300 may transmit different pieces of thermal feedback control data corresponding to the plurality of feedback devices 1600, respectively, to the plurality of feedback devices 1600.

In addition, in still another embodiment of the present invention, although a single feedback device 1600 is used for a single piece of multimedia content, pieces of thermal feedback information on a plurality of feedback devices may be indicated in thermal feedback data. In this case, the control unit 22300 may generate thermal feedback control data on the basis of the thermal feedback data by using various methods. For example, the control unit 22300 may generate thermal feedback control data on the basis of thermal feedback information on a single feedback device 1600 among pieces of thermal feedback information of the plurality of feedback devices 1600 included in the thermal feedback data or may generate thermal feedback control data by combining the pieces of thermal feedback information on the plurality of feedback devices 1600.

The control unit 22300 may provide the generated thermal feedback control data to the feedback device 1600.

In addition, in yet another embodiment of the present invention, although a plurality of feedback devices 1600 are used for a single piece of multimedia content, thermal feedback information on only a single feedback device may be indicated in thermal feedback data.

In this case, the control unit 22300 may generate thermal feedback control data for the plurality of feedback devices 1600 on the basis of the thermal feedback data by using various methods. For example, the control unit 22300 may generate a plurality of pieces of the same thermal feedback control data on the basis of thermal feedback information on a feedback device 1600 included in the thermal feedback data and may provide the generated plurality of pieces of thermal feedback control data to the plurality of feedback devices 1600.

As another example, the control unit 22300 may also generate a plurality of pieces of thermal feedback control data on the basis of thermal feedback information on a single feedback device 1600 according to a preset rule. In this case, feedback information fields included in the plurality of pieces of thermal feedback control data may indicate different pieces of thermal feedback. The control unit 22300 may provide the generated plurality of pieces of thermal feedback control data, which differ from each other, to each of the plurality of feedback devices 1600.

2. Thermal Experience Providing Method Based on Thermal Feedback Control System (22000)

Hereinafter, a thermal experience providing method based on the thermal feedback control system 22000 according to an embodiment of the present invention will be described. In the following description, the thermal experience providing method according to an embodiment of the present invention will be described with reference to operations by the above-described thermal experience providing system 1000 and thermal feedback control system 22000. However, this is merely for convenience of description, and thus the thermal experience providing method based on the thermal feedback control system 22000 according to an embodiment of the present invention is not limited thereto.

2.1. Outline of Thermal Experience Providing Method

Figure 67:
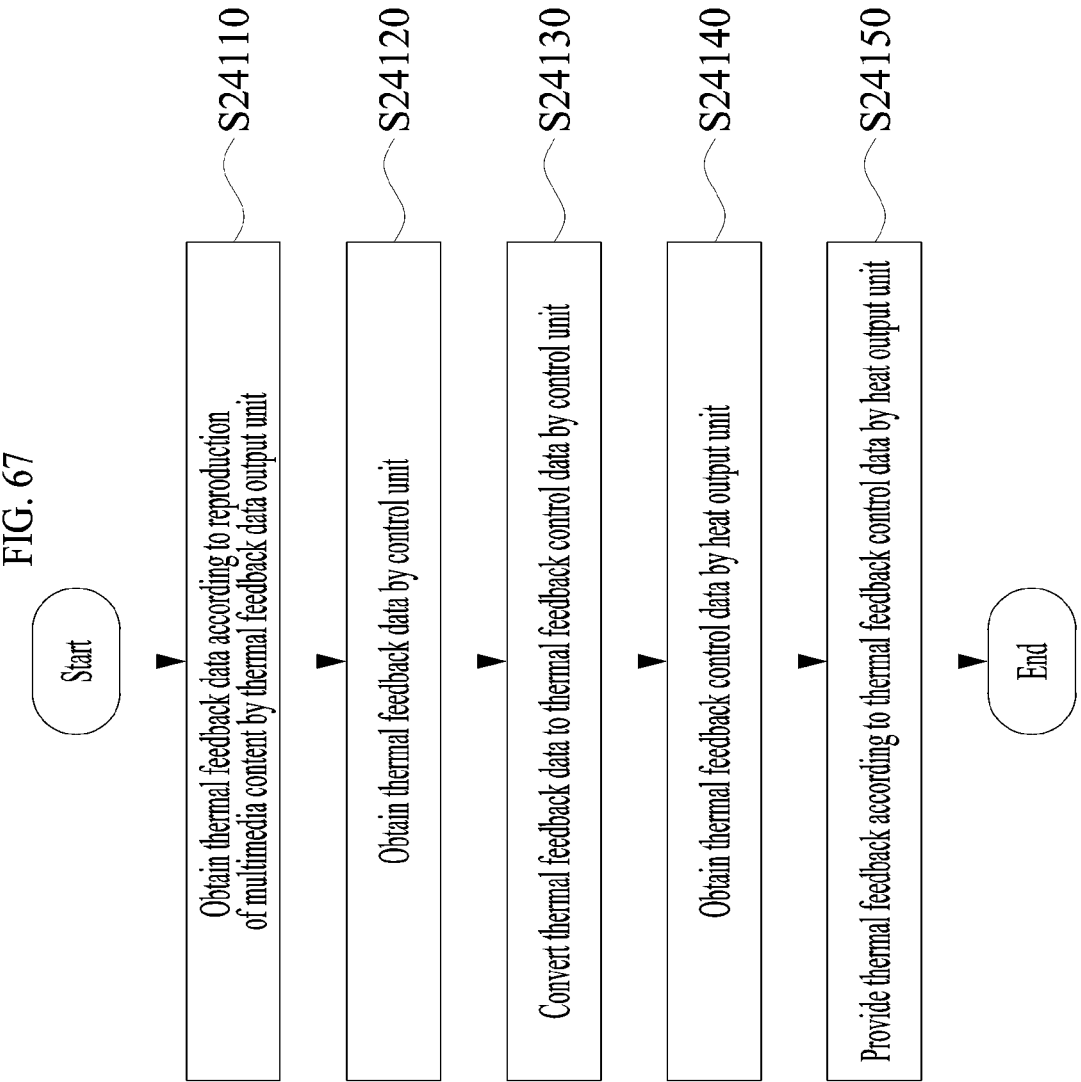
FIG. 67 is a flowchart related to a method of providing a thermal experience according to an embodiment of the present invention.

FIG. 67 is a flowchart related to a thermal experience providing method according to an embodiment of the present invention.

Referring to FIG. 67, the thermal experience providing method according to an embodiment of the present invention may include obtaining, by the thermal feedback data output unit 22100, thermal feedback data according to reproduction of multimedia content (S24110), obtaining, by the control unit 22300, the thermal feedback data (S24120), converting, by the control unit 22300, the thermal feedback data into thermal feedback control data (S24130), obtaining, by the heat output unit 22200, the thermal feedback control data (S24140), and providing, by the heat output unit 22200, thermal feedback according to the thermal feedback control data (S24150). The above-listed steps will be described below.

First, the thermal feedback data output unit 22100 may obtain thermal feedback data according to reproduction of multimedia content (S24110). In an embodiment, the content reproduction device 1200 may reproduce multimedia content. The multimedia content may be a video, a game, a VR application, an AR application, an experiencing application, and the like. The controller 1260 of the content reproduction device 1200 may load multimedia content stored in the memory 1240 from the memory 1240 or receive multimedia content through the communication module 1220 and reproduce the multimedia content.

For example, the controller 1260 of the content reproduction device 1200 may reproduce multimedia content such as a game or a movie file stored in the memory 1240. As another example, the content reproduction device 1200 may receive multimedia content from the Internet through the communication module 1220 by using a downloading or streaming method and reproduce the multimedia content.

As the multimedia content is reproduced, the thermal feedback data output unit 22100 may obtain thermal feedback information. An algorithm for processing thermal feedback data or thermal data may be included in the multimedia content. The controller 1260 of the content reproduction device 1200 may decode thermal feedback data or perform a thermal feedback processing algorithm according to reproduction of the multimedia content and, as a result, may obtain the thermal feedback data. In addition, the thermal feedback data output unit 22100 may obtain the thermal feedback data from the controller 1260. For example, the thermal feedback data output unit 22100 may be included in the controller 1260 or included in another device physically separated from the controller 1260.

In addition, the control unit 22300 may obtain the thermal feedback data (S24120), the control unit 22300 may convert the thermal feedback data to thermal feedback control data (S24130), and the heat output unit 22200 may obtain the thermal feedback control data (S24140). Since description given above with reference to FIGS. 35 to 43 may be applied as it is to steps S24120 to S24140, detailed description thereof will be omitted.

In addition, the heat output unit 22200 may provide thermal feedback according to the thermal feedback control data (S24150).

The heat output unit 22200 may generate a thermal feedback signal on the basis of the thermal feedback control data and provide the thermal feedback signal to the feedback controller 1648. In this case, the heat output unit 22200 may be implemented in a form included in the feedback controller 1648 or may also be implemented as a device physically separated from the feedback controller 1648. The feedback controller 1648 may perform a thermal feedback output operation according to the thermal feedback signal.

Here, the thermal feedback signal is a signal for controlling output of thermal feedback. In an embodiment of the present invention, a thermal feedback signal may include a thermal feedback start signal indicating a start of output of thermal feedback and a thermal feedback end signal indicating an end of output of thermal feedback.

In a specific embodiment, the heat output unit 22200 may provide the thermal feedback start signal according to thermal feedback control data, and the feedback controller 1648 may obtain the start signal. When the feedback controller 1648 obtains the start signal, the feedback controller 1648 may apply power to the thermoelectric couple array 1643 according to the start signal so that the thermoelectric couple array 1643 performs a thermal feedback output operation.

In addition, when the heat output unit 22200 provides the thermal feedback end signal according to thermal feedback control data, the feedback controller 1648 may obtain the end signal and cut off power to the thermoelectric couple array 1643 according to the end signal so that the thermoelectric couple array 1643 may stop the thermal feedback output operation.

Here, the end signal is not essential. For example, the heat output unit 22200 may cause feedback duration time information to be included in the start signal according to thermal feedback control data, and the feedback controller 1648 may determine thermal feedback output time according to the feedback duration time information, maintain output of thermal feedback during the output time, and then end the output of thermal feedback. Thus, the end signal may not be necessary. As another example, when thermal feedback output time is set as a default in the feedback device 1600, the feedback controller 1648 may maintain output of thermal feedback during a preset amount of time and then end the output of thermal feedback. Thus, the end signal may not be necessary.

Meanwhile, the feedback controller 1648 of the feedback device 1600 may provide a thermal feedback report signal reporting an operational state of the heat output module 1640 to the heat output unit 22200, and the heat output unit 22200 may provide the thermal feedback report signal to the control unit 22300. For example, the feedback device 1600 may provide the report signal periodically or as a response to obtaining a thermal feedback signal. The thermal feedback report signal may include information on whether thermal feedback is output, a type or an intensity of thermal feedback being output, a temperature of the contact surface 1641, biological information of the user sensed by a sensing module, whether an error has occurred, the state-of-charge of a battery, and the like. The control unit 22300 may take into consideration the information included in the report signal in converting thermal feedback data to thermal feedback control data on the basis of the report signal. For example, when information indicating that it is not possible to output cold feedback from the heat output module 1640 is included in the report signal, the control unit 22300 may not reflect information on cold feedback to the thermal feedback control data from among pieces of information on types of thermal feedback included in thermal feedback data.

In addition, a thermal feedback output operation of the feedback device 1600 according to the thermal feedback signal may be performed using various methods.

First, starting and ending of a thermal feedback output operation of the feedback device 1600 may be performed as follows. For example, the feedback device 1600 may perform the thermal feedback output operation only while a thermal feedback signal is being received and may stop the thermal feedback output operation when the thermal feedback signal is not received. As another example, when a start signal is received, the feedback device 1600 may output thermal feedback for an amount of time set as a default or for an amount of time corresponding to thermal feedback providing time included in the start signal and then stop the output. As still another example, the feedback device 1600 may output thermal feedback for an amount of time from a time point at which the start signal is received to a time point at which an end signal is received and then stop the output.

In addition, although the thermal feedback signal may simply be provided as an on/off signal, the thermal feedback signal may also be provided in a form including thermal feedback information according to thermal feedback control data. Upon receiving a thermal feedback signal, the feedback controller 1648 may extract information included in the thermal feedback signal and control a thermal feedback output operation. For example, the feedback controller 1648 may determine, on the basis of thermal feedback output region information (information included in an output region field of thermal feedback control data), which heat output module 1640 will perform a thermal feedback output operation. As another example, the feedback controller 1648 may determine, on the basis of thermal feedback type information (information included in a type field of thermal feedback control data), whether to perform an exothermic operation, an endothermic operation, or a thermal grill operation. As still another example, the feedback controller 1648 may determine, on the basis of thermal feedback intensity information (information included in a level field of thermal feedback control data), a voltage value or the like of power to be applied to the thermoelectric couple array 1643. As yet another example, the feedback controller 1648 may determine, on the basis of thermal feedback providing time information (information included in a time field of thermal feedback control data), a start time point and an end time point of thermal feedback output. Of course, at least one of the above-described type, intensity, and providing time of thermal feedback may be set as a default in the feedback device 1600.

2.2. Application of Thermal Experience Providing Method

Conventionally, contents such as games and movies have been experienced according to audiovisual expression methods provided by video or audio. Also, in order to improve immersion into content, a tactile experience, which is represented by vibration feedback, and an olfactory experience using scent have supported the conventional audiovisual expression methods. Furthermore, in recent years, solutions which enable users to have a full range of user experiences, such as virtual reality (VR) and augmented reality (AR), have been developed.

In enabling users to experience content, the thermal experience providing system 1000 may implement thermal reality (TR) by outputting thermal feedback in sync with various situations provided using the above-described conventional methods so that a user experience is further enhanced for various contents.

In relation to this, when the above-described thermal experience providing method is used, by causing the feedback device 1600 to output thermal feedback through a thermal feedback signal according to reproduction of multimedia content by a content reproduction device, the thermal experience providing system 1000 may provide a thermal experience to users.

Therefore, the thermal experience providing method may be applied to various technical fields where a user experience is required. Hereinafter, some typical technical fields in which the thermal feedback control system 22000 may be utilized will be briefly described below.

2.2.1. Virtual Reality (VR)

Virtual reality is a typical example of a field in which the thermal feedback control system 22000 may be utilized.

Virtual reality refers to creating a virtual environment or situation so that the user feels as if he or she is actually in a virtual space. Generally, virtual reality is implemented using a head mounted display (HMD) on the basis of a three-dimensional video which dynamically changes according to the user's line of sight. Virtual reality has been actively developed for purposes of supporting education and business as well as various games and movies.

Particularly, with the recent development of smart devices and subsequent launch of VR devices after the launch of Samsung Electronics' Gear VR™, the virtual reality market is expected to grow in the future. Also, as various types of VR devices are launched by various manufacturers, compatibility between a VR application and various types of feedback devices included in the various VR devices may become a problem.

The thermal feedback control system 22000 of the present invention may be applied to such VR applications to solve the compatibility problem, thereby adding a thermal sensation to the existing visual/auditory/tactile sensations.

For example, the thermal feedback control system 22000 may implement thermal reality by assigning a temperature to a specific object disposed in a virtual space, obtaining thermal feedback data for thermal feedback when an avatar, which is an alter ego of the user, touches the object, converting the thermal feedback data to thermal feedback control data understandable by the feedback device 1600, and providing the thermal feedback control data to the feedback device 1600. In this case, the thermal feedback control system 22000 may provide the thermal feedback control data to the feedback device 1600 in real time immediately upon obtaining the thermal feedback data.

2.2.2. Augmented Reality (AR)

The thermal feedback control system 22000 may be utilized in the augmented reality field.

Augmented reality refers to providing a virtual object by overlaying the virtual object on a real-world environment and is also referred to as mixed reality since a virtual environment is combined with the real-world environment.

Compared to the virtual reality immersing the user into a full virtual space, the augmented reality basically augments a virtual object or virtual supplementary information in a real-world environment. Therefore, the augmented reality is implemented using a method of augmenting a virtual image on a glass type transparent display which projects the reality as it is instead of completely blocking the user's field of view even when the HMD is used or using a method of composing a virtual image with a real image captured using a camera 1480 in real time.

Therefore, since, unlike the virtual reality technology, the augmented reality technology simultaneously provides the real-world environment and the virtual environment, the augmented reality technology has an advantage in that a user may be provided with a better sense of reality and interaction is possible with information present in the actual environment.

Various smart devices including Apple's iPhone™ are equipped with the augmented reality function, even though it is limited. In recent years, interest in augmented reality has been growing with the appearance of Microsoft's HMD type Hololens™, which operates as a standalone device. As the number of devices equipped with the augmented reality function increases, compatibility between various types of feedback devices for outputting thermal feedback in relation to devices equipped with augmented reality applications and the various augmented reality function may become a problem.

The thermal feedback control system 22000 may support a conventional user experience mainly based on visual/auditory senses by providing a thermal sensation linked to such augmented reality applications. For example, the thermal feedback control system 22000 may provide useful information to the user by obtaining thermal feedback data for hot feedback as one augmentation element when a hot object enters within the user's field of view, converting the thermal feedback data to thermal feedback control data understandable by the feedback device 1600, and providing the thermal feedback control data to the feedback device 1600. In this case, the thermal feedback control system 22000 may provide the thermal feedback control data to the feedback device 1600 in real time immediately upon obtaining the thermal feedback data.

2.2.3. Game Content

The thermal feedback control system 22000 may also be utilized in game content.

Game content is basically multimedia content based on interaction between elements within a game and the user. Due to having an interactive element, the game content is a field in which a user experience is extremely important.

Game content may be implemented using the above-described virtual reality or augmented reality technique as well as a conventional technique in which a user's manipulation is reflected in a game screen output through a TV or a monitor. The thermal experience providing system 1000 may add a thermal experience to a game environment implemented using the above-mentioned techniques, as a way of improving immersion into the game. For example, when being shot by a gun or the like occurs in a first-person shooter game, the thermal experience providing system 1000 may output thermal feedback according to the shooting.

In addition, game content may be implemented by various manufacturers using various types of gaming controllers, and a heat output module 1640 for providing thermal feedback may be included in the gaming controller. Since the heat output module 1640 may be controlled by a gaming controller equipped with the heat output module 1640, compatibility between thermal feedback data corresponding to game content and the various gaming controllers may become a problem. In this case, the thermal feedback control system 22000 may provide thermal feedback regardless of the type of gaming controller by obtaining thermal feedback data for thermal feedback corresponding to game content, converting the thermal feedback data to thermal feedback control data understandable by the heat output module 1640, and providing the thermal feedback control data to the heat output module 1640. In this case, the thermal feedback control system 22000 may provide the thermal feedback control data to a gaming device in real time immediately upon obtaining the thermal feedback data.

2.2.4. Video Content

In addition, the thermal feedback control system 22000 may also be utilized in video content or the like. Video content is based on audiovisual forms of expression such as video or audio. The thermal experience providing system 1000 may add a thermal experience to multimedia content by outputting thermal feedback corresponding to video scenes which are expressed audiovisually. The thermal experience providing system 1000 may output thermal feedback by, for example, outputting hot feedback in an explosion scene and outputting cold feedback in a scene in which one is drenched with water.

However, there may be various types of feedback devices related to video content, and instruction systems of the feedback devices and data formats understandable by the feedback devices may be different from one another. Therefore, like the previous examples, compatibility between video content and the various feedback devices may become a problem. To solve this problem, the thermal feedback control system 22000 may implement thermal reality by obtaining thermal feedback data for thermal feedback related to video content, converting the thermal feedback data to thermal feedback control data understandable by the feedback device 1600, and providing the thermal feedback control data to the feedback device 1600. In this case, the thermal feedback control system 22000 may provide the thermal feedback control data to the feedback device 1600 in real time immediately upon obtaining the thermal feedback data or may only provide a single piece of thermal feedback control data including the entire thermal feedback information of the video content to the feedback device 1600.

Various application fields of the thermal feedback control system 22000 have been described above, but the application fields of the thermal feedback control system 22000 are not limited to the above-described examples. In addition to being applied to the above-described technical fields, the thermal feedback control system 22000 may be utilized in various other multimedia contents including contents for education or learning or medical applications.

Therefore, in the present invention, the thermal feedback control system 22000 should be interpreted as being applicable, without limitations, to fields in which thermal feedback may be provided to improve a user experience.

IV. Thermal Experience Providing Method Using Feedback Device

Hereinafter, a thermal experience providing method using a feedback device according to an embodiment of the present invention will be described.

1. Thermal Experience Providing System 1.1. Configuration of Thermal Experience Providing System FIG. 68 is a block diagram related to a configuration of a thermal experience providing system according to another embodiment of the present invention.

Figure 68:
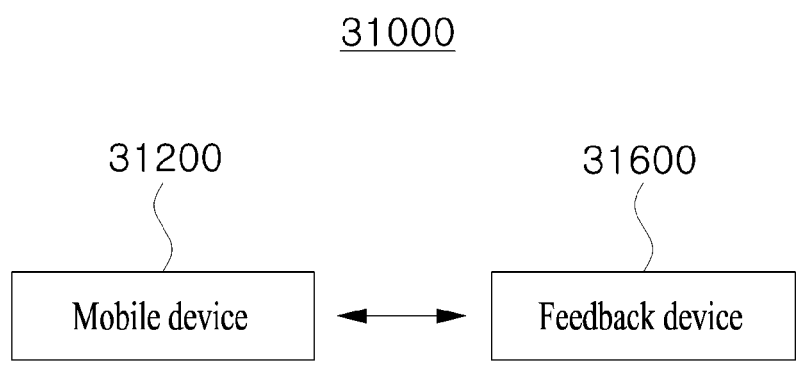
FIG. 68 is a block diagram related to a configuration of a thermal experience provision system according to another embodiment of the present invention.

Referring to FIG. 68, a thermal experience providing system 1000 may include a mobile device 31200 and a feedback device 31600.

Details described above in Section I may be applied to the thermal experience providing system 1000 according to the embodiment of the present invention.

In addition, details described above in Sections I to III may be applied to the feedback device 31600 and a heat output module 31640 which will be described below.

A mobile device 31200 may reproduce multimedia content and output video or audio according to the content reproduction, and the feedback device 31600 may output thermal feedback according to the content reproduction. That is, the mobile device 31200 and the feedback device 31600 may be communicatively connected, and the feedback device 31600 may obtain information for outputting thermal feedback from the mobile device 31200. For example, the mobile device 31200 may decode video content including video data/audio data/thermal feedback data and may generate a video signal, an audio signal, and a thermal feedback signal according to the decoded video content. For example, when a thermal event has occurred during driving of multimedia content, the mobile device 31200 may generate a thermal feedback signal corresponding to the thermal event. In this case, when types and intensities of a first thermal event and a second thermal event among thermal events are different, thermal feedback signals corresponding to each thermal event may also be different. That is, a thermal feedback signal may be determined by a thermal event.

In addition, the mobile device 31200 may output video and audio according to a video signal and an audio signal and transmit a thermal feedback signal to the feedback device 31600, and the feedback device 31600 may receive the thermal feedback signal and output thermal feedback.

In addition, the mobile device 31200 and the feedback device 31600 may be located within a predetermined distance. For example, the mobile device 31200 may be in contact with the feedback device 31600 and be mounted on the feedback device 31600.

Hereinafter, each element of the thermal experience providing system 1000 will be described in more detail.

1.1.1. Mobile Device

The mobile device 31200 reproduces multimedia content. The mobile device 31200 collectively refers to information processing devices owned by users and may include a smartphone, a tablet, a smart watch, and the like. For example, the mobile device 31200 may be provided in the form of a smartphone such as Samsung Electronics' Galaxy S (Galaxy Series)™ and Apple's iPhone™ series. Generally, the mobile device 31200 includes a display, an audio terminal, a camera, a posture sensor, and the like mounted therein and may be mounted in an HMD to implement virtual reality or augmented reality. Also, the mobile device 31200 may be referred to by various names such as content providing device and audiovisual device.

Figure 69:
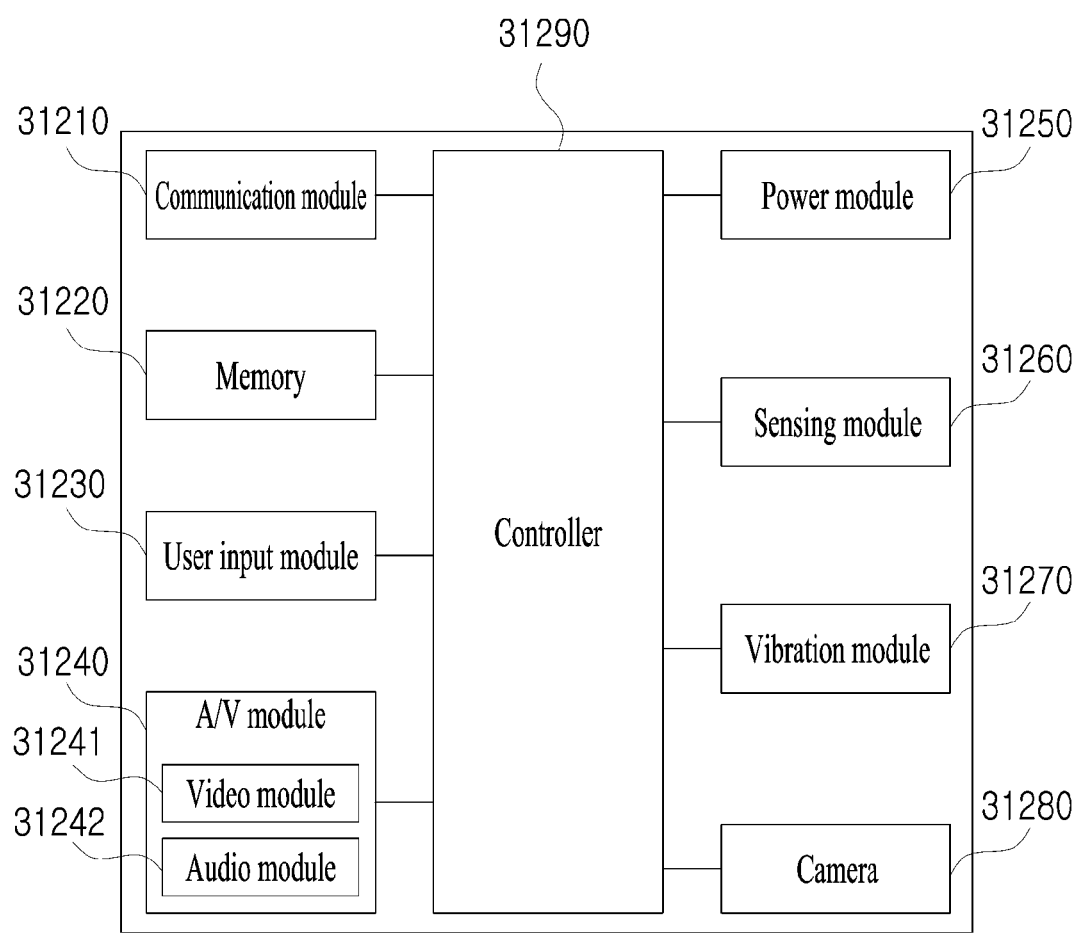
FIG. 69 is a block diagram related to a configuration of a mobile device according to an embodiment of the present invention.

FIG. 69 is a block diagram related to a configuration of a mobile device according to an embodiment of the present invention.

Referring to FIG. 69, a mobile device 31200 may include a communication module 31210, a memory 31220, a user input module 31230, an audiovisual (A/V) module 31240, a power module 31250, a sensing module 31260, a vibration module 31270, a camera 31280, and a controller 31290.

The communication module 31210 may perform communication with an external device. The mobile device 31200 may transmit and receive data to and from a feedback device 31600 through the communication module 31210. For example, the mobile device 31200 may transmit a thermal feedback signal to the feedback device 31600 through the communication module 31210. In addition, the mobile device 31200 may download multimedia content by connecting to the Internet through the communication module 31210.

The communication module 31210 is mainly classified into a wired type and a wireless type. Since both the wired type and the wireless type have their own advantages and disadvantages, the wired type and the wireless type may be simultaneously provided in the mobile device 31200 according to circumstances.

Typical examples of the wired type include a local area network (LAN) and universal serial bus (USB) communication, but other methods are also possible. For example, in the case of the wired type, the communication module 31210 may include a wired communication interface such as Recommended Standard (RS) 232, RS 485, and RS 422.

The wireless type may mostly use wireless personal area network (WPAN) communication methods such as Bluetooth, Bluetooth Low Energy (BLE), and ZigBee. However, since wireless communication protocols are not limited thereto, the wireless type communication module may also use wireless local area network (WLAN) communication methods such as Wi-Fi or other known communication methods.

Meanwhile, as a wired/wireless communication protocol, an exclusive protocol developed by a manufacturer of the mobile device 31200 may also be used.

The memory 31220 may store various pieces of information. Various pieces of data may be temporarily or semi-permanently stored in the memory 31220. Examples of the memory 31220 may include a hard disk drive (HDD), a solid state drive (SSD), a flash memory, a read-only memory (ROM), and a random access memory (RAM). The memory 31220 may be provided in a form mounted in the mobile device 31200 or a form attachable to and detachable from the mobile device 31200.

Various pieces of data required for operation of the mobile device 31200, including an operating system (OS) for driving the mobile device 31200 and content to be executed in the mobile device 31200 may be stored in the memory 31220.

The user input module 31230 generates input data for controlling operation of the mobile device 31200 by the user. The user input module 31230 may be configured using a key pad, a dome switch, a touch pad (static pressure/static electricity), a jog wheel, a jog switch, and the like.

The A/V module 31240 may provide audio or video to the user. To this end, the A/V module 31240 may include a video module 31241 and an audio module 31242.

The video module 31241 may generally be provided in the form of a display and output a video according to a video signal of the mobile device 31200. The audio module 31242 may generally be provided in the form of a speaker and output audio according to an audio signal of the mobile device 31200.

The power module 31250 supplies power required for operation of the mobile device 31200. The power module 31250 may supply power applied from the outside to each element required for operation of the mobile device 31200 and may store electrical energy like a battery and then supply the electrical energy to each element.

The sensing module 31260 may sense various pieces of information related to the mobile device 31200. Typical examples of the sensing module 31260 include a posture sensor sensing a posture of the mobile device 31200 and a motion sensor sensing motion, and the sensing module 31260 may also be a bio sensor sensing a user's body signal. A gyro sensor or an acceleration sensor may be used as the posture sensor or the motion sensor. The bio sensor may include a temperature sensor sensing a temperature of the user's body and an electrocardiogram sensor sensing electrocardiogram.

The vibration module 31270 may output vibration feedback. Together with thermal feedback, the vibration feedback may serve to further improve the user's immersion into a game.

The camera 31280 captures a video. The video captured by the camera 31280 may be output through the video module 31241. Recognition of an actual space is required to implement augmented reality, and to this end, the video captured by the camera 31280 may be used. The captured video may also be composed with a virtual video in order to be used in generating an augmented video.

The controller 31290 may control the overall operation of the mobile device 31200. For example, the controller 31290 may load multimedia content from the memory 31220 and reproduce the multimedia content or may generate a control signal for controlling output of video, audio, or thermal feedback according to content reproduction.

The controller 31290 may be implemented with a central processing unit (CPU) or a device similar thereto according to hardware, software, or a combination thereof. The controller 31290 may be provided in the form of an electronic circuit that processes an electrical signal and performs a control function in terms of hardware and may be provided in the form of a program or code for driving a hardware circuit in terms of software.

1.1.2. Feedback Device

The feedback device 31600 may output thermal feedback according to multimedia reproduction.

Figure 70:
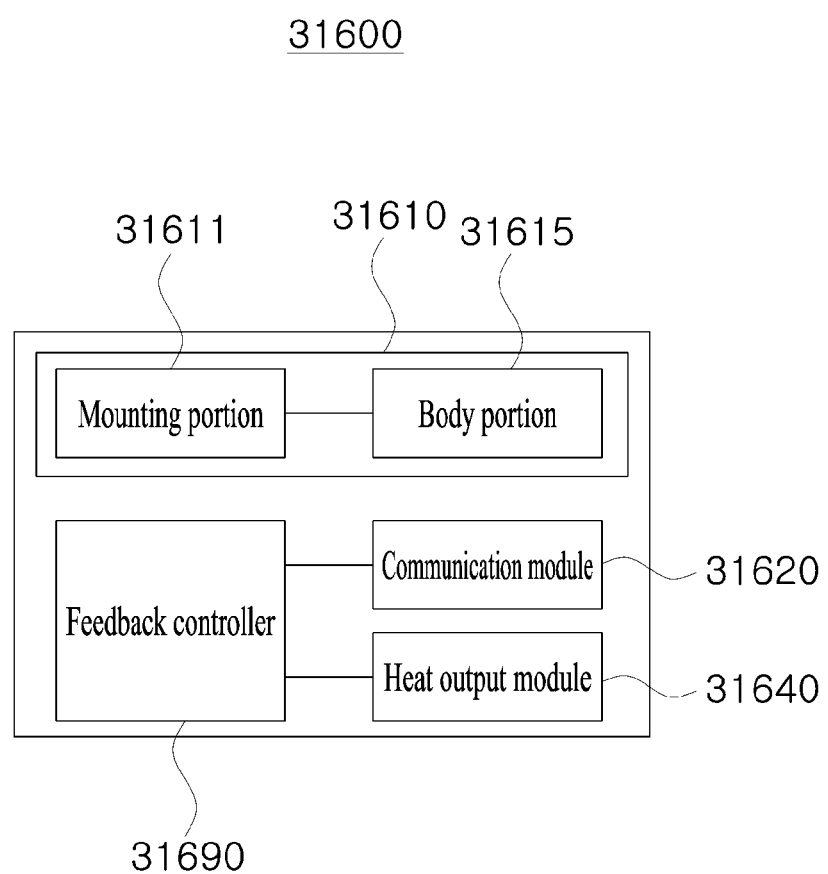
FIG. 70 is a block diagram related to a configuration of a feedback device according to an embodiment of the present invention.

FIG. 70 is a block diagram related to a configuration of a feedback device according to an embodiment of the present invention.

Referring to FIG. 70, a feedback device 31600 may include a casing 31610, a communication module 31620, a heat output module 31640, and a feedback controller 31690.

The casing 31610 forms an exterior of the feedback device 31600 and stores configurations such as the communication module 31620, the heat output module 31640, and the feedback controller 31690 therein. Accordingly, the stored configurations may be protected from an external impact or the like by the casing 31610.

The overall shape of the casing 31610 may mostly be a pad type (or a joystick type) for both hands or a bar type (or a stick type) for one hand but is not necessarily limited thereto. For reference, the pad type for both hands is usually used for games based on conventional two dimensional (2D) displays, and the bar type is usually used for virtual reality, augmented reality, mixed reality (MR), and the like. An example of the bar type may include a selfie stick.

A mounting portion 31611 for mounting the mobile device 31200 and a body portion 31615 may be provided in the casing 31610. For example, the body portion 31615 may be understood as a member other than the mounting portion 31611 in the casing 31610.

The mounting portion 31611 is for holding the mobile device 31200 in the feedback device 31600, and the mobile device 31200 may be in contact with and support at the feedback device 31600 by the mounting portion 31611. The mounting portion 31611 may be referred to by various names such as supporting portion, holding portion, and fixing portion. Since the mobile device 31200 is in contact with and supported at the feedback device 31600 through the mounting portion 31611, when the feedback device 31600 is moved, the mobile device 31200 may also be moved, and a posture and/or a location of the mobile device 31200 may be changed. That is, due to the mounting portion 31611, movement of the feedback device 31600 and movement of the mobile device 31200 may be interlocked with each other.

The mounting portion 31611 may fix the mobile device 31200 by coming in contact with one or more surfaces of the mobile device 31200 and applying an external force thereto. For example, the mounting portion 31611 may include a support member supporting the mobile device 31200 and a pressing member applying pressure according to an elastic force of an elastic member to one or more surfaces of the mobile device 31200. Here, there may be one or more pressing members. For example, when there are two or more pressing members, the pressing members may apply pressure to different surfaces of the mobile device 31200. In this case, a distance between the support member and the pressing members and/or a distance between the pressing members may be adjusted according to a width of the mobile device 31200.

As another example, the mounting portion 31611 may include an accommodating portion, and the accommodating portion may accommodate and fix one or more surfaces of the mobile device 31200.

As still another example, the mounting portion 31611 may include a fitting member for fitting with the mobile device 31200. For example, when a groove (or a slit) is formed in at least one surface of the mobile device 31200, the fitting member may be a protruding member. Conversely, when at least one surface of the mobile device 31200 has a protruding shape, the fitting member may be a groove member. Also, the groove of the mobile device 31200 and the protruding member of the mounting portion 31611, or the protrusion of the mobile device 31200 and the groove member of the mounting portion 31611, may be coupled to each other by sliding.

As yet another example, the mounting portion 31611 may include a magnetic member. The magnetic member may be coupled to the mobile device 31200 by a magnetic force. For example, the mobile device 31200 may also include a magnetic member for coupling to the magnetic member of the mounting portion 31611 by a magnetic force.

However, the mounting portion 31611 is not limited to the above examples, and the mounting portion 31611 may include any other shapes and materials capable of supporting and fixing the mobile device 31200.

The body portion 31615 may be provided in various shapes according to a type of the feedback device 31600. For example, when the feedback device 31600 is a selfie stick type, the body portion 31615 may have a shape extending in one direction. Also, depending on types of the feedback device 31600, the body portion 31615 may be configured in the shape of a handle (a wheel), the shape of a pad (a joystick), the shape of a gun, the shape of a case, and the like.

In addition, the body portion 31615 may include a grip portion for the user to grip the feedback device 31600. To facilitate the user's gripping, the grip portion may be formed with a material having a high frictional force (for example, rubber or urethane) or have a non-slip shape (for example, a concave-convex shape). The grip portion may also be formed with a material that well-absorbs sweat generated from the user's skin.

Here, a contact surface of the heat output module 31640 may be formed at the grip portion, or the grip portion may correspond to the contact surface of the heat output module 31640. Also, the grip portion may be provided on at least a partial region of the body portion 31615. For example, in the case of the feedback device 31600 formed in the shape of a pad for both hands, the grip portion may be formed at two spots, and in the case of the feedback device 31600 formed in the shape of a stick, the grip portion may be formed at one spot. However, two feedback devices 31600 each formed in the shape of a stick may be used as a pair in some cases, and here, the grip portion may be formed at each of the two feedback devices 31600.

In addition, the body portion 31615 may include an extending portion. The extending portion may expand the body portion 31615. For example, when the feedback device 31600 is a selfie stick type, the body portion 31615 may be expanded in a longitudinal direction by the extending portion.

In addition, the body portion 31615 may include a heat dissipating portion. The heat dissipating portion may indicate a portion dissipating waste heat, which is generated by the heat output module 31640, to outside the feedback device 31600. Here, the waste heat may refer to residual heat excluding heat used in providing a thermal experience to the user from the heat generated by the feedback device 31600. For example, the waste heat may include residual heat remaining in the feedback device 31600 after thermal feedback is output by the heat output module 31640. The heat dissipating portion will be described in more detail below with reference to FIGS. 84 and 85.

The communication module 31620 performs communication with an external device. The feedback device 31600 may transmit and receive data to and from the mobile device 31200 through the communication module 31620. For example, the feedback device 31600 may receive a thermal feedback signal from the mobile device 31200 through the communication module 31620.

The communication module 31620 is mainly classified into a wired type and a wireless type. Since both the wired type and the wireless type have their own advantages and disadvantages, the wired type and the wireless type may be simultaneously provided in a single feedback controller 31690 according to circumstances.

A typical example of the wired type includes USB communication, but other methods are also possible. For example, in the case of the wired type, the communication module 31620 may include a wired communication interface such as RS 232, RS 485, and RS 422.

The wireless type may mostly use WPAN communication methods such as Bluetooth, BLE, and ZigBee. However, since wireless communication protocols are not limited thereto, the wireless type communication module 31620 may also use WLAN communication methods such as Wi-Fi or other known communication methods. Meanwhile, as a wired/wireless communication protocol, an exclusive protocol developed by a manufacturer of the feedback device 31600 may also be used.

The heat output module 31640 may output thermal feedback. The thermal feedback may be output by the heat output module 31640, which includes a contact surface 31641 coming in contact with the user's body and a thermoelectric element connected to the contact surface, applying hot heat or cold heat generated by the thermoelectric element, according to power applied thereto, to the user's body through the contact surface 31641.

The heat output module 31640 may perform an exothermic operation, an endothermic operation, or a thermal grill operation according to a thermal feedback signal received from the mobile device 31200 through the communication module 31620 in order to output thermal feedback, and the user may have a thermal experience due to the output thermal feedback.

The feedback controller 31690 may control the overall operation of the feedback device 31600. For example, the feedback controller 31690 may receive a thermal feedback signal from the mobile device 31200 through the communication module 31620 and apply power to a thermoelectric element of the heat output module 31640 so that thermal feedback according to the thermal feedback signal is output.

The feedback controller 31690 may be implemented with a CPU or a device similar thereto according to hardware, software, or a combination thereof. The feedback controller 31690 may be provided in the form of an electronic circuit that processes an electrical signal and may perform a control function in terms of hardware and may be provided in the form of a program or code for driving a hardware circuit in terms of software.

In an embodiment, in order to be communicatively connected to the mobile device 31200, the feedback controller 31690 may control the communication module 31620 so that a communication channel with the mobile device 31200 is established. For example, the communication module 31620 may be paired using a Bluetooth method according to control of the feedback controller 31690 and may establish a Bluetooth channel with the mobile device 31200.

In an embodiment, when the mobile device 31200 is disposed within a predetermined distance from the feedback controller 31690, the feedback controller 31690 may control the communication module 31620 so that a communication channel with the mobile device 31200 is established. Here, the communication channel may refer to a wired communication channel and/or a wireless communication channel.

For example, the feedback controller 31690 may obtain a strength of a signal received from the mobile device 31200, and when the strength of the received signal is a predetermined value or higher, the feedback controller 31690 may control the communication module 31620 so that a communication channel with the mobile device 31200 is established. Here, the strength of the received signal may indicate a received signal strength indicator (RSSI) known in the art but may also refer to a value other than the RSSI capable of indicating a strength of a received signal.

In another embodiment, the feedback controller 31690 may determine whether the mobile device 31200 is mounted on the mounting portion 31611, and when the mobile device 31200 is mounted on the mounting portion 31611, the feedback controller 31690 may control the communication module 31620 so that a communication channel with the mobile device 31200 is established. For example, the mounting portion 31611 may include a switch portion, and the switch portion may be configured to come in contact with the mobile device 31200 when the mobile device 31200 is mounted on the mounting portion 31611. When the switch portion is in contact with the mobile device 31200, the feedback controller 31690 may determine that the mobile device 31200 is mounted on the mounting portion 31611 and control the communication module 31620 so that a communication channel with the mobile device 31200 is established. As another example, the mounting portion 31611 may include a sensor capable of sensing contact with the mobile device 31200, and the feedback controller 31690 may determine whether the mobile device 31200 is mounted on the mounting portion 31611 through a change in a sensing quantity of the sensor.

Figure 71:
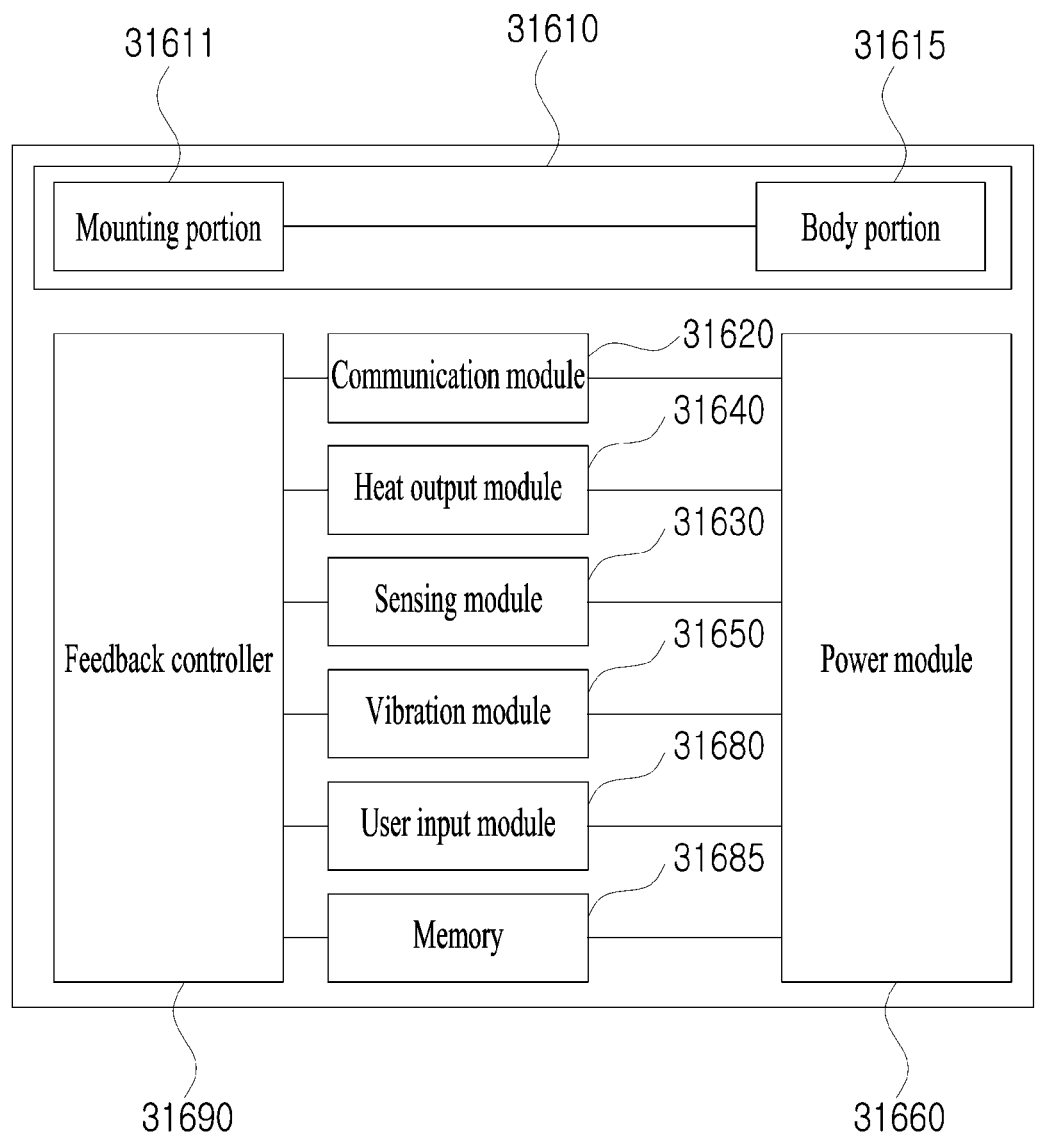
FIG. 71 is a block diagram related to a configuration of a feedback device according to another embodiment of the present invention.

FIG. 71 is a block diagram related to a configuration of a feedback device according to another embodiment of the present invention.

Referring to FIG. 71, the feedback device 31600 described above with reference to FIG. 70 may further include a sensing module 31630, a vibration module 31650, a power module 31660, a user input module 31680, and a memory 31685 in addition to the casing 31610, the communication module 31620, the heat output module 31640, and the feedback controller 31690.

The sensing module 31630 may sense various pieces of information related to the feedback device 31600. Typical examples of the sensing module 31630 include a posture sensor sensing a posture of the feedback device 31600 and a motion sensor sensing motion of the feedback device 31600, and the sensing module 31630 may also be a bio sensor sensing a user's body signal. A gyro sensor or an acceleration sensor may be used as the posture sensor or the motion sensor. The bio sensor may include a temperature sensor sensing a temperature of the user's body and an electrocardiogram sensor sensing electrocardiogram. Also, as described above, the sensing module 31630 may sense whether the mobile device 31200 is mounted on the mounting portion 31611.

The vibration module 31650 may output vibration feedback. Together with thermal feedback, the vibration feedback may serve to further improve the user's immersion into a game. For example, the vibration feedback may be generated when a character in a game is involved in an explosion scene or receives an impact due to falling from a high place. Meanwhile, although it will be described below, vibration feedback and thermal feedback may be linked to each other.

The user input module 31680 may obtain a user input from the user. For example, when the feedback device 31600 is of a game pad type, a user input is mostly a user command related to a game, and examples of the user input may include manipulation of a character in a game, selection of a menu, and the like. As another example, when the feedback device 31600 is a selfie stick type, a user input may be a command for taking a picture.

As still another example, a user input may be a user command for establishing a communication channel with the mobile device 31200. The user input module 31680 may mostly be a button or a stick, and the user may input a user input by pressing the button or manipulating the stick in a specific direction. Of course, the user input module 31680 is not limited to the above-described examples.

The memory 31685 may store various pieces of information. The memory 31685 may store data temporarily or semi-permanently. Examples of the memory 31685 may include an HDD, an SSD, a flash memory, a ROM, and a RAM. The memory 31685 may be provided in a form mounted in the feedback device 31600 or a form attachable to and detachable from the feedback device 31600.

Various pieces of data required or used for an OS for driving the feedback device 31600 or for the operation of the feedback device 31600 may be stored in the memory 31685.

The power module 31660 supplies power required for operation of the feedback device 31600. The power module 31660 may supply power applied from the outside to each element required for operation of the feedback device 31600 and may store electrical energy like a battery and then supply the electrical energy to each element.

In an embodiment, the power module 31660 may receive electricity from an external device through a wired port such as a USB port. Of course, the wired port includes a port capable of receiving electricity other than the USB port. The power module 31660 may also receive electricity wirelessly from an external device through a wireless charging port. For example, the power module 31660 may receive electricity from the power module 31250 of the mobile device 31200 through a wired or wireless port. The power received from the external device may be stored in a battery of the power module 31660.

In another embodiment, electricity stored in the power module 31660 may be transmitted to the power module 31250 of the mobile device 31200 through the wired port and/or the wireless port. That is, by providing electricity to the mobile device 31200, the feedback device 31600 may serve as a portable battery for the mobile device 31200.

In another embodiment, when electricity stored in a battery is at a predetermined level or lower, the power module 31660 may notify the user of information indicating that the battery is at a predetermined level or lower. For example, when the feedback device 31600 includes a notifying part (for example, a light emitting diode (LED), a display, or the like) capable of outputting a message to the user, the feedback controller 31690 may output battery state information through the notifying part. As another example, the feedback controller 31690 may output battery state information through the heat output module 31640. As an example, the feedback controller 31690 may control the heat output module 31640 so that hot feedback and cold feedback are alternately output for a predetermined amount of time. As still another example, the feedback controller 31690 may output battery state information through the mobile device 31200. As an example, the feedback controller 31690 may transmit battery state information to the mobile device 31200 through the communication module 31620, and the mobile device 31200 may output information indicating that a state-of-charge of the battery is a predetermined level or lower through the A/V module 31240 according to the obtained battery state information.

The feedback controller 31690 may perform the overall control of the feedback device 31600. For example, the feedback controller 31690 may transmit a user input which is input to the user input module 31680 or posture information on the feedback device 31600 which is sensed by the sensing module 31630 to the mobile device 31200 by using the communication module 31620 or, conversely, may receive a vibration signal from the mobile device 31200 through the communication module 31620 and cause the vibration sensor to generate vibration feedback. The feedback controller 31690 may also receive a thermal feedback request signal from the mobile device 31200 through the communication module 31620 and control the heat output module 31640 to generate thermal feedback.

In an embodiment, in order to save electricity, the feedback controller 31690 may block a communication connection with the mobile device 31200 when the feedback device 31600 is not moving. For example, when a sensing value of the sensor, which senses movement of the feedback device 31600, of the sensing module 31630 does not change for a predetermined amount of time, the feedback controller 31690 may control the communication module 31620 to stop the communication connection with the mobile device 31200.

In an embodiment, when the mobile device 31200 is mounted on the mounting portion 31611, if vibration is output from the vibration module 31270 of the mobile device 31200, coupling between the mobile device 31200 and the mounting portion 31611 may be weakened due to the vibration. Also, when the mobile device 31200 is mounted on the mounting portion 31611, the user may not perceive vibration even if the vibration is output from the mobile device 31200. To solve such a problem, when the mobile device 31200 is mounted on the mounting portion 31611, the feedback controller 31690 may transmit a request signal to the mobile device 31200 to turn off a vibration output of the vibration module 31270 of the mobile device 31200, and the controller 31290 of the mobile device 31200 may turn off the vibration output of the vibration module 31270 according to the request signal. Further, when vibration feedback has to be output from the mobile device 31200, the mobile device 31200 may transmit a vibration feedback signal to the feedback device 31600 through the communication module 31210, and the feedback controller 31690 may control the vibration module 31270 to output vibration according to the vibration feedback signal. Accordingly, vibration feedback may be better transmitted to the user while the coupling between the mobile device 31200 at the mounting portion 31611 and the feedback controller 31690 is not weakened.

1.1.2.1. Implementations of Feedback Device

The feedback device 31600 having the above-described configuration may be implemented in various forms. Hereinafter, some implementations of the feedback device 31600 will be described.

Figure 72:
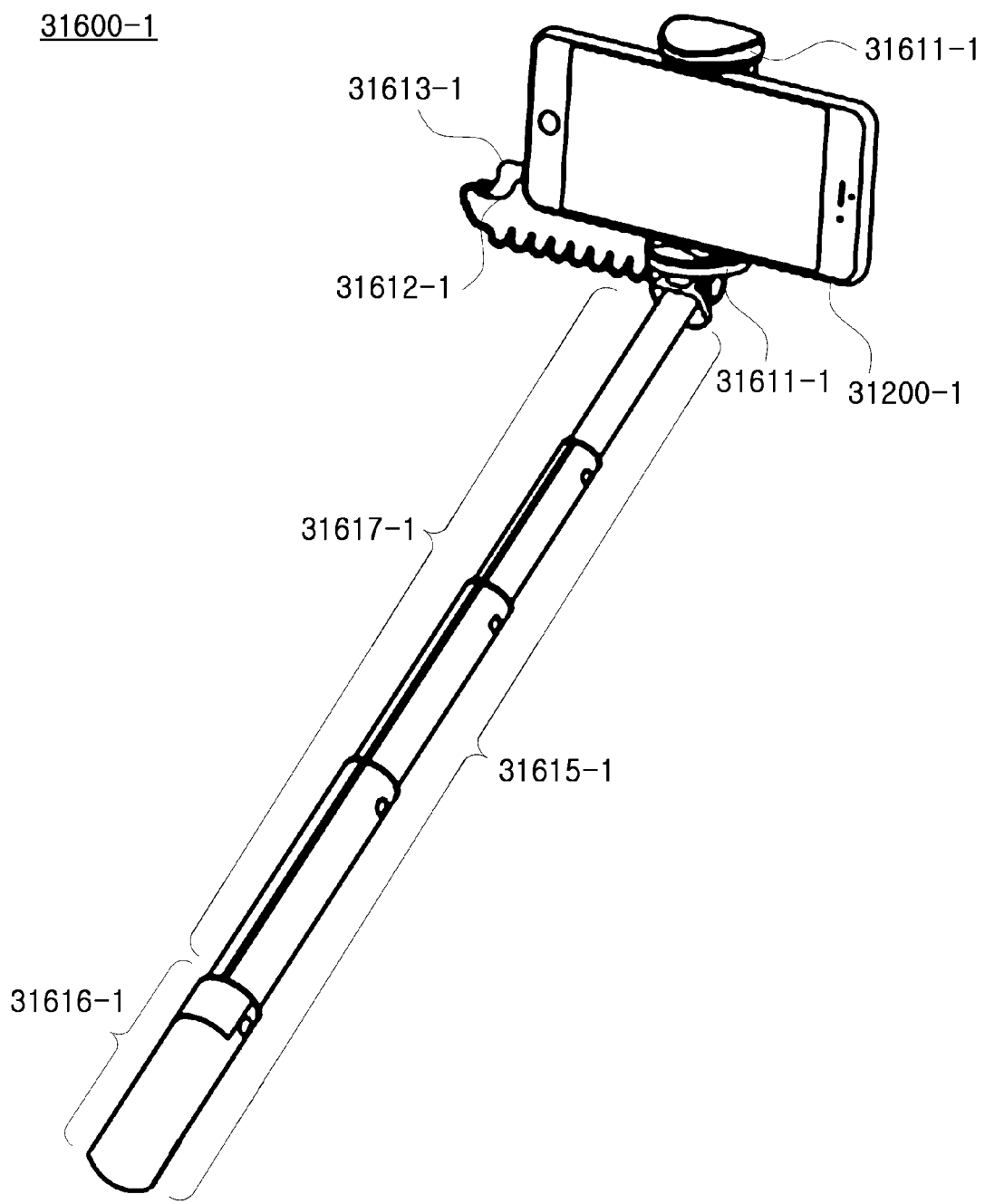
FIG. 72 is a schematic diagram of a first implementation of the feedback device according to an embodiment of the present invention.

FIG. 72 is a schematic diagram of a first implementation of the feedback device according to an embodiment of the present invention.

In the present implementation, a feedback device 31600-1 may be provided in the form of a selfie stick. The feedback device 31600-1 may include mounting portions 31611-1 and a body portion 31615-1. The mounting portions 31611-1 may come in contact with two surfaces of a mobile device 31200-1 and apply an external force thereto in order to support and fix the mobile device 31200-1. Also, a distance between the mounting portions 31611-1 may be adjusted according to a width of the mobile device 31200-1.

The body portion 31615-1 may include a grip portion 31616-1 and an extending portion 31617-1. The body portion 31615-1 may include a communication module 31620, and the feedback device 31600-1 may be connected to the mobile device 31200-1 by a wired or wireless communication method through the communication module 31620.

A contact surface of a heat output module 31640 may be disposed on an inner surface or an outer surface of at least a portion of the body portion 31616-1, and the feedback device 31600-1 may output thermal feedback through the contact surface of the heat output module 31640 by being linked to the mobile device 31200-1.

The extending portion 31617-1 may expand in a longitudinal direction. A length of the extending portion 31617-1 may be adjusted mostly for the purpose of facilitating a photographing function, which is an original function of a selfie stick.

In addition, a battery connecting line 31612-1 and a wired communication line 31613-1 may be provided in the body portion 31615-1. The battery connecting line 31612-1 may transmit electricity stored in the power module 31250 of the mobile device 31200-1 to the power module 31660 of the feedback device 31600-1, and the power module 31660 of the feedback device 31600-1 may store the received electricity. The wired communication line 31613-1 may transmit data which is transmitted and received between the mobile device 31200-1 and the feedback device 31600-1. For example, a thermal feedback signal may be transmitted from the mobile device 31200-1 to the feedback device 31600-1 through the wired communication line 31613-1. As another example, a photographing signal may be transmitted from the feedback device 31600-1 to the mobile device 31200-1 through the wired communication line 31613-1.

Figure 73:
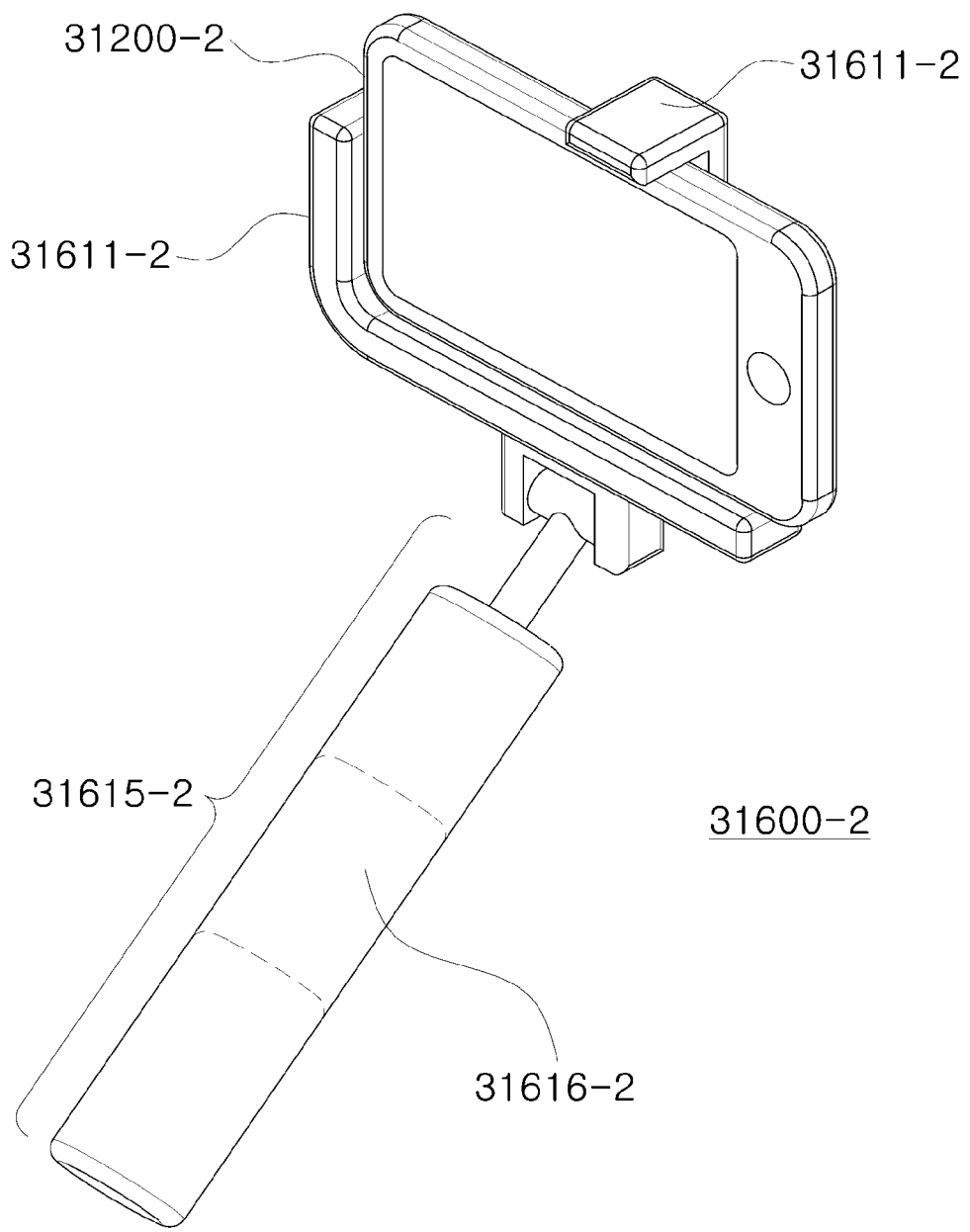
FIG. 73 is a schematic diagram of a second implementation of the feedback device according to an embodiment of the present invention.

FIG. 73 is a schematic diagram of a second implementation of the feedback device according to an embodiment of the present invention.

In the present implementation, a feedback device 31600-2 may be provided in the form of a selfie stick. The feedback device 31600-2 may include mounting portions 31611-2 and a body portion 31615-2.

The mounting portions 31611-2 may come in contact with three surfaces of a mobile device 31200-2 and apply an external force thereto in order to support and fix the mobile device 31200-2. Also, a distance between the mounting portions 31611-2 may be adjusted according to a width of the mobile device 31200-2.

The body portion 31615-2 may include a grip portion 31616-2. Although the grip portion 31616-2 is shown as being disposed at an intermediate region of the body portion 31615-2 in FIG. 73, embodiments are not limited thereto, and the grip portion 31616-2 may also be disposed at an upper region or a lower region of the body portion 31615-2 or may be the entire region of the body portion 31615-2. A contact surface of a heat output module 31640 may be disposed on an inner surface or an outer surface of at least a portion of the grip portion 31616-2, and the feedback device 31600-2 may output thermal feedback through the contact surface of the heat output module 31640 by being linked to the mobile device 31200-2.

Figure 74:
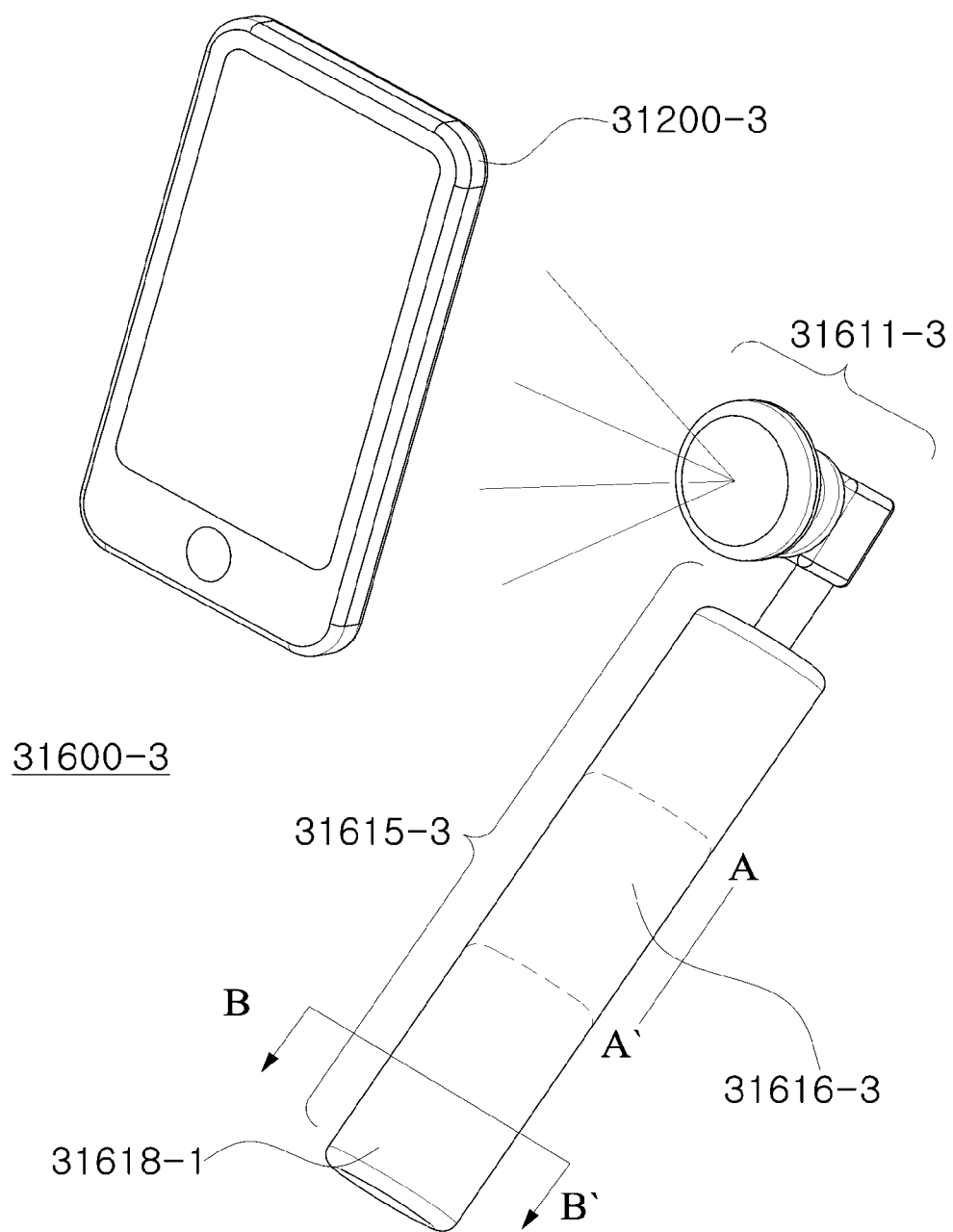
FIG. 74 is a schematic diagram of a third implementation of the feedback device according to an embodiment of the present invention.

FIG. 74 is a schematic diagram of a third implementation of the feedback device according to an embodiment of the present invention.

In the present implementation, a feedback device 31600-3 may be provided in the form of a selfie stick. The feedback device 31600-3 may include a mounting portion 31611-3 and a body portion 31615-3.

The mounting portion 31611-3 may include a magnetic member, and a mobile device 31200-3 may be supported and fixed on the mounting portion 31611-3 by the magnetic member using a magnetic force. For example, a magnetic member may be attached to the mobile device 31200-3, and the magnetic member of the mounting portion 31611-3 and the magnetic member of the mobile device 31200-3 may be coupled to each other by a magnetic force such that the mobile device 31200-3 is mounted on the mounting portion 31611-3.

The body portion 31615-3 may include a grip portion 31616-3 and a heat dissipating portion 31618-1.

Although the grip portion 31612-3 and the heat dissipating portion 31618-1 are shown as being respectively disposed at an intermediate region and a lower region of the body portion 31615-2 in FIG. 74, embodiments are not limited thereto, and the grip portion 31616-3 and the heat dissipating portion 31618-1 may also be disposed on any of an upper region, the intermediate region, and the lower region of the body portion 31615-3. The grip portion 31616-3 and the heat dissipating portion 31618-1 may also be disposed at the entire region of the body portion 31615-3. A contact surface of a heat output module 31640 may be disposed at an inner surface or an outer surface of at least a portion of the grip portion 31616-2, and the feedback device 31600-2 may output thermal feedback through the contact surface of the heat output module 31640 by being linked to the mobile device 31200-2.

The heat dissipating portion 31618-1 may dissipate waste heat, which is generated in the feedback device 31600-3 due to output of thermal feedback, to the outside. The heat dissipating portion 31618-1 will be described below in more detail below with reference to FIGS. 84 and 85.

Figure 75:
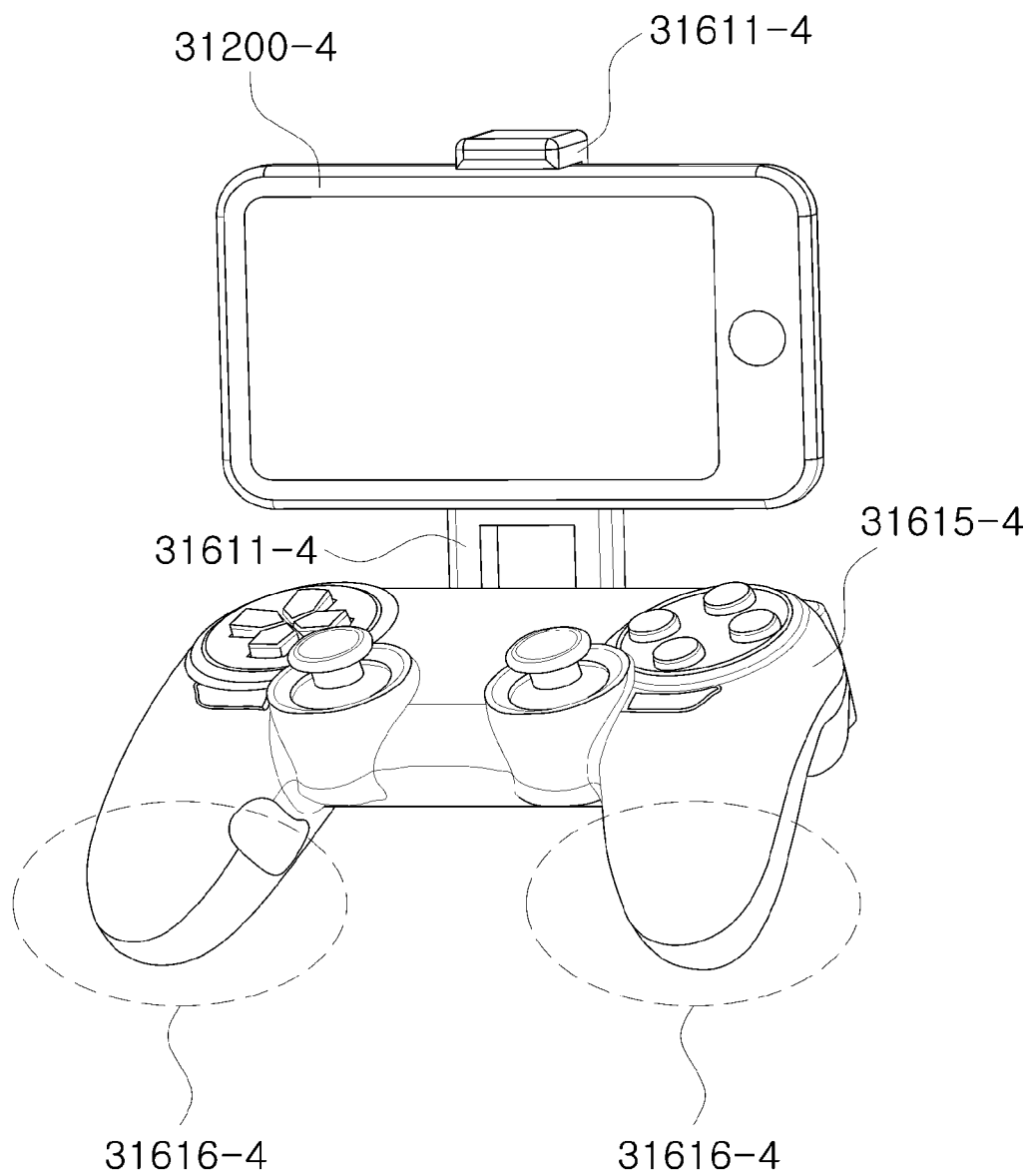
FIG. 75 is a schematic diagram of a fourth implementation of the feedback device according to an embodiment of the present invention.

FIG. 75 is a schematic diagram of a fourth implementation of the feedback device according to an embodiment of the present invention.

In the present implementation, a feedback device 31600-4 may be provided in the shape of a pad gripped by both hands like Dual Shock™ for Sony's Playstation™ or a gaming controller for Microsoft's Xbox™.

The feedback device 31600-4 may include mounting portions 31611-4 and a body portion 31615-4.

The mounting portions 31611-4 may come in contact with two surfaces of a mobile device 31200-4 and apply an external force thereto in order to support and fix the mobile device 31200-4. Also, a distance between the mounting portions 31611-4 may be adjusted according to a width of the mobile device 31200-4. Of course, embodiments are not limited thereto, and the mounting portions 31611-4 may include a magnetic member for mounting the mobile device 31200-4 using a magnetic force.

The body portion 31615-2 may include grip portions 31616-4. The grip portions 31616-4 may be provided in plural at two regions of the body portion 31615-4 spaced apart from each other so that the grip portions 31616-4 may be gripped by both hands. A contact surface of a heat output module 31640 may be formed on each grip portion 31616-4. The feedback device 31600-4 may output thermal feedback through the contact surfaces of the heat output module 31640 by being linked to the mobile device 31200-4.

Figure 76:
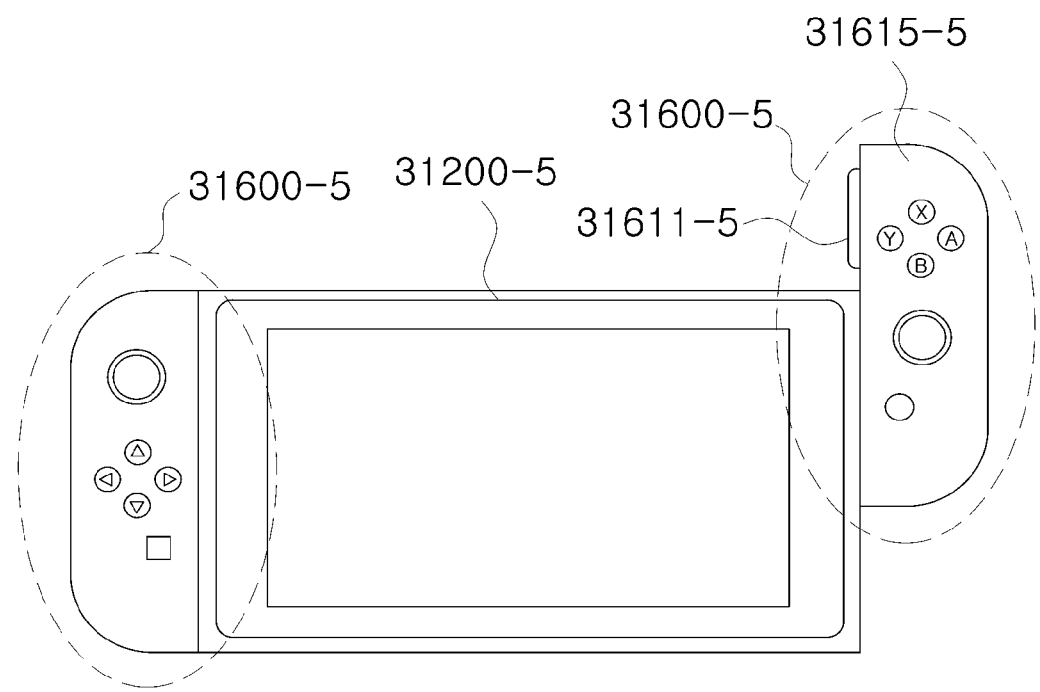
FIG. 76 is a schematic diagram of a fifth implementation of the feedback device according to an embodiment of the present invention.

FIG. 76 is a schematic diagram of a fifth implementation of the feedback device according to an embodiment of the present invention.

In the present implementation, a feedback device 31600-5 may be provided in the form of a gaming controller gripped by one hand like Nintendo's Nintendo Switch™ controller.

The feedback device 31600-5 may include a mounting portion 31611-5 and a body portion 31615-5.

The mounting portion 31611-5 may include a protruding member, and the protruding member of the mounting portion 31611-5 may be coupled to a groove member, which is formed at one surface of the mobile device 31200-5, by sliding. Also, when there are two feedback devices 31600-5, the feedback devices 31600-5 may be respectively coupled to groove members formed at both surfaces of the mobile device 31200-5 by sliding.

A grip portion may be provided at the entire region of the body portion 31615-5. A contact surface of a heat output module 31640 may be formed on at least one surface of the body portion 31615-5 (for example, a side surface of the body portion 31615-5). The feedback device 31600-5 may output thermal feedback through the contact surface of the heat output module 31640 by being linked to the mobile device 31200-5.

Figure 77:
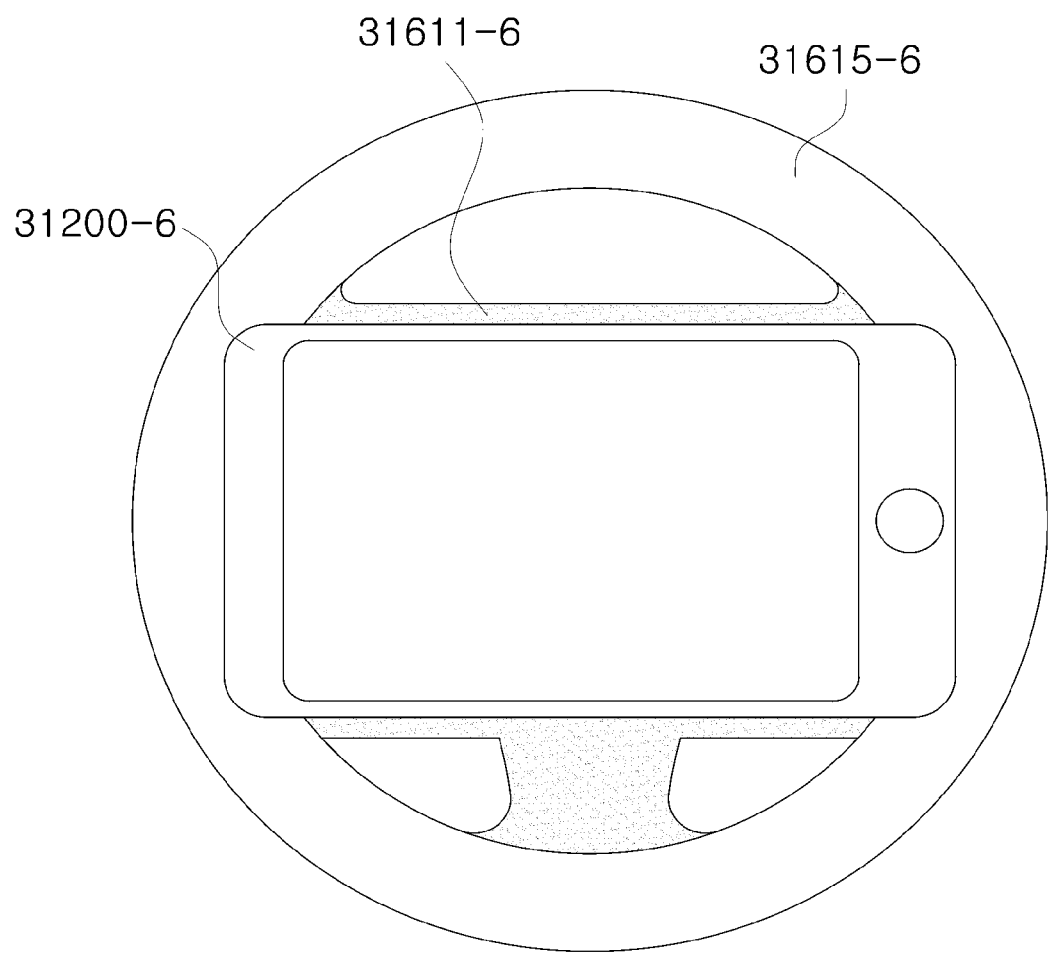
FIG. 77 is a schematic diagram of a sixth implementation of the feedback device according to an embodiment of the present invention.

FIG. 77 is a schematic diagram of a sixth implementation of the feedback device according to an embodiment of the present invention.

In the present implementation, a feedback device 31600-6 may be provided in the shape of a handle that is mostly used in a racing game.

The feedback device 31600-6 may include a mounting portion 31611-6 and a body portion 31615-6.

The mounting portion 31611-6 may include an accommodating member, and the accommodating member may accommodate and fix two or more surfaces of a mobile device 31200-6.

A grip portion may be provided on at least a partial region of the body portion 31615-6. For example, the body portion 31615-6 may include a ring member, and the grip portion may be provided at two regions of the ring member or at the entire region of the ring member.

In addition, a contact surface of a heat output module 31640 may be formed on at least one surface of the body portion 31615-6. For example, the contact surface may be formed at two regions or the entire region of the ring member.

The feedback device 31600-6 may output thermal feedback through the contact surface of the heat output module 31640 by being linked to the mobile device 31200-6.

Figure 78A:
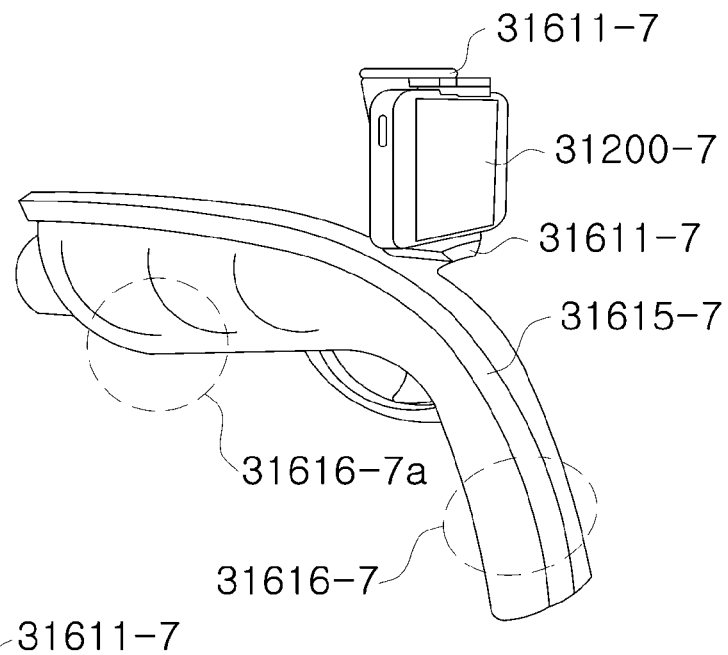
FIGS. 78A and 78B are a schematic diagram of a seventh implementation of the feedback device according to an embodiment of the present invention.
Figure 78B:
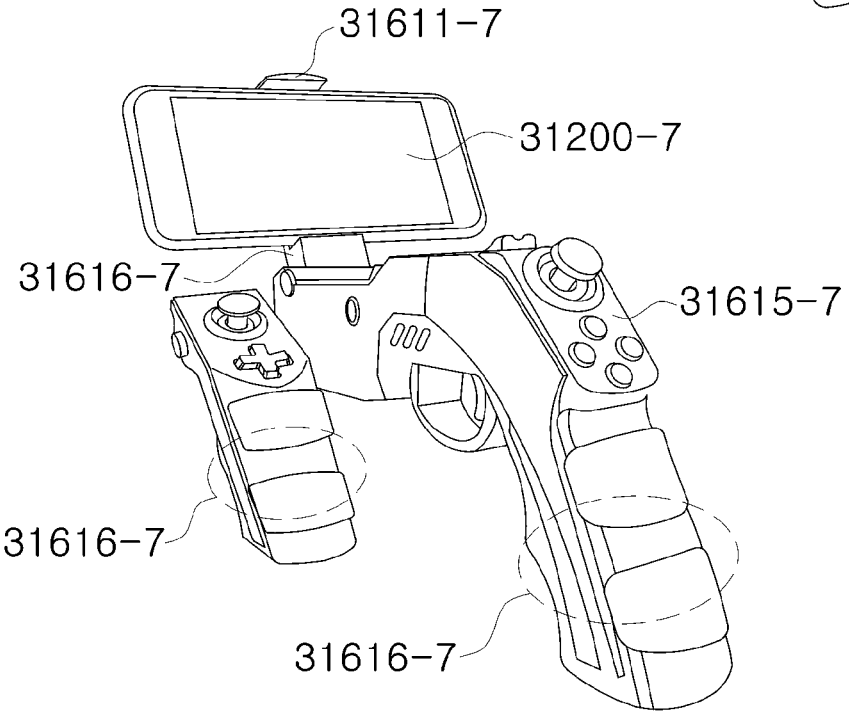

FIG. 78 is a schematic diagram of a seventh implementation of the feedback device according to an embodiment of the present invention.

In the present implementation, a feedback device 31600-7 may be provided in the shape of a gun gripped by one hand or both hands.

The feedback device 31600-7 may include mounting portions 31611-7 and a body portion 31615-7.

The mounting portions 31611-7 may come in contact with two surfaces of a mobile device 31200-7 and apply an external force thereto in order to support and fix the mobile device 31200-7. Also, a distance between the mounting portions 31611-7 may be adjusted according to a size of the mobile device 31200-7. Of course, embodiments are not limited thereto, and the mounting portions 31611-7 may include a magnetic member for mounting the mobile device 31200-7 using a magnetic force.

The body portion 31615-7 may be formed in the shape of a gun, and an exterior thereof may include a trigger, a handle, a barrel, a barrel cover, and the like. Also, the exterior of the gun may be formed in various shapes according to various aspects. Also, the body portion 31615-7 may include a grip portion 31616-7. For example, the grip portion 31616-7 may be formed at a handle region of the body portion 31615-7. For example, in FIG. 78A, a single handle region may be formed, and the grip portion 31616-7 may be formed at the single handle region. On the other hand, in FIG. 78B, two handle regions may be formed, and the grip portion 31616-7 may be formed at each of the two handle regions.

In addition, according to circumstances, the grip portion 31616-7 may be formed at a portion other than the handle region. For example, in FIG. 78A, the grip portion 31616-7 may be formed at various regions, such as a barrel cover region 31616-7*a*, other than the handle region of the body portion 31615-7. A contact surface of a heat output module 31640 may be disposed at an inner surface or an outer surface of at least a portion of each of the grip portions 31616-7 and 31616-7*a*, and the feedback device 31600-7 may output thermal feedback through the contact surface of the heat output module 31640 by being linked to the mobile device 31200-7.

FIG. 79 is a schematic diagram of an eighth implementation of the feedback device according to an embodiment of the present invention.

Figure 79A:
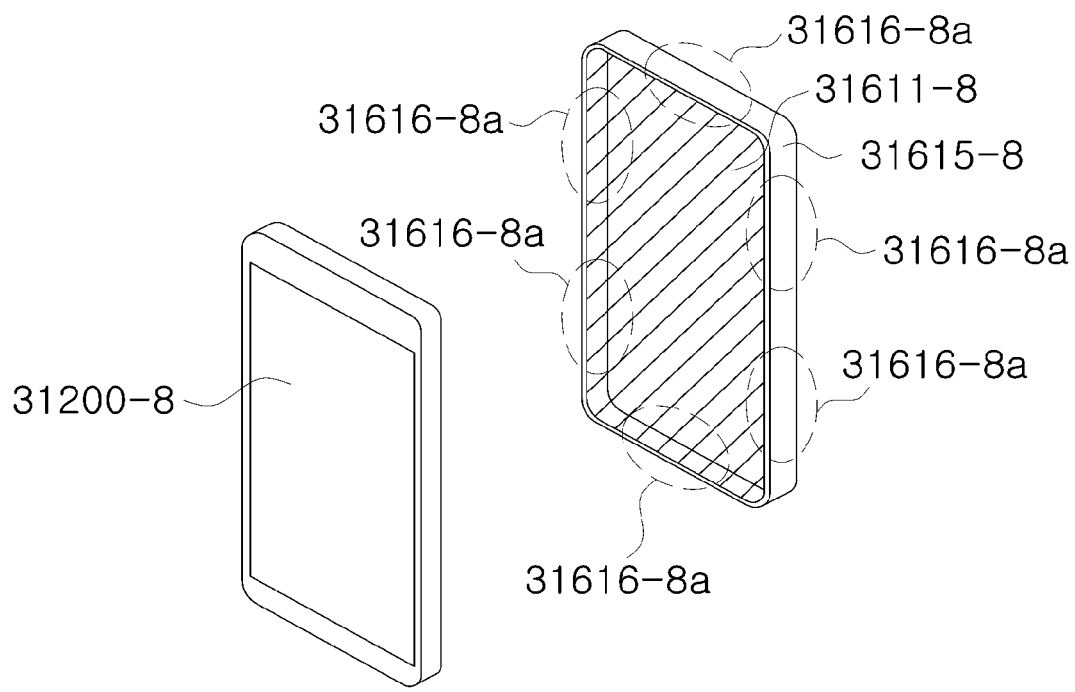
FIGS. 79A and 79B are a schematic diagram of an eighth implementation of the feedback device according to an embodiment of the present invention.
Figure 79B:
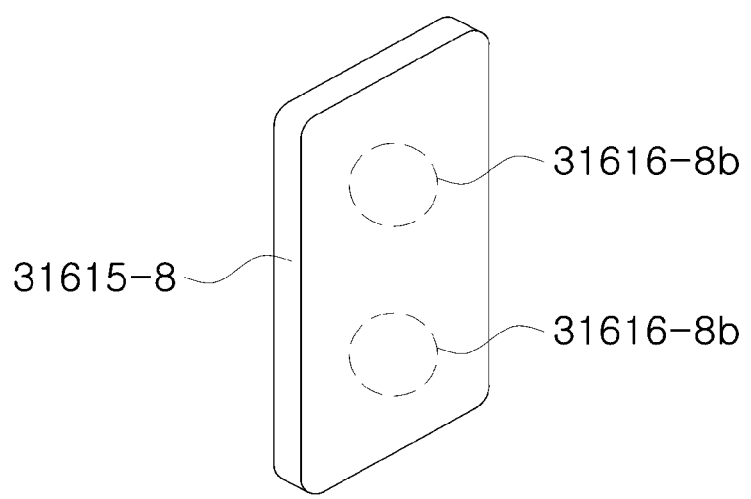

In the present implementation, a feedback device 31600-8 may be formed in the shape of a case for protecting a mobile device 31200-8 from an external force. FIG. 79A shows a front surface of the feedback device 31600-8, and FIG. 79B shows a rear surface of the feedback device 31600-8.

The feedback device 31600-8 may include a mounting portion 31611-8 and a body portion 31615-8.

The mounting portion 31611-8 may include an accommodating member. The accommodating member may be formed at an inner surface of the body portion 31615-8 and may accommodate two or more surfaces of the mobile device 31200-8. By the mobile device 31200-8 being accommodated in the accommodating member, the mobile device 31200-8 may be fixed to the feedback device 31600-8.

A grip portion may be provided on at least a partial region of the body portion 31615-8. For example, grip portions 31616-8*a* may be formed at side surfaces of the body portion 31615-8, and/or grip portions 31616-8*b* may be formed at a rear surface of the body portion 31615-8. However, embodiments are not limited thereto, and the body portion 31615-8 may correspond to any region at which the feedback device 31600-8 is gripped by the user.

In addition, a contact surface of a heat output module 31640 may be formed on at least a partial region of the body portion 31615-8. For example, the contact surface may be formed on at least a partial region of each of the grip portions 31615-8*a* and 31615-8*b*. The feedback device 31600-8 may output thermal feedback through the contact surface of the heat output module 31640 by being linked to the mobile device 31200-8. According to a location of the contact surface, a thermal experience may be transferred to the user's finger or palm.

2. Heat Output Module and Heat Dissipating Member 2.1. Outline of Heat Output Module A heat output module 31640 may output thermal feedback transferring hot heat and cold heat to the user by performing an exothermic operation, an endothermic operation, or a thermal grill operation. The description on the heat output module 1640 given above in Section I may be applied to the heat output module 31640 which will be described below. Of course, description on the heat output module 31640 which will be given below may also be applied to the heat output module 1640 which has been described above in Section I.

The heat output module 31640 mounted in the feedback device 31600 in the thermal experience providing system 1000 outputs thermal feedback when the feedback device 31600 receives a thermal feedback signal so that the thermal experience providing system 1000 provides a thermal experience to the user.

To perform the above-described exothermic operation, endothermic operation, or thermal grill operation, the heat output module 31640 may use a thermoelement such as a Peltier element.

The Peltier effect is a thermoelectric phenomenon discovered by Jean Peltier in 1834 and refers to a phenomenon in which, when two different metals are joined and then a current is applied, an exothermic reaction occurs at one side and a cooling reaction occurs at the other side depending on a direction of the current. The Peltier element is an element that causes the Peltier effect. Although the Peltier element was initially formed with an alloy of different metals such as bismuth and antimony, the Peltier element has recently been manufactured by a method in which an N type and P type semiconductor is arranged between two metal plates to have higher thermoelectric efficiency.

Because heat generation and heat absorption are immediately induced in metal plates at both sides of the Peltier element when a current is applied thereto, the heat generation and the heat absorption may be switched according to a direction of the current, and an extent of the heat generation or the heat absorption may be relatively precisely adjusted according to the amount of the current, and the Peltier element is appropriate to be used in the exothermic operation or the endothermic operation for thermal feedback. Particularly, as a flexible thermoelement has recently been developed, the heat output module 31640 may be manufactured in the form that is easy to come into contact with a user's body, and commercial usability of the feedback device 31600 is enhanced.

Accordingly, as electricity is applied to the above-described thermoelectric element, the heat output module 31640 may perform the exothermic operation or the endothermic operation. In terms of physics, an exothermic reaction and an endothermic reaction simultaneously occur in a thermoelectric element that has received electricity. However, in the present specification, an operation of the heat output module 31640 in which a surface in contact with a user's body generates heat will be defined as the exothermic operation, and an operation of the heat output module 31640 in which the surface absorbs heat will be defined as the endothermic operation. For example, the thermoelectric element may be configured by disposing an N type and P type semiconductor on a substrate 31642. Here, when a current is applied, heat generation occurs at one side and heat absorption occurs at the other side. Here, when a side surface toward the user's body is referred to as a front surface and a surface opposite the front surface is referred to as a rear surface, an operation of the heat output module 31640 in which heat generation occurs at the front surface and heat absorption occurs at the rear surface may be defined as the exothermic operation, and, conversely, an operation of the heat output module 31640 in which heat absorption occurs at the front surface and heat generation occurs at the rear surface may be defined as the endothermic operation.

Because the thermoelectric effect is induced by a charge flowing in the thermoelectric element, electricity that induces the exothermic operation or the endothermic operation of the heat output module 31640 may be described in terms of a current. However, in the present specification, for convenience of description, the electricity will be collectively described in terms of a voltage. However, this is merely for convenience of description, and inventive thinking is not required for one of ordinary skill in the art to which the present invention pertains (hereinafter referred to as "person skill in the art") to alter the description in terms of a voltage into description in terms of a current to interpret the description in terms of a current. Therefore, the present invention should not be limitedly interpreted in terms of a voltage.

2.2. Configuration of Heat Output Module

Figure 80:
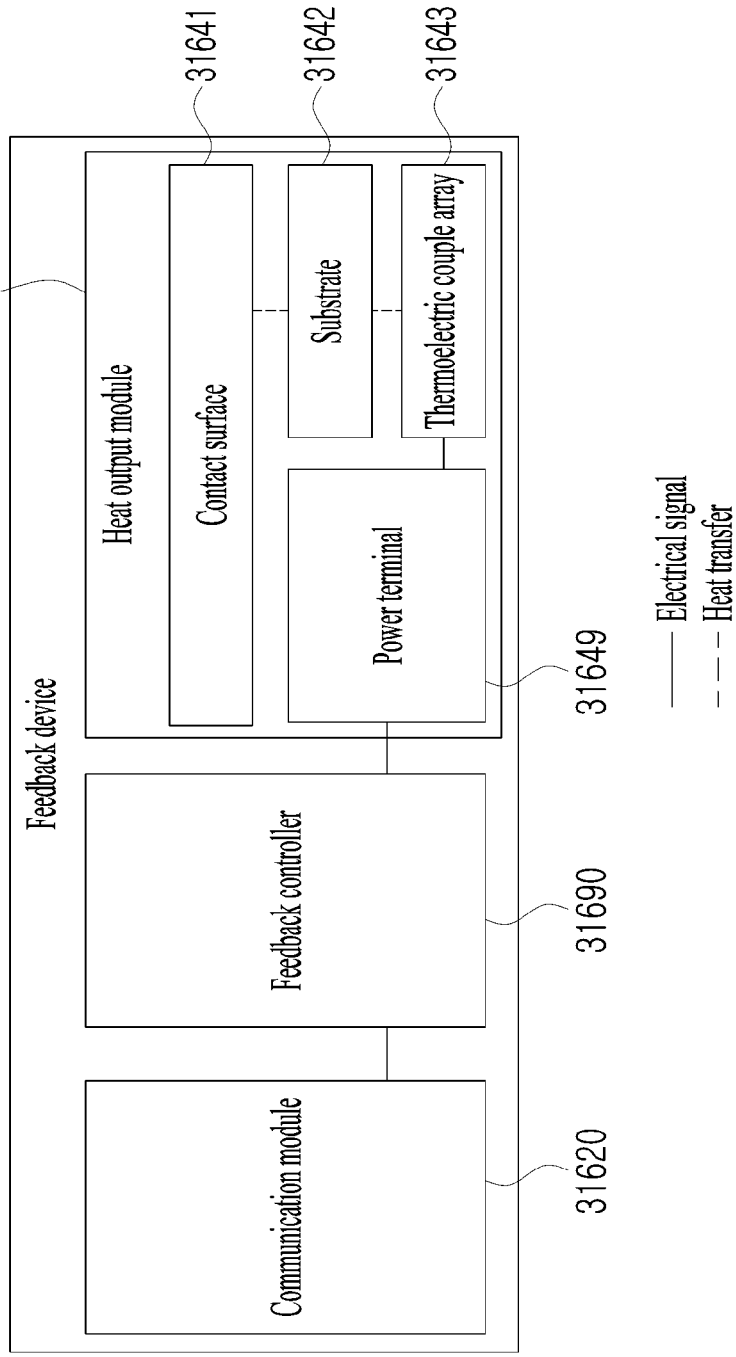
FIG. 80 is a block diagram related to a configuration of the feedback device according to an embodiment of the present invention.

FIG. 80 is a block diagram related to a configuration of the feedback device according to an embodiment of the present invention.

Referring to FIG. 80, a feedback device 31600 includes a communication module 31620, a feedback controller 31690, and a heat output module 31640.

According to an embodiment of the present invention, the feedback controller 31690 may be a configuration differentiated from the heat output module 31640 or may also be included in the heat output module 31640. Also, embodiments are not limited thereto, and when the feedback controller 31690 is present outside the heat output module 31640, a feedback controller separate from the feedback controller 31690 may be present inside the heat output module 31640. In the present specification, for convenience of description, description will be given by assuming that the feedback controller 31690 is a configuration differentiated from the heat output module 31640.

The heat output module 31640 may include a contact surface 31641, a substrate 31642, a thermoelectric couple array 31643 disposed on the substrate 31642, and a power terminal 31649 applying power to the heat output module 31640.

The contact surface 31641 directly comes into contact with a user's body and transfers hot heat or cold heat generated in the heat output module 31640 to the user's skin. In other words, a portion of an outer surface of the feedback device 31600 directly coming into contact with the user's body may be the contact surface 31641.

Figure 81:
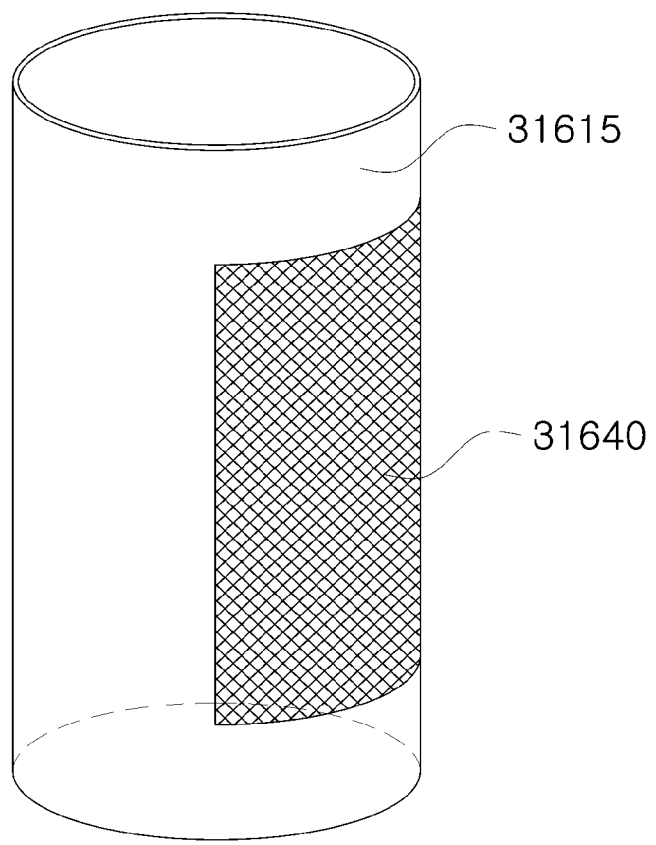
FIG. 81 is a view for describing arrangement of a contact surface according to an embodiment of the present invention.

For example, FIG. 81 is a view for describing arrangement of a contact surface according to an embodiment of the present invention. Referring to FIG. 81, the contact surface 31641 may be formed on at least a portion of the body portion 31615 of the feedback device 31600. For example, the contact surface 31641 may be formed at a grip portion of the body portion 31615 gripped by a user. However, embodiments are not limited thereto, and the contact surface 31641 may also be formed at the entire body portion 31615.

In an embodiment, the contact surface 31641 may be provided as a layer which is directly or indirectly attached to an outer surface of a thermoelectric couple array 31643 (toward the user's body) performing the exothermic operation or the endothermic operation in the heat output module 31640. The contract surface 31641 having such a form may be disposed between the thermoelectric couple array 31643 and the user's skin to perform heat transfer. To this end, the contact surface 31641 may be formed with a material with high thermal conductivity so that heat transfer is well-performed from the thermoelectric couple array 31643 to the user's body. The layer type contact surface 31641 also serves to protect the thermoelectric couple array 31643 from an external impact by preventing the thermoelectric couple array 31643 from being directly exposed to the outside.

Meanwhile, although the contact surface 31641 has been described above as being a separate configuration disposed at the outer surface of the thermoelectric couple array 31643, to the contrary, the outer surface itself of the thermoelectric couple array 31643 may also be the contact surface 31641. In other words, a portion of a front surface of the thermoelectric couple array 31643 or the entire front surface thereof may be the contact surface 31641.

The substrate 31642 serves to support a unit thermoelectric couple 31645 and is formed of an insulating material. For example, ceramic may be selected as a material of the substrate 31642. The substrate 31642 may also be formed in the shape of a flat plate, but embodiments are not necessarily limited thereto.

The substrate 31642 may be formed of a flexible material having flexibility that may be universally used for various types of feedback devices 31600 having various shapes of contact surfaces 31641. For example, in a gaming controller type feedback device 31600, a portion of the gaming controller gripped by the user's palm mostly has a curved shape, and in order to use the heat output module 31640 at such a curved portion, it may be important that the heat output module 31640 has flexibility. Examples of flexible materials used for the substrate 31642 may include glass fiber, flexible plastic, or the like.

The thermoelectric couple array 31643 is formed of a plurality of unit thermoelectric couples 31645 disposed on the substrate 31642. Although a pair of different metals (for example, bismuth and antimony) may be used as the unit thermoelectric couple 31645, a pair of N type and P type semiconductors may mostly be used.

Semiconductors constituting a semiconductor couple are electrically connected to each other at one end of the unit thermoelectric couple 31645, and the unit thermoelectric couple 31645 is electrically connected to another unit thermoelectric couple 31645 at the other end of the unit thermoelectric couple 31645. An electrical connection between semiconductors 31645a and 31645b constituting a semiconductor couple or with an adjacent semiconductor may be performed by a conductor member 31646 disposed on the substrate 31642. The conductor member 31646 may be a lead wire or an electrode formed of copper, silver, or the like.

The electrical connection between the unit thermoelectric couples 31645 may be mostly performed by serial connection, the serially connected unit thermoelectric couples 31645 may form a thermoelectric couple group 31644, and the thermoelectric couple group 31644 may form the thermoelectric couple array 31643.

The power terminal 31649 may apply power to the heat output module 31640. The thermoelectric couple array 31643 may generate heat or absorb heat according to a voltage value or a direction of a current of power applied to the power terminal 31649. More specifically, two power terminals 31649 may be connected to a single thermoelectric couple group 31644. Consequently, when a plurality of thermoelectric couple groups 31644 are present, two power terminals 31649 may be disposed for each of the thermoelectric couple groups 31644. According to such a connection method, a voltage value or a direction of a current may be separately controlled for each of the thermoelectric couple groups 31644, and whether to perform heat generation or heat absorption and an extent thereof may be adjusted.

As will be described below, the power terminal 31649 receives an electrical signal output by the feedback controller 31690, and accordingly, as a result, the feedback controller 31690 may adjust a direction or magnitude of the electrical signal and control the exothermic operation and the endothermic operation of the heat output module 31640. Also, when the plurality of thermoelectric couple groups 31644 are present, an electrical signal applied to each power terminal 31649 may be separately adjusted for each thermoelectric couple group 31644.

The feedback controller 31690 may apply an electrical signal to the thermoelectric couple array 31643 through the power terminal 31649. Specifically, the feedback controller 31690 may receive information on thermal feedback from the controller 31290 of the mobile device 31200 through the communication module 31620, interpret the information on thermal feedback to determine a type or an intensity of the thermal feedback, generate an electrical signal according to a result of the determination, and apply the generated electrical signal to the power terminal 31649 so that the thermoelectric couple array 31643 may output the thermal feedback.

To this end, the feedback controller 31690 may compute and process various pieces of information, output an electrical signal to the thermoelectric couple array 31643 according to a result of processing, and control an operation of the thermoelectric couple array 31643. Therefore, the feedback controller 31690 may be implemented with a computer or an apparatus similar thereto according to hardware, software, or a combination thereof. The feedback controller 31690 may be provided in the form of an electronic circuit that processes an electrical signal and performs a control function in terms of hardware and may be provided in the form of a program or code for driving a hardware circuit in terms of software.

The above-described heat output module 31640 may also be provided in plural in the feedback device 31600. For example, when the feedback device 31600 has a plurality of grip portions 31616-4 as illustrated in FIG. 75, the heat output module 31640 may be mounted for each grip portion 31616-4 of the feedback device 31600.

When the plurality of heat output modules 31640 are provided in a single feedback device 31600 in this way, the feedback controller 31690 may collectively manage all of the heat output modules 31640, or the feedback controller 31690 may be provided for each of the heat output modules 31640. Also, when the feedback device 31600 is provided in plural in the thermal experience providing system 1000 as illustrated in FIG. 76, a single heat output module 31640 or a plurality of heat output modules 31640 may be disposed in each feedback device 31600.

2.3. Form of Heat Output Module

Some typical forms of the heat output module 31640 will be described on the basis of the above-described configuration of the heat output module 31640.

Figure 82:
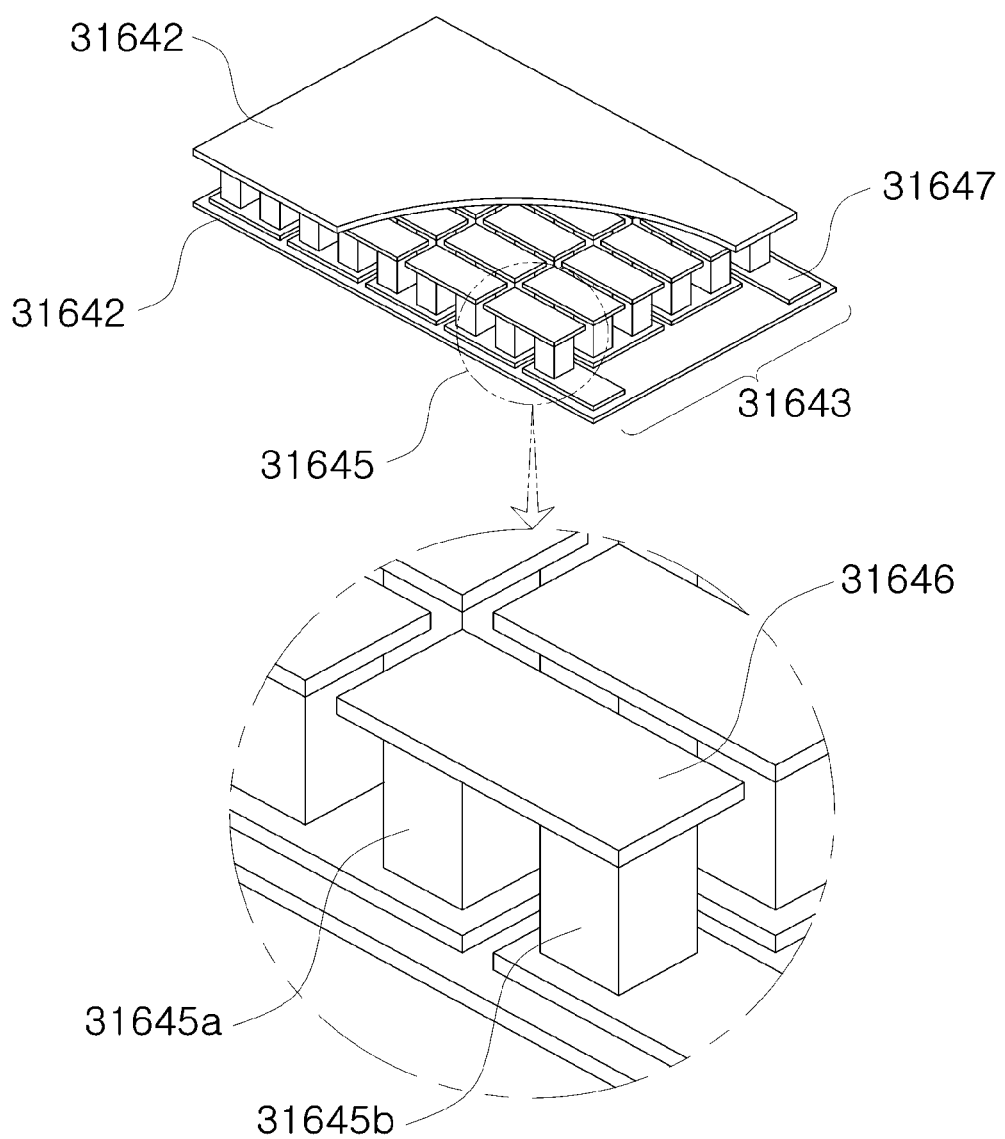
FIG. 82 is a view related to a form of a heat output module according to an embodiment of the present invention.

FIG. 82 is a view related to a form of a heat output module according to an embodiment of the present invention.

Referring to FIG. 82, in one form of the heat output module 31640, a pair of substrates 31642 are provided to face each other. The contact surface 31641 may be disposed at an outer side of one of the two substrates 31642 and transfer heat generated by the heat output module 31640 to the user's body. Also, when a flexible substrate 31642 is used as the substrate 31642, flexibility may be imparted to the heat output module 31640.

The plurality of unit thermoelectric couples 31645 are located between the substrates 31642. Each of the unit thermoelectric couples 31645 includes a semiconductor couple that consists of an N-type semiconductor and a P-type semiconductor. In each of the unit thermoelectric couples 31645, one ends of the N-type semiconductor and the P-type semiconductor are electrically connected to each other by the conductor member 31646. Also, unit elements are electrically connected by a method in which the other ends of an N-type semiconductor and a P-type semiconductor of any unit thermoelectric couple 31645 are connected to the other ends of a P-type semiconductor and an N-type semiconductor of an adjacent unit thermoelectric couple 31645 by the conductor member 31646. Accordingly, the connected unit elements are serially connected and form a single thermoelectric couple group 31644. In the present form, because an entire thermoelectric couple array 31643 is formed of a single thermoelectric couple group 31644, and because the entirety of the unit thermoelectric couples 31645 are serially connected between the power terminals 31649, the heat output module 31640 performs the same operation throughout front surfaces of the entire unit thermoelectric couples 31645. That is, the heat output module 31640 may perform the exothermic operation when power is applied to the power terminal 31649 in one direction and may perform the endothermic operation when power is applied to the power terminal 31649 in the other direction.

Figure 83:
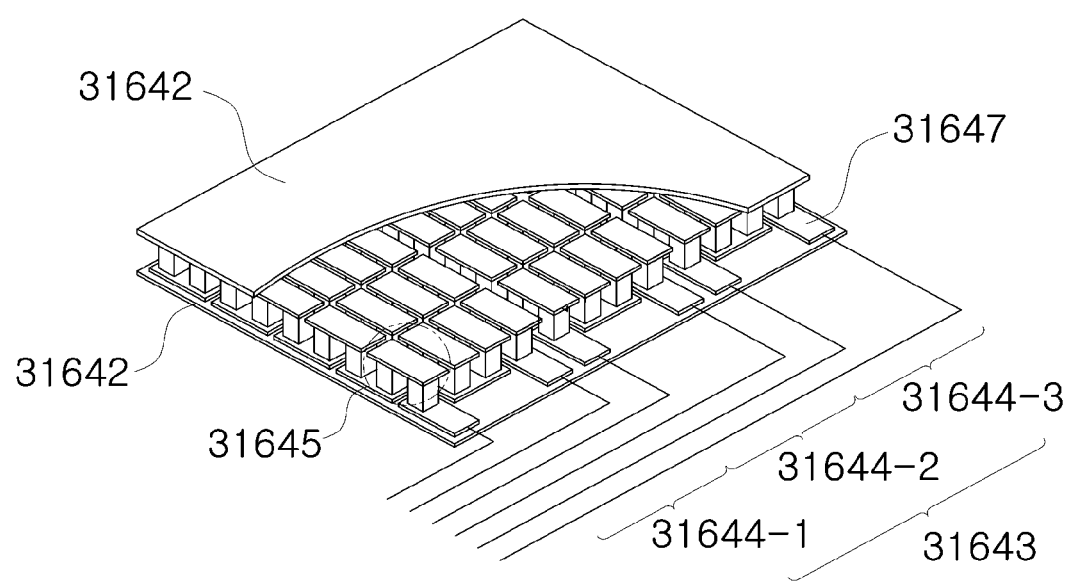
FIG. 83 is a view related to another form of the heat output module according to an embodiment of the present invention.

FIG. 83 is a view related to another form of the heat output module according to an embodiment of the present invention.

Referring to FIG. 83, the other form of the heat output module 31640 is similar to the above-described form. However, in the present form, the thermoelectric couple array 31643 has a plurality of thermoelectric couple groups 31644, and each of the thermoelectric couple groups 31644 is connected to one of the power terminals 31649. Accordingly, each of the thermoelectric couple groups 31644 may be separately controlled. For example, in FIG. 33, currents in different directions may be applied to a first thermoelectric couple group 31644-1 and a second thermoelectric couple group 31644-2 so that the first thermoelectric couple group 31644-1 performs the exothermic operation (here, a direction of a current is "forward direction"), and the second thermoelectric couple group 31644-2 performs the endothermic operation (here, a direction of a current is "reverse direction"). As another example, different voltage values may be applied to a power terminal of the first thermoelectric couple group 31644-1 and a power terminal of the second thermoelectric couple group 31644-2 so that the first thermoelectric couple group 31644-1 and the second thermoelectric couple group 31644-2 perform the exothermic operation and the endothermic operation to different extents.

Meanwhile, although the thermoelectric couple groups 31644 are illustrated in FIG. 83 as being arranged in a one-dimensional array in the thermoelectric couple array 31643, to the contrary, the thermoelectric couple groups 31644 may also be arranged in a two-dimensional array. Meanwhile, although the above-described forms of the heat output module 32640 have been described as using the pair of substrates 31642 facing each other, to the contrary, only a single substrate 31642 may also be used.

The above-described various forms of the heat output module 31640 may be combined or modified by a person skilled in the art within the self-evident scope. For example, although the contact surface 31641 has been described as being formed as a separate layer from the heat output module 31640 at the front surface of the heat output module 31640 in each of the forms of the heat output module 31640, the front surface itself of the heat output module 31640 may be the contact surface 31641. For example, in one form of the above-described heat output module 31640, an outer surface of the substrate 31642 may be the contact surface 31641.

2.4. Heat Dissipating Member

Figure 84:
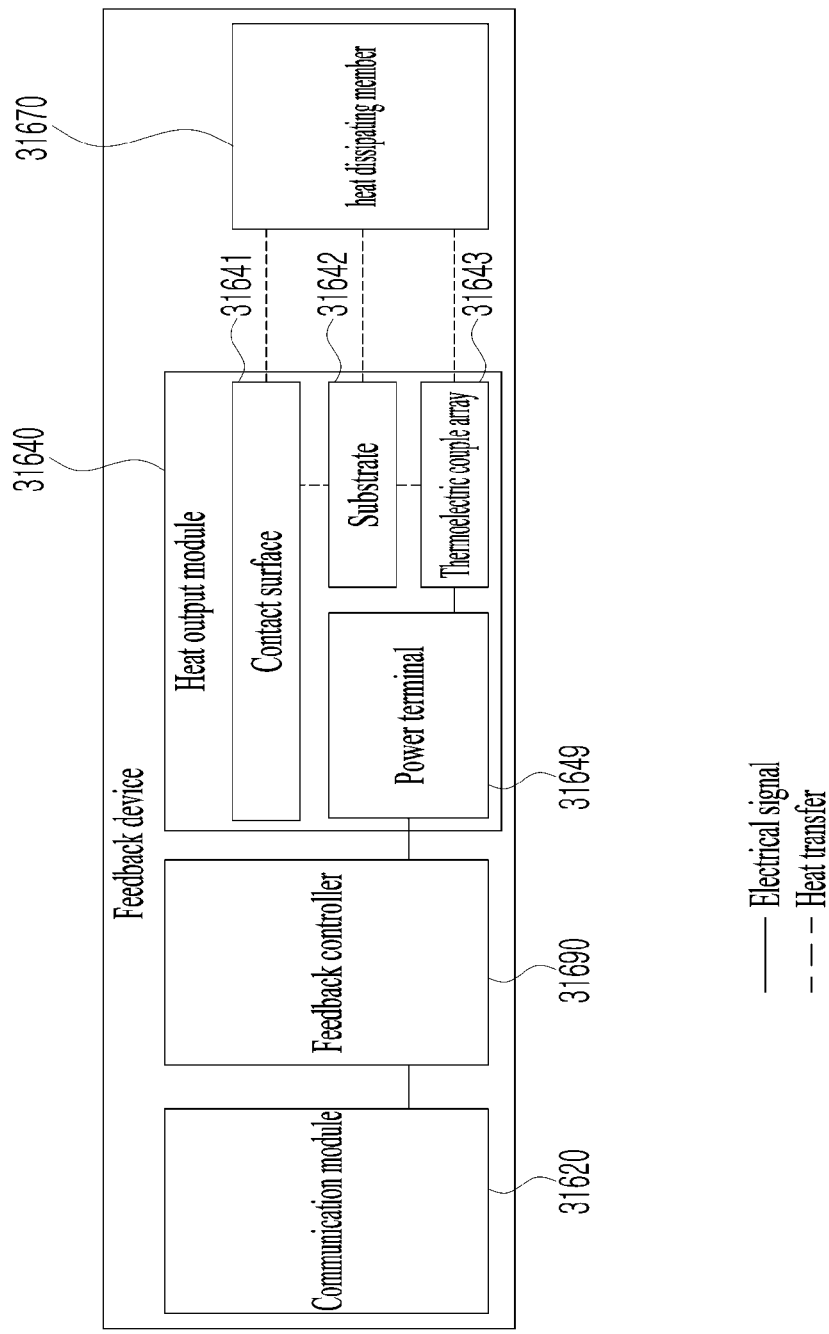
FIG. 84 is a block diagram related to a configuration of a feedback device according to another embodiment of the present invention.

FIG. 84 is a block diagram related to a configuration of a feedback device according to another embodiment of the present invention.

Referring to FIG. 84, a feedback device 31600 includes a communication module 31620, a feedback controller 31690, a heat output module 31640, and a heat dissipating member 31670. Since description given above with reference to FIG. 80 may be applied as it is to the communication module 31620, the feedback controller 31690, and the heat output module 31640, further details thereof will be omitted.

The heat dissipating member 31670 is included in the heat dissipating portion described above with reference to FIGS. 70 to 74. The heat dissipating member 31670 may receive waste heat generated in the heat output module 31640, for example, in the contact surface 31641, the substrate 31642, and the thermoelectric couple array 31643, due to output of thermal feedback and may dissipate the waste heat to outside the feedback device 31600. Here, the term waste heat may refer to residual heat excluding heat used in providing a thermal experience to the user from the heat generated by the feedback device 31600. For example, in the case in which the heat output module 31640 performs the endothermic operation, when a side surface toward the user's body is referred to as a front surface and a surface opposite the front surface is referred to as a rear surface, heat absorption occurs at the front surface and heat generation occurs at the rear surface in the heat output module 31640. In this case, heat generated at the rear surface should not be transferred to the user. When the heat is transferred to the user, the heat degrades a thermal experience of the user. Also, configurations included in the feedback device 31600 may be deteriorated due to the heat generated at the rear surface. Therefore, heat generated at the rear surface during the endothermic operation may become waste heat. As another example, when the heat output module 31640 performs the exothermic operation, heat generation occurs at the front surface, and the heat generated at the front surface is used in a thermal experience of the user. However, residual heat may be generated at the front surface even after the exothermic operation has stopped, and such residual heat degrades the thermal experience of the user. Therefore, the residual heat at the front surface during the exothermic operation may also become waste heat. In addition, any heat degrading the thermal experience of the user from the heat generated by the feedback device 31600 may become waste heat.

In an embodiment, the heat dissipating member 31670 may be disposed in the heat dissipating portion of the casing 31610. Accordingly, waste heat generated in the heat output module 31640 may be discharged to the heat dissipating portion of the casing 31610 via the heat dissipating member 31670. In an embodiment, a heat transfer member may connect the heat output module 31640 and the heat dissipating member 31670. In this case, the heat transfer member may transfer the waste heat generated in the heat output module to the heat dissipating member 31670. An example of the heat transfer member includes a heat pipe. Of course, the heat transfer member is not limited to the heat pipe, and the heat transfer member may include any configuration capable of transferring heat.

In addition, the heat dissipating member 31670 may be the heat dissipating portion itself of the casing 31610. For example, a cavity portion may be formed in the heat dissipating portion of the casing 31610, and waste heat may be dissipated to the outside through the cavity portion of the heat dissipating portion.

FIG. 85 is a schematic diagram of an implementation of a heat dissipating member according to an embodiment of the present invention.

For convenience of description, the heat dissipating member 31670 disposed in the heat dissipating portion 31618-1 of the feedback device 31600-3 of FIG. 74 will be described with reference to FIG. 85. However, the structure and form of the heat dissipating member 31670 are not limited thereto, and when the heat dissipating member 31670 is applied to a feedback device having a different shape, the structure and form of the heat dissipating member may be appropriately changed.

FIGS. 85A and 85B illustrate cross-sectional views taken along line B-B' of the feedback device 31600-3 of FIG. 74.

In FIG. 85A, a cavity portion 31671 including at least one hollow may be formed at a lower surface of the body portion 31615. In this case, the heat dissipating member 31670 may be a region including the cavity portion 31671 in the casing 31610, and waste heat generated in the heat output module 31640 may be discharged through the cavity portion 31671.

In FIG. 85B, the heat dissipating member 31670 may include a heat dissipating sheet 31672. For example, the heat dissipating sheet 31672 may be a polyimide (PI) film. The heat dissipating sheet 31672 may be disposed inside the body portion 31615, and waste heat generated in the heat output module 31640 may be transferred to the heat dissipating sheet 31672. For example, a heat transfer module may be disposed between the heat output module 31640 and the heat dissipating sheet 31672, and waste heat may be transferred from the heat output module 31640 to the heat dissipating sheet 31672 through a heat transfer module. The heat dissipating sheet 31672 may dissipate the received waste heat to the outside via the body portion 31615.

In FIG. 85C, the heat dissipating member 31670 may include a heat dissipating fan 31673. The heat dissipating fan 31673 may dissipate waste heat to the outside by circulating air. In this case, when a cavity portion is formed in the body portion 31615, waste heat may be discharged to the cavity portion by the heat dissipating fan 31673. Also, power for driving the heat dissipating fan 31673 may be applied to the heat dissipating fan 31673.

In FIG. 85D, the heat dissipating member 31670 may include a heat dissipating fin 31674. Due to its shape, the heat dissipating fin 31674 may have a wide heat exchange area, and because of this, convection heat dissipation efficiency may be increased. Therefore, waste heat generated in the heat output module 31640 may be dissipated through the wide heat exchange area of the heat dissipating fin 31674. Also, a cavity portion may be formed in the body portion 31615, and the heat dissipating fin 31674 may be disposed on the cavity portion. Accordingly, waste heat may be discharged to the cavity portion by the heat dissipating fin 31674.

3. Thermal Experience Providing Method

Hereinafter, a thermal experience providing method according to an embodiment of the present invention will be described. In the following description, the thermal experience providing method according to an embodiment of the present invention will be described by referring to thermal feedback providing operations by the above-described thermal experience providing system 1000 and the heat output module 31640. However, this is merely for convenience of description, and the thermal experience providing method according to an embodiment of the present invention is not limited thereto.

3.1. Outline of Thermal Experience Providing Method

Figure 86:
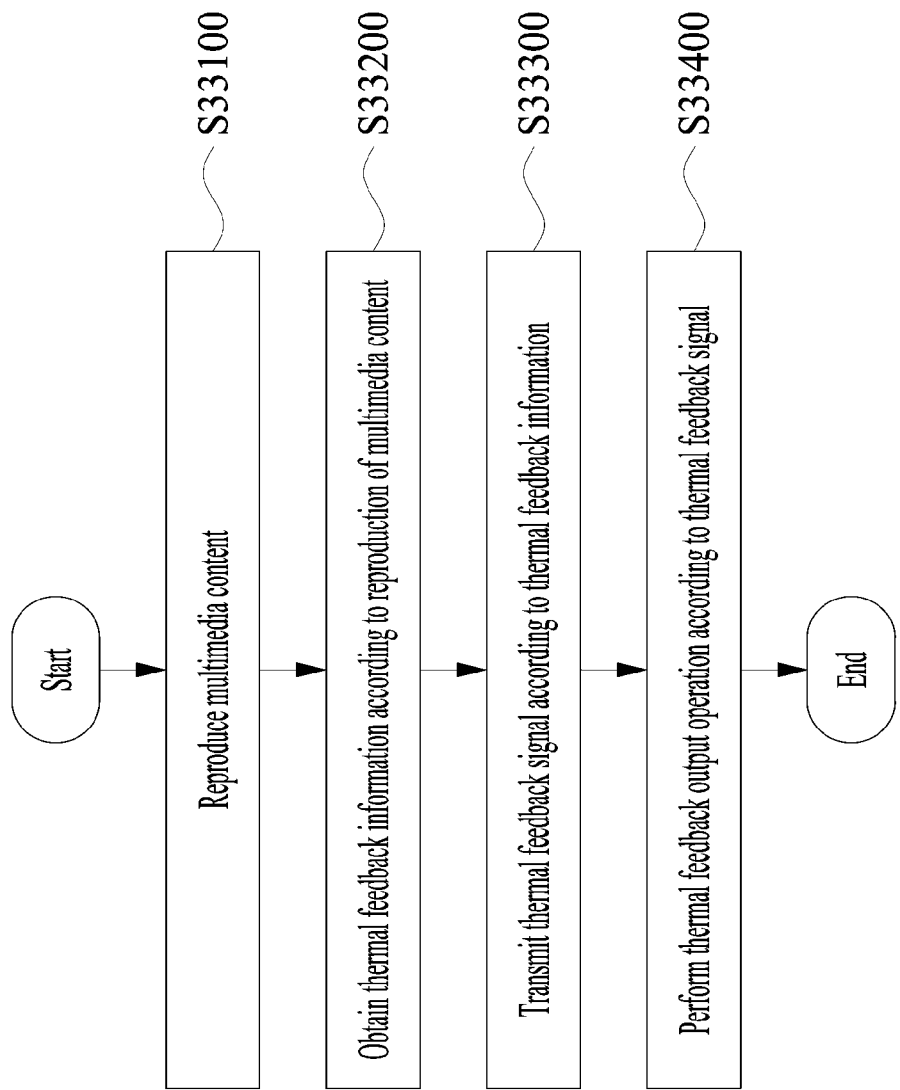
FIG. 86 is a basic flowchart of a method of providing a thermal experience according to an embodiment of the present invention.

FIG. 86 is a basic flowchart of a method of providing a thermal experience according to an embodiment of the present invention.

Referring to FIG. 86, the thermal experience providing method according to an embodiment of the present invention may include reproducing, by a mobile device 31200, multimedia content (S33100), obtaining, by the mobile device 31200, thermal feedback information according to the reproduction of the multimedia content (S33200), transmitting, by the mobile device 31200, a thermal feedback signal to a feedback device 31600 according to the thermal feedback information (S33300), and performing, by the feedback device 31600, a thermal feedback output operation according to the thermal feedback signal (S33400). The above-listed steps will be described below.

First, the mobile device 31200 may reproduce multimedia content (S33100).

The multimedia content may be a video, a game, a VR application, an AR application, an experiencing application, an object recognition application, and the like. The controller 31290 of the mobile device 31200 may load multimedia content stored in the memory 31220 from the memory 31220 or receive multimedia content through the communication module 31210 and reproduce the multimedia content.

For example, the controller 31290 of the mobile device 31200 may reproduce multimedia content such as a game or a movie file stored in the memory 31220. As another example, the mobile device 31200 may receive multimedia content from the Internet through the communication module 31210 by using a downloading or streaming method and reproduce the multimedia content.

The mobile device 31200 may obtain thermal feedback information according to the reproduction of the multimedia content (S33200).

An algorithm for processing thermal feedback data or thermal data may be included in the multimedia content. The controller 31290 of the mobile device 31200 may decode thermal feedback data or perform a thermal feedback processing algorithm according to reproduction of the multimedia content and, as a result, may obtain thermal feedback information.

Here, the thermal feedback information may include at least one of pieces of information on a target of thermal feedback, a type of thermal feedback, an intensity of thermal feedback, and a thermal feedback providing time.

The target of thermal feedback may refer to a target to which the thermal feedback will be applied. For example, a target of thermal feedback may indicate a target on which thermal feedback will be performed when a plurality of feedback devices 31600 are used in the thermal experience providing system 1000, when a plurality of heat output modules 31640 are present in the feedback device 31600, or when the heat output module 31640 is controlled for each region.

The type of thermal feedback may refer to a type of thermal feedback. For example, types of thermal feedback may include hot feedback, cold feedback, and thermal grill feedback. Also, the thermal grill feedback may include neutral thermal grill feedback, hot thermal grill feedback, and cold thermal grill feedback.

The intensity of thermal feedback may refer to a strength of thermal feedback. According to circumstances, an intensity of thermal feedback may include a type of thermal feedback. For example, intensities of thermal feedback may be classified into first to tenth levels, cold feedback may be assigned to the first to fifth levels, and hot feedback may be assigned to the sixth to tenth levels.

The thermal feedback providing time may refer to a time at which thermal feedback will be output. The thermal feedback providing time may include a start time, an end time, a duration time, and the like of thermal feedback output.

The mobile device 31200 may transmit a thermal feedback signal to the feedback device 31600 according to the thermal feedback information (S33300), and the feedback device 31600 may receive the thermal feedback signal and perform a thermal feedback output operation according to the received signal (S33400).

Specifically, the controller 31290 may generate the thermal feedback signal on the basis of the thermal feedback information and may transmit the thermal feedback signal to the feedback device 31600 through the communication module 31210. In a thermal experience providing system 1000 including a plurality of feedback devices 31600, the controller 31290 may also select, on the basis of thermal feedback target information, a feedback device 31600 to which the thermal feedback signal will be transmitted. The feedback controller 31690 may receive the thermal feedback signal through the communication module 31620 and may perform a thermal feedback output operation according to the thermal feedback signal.

The thermal feedback signal is a signal for controlling output of thermal feedback. The thermal feedback signal may include a thermal feedback start signal indicating a start of output of thermal feedback and a thermal feedback end signal indicating an end of output of thermal feedback.

The controller 31290 of the mobile device 31200 may transmit the start signal through the communication module 31210, and the feedback controller 31690 of the feedback device 31600 may receive the start signal through the communication module 31620. Upon the reception of the start signal by the feedback device 31600, the feedback controller 31690 may apply power to a thermoelectric couple array 31643 according to the start signal so that the thermoelectric couple array 31643 may perform a thermal feedback output operation.

The controller 31290 of the mobile device 31200 may transmit the end signal through the communication module 31210, and the feedback controller 31690 of the feedback device 31600 may receive the end signal through the communication module 31620. Upon the reception of the end signal by the feedback device 31600, the feedback controller 31690 may cut off power to the thermoelectric couple array 31643 according to the end signal so that the thermoelectric couple array 31643 may stop the thermal feedback output operation.

The performing of the thermal feedback output operation of step S33400 will be described in more detail with reference to FIG. 87.

Figure 87:
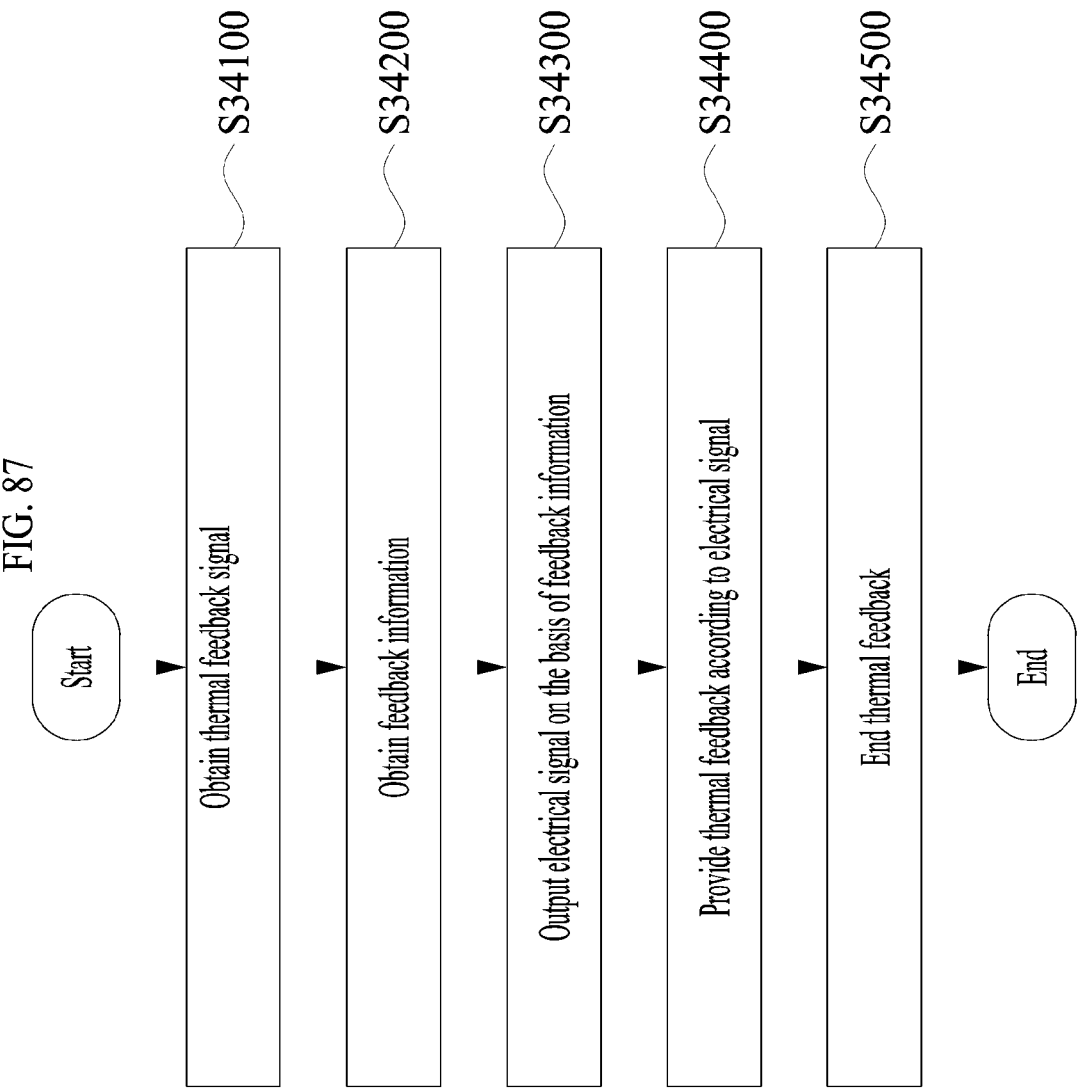
FIG. 87 is a flowchart related to a method of outputting thermal feedback according to an embodiment of the present invention.

FIG. 87 is a flowchart related to a thermal feedback outputting method according to an embodiment of the present invention.

The thermal feedback outputting method according to FIG. 87 is a method carried out by the feedback device 31600 of starting and ending thermal feedback and may include obtaining a thermal feedback signal (S34100), obtaining feedback information (S34200), outputting an electrical signal on the basis of the feedback information (S34300), providing thermal feedback according to the electrical signal (S34400), and ending the thermal feedback according to a feedback ending message (S34500).

Hereinafter, each of the above-listed steps will be described in more detail.

First, the feedback controller 31690 of the feedback device 31600 may obtain a thermal feedback signal (S34100). As described above in relation to step S33300 of FIG. 86, the feedback controller 31690 may obtain a thermal feedback signal from the mobile device 31200 through the communication module 31620.

When the thermal feedback signal is obtained, the feedback controller 31690 may obtain feedback information (S34200). Here, the feedback information may include pieces of information on a type of thermal feedback, an intensity of thermal feedback, and time during which thermal feedback is applied. Although such pieces of information may directly include data related to a type, an intensity, and time of thermal feedback, to the contrary, such pieces of information may also indirectly include the data related to the type, intensity, and time of the thermal feedback.

For example, a thermal feedback signal may include feedback information.

As another example, feedback information may be stored in the memory 31685, and a thermal feedback signal may, instead of directly including the feedback information, include an identifier for obtaining the feedback information stored in the memory 31685. For example, the feedback controller 31690 may extract the identifier from the received thermal feedback signal and may obtain, from the extracted identifier, feedback information corresponding to the received thermal feedback signal from a feedback information table stored in the memory 31685.

As another example, a thermal feedback signal may simply request for a start of thermal feedback, and, according to the thermal feedback signal, the feedback controller 31690 may load and obtain pre-stored feedback information from the memory 31685.

Next, the feedback controller 31690 may output an electrical signal on the basis of the feedback information (S34300). The feedback controller 31690 may generate an electrical signal to be applied to the heat output module 31640 on the basis of the feedback information.

The feedback controller 31690 may determine, on the basis of a type of thermal feedback, a direction of a voltage of the electrical signal to be applied. For example, the feedback controller 31690 may determine that a voltage to be applied is a forward voltage when thermal feedback is hot feedback, determine that the voltage is a reverse voltage when thermal feedback is cold feedback, and determine to apply a forward voltage and a reverse voltage simultaneously or by performing time division when the thermal feedback is thermal grill feedback.

Also, the feedback controller 31690 may determine a magnitude of a voltage to be applied on the basis of an intensity of thermal feedback. A voltage table related to magnitudes of voltages for each intensity of thermal feedback may be stored in the memory 31685. The feedback controller 31690 may determine the magnitude of the voltage to be applied on the basis of the intensity of thermal feedback by referring to the voltage table. Meanwhile, since an intensity of a voltage to be applied may vary according to a type of thermal feedback, when referring to the voltage table, the feedback controller 31690 may also take into consideration the type of thermal feedback.

In addition, the feedback controller 31690 may determine a period of time for applying a voltage on the basis of information on a time during which thermal feedback will be applied.

When a direction, magnitude, and application time of a voltage are set, the feedback controller 31690 may apply an electrical signal corresponding to a result of setting to the heat output module 31640.

The heat output module 31640 may receive the electrical signal through the power terminal 31649, and accordingly, the thermoelectric couple array 31643 may perform the exothermic operation, the endothermic operation, or the thermal grill operation (S34400). Accordingly, the feedback device 31600 may output thermal feedback and provide the thermal feedback to the user.

Lastly, the feedback controller 31690 may obtain a feedback ending message and end thermal feedback (S34500). The feedback ending message indicates an end of feedback. The feedback device 31600 may obtain the feedback ending message by using a method similar to that in which the thermal feedback signal is obtained. When the feedback ending message is received, the feedback device 31600 may stop an operation related to thermal feedback that has been performed. However, the feedback ending message is not necessarily required to end the operation related to thermal feedback. For example, when feedback information includes information on a time during which thermal feedback will be applied, the feedback device 31600 may apply thermal feedback for the corresponding time and then stop an operation related to the thermal feedback to end the thermal feedback.

Meanwhile, the feedback controller 31690 of the feedback device 31600 may transmit a thermal feedback report signal reporting an operational state of the heat output module 31640 to the mobile device 31200 through the communication module 31620. The feedback device 31600 may transmit the report signal to the mobile device 31200 periodically or as a response to receiving a thermal feedback signal. The thermal feedback report signal may include information on whether thermal feedback is output, a type or an intensity of thermal feedback being output, a temperature of the contact surface 31641, biological information of the user sensed by a sensing module, whether an error has occurred, the state-of-charge of a battery, and the like.

3.2. Application of Thermal Experience Providing Method

Conventionally, contents such as games and movies have been experienced according to audiovisual expression methods provided by video or audio. Also, in order to improve immersion into content, a tactile experience, which is represented by vibration feedback, and an olfactory experience using scent have supported the conventional audiovisual expression methods. Furthermore, in recent years, solutions which enable users to have a full range of user experiences, such as virtual reality (VR) and augmented reality (AR), have been developed.

In enabling users to experience content, the thermal experience providing system 1000 may implement thermal reality (TR) by outputting thermal feedback in sync with various situations provided using the above-described conventional methods so that a user experience is further enhanced for various contents.

In relation to this, when the above-described thermal experience providing method is used, by causing the feedback device 31600 to output thermal feedback through a thermal feedback signal according to reproduction of multimedia content by a content reproduction device, the thermal experience providing system 1000 may provide a thermal experience to users.

Therefore, the thermal experience providing method may be applied to various technical fields where a user experience is required. Hereinafter, some typical technical fields in which the thermal experience providing system 1000 and the thermal experience providing method may be utilized will be briefly described below.

3.2.1. Virtual Reality (VR)

Virtual reality is a typical example of a field in which the thermal experience providing system 1000 may be utilized.

Virtual reality refers to creating a virtual environment or situation so that the user feels as if he or she is actually in a virtual space. Generally, virtual reality is implemented using a head mounted display (HMD) on the basis of a three-dimensional video which dynamically changes according to the user's line of sight. Virtual reality has been actively developed for purposes of supporting education and business as well as various games and movies.

Particularly, with the recent development of smart devices and subsequent launch of VR devices after the launch of Samsung Electronics' Gear VR™, the virtual reality market is expected to grow in the future.

The thermal experience providing system 1000 of the present invention may be embedded in such virtual reality applications, thereby adding a thermal sensation to the existing visual/auditory/tactile sense.

For example, the thermal experience providing system 1000 may implement thermal reality by assigning a temperature to a specific object disposed in a virtual space and providing hot feedback when an avatar, which is an alter ego of the user, touches the object, Similar to this, the thermal experience providing system 1000 may assign a suitable sense of temperature to a virtual space given as an environment such as desert or polar regions and output hot feedback or cold feedback to users according to the sense of temperature, thereby improving the user's immersion into the virtual reality.

3.2.2. Augmented Reality (AR)

Augmented reality is also a typical example of a field in which the thermal experience providing system 1000 is utilized.

Augmented reality refers to providing a virtual object by overlaying the virtual object on a real-world environment and is also referred to as mixed reality since a virtual environment is combined with the real-world environment.

Compared to the virtual reality immersing the user into a full virtual space, the augmented reality basically augments a virtual object or virtual additional information in a real-world environment. Therefore, the augmented reality is implemented using a method of augmenting a virtual image on a glass type transparent display which projects the reality as it is instead of completely blocking the user's field of view even when the HMD is used or using a method of composing a virtual image with a real image captured using a camera 31280 in real time.

Therefore, since, unlike the virtual reality technology, the augmented reality technology simultaneously provides the real-world environment and the virtual environment, the augmented reality technology has an advantage in that a user may be provided with a better sense of reality and interaction is possible with information present in the actual environment.

Various smart devices including Apple's iPhone™ are equipped with the augmented reality function, even though it is limited. In recent years, interest in augmented reality has been growing with the appearance of Microsoft's HMD type Hololens™, which operates as a standalone device.

The thermal experience providing system 1000 may support a conventional user experience mainly based on visual/auditory senses by providing a thermal sensation linked to such augmented reality applications.

For example, the thermal experience providing system 1000 may provide useful information to the user by outputting hot feedback as one augmentation element when a hot object enters within the user's field of view.

A thermal experience providing method using the augmented reality technology will be described in detail below.

Figure 88:
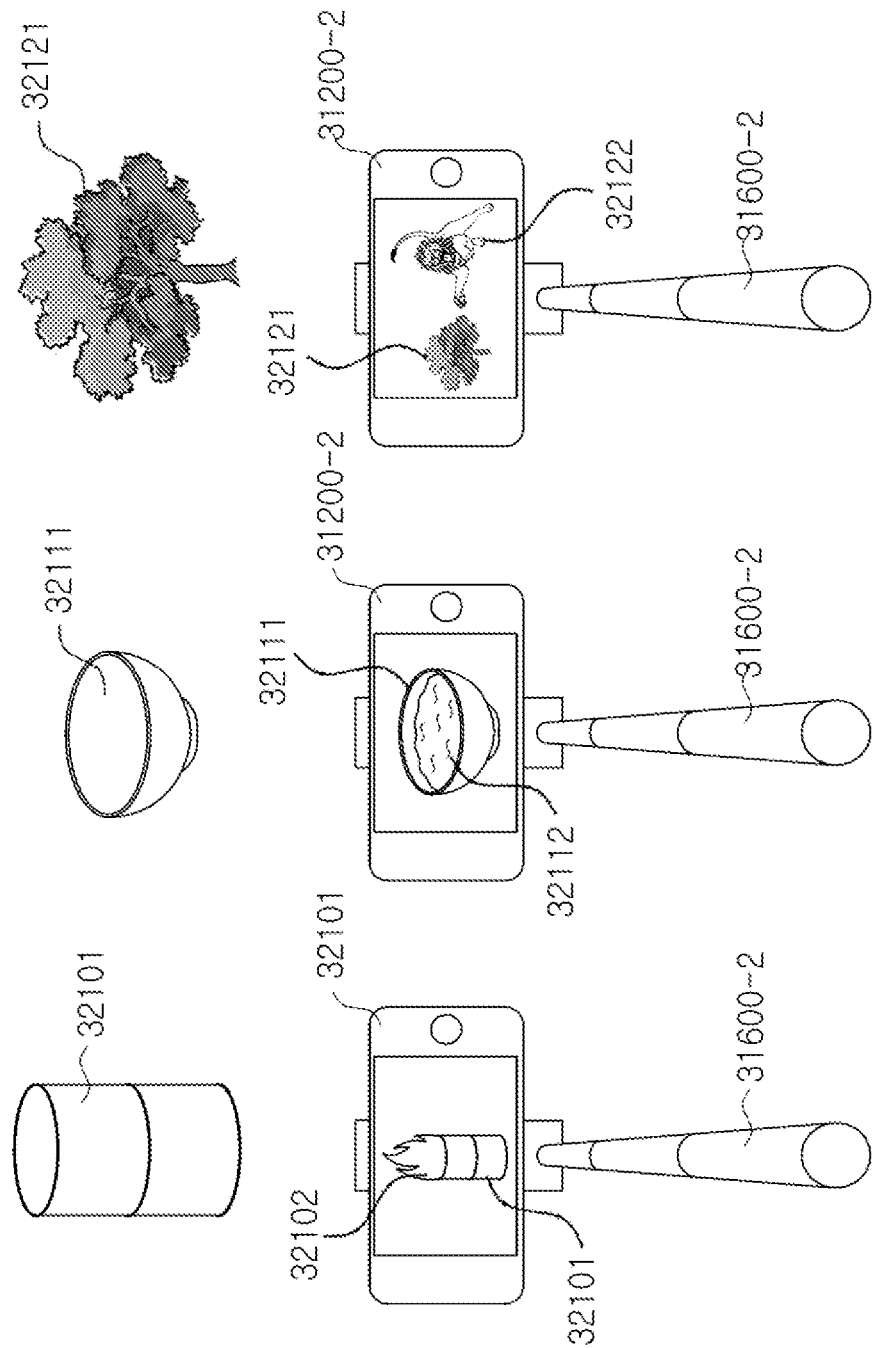
FIGS. 88A-88C are views for describing a method of providing a thermal experience using an augmented reality (AR) technology.

FIG. 88 is a view for describing a thermal experience providing method using the augmented reality technology.

In FIG. 88, provision of a thermal event by the feedback device 31600-2 when an augmented reality application is reproduced in the mobile device 31200-2 according to the example of FIG. 73 will be described.

Referring to FIG. 88, FIGS. 88A, 88B, and 88C show provision of a thermal event by the feedback device 31600-2 on which the mobile device 31200-2 is mounted. Hereinafter, a situation will be assumed in which a communication channel is established between the mobile device 31200-2 and the feedback device 31600-2, and an augmented reality application is driven in the mobile device 31200-2.

In FIGS. 88A, 88B, and 88C, a camera of the mobile device 31200-2 may capture objects 32101, 32111, and 32121, and a controller of the mobile device 31200-2 controls a video module 31241 to display the objects 32101, 32111, and 32121 on a display. Also, the controller of the mobile device 31200-2 generates virtual objects 32102, 32112, and 32122 related to the objects 32101, 32111, and 32121 according to driving of the augmented reality application and displays the virtual objects 32102, 32112, and 32122 together with the objects 32101, 32111, and 32121. In this case, the virtual object 32102 is in the form of fire and has a hot property, the virtual object 32112 is in the form of water and has a cold property, and the virtual object 32122 is in the form of a predatory animal and has a property of striking a blow.

In addition, the controller of the mobile device 31200-2 may obtain thermal feedback information on the virtual objects 32102, 32112, and 32122. In this case, for the virtual object 32102, a type of thermal feedback information may be determined as hot feedback according to the hot property; for the virtual object 32112, a type of thermal feedback information may be determined as cold feedback according to the cold property; and for the virtual object 32122, a type of thermal feedback information may be determined as thermal pain feedback according to the property of striking a blow. Also, an intensity of thermal feedback, a thermal feedback providing time, and the like may be determined by the augmented reality application.

The controller of the mobile device 31200-2 transmits a thermal feedback signal according to the thermal feedback information to the feedback device 31600-2.

The feedback controller of the feedback device 31600-2 receives the thermal feedback signal from the mobile device 31200-2, obtains feedback information from the thermal feedback signal, and outputs an electrical signal according to the feedback information. For example, the feedback controller of the feedback device 31600-2 may apply a forward voltage to a heat output module to provide hot feedback in the case of FIG. 88A, may apply a reverse voltage to the heat output module to provide cold feedback to the heat output module in the case of FIG. 88B, and may apply a forward voltage and a reverse voltage to the heat output module simultaneously or by performing time division to provide thermal pain feedback to the heat output module in the case of FIG. 88C. Also, a magnitude, an application time, or the like of an electrical signal may be determined by an intensity of thermal feedback and a thermal feedback providing time included in the feedback information. The heat output module performs the exothermic operation, the endothermic operation, or the thermal grill operation due to the received electrical signal so that thermal feedback is provided to the user.

3.2.3. Game Content

The thermal experience providing system 1000 may also be utilized in game content.

Game content is basically multimedia content based on interaction between elements within a game and the user. Due to having an interactive element, the game content is a field in which a user experience is extremely important.

Game content may be implemented using the above-described virtual reality or augmented reality technique as well as a conventional technique in which a user's manipulation is reflected in a game screen output through a TV or a monitor. The thermal experience providing system 1000 may add a thermal experience to a game environment implemented using the above-mentioned techniques as a way of improving immersion in the game. For example, when being shot by a gun or the like occurs in a first-person shooter game, the thermal experience providing system 1000 may output thermal feedback according to the shooting.

3.2.4. Video Content

In addition, the thermal experience providing system 1000 may also be utilized in video content or the like. Video content is based on audiovisual forms of expression such as video or audio. The thermal experience providing system 1000 may add a thermal experience to multimedia content by outputting thermal feedback corresponding to video scenes which are expressed audiovisually. The thermal experience providing system 1000 may output thermal feedback by, for example, outputting hot feedback in an explosion scene and outputting cold feedback in a scene in which one is drenched with water.

3.2.5. Object Recognition Content

In addition, the thermal experience providing system 1000 may be provided on the basis of object recognition. The object recognition technology refers to a technology for recognizing an object included in content such as an image, a video, and an audio.

In an embodiment, machine learning (for example, deep learning) may be utilized in the object recognition technology. Since conventional technologies may be used in object recognition, detailed description of the object recognition technology will be omitted.

Some of objects recognized through the object recognition technology may have properties related to thermal feedback. For example, a volcano has a hot property, an ice cream has a cold property, and lightning has an electrical property. The thermal experience providing system 1000 may add a thermal experience to content by outputting thermal feedback corresponding to properties of objects. For example, the thermal experience providing system 1000 may output hot feedback according to the hot property when an object recognized from content is a volcano, may output cold feedback according to the cold property when the recognized object is a piece of ice, and may output thermal pain feedback according to the electrical property when the recognized object is lightning.

A thermal experience providing method using the object recognition technology will be described in detail below.

Figure 89:
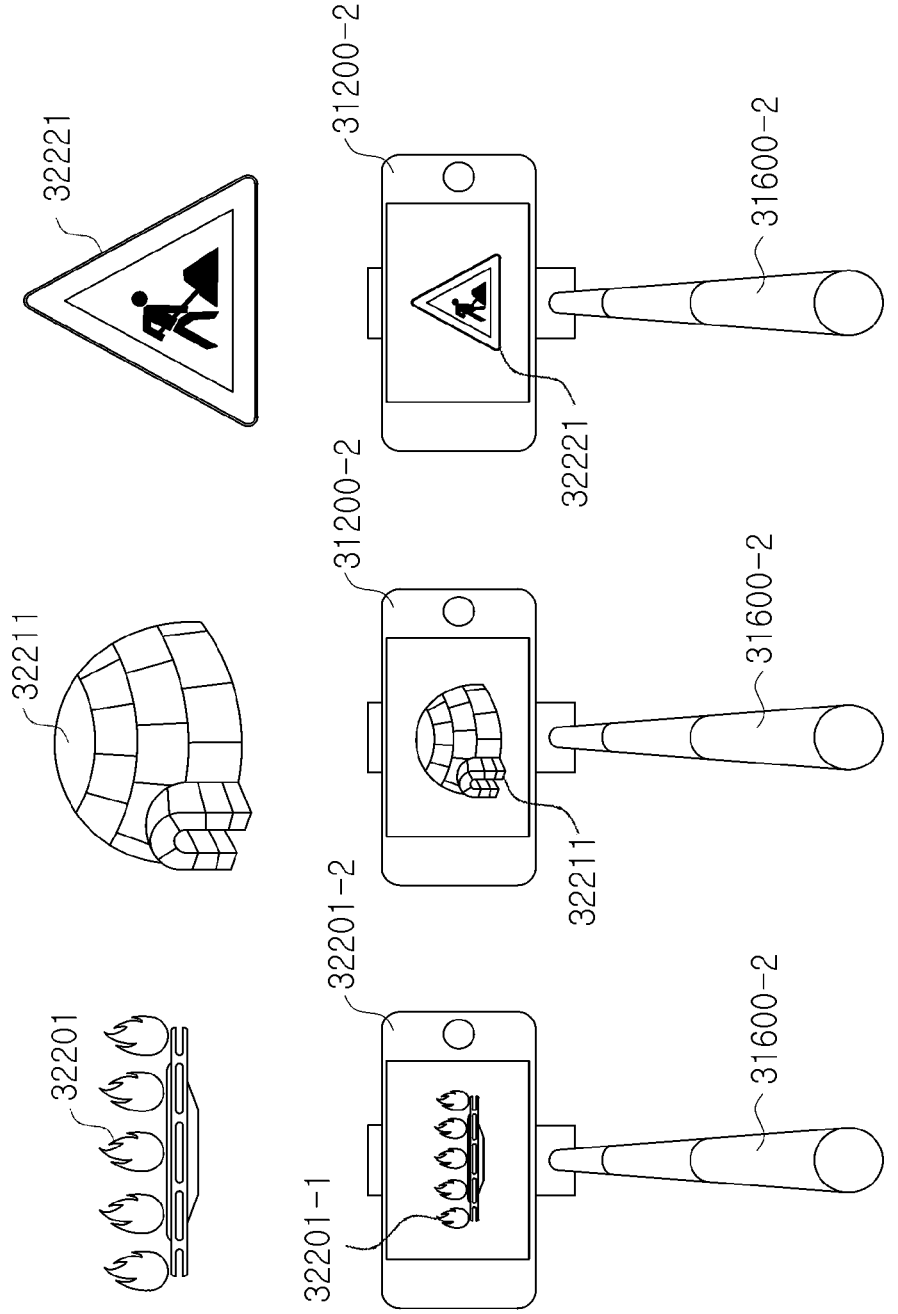
FIGS. 89A-89C are views for describing a method of providing a thermal experience using an object recognition technology.

FIG. 89 is a view for describing a thermal experience providing method using an object recognition technology.

In FIG. 89, provision of a thermal event by the feedback device 31600-2 when an object recognition application is reproduced in the mobile device 31200-2 according to the example of FIG. 73 will be described.

Referring to FIG. 89, FIGS. 89A, 89B, and 89C show provision of a thermal event by the feedback device 31600-2 on which the mobile device 31200-2 is mounted. Hereinafter, a situation will be assumed in which a communication channel is established between the mobile device 31200-2 and the feedback device 31600-2 and in which an object recognition application is driven in the mobile device 31200-2.

In FIGS. 89A, 89B, and 89C, a camera of the mobile device 31200-2 may capture a first object 32201, a second object 32211, and a third object 32221, and a controller of the mobile device 31200-2 may recognize, through the object recognition application, that the first object 32201 is a gas flame, the second object 32211 is an igloo, and the third object 32221 is a construction sign.

In addition, the controller of the mobile device 31200-2 may determine that a property of the first object 32201 is a hot property, a property of the second object 32211 is a cold property, and a property of the third object 32221 is a property of warning. Also, the controller of the mobile device 31200-2 may obtain thermal feedback information of the objects 32201, 32211, and 32221. For example, for the first object 32201, a type of thermal feedback information may be determined as hot feedback according to the hot property; for the second object 32211, a type of thermal feedback information may be determined as cold feedback according to the cold property; and for the third object 32221, a type of thermal feedback information may be determined as thermal pain feedback according to the property of warning. Also, an intensity of thermal feedback, a thermal feedback providing time, and the like may be determined.

The controller of the mobile device 31200-2 transmits a thermal feedback signal according to the thermal feedback information to the feedback device 31600-2.

The feedback controller of the feedback device 31600-2 receives the thermal feedback signal from the mobile device 31200-2, obtains feedback information from the thermal feedback signal, and outputs an electrical signal according to the feedback information. For example, the feedback controller of the feedback device 31600-2 may apply a forward voltage to a heat output module to provide hot feedback in the case of FIG. 89A, may apply a reverse voltage to the heat output module to provide cold feedback to the heat output module in the case of FIG. 89B, and may apply a forward voltage and a reverse voltage to the heat output module simultaneously or by performing time division to provide thermal pain feedback to the heat output module in the case of FIG. 89C. Also, a magnitude, an application time, or the like of an electrical signal may be determined by an intensity of thermal feedback and a thermal feedback providing time included in the feedback information. The heat output module performs the exothermic operation, the endothermic operation, or the thermal grill operation due to the received electrical signal so that thermal feedback is provided to the user.

Various application fields of the thermal experience providing system 1000 have been described above, but the application fields of the thermal experience providing system 1000 are not limited to the above-described examples. In addition to being applied to the above-described technical fields, the thermal experience providing system 1000 may be utilized in various other multimedia contents including contents for education or learning or medical applications.

Therefore, in the present invention, the thermal experience providing system 1000 should be interpreted as being applicable, without limitations, to fields in which thermal feedback may be provided to improve a user experience.

V. Special Effect Control System

1. Special Effect Control System

Hereinafter, a special effect control system according to an embodiment of the present invention will be described.

1.1. Outline of Special Effect Control System

The special effect control system according to an embodiment of the present invention is a system that allows a user who is enjoying multimedia in a 4D theater or a special effect theater to have a Thermal eXperience (TX). Specifically, the special effect control system may allow the user to have a thermal experience by outputting thermal feedback to the user at a predetermined time point in order to maximize the degree of immersion into multimedia content as a means of multimedia content expression. Particularly, since the thermal feedback provided by the special effect control system according to an embodiment of the present invention causes heat transfer while in direct contact with a portion of the user's body, the thermal feedback has advantageous effects in terms of the speed of heat transfer, the ease of control of the amount of transferred heat, and the accuracy of synchronization with multimedia.

Although multimedia content is generally provided to a user according to an audiovisual expression means mostly based on a video and audio, in the present invention, a thermal expression based on thermal feedback may be included as an essential expression means.

The special effect control system according to an embodiment of the present invention may include one or more special effect chairs 42000 and a central control device 41000. The elements are communicatively connected to one another so that reproduction of multimedia content is synchronized in each of the elements.

Since the elements are closely connected, the special effect control system may provide various special effects, including an audiovisual video and thermal feedback, to the user realistically.

1.2. Thermal Feedback

Hereinafter, thermal feedback provided to a user by the special effect control system according to an embodiment of the present invention will be described.

Thermal feedback is a type of a thermal stimulator that stimulates thermal sensation organs distributed across a user's body to make the user feel thermal sensation. In the present specification, thermal feedback should be interpreted as encompassing all thermal stimulators that stimulate a user's thermal sensation organs.

Typical examples of thermal feedback include hot feedback and cold feedback. Hot feedback refers to applying hot heat to hot spots distributed across the user's skin so that the user feels hotness, and cold feedback refers to applying cold heat to cold spots distributed across the user's skin so that the user feels coldness.

Here, because heat is a physical quantity expressed as a scalar, "cold heat is applied" may not be a precise expression in terms of physics. However, in the present specification, for convenience of description, a phenomenon in which heat is applied will be expressed as applying hot heat, and the opposite phenomenon, that is, a phenomenon in which heat is absorbed, will be expressed as applying cold heat.

In addition, in the present specification, thermal feedback may further include thermal grill feedback in addition to hot feedback and cold feedback. When hot heat and cold heat are provided simultaneously, a user perceives a sensation of pain instead of separately perceiving hotness and coldness. Such a sensation is a so-called thermal grill illusion (TGI, hereinafter referred to as "thermal pain"). That is, thermal grill feedback refers to thermal feedback in which hot heat and cold heat are applied in combination and may be mostly provided by outputting hot feedback and cold feedback simultaneously. Thermal grill feedback may also be referred to as thermal pain feedback due to its aspect of providing a sensation close to a sensation of pain.

In the present specification, a thermoelectric operation refers to an operation in which a thermoelectric element 2320 causes an exothermic or endothermic phenomenon, thermal feedback refers to an operation in which a special effect chair 2000 provides an exothermic or endothermic effect to a user, and it should be understood that the user has a thermal experience including warmth, hotness, or thermal pain by receiving the thermal feedback.

In the special effect control system according to an embodiment of the present invention, thermal feedback may be provided to the user in connection with multimedia content. Thermal feedback data may include information on the thermal feedback. The thermal feedback data includes information on thermal feedback in connection with a multimedia content reproduction time point in order to improve the degree of immersion in enjoying the multimedia content.

The information on the thermal feedback may be encoded in a digital form according to a specific protocol within the thermal feedback data. As will be described in more detail below, the central control device 41000 and the special effect chair 42000 constituting the special effect control system may exchange pieces of information on thermal feedback by transmitting/receiving thermal feedback data.

The information on thermal feedback is information constituting thermal feedback (thermal feedback configuration information) and, for example, may include information on whether thermal feedback is hotness, coldness, or the sensation of pain (thermal feedback type information), thermal feedback intensity information, information on a time point at which thermal feedback is provided to the user in connection with multimedia content so that the user receives a thermal experience and a time point at which the provision of the thermal feedback is stopped (thermal feedback timing information), and the like.

The information on thermal feedback may also include, for example, as information on applied power, information on a direction in which power is applied to a thermoelectric element 42320, information on a current value or voltage value of power applied to the thermoelectric element 42320, information on a time point at which power is applied to the thermoelectric element 42320 and a time point at which the application of power is stopped, and the like. The information on the applied power may be directly included in the thermal feedback data. Alternatively, the information on the applied power may also be indirectly included in the thermal feedback data in a form in which the information on the applied power is obtained by interpreting the thermal feedback configuration information, e.g., a type of thermal feedback, an intensity of thermal feedback, and a timing of thermal feedback.

Here, for convenience of description, the thermal feedback configuration information and the information on the applied power have been described as being separate from each other. However, it should be understood that the information on the applied power is the thermal feedback configuration information viewed from the aspect of power that controllers 41300 and 42500 generate/process. That is, the controllers 41300 and 42500 may obtain the information on the applied power by interpreting the thermal feedback configuration information. Therefore, it should be understood that the information on the applied power is indirectly included in the thermal feedback configuration information or that the thermal feedback configuration information and the information on the applied power are substantially the same information.

In addition, when a heat output module 42300 includes a plurality of thermoelectric couple groups 42322 or thermoelectric couple arrays 42323, the information on thermal feedback may include, for each of the plurality of thermoelectric couple groups 42322 or thermoelectric couple arrays 42323, thermal feedback type information, thermal feedback intensity information, and/or thermal feedback timing information. In this case, the thermal feedback type information, thermal feedback intensity information, and/or thermal feedback timing information related to a first thermoelectric couple group 42322 may be the same as or different from the thermal feedback type information, thermal feedback intensity information, and/or thermal feedback timing information related to a second thermoelectric couple group 42322.

In addition, time may be required physically from a time point at which power is applied to the thermoelectric element 42320 until a thermoelectric operation occurs in the thermoelectric element 42320 in response to the power applied thereto. Such a time difference may be small, but according to circumstances, such a time difference may be of non-negligible magnitude in providing a high level of thermal experience. In such a case, there is a need to take into consideration the time required between a thermal feedback providing time point at which thermal feedback is actually provided to a user and a power application time point at which power is applied so that the thermal feedback is actually provided to the user at the thermal feedback providing time point. Therefore, information on thermal feedback that a controller 42600 in the special effect chair 42000 receives may include a power application time point calculated in consideration of the time delay. Alternatively, the controller 42600 in the special effect chair 42000 may directly obtain a power application time point from the thermal feedback providing time point by taking the time delay into consideration.

The information on thermal feedback including a type, intensity, and/or time duration of thermal feedback which is provided in the special effect control system according to an embodiment of the present invention may be closely synchronized with reproduction of multimedia content. For example, pieces of thermal feedback to be provided to the user are different according to each situation when an explosion scene is reproduced, when a bonfire video is reproduced, and when a scene of heavy rain is reproduced in an audiovisual video. Therefore, to improve immersion of enjoying content, there is a need for pieces of thermal feedback and situations respectively corresponding thereto to be accurately synchronized in terms of a type, intensity, and/or time duration of thermal feedback. Here, from the above-described multimedia content, a scene in which user's immersion may be increased when thermal feedback is provided is referred to as a thermal event.

Hereinafter, a configuration of the special effect control system for providing the above-described thermal feedback by synchronizing the thermal feedback with a thermal event will be described.

2. Configuration of Special Effect Control System

Figure 90:
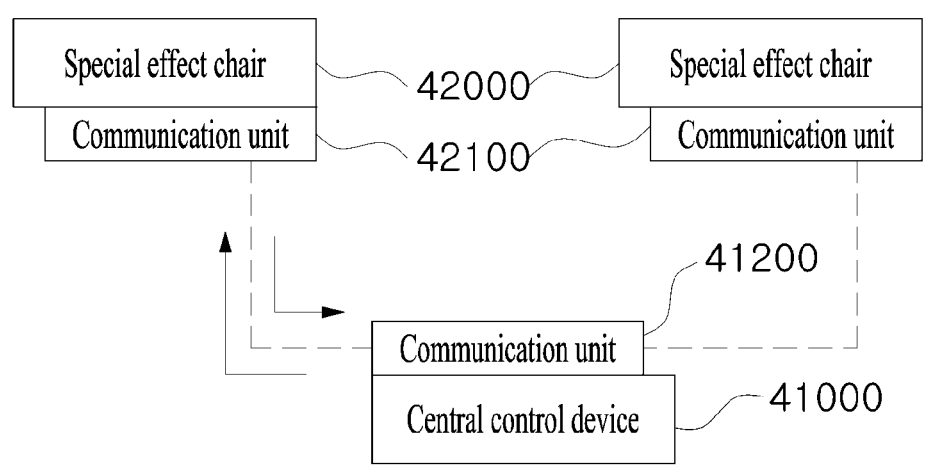
FIG. 90 is a block diagram related to a configuration of a special effect control system according to an embodiment of the present invention.

Referring to FIG. 90, the special effect control system may include one or more special effect chairs 42000 and a central control device 41000. The one or more special effect chairs 42000 are communicatively connected to the central control device 41000.

The central control device 41000 may collectively control the overall operation required in the special effect control system. The central control device 41000 may store/manage information required for an operation of the special effect chair 42000 or may obtain information required for an operation of the special effect chair 42000 and transmit the obtained information to the special effect chair 42000. For example, according to some embodiments of the present application, the central control device 41000 may store various pieces of information required for the special effect chair 42000 to perform a thermoelectric operation, appropriately manage the pieces of information, generate the pieces of information, or transmit the pieces of information to the special effect chair 42000.

The special effect chair 42000 is implemented in the form of a seat sittable for a user. The special effect chair 42000 is a device that provides thermal feedback to the user seated on the special effect chair 42000. The special effect chair 42000 provides thermal feedback corresponding to a thermal event at a time point synchronized with reproduction of multimedia content. To this end, the special effect chair 42000 may transmit/receive thermal feedback data to and from the central control device 41000, may interpret the received thermal feedback data to obtain information on thermal feedback, and may perform an operation for providing thermal feedback according to the obtained information.

The special effect control system according to an embodiment of the present application may include various feedback devices for providing various special effects other than the above-described special effect chair 42000. The various other feedback devices may constitute the special effect control system by being included as an additional module in the special effect chair 42000 or being a device independent from the special effect chair 42000 and being connected to the special effect chair 42000. In this case, the central control device 41000 may store/manage information required for operation of the feedback device or may obtain information required for operation of the feedback device and transmit the obtained information to the feedback device, thereby directly controlling the feedback device. Alternatively, the central control device 41000 may encode information required for operation of the feedback device and then transmit the encoded information in a digital form to the special effect chair 42000. In this case, the special effect chair 42000 may store/interpret the transmitted information to obtain the information. In this way, the special effect chair 42000 may directly control operation of the feedback device. Data transmitted to the special effect chair 42000 by the central control device 41000 may include information for controlling a specific special effect at a specific time point with a specific intensity so that various special effects including thermal feedback are provided in synchronization with reproduction of multimedia content.

Although two special effect chairs 42000 are illustrated as being included in the special effect control system of the present application in FIG. 90, the special effect control system according to an embodiment of the present application may also include two or more special effect chairs 42000. Alternatively, the special effect control system according to an embodiment of the present application may only include a single special effect chair 42000.

According to some embodiments of the present invention, although not illustrated in FIG. 90, the special effect control system may further include an audiovisual video output unit.

The audiovisual video output unit may receive an audiovisual video from the central control device 41000 and output the received audiovisual video, thereby providing the audiovisual video to a user. The video output unit may be a display device itself on which the audiovisual video is displayed. Alternatively, when an audiovisual video is received in a form of encoded data, the audiovisual video output unit may include a processor for interpreting the received data and obtaining video information. In this case, the audiovisual video may have been pre-stored in a digital form in the central control device 41000. Also, the central control device 41000 may generate a control signal required for operation of the audiovisual video output unit.

To summarize, the central control device 41000 may transmit data for collectively controlling the special effect chair 42000 and/or the audiovisual video output unit to the special effect chair 42000 and/or the audiovisual video output unit. The special effect chair 42000 and/or the audiovisual video output unit may receive the data, interpret information included therein, and control a plurality of special effect providing devices at a set time point with a set intensity according to the interpreted information. In this way, the user may receive multimedia content in which an audiovisual video is synchronized with various special effects.

Hereinafter, each element of the special effect control system disclosed according to an embodiment of the present application will be described in more detail.

First, the central control device 41000 will be described with reference to FIG. 91.

2.1. Central Control Device (41000)

As described above, the central control device 41000 is a configuration for collectively controlling operations of the one or more special effect chairs 42000.

When the special effect control system according to an embodiment of the present invention further includes an audiovisual video output unit and/or various feedback devices, the central control device 41000 is a configuration for collectively controlling operations of each special effect chair 42000, the audiovisual video output unit and/or the various feedback devices.

Figure 91:
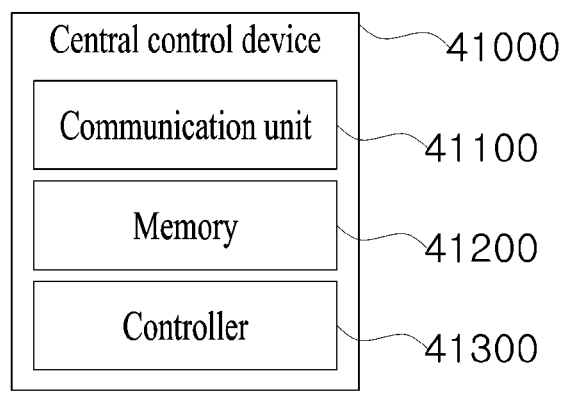
FIG. 91 is a block diagram related to a configuration of a central control device according to an embodiment of the present invention.

Referring to FIG. 91, the central control device 41000 may include a communication unit 41100, a memory 41200, and a controller 41300.

The central control device 41000 may store/interpret/manage pieces of data respectively required for the special effect chairs 42000, the audiovisual video output unit and/or various feedback devices. Also, for reproduction of multimedia content, the central control device 41000 may transmit the data to the special effect chairs 42000, the audiovisual video output unit and/or various feedback devices. Alternatively, the central control device 41000 may receive data transmitted from the special effect chairs 42000, the audiovisual video output unit and/or various feedback devices.

The communication unit 41100 connects the central control device 41000 and the special effect chair 42000 so that the central control device 41000 and the special effect chair 42000 may perform data communication with each other. To connect the central control device 41000 and the special effect chair 42000, the communication unit 41100 may be implemented using a wired or wireless method. Since both the wired type and the wireless type have their own advantages and disadvantages, the wired type and the wireless type may be simultaneously provided in the central control device 41000 according to circumstances. A local area network (LAN) in which various cables, such as a twisted pair, a coaxial cable, and a fiber optic cable, may be used may be a typical example of the wired type. However, the wired type is not limited thereto, and any suitable medium and suitable communication network may be used according to the size of a theater, the size of data, and the like.

The wireless type may mostly use WLAN communication methods such as Wi-Fi. However, when, according to the size of a theater, short range communication is sufficient, WPAN communication methods such as Bluetooth and ZigBee may also be used. However, since wireless communication protocols are not limited thereto, other known communication methods such as an infrared communication method may also be used. Meanwhile, as a wired/wireless communication protocol, an exclusive protocol developed by a manufacturer of the special effect control system may also be used.

The memory 41200 may store various pieces of information. The memory 41200 may store data temporarily or semi-permanently. Examples of the memory 41200 may include a HDD, a SSD, a flash memory, a ROM, and a RAM. The memory 41200 may be provided in a form mounted in the central control device 41000 or a form attachable to and detachable from the central control device 41000. Various pieces of data required for or used in operation of the central control device 41000 or an OS for driving the central control device 41000 may be stored in the memory 41200.

The controller 41300 may be implemented with a computer or an apparatus similar thereto according to hardware, software, or a combination thereof so that the controller 41300 may perform computing and processing of various pieces of information. The controller 41300 may be provided as a processor storing and processing data in terms of hardware and may be provided in the form of a program or code for driving a circuit in terms of software. For example, the controller 41300 may exchange data with the communication unit 41100 and the memory 41200. The controller 41300 may manage data to be transmitted to the elements of the special effect control system, including the special effect chair 42000, by converting the data to a form storable in the memory 41200. The controller 41300 may call for the data stored in the memory 41200 and decode the data to interpret required information. To transmit the data to each element of the special effect control system through the communication unit 41100, the controller 41300 may encode the data in a form of data suitable for a communication method selected in the special effect control system.

As described above, the central control device 41000 is a configuration that collectively controls and closely connects each special effect chair 42000, the audiovisual video output unit and/or various feedback devices.

2.2. Special Effect Chair (42000)

Next, the special effect chair 42000 and each element thereof will be described below with reference to FIG. 92.

Figure 92:
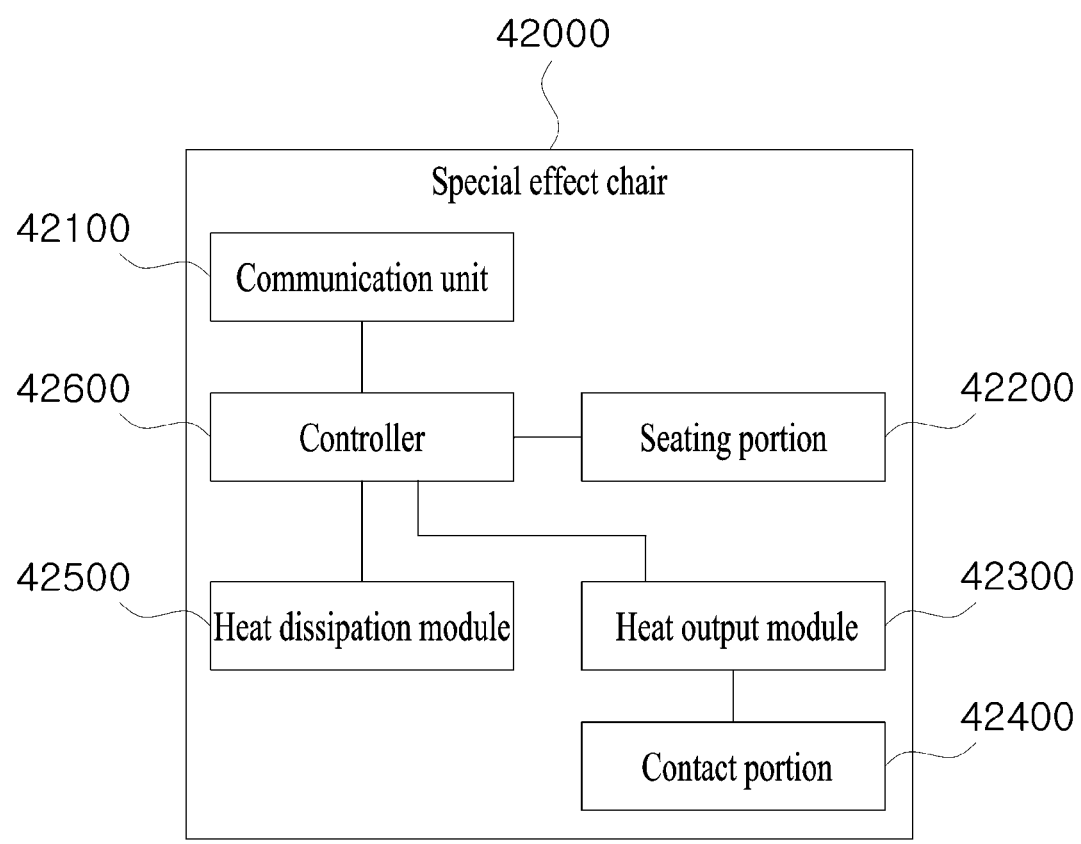
FIG. 92 is a block diagram related to a configuration of a special effect chair according to an embodiment of the present invention.

As illustrated in FIG. 92, the special effect chair 42000 may include a communication unit 42100, a seating portion 42200, a heat output module 42300, a contact portion 42400, a heat dissipation module 42500, and a controller 42600.

Hereinafter, each element of the special effect chair 42000 will be described in more detail.

First, a configuration and general functions of the seating portion 42200 will be described.

The seating portion 42200 is configured to support a user who sits on the special effect chair 42000 to enjoy multimedia content. The seating portion 42200 may be in the form of a chair.

The seating portion 42200 may include an armrest portion on which the user may put his or her arm. The seating portion 42200 may include a safety bar for preventing the user from falling off the seating portion 42200 during an operation such as rotation and vibration of the seating portion 42200.

The seating portion 42200 may include a rotating portion for rotating the seating portion 42200 or a vibrating portion for providing vibration to the seating portion 42200 so that a motion effect such as rotation or vibration may be provided to the user. Alternatively, according to circumstances, a plurality of seating portions 42200 adjacent to each other may be connected to a common rotating portion or vibrating portion to share a single rotating portion or vibrating portion.

In addition, feedback devices for providing various special effects such as water jet, face jet, seat drop, vibration, leg tickler, neck attach, seat pull-down, smoke & fog, virtual fire, air bubble, moving light, strobe, scent machine, or the like may be connected to the seating portion 42200 or included in the seating portion 42200.

In addition, as will be described in more detail below, a sensor for sensing whether the user is seated on the seating portion 42200 may be connected to the seating portion 42200.

The feedback devices that may be connected to the above-described seating portion 42200 may be controlled by the controller 42600. The controller 42600 may receive data including information required for controlling the feedback devices from the central control device 41000 and interpret the received data to obtain the information required for controlling the feedback devices. The information required for controlling the feedback devices may include information on a time point at which feedback is provided/maintained/stopped by each feedback device and information on an intensity of feedback.

Hereinafter, the heat output module 42300 according to an embodiment of the present invention will be described.

The heat output module 42300 may output thermal feedback for transferring hot heat and cold heat to the user by performing an exothermic operation, an endothermic operation, or a thermal grill operation. The heat output module 42300 mounted in the special effect chair 42000 outputs thermal feedback when the special effect chair 42000 receives a thermal feedback signal so that a thermal experience is provided to the user.

To perform the above-described exothermic operation, endothermic operation, or thermal grill operation, the heat output module 42300 may use a thermoelectric element such as a Peltier element. Accordingly, as electricity is applied to the above-described thermoelectric element 42320, the heat output module 42300 may perform the exothermic operation or the endothermic operation. In terms of physics, an exothermic reaction and an endothermic reaction simultaneously occur in the thermoelectric element 42320 that has received electricity. However, in the present specification, an operation of the heat output module 42300 in which a surface toward a user's body generates heat will be defined as the exothermic operation, and an operation of the heat output module 42300 in which the surface absorbs heat will be defined as the endothermic operation. For example, the thermoelectric element 42320 may be configured by disposing an N type and P type semiconductor on a substrate 42310. Here, when a current is applied thereto, heat generation occurs at one side and heat absorption occurs at the other side. Here, when a side surface toward the user's body is referred to as a front surface 42324 and a surface opposite the front surface 42324 is referred to as a rear surface 42325, an operation of the heat output module 42300 in which heat generation occurs at the front surface 42324 and heat absorption occurs at the rear surface 42325 may be defined as the exothermic operation, and conversely, an operation of the heat output module 42300 in which heat absorption occurs at the front surface 42324 and heat generation occurs at the rear surface may be defined as the endothermic operation.

Figure 93:
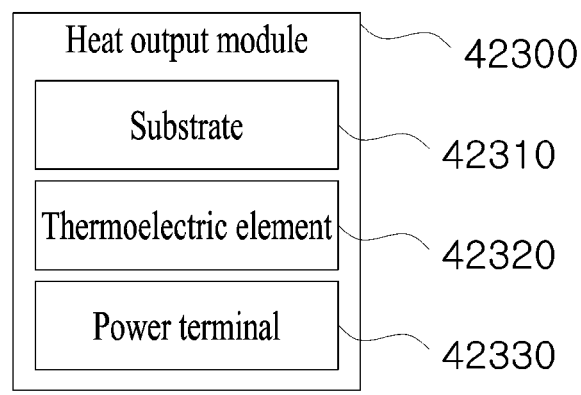
FIG. 93 is a block diagram related to a configuration of a heat output module according to an embodiment of the present invention.

Referring to FIG. 93, the heat output module 42300 may include substrates 42310, the thermoelectric element 42320 formed of thermoelectric couple arrays 42323 disposed between the substrates 42310, and a power terminal 42330 applying power to the thermoelectric element 42320.

The substrate 42310 serves to support a unit thermoelectric couple 42321 and is formed of an electric insulating material. For example, ceramic may be selected as a material of the substrate 42310. The substrate 42310 may also be formed in the shape of a flat plate, but embodiments are not necessarily limited thereto.

The heat output module 42300 may be attached to various positions of the special effect chair 42000 and come in contact with various forms of contact portions 42400. For the heat output module 42300 to come in contact with the contact portion 42400 having a curved shape, it may be important that the heat output module 42300 has flexibility. Examples of flexible materials used for the substrate 42310 may include glass fiber, flexible plastic, or the like.

A thermoelectric couple array 42323 is formed of a plurality of unit thermoelectric couples 42321 disposed on the substrate 42310. Although a pair of different metals (for example, bismuth and antimony) may be used as the unit thermoelectric couple 42321, a pair of N type and P type semiconductors may mostly be used. Semiconductors constituting a semiconductor couple are electrically connected to each other at one end of the unit thermoelectric couple 42321, and the unit thermoelectric couple 42321 is electrically connected to another unit thermoelectric couple 42321 at the other end of the unit thermoelectric couple 42321. An electrical connection between semiconductors constituting a semiconductor couple or with an adjacent semiconductor may be performed by a conductor member disposed on the substrate 42310. The conductor member may be a lead wire or an electrode formed of copper, silver, or the like.

The electrical connection between the unit thermoelectric couples 42321 may be mostly performed by serial connection, the serially connected unit thermoelectric couples 42321 may form a thermoelectric couple group 42322, and the thermoelectric couple group 42322 may form the thermoelectric couple array 42323.

The power terminal 42330 may apply power to the heat output module 42300. The thermoelectric couple array 42323 may generate heat or absorb heat according to a voltage value or a direction of a current of power applied to the power terminal 42330. More specifically, two power terminals 42330 may be connected to a single thermoelectric couple group 42322. Consequently, when a plurality of thermoelectric couple groups 42322 are present, two power terminals 42330 may be disposed for each of the thermoelectric couple groups 42322. According to such a connection method, a voltage value or a direction of a current may be separately controlled for each of the thermoelectric couple groups 42322, and whether to perform heat generation or heat absorption and an extent thereof may be adjusted. Also, as will be described below, the power terminal 42330 receives an electrical signal output by the feedback controller, and accordingly, as a result, the feedback controller may adjust a direction or magnitude of the electrical signal and control the exothermic operation and the endothermic operation of the heat output module 42300. Also, when the plurality of thermoelectric couple groups 42322 are present, an electrical signal applied to each power terminal 42330 may be separately adjusted for each thermoelectric couple group 42322.

Figure 94:
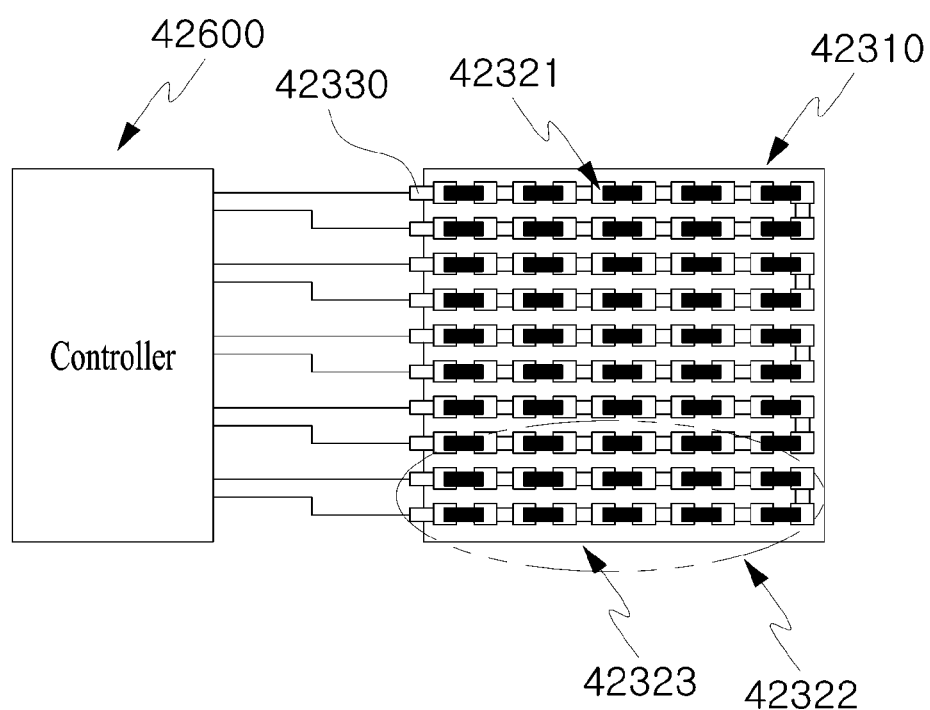
FIG. 94 is a schematic diagram of the heat output module according to an embodiment of the present invention.

Referring to FIG. 94, it can be seen that the thermoelectric couple array 42323 is disposed between two substrates 42310 facing each other. The thermoelectric array may include one or more thermoelectric couple groups 42322 including a pair of power terminals 42330 so that power may be separately applied to each thermoelectric couple group 42322. Each thermoelectric couple group 42322 may include one or more thermoelectric couples 42321, and in each thermoelectric couple 42321, N type and P type semiconductors may be alternately connected through a conductor member at one end.

A method in which the special effect chair 42000 according to an embodiment of the present invention provides thermal feedback is a method in which the heat output module 42300 comes in contact with the user's body directly or indirectly to transfer hotness or coldness thereto.

The contact portion 42400 is a configuration for transferring heat generated in the heat output module 42300 to a portion of the user's body. To this end, the contact portion 42400 may be in contact with a portion of the user's body seated on the seating portion 42200. Also, the contact portion 42400 may be thermally connected to the heat output module 42300. The contact portion 42400 may be thermally connected to the heat output module 42300 through a heat conducting material, but preferably, the contact portion 42400 may receive heat by being in direct contact with the front surface 42324 of the thermoelectric element 42320.

The contact portion 42400 may serve to protect the thermoelectric element 42320 or to protect the user's body from the thermoelectric element 42320. However, the original function of the contact portion 42400 is to transfer heat generated in the thermoelectric element 42320 to a portion of the user's body while minimizing heat loss. Therefore, preferably, the contact portion 42400 is formed of a material having high conductivity.

The contact portion 42400 has been described above as a separate configuration disposed on the heat output module 42300, but to the contrary, an outer surface itself of the heat output module 42300 may also be the contact portion 42400. That is, heat generated by a thermoelectric operation may also be transferred to the user's body by the front surface 42324 of the thermoelectric element 42320 being in direct contact with the user's body.

Although, for convenience of description, the heat has been described as the generated heat, the generated heat should be interpreted as having a positive value when the thermoelectric element 42320 performs the exothermic operation and as having a negative value when the thermoelectric element 42320 performs the endothermic operation.

Since the contact portion 42400 causes heat conduction by coming in direct contact with the user's body, for heat transfer efficiency, there is a need to maximize a surface coming in contact with the user's body. To this end, the contact portion 42400 may be a configuration that is naturally bendable along the curve of the user's body. Also, since, preferably, the front surface of the thermoelectric element 42320 is connected to the contact portion 42400 by contact with one surface of the contact portion 42400, preferably, the thermoelectric element 42320 is also a configuration that is naturally bendable.

Here, although, for convenience of description, the contact has been described as the contact with the user's body, the contact does not only necessarily refer to contact with the user's skin, and should be interpreted as having a meaning that encompasses transferring heat to the user by coming in contact with the user through clothing worn by the user.

The contact portion 42400 may be disposed at any part of the seating portion 42200 as long as the contact portion 42400 may come in contact with the user's body while the user is seated on the special effect chair 42000.

Figure 95:
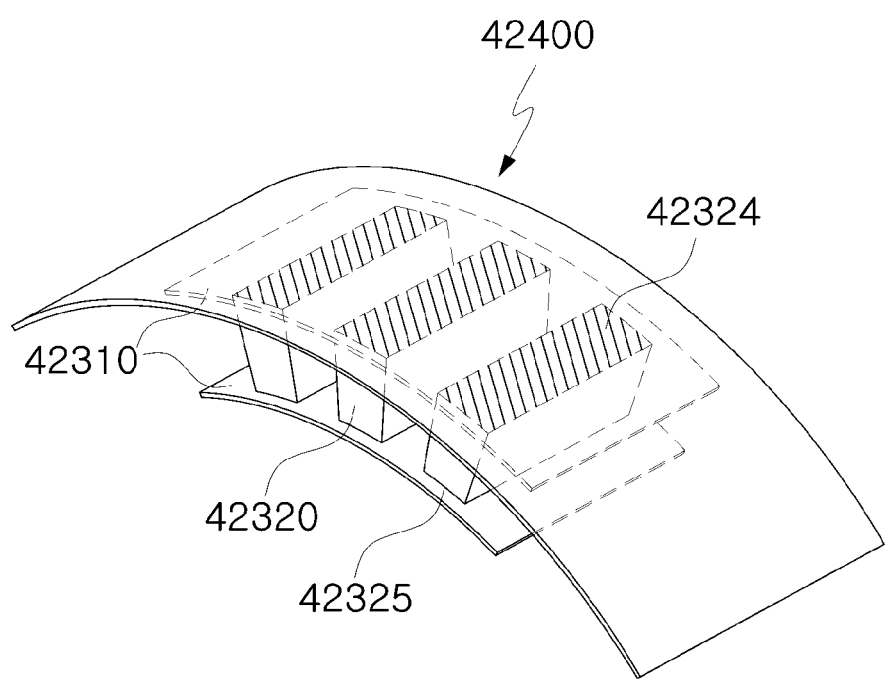
FIG. 95 illustrates configurations of a contact portion and the heat output module according to an embodiment of the present invention.

FIG. 95 illustrates configurations of the contact portion 42400 and the heat output module 42300 according to an embodiment of the present invention.

The contact portion 42400 may be in direct contact with the front surface 42324 of the thermoelectric element 42320 or may be in indirect contact therewith while the substrate 42310, which is in contact with the front surface 42324 of the thermoelectric element 42320, is disposed therebetween. As illustrated, the contact portion 42400 may be in the form of a thin film. The contact portion 42400 in the form of a thin film may be naturally bent along a curve of the user's body or a curve of a portion of the special effect chair 42000. Also, the thermoelectric element 42320 in contact with the contact portion 42400 may maintain that curve of the contact portion as it is.

Hereinafter, various implementable forms of the contact portion 42400 will be described with reference to FIG. 96. The following description merely presents an embodiment and does not limit the form of the contact portion 42400 or the configurations of the contact portion 42400 and the thermoelectric element 42320.

Figure 96A:
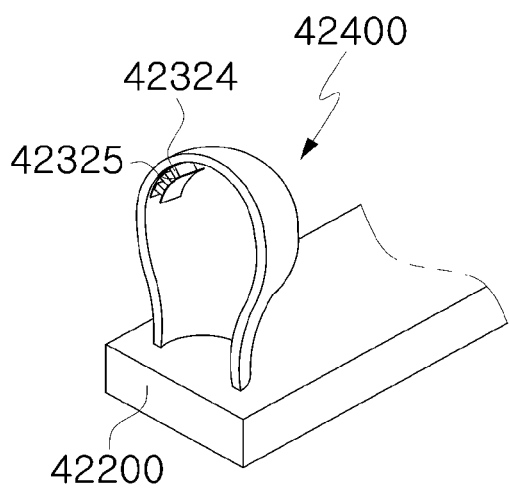
FIGS. 96A-96D are schematic diagrams of the contact portion according to an embodiment of the present invention.

Referring to FIG. 96A, the contact portion 42400 according to an embodiment of the present invention may include at least a portion of a stick. Here, the stick refers to a configuration which is connected to one side of the armrest portion and has a grip-like form for the user to grasp. The stick may have an empty space therein. The front surface 42324 of the thermoelectric element 42320 may be connected to an inner surface of the stick. In this way, heat transfer may be performed through a hand of the user grasping the stick. The user seated on the special effect chair 42000 may receive thermal feedback while enjoying multimedia content while grasping the stick.

Figure 96B:
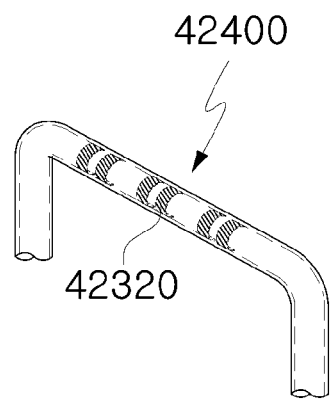

Referring to FIG. 96B, the contact portion 42400 may include at least a portion of a safety bar. The special effects may include motion control such as rotation or vibration, and to prevent falling off from the seating portion 42200 due to such motion, the user may hold onto the safety bar. The contact portion 42400 may be disposed at a location at a portion of the safety bar that is expected to be gripped by the user's hand. In this way, the user may receive thermal feedback by grasping the safety bar.

Figure 96C:
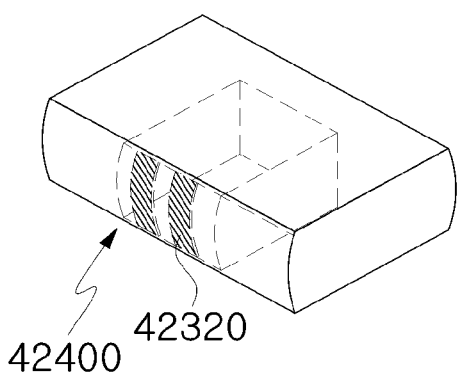

Referring to FIG. 96C, the contact portion 42400 may include at least a portion of a neck rest. The neck rest is a configuration coming in contact with the user's neck portion to support the user's neck when the user is seated. A portion of the neck rest may be the contact portion 42400, and a thermoelectric element 42320 may be connected to the contact portion 42400 so that thermal feedback is provided to the user in contact with the portion of the neck rest. In this way, the user may receive thermal feedback while seated.

Figure 96D:
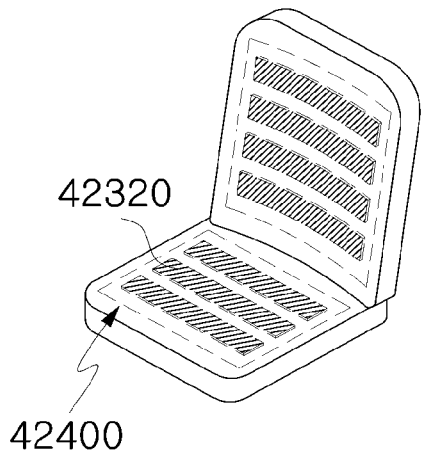

Referring to FIG. 96D, the contact portion 42400 may include a portion of the seating portion 42200 coming in contact with a back or lower body of the user, who is seated, to support a weight of the back or lower body. A thermoelectric element 42320 may be connected to the contact portion 42400. In this way, thermal feedback may be provided to the user's body in contact with the portion of the seating portion 42200. The thermoelectric element 42320 may include one or more thermoelectric couple groups 42322 or thermoelectric couple arrays 42323. Each of the thermoelectric couple groups 42322 or thermoelectric couple arrays 42323 may be controlled by the controller 42600 to independently perform a thermoelectric operation. Therefore, various types of thermal feedback may be provided to the user who is seated. For example, in a scene in which a protagonist of multimedia content crosses a shallow stream, cold feedback may be provided only by the thermoelectric couple groups 42322 or thermoelectric couple arrays 42323 in contact with the bottom of the lower body among the plurality of thermoelectric couple groups 42322 or thermoelectric couple arrays 42323. In this way, the user may feel a sense of cold water only at the bottom of the lower body. Alternatively, in a scene in which the protagonist goes deep into the water one step at a time, cold feedback may be sequentially provided first from the thermoelectric couple group 42322 or thermoelectric couple array 42323 in contact with the bottom of the lower body and lastly from the thermoelectric couple group 42322 or thermoelectric couple array 42323 in contact with the top of the upper body. In this way, the user may sense coldness as if the user is being slowly submerged from the lower body to upper body.

Such a contact type heat transfer method has advantageous effects in terms of technology as compared with a conventional heat transfer method.

First, an amount of heat transferred to the user may be accurately adjusted. This is because there are few variables that may affect the thermal conduction, and it is relatively easy to control the variables as compared with the heat transfer method using convection. When an intensity of power to be applied and application time of the power are known, an amount of generated heat or absorbed heat may be calculated, which facilitates adjusting thermal feedback to a desired intensity.

Second, it is possible to only provide thermal feedback to a local portion of the user's body. When such a technical feature is applied, as described above in relation to types of thermal feedback, the types of thermal feedback may be diversified, e.g., thermal feedback may be provided by the thermoelectric element 42320 coming in contact with different body portions, or thermal feedback may be sequentially provided by a plurality of thermoelectric couple arrays 42323 adjacent to each other.

Third, time taken from a time point at which thermal feedback is requested to a time point at which the requested thermal feedback is provided may be shortened. This is because one surface of the contact portion 42400 is in contact with one surface of the thermoelectric element 42320, another surface of the contact portion 42400 is in direct contact with the user's body, and the contact portion 42400 is formed of a material having high thermal conductivity. That is, a response speed of providing thermal feedback may be fast.

Since a conventional heat transfer method using air convection has to go through heating a heat source, causing air movement by driving a fan, receiving heat from the heat source through air convection, moving air containing heat, and transferring the heat from the air to the user's body through convection, a response speed may be slower as compared with the heat output module 42300 according to an embodiment of the present invention.

Since, in a conventional heat transfer method in which heat generated from the thermoelectric element 42320 is transferred to the user's body through a heat transfer member such as a heat pipe, conduction has to occur through the heat transfer member, a response speed may be slower as compared with the heat output module 42300 according to an embodiment of the present invention. In contrast, since the thermoelectric element 42320 of the present invention may immediately come in contact with the user's body due to being flexibly bendable, a response speed and thermal conductivity may be increased.

The above-described advantages of using the contact type heat transfer method signify that it is possible to, in turn, increase connection with multimedia content, that is, increase accuracy of synchronization between an audiovisual video and thermal feedback.

Next, a configuration and general operations of the heat dissipation module 42500 will be described.

The heat dissipation module 42500 serves to dissipate waste heat, which is generally unnecessarily accumulated in a portion of the heat output module 42300 or the special effect chair 42000 due to characteristics of a thermoelectric effect as a thermoelectric operation is repeated in the thermoelectric element 42320, to the surroundings.

The waste heat may be a factor that interferes with the user's sensing of thermal feedback through the thermoelectric element 42320 and may also be a factor that deteriorates the durability of the special effect chair 42000 when the waste heat is accumulated as the thermal feedback is repeated several times. Alternatively, the waste heat may become severe to a level that creates a risk of burn to the user. Therefore, it is necessary to dissipate waste heat periodically or under certain conditions.

There may be various implementations of performing a heat dissipating operation. For example, a method of electrically controlling turning a heat dissipating fan on/off to drive the heat dissipating fan may be used. Alternatively, a method of electrically controlling opening/closing of an electronic valve to control flow of a fluid in a heat pipe may be used. Alternatively, a method may be used in which a heat pipe and a portion of the thermoelectric element 42320 are in contact physically at a time point at which a heat dissipating operation is required and are electrically or mechanically controlled to be disconnected at a time point at which the heat dissipating operation has to be stopped.

There may be various configurations of the heat dissipation module 42500. Any configuration may be included in the heat dissipation module 42500 as long as the configuration is a means for effectively dissipating waste heat. For example, the heat dissipation module 42500 may include a heat transfer portion 42510. The heat transfer portion 42510 may be thermally connected to a portion of a heat output module in which waste heat is generated. The heat transfer portion may cause the waste heat to move to outside the special effect chair 42000 by using a thermal conduction method. Alternatively, the heat dissipation module 42500 may further include a waste heat dissipating portion 42520. The waste heat dissipating portion 42520 may be provided at the other end of the heat transfer portion 42510 not connected to the thermoelectric element 42320 to dissipate waste heat from the other end to the surroundings. The waste heat dissipating portion 42520 may include a heat dissipating plate, a heat dissipating fin, or a heat dissipating fan. Alternatively, the heat dissipation module may be designed to facilitate dissipation of waste heat along a flow of air released to the outside of the special effect chair 42000.

Generally, the waste heat may be generated in the heat output module 42300. However, due to the configuration of the heat output module 42300 and structural features of the special effect chair 42000, there may be a specific location at which waste heat is concentrated and accumulated. In this case, the heat dissipation module 42500 may be a configuration that dissipates waste heat at the specific location.

Hereinafter, a configuration of the heat dissipation module 42500 according to an embodiment of the present invention that may be provided in a configuration of the contact portion 42400 according to an embodiment of the present invention will be described with reference to FIG. 97.

Figure 97A:
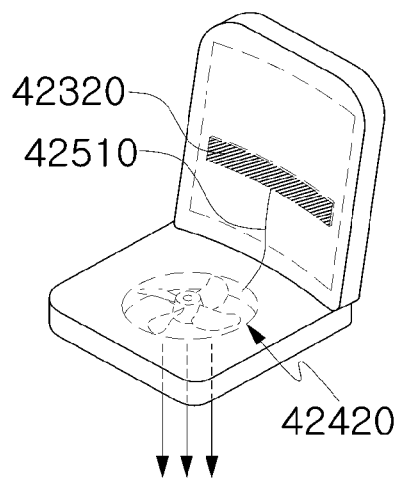
FIGS. 97A-97D are schematic diagrams of a heat dissipation module according to an embodiment of the present invention.

FIG. 97A illustrates a configuration of the heat dissipation module 42500 according to an embodiment of the present invention. The heat dissipation module 42500 may be disposed at a portion of the seating portion 42200 coming in contact with the lower body of the seated user. The heat dissipation module 42500 may be thermally connected to the thermoelectric element 42320.

The heat dissipation module 42500 may be designed so that a heat dissipating direction is a direction toward the ground. Since waste heat is dissipated to the surroundings when the heat dissipating operation is performed, the dissipation of waste heat may affect other users located at the left, right, in front, or behind the seating portion 42200. When the heat dissipation module 42500 has a configuration in which the heat dissipating direction is toward the ground, an influence of the heat dissipating operation on users seated on other adjacent seating portions 42200 may be minimized.

Figure 97B:
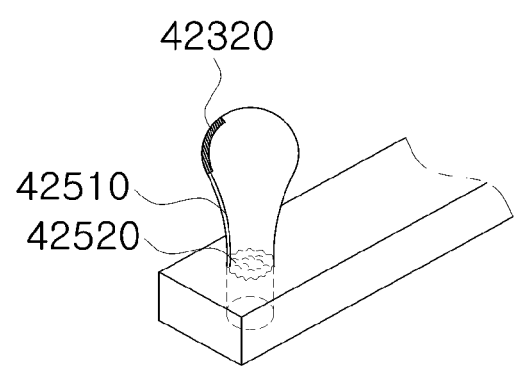

In FIG. 97B, the heat dissipation module 42500 may be thermally connected to a thermoelectric element 42320 disposed at a portion of a stick by the heat transfer portion 42510. The stick may be disposed at one surface of an armrest portion of the special effect chair 42000, and the stick may include the waste heat dissipating portion 42520 dissipating waste heat to another surface of the armrest portion. The heat transfer portion 42510 may cause waste heat generated in the thermoelectric element 42320 to move from the thermoelectric element 42320 to the waste heat dissipating portion 42520. A heat dissipating plate, a heat dissipating fin, or a heat dissipating patch may be disposed in the waste heat dissipating portion 42520 and may dissipate the moved waste heat in a direction moving away from the user.

Figure 97C:
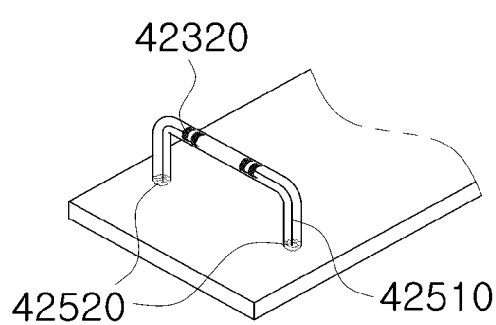

In FIG. 97C, the heat dissipation module 42500 may be thermally connected to a thermoelectric element 42320 disposed at a portion of a safety bar by the heat transfer portion 42510. The safety bar may be connected to one surface of the seating portion 42200, and the safety bar may include the waste heat dissipating portion 42520 dissipating waste heat to both ends of the safety bar toward a direction moving away from the user seated on the seating portion 42200. The heat transfer portion 42510 may cause waste heat generated in the thermoelectric element 42320 to move from the thermoelectric element 42320 to the waste heat dissipating portion 42520. A heat dissipating plate, a heat dissipating fin, or a heat dissipating patch may be disposed in the waste heat dissipating portion 42520 and may dissipate the moved waste heat in the direction moving away from the user.

Figure 97D:
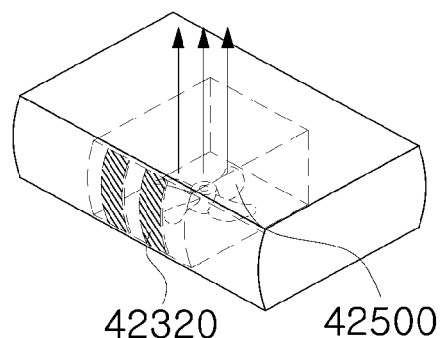

In FIG. 97D, the heat dissipation module 42500 may be a heat dissipating fan dissipating waste heat generated in the thermoelectric element 42320 disposed at a portion of a neck rest to outside the seating portion 42200. The neck rest may include the thermoelectric element 42320 and a heat dissipating fan provided therein. The heat dissipating fan may be disposed at a location that facilitates dissipation of waste heat generated in the thermoelectric element 42320 from the seating portion 42200 in a direction opposite the ground. In this way, an air flow may be formed such that, as the heat dissipating fan operates, air outside the seating portion 42200 is introduced into the neck rest and waste heat exits the seating portion 42200 in the direction opposite the ground.

The configuration of the heat dissipation module 42500 is not limited to the above-described embodiments, and any configuration capable of discharging waste heat generated in the special effect chair 42000 to outside the special effect chair 42000 may be the heat dissipation module 42500 used in the present invention.

The heat dissipation module 42500 may be communicatively connected to the controller 42600 and be controlled by the controller 42600. There may be various methods in which a heat dissipating operation is performed by a controller. For example, the controller 42600 may obtain information required for a heat dissipating operation—for example, information on a start time point and a stop time point of a heat dissipating operation—that is obtained from heat dissipation data. The controller 42600 may transmit a control signal based on the information to the heat dissipation module 42500. The heat dissipation module 42500 may perform a heat dissipating operation at the start time point of the heat dissipating operation and stop the heat dissipating operation at the stop time point of the heat dissipating operation according to the control signal. As still another example, the controller 42600 may control an operation of the heat dissipation module 42500 on the basis of a temperature value or a noise value sensed from a temperature sensor or a noise sensor. The heat dissipation module 42500 may dissipate waste heat under conditions in which enjoyment of multimedia content by the user and provision of thermal feedback are not interfered with.

A method of controlling the heat dissipating operation will be described in more detail below.

Next, the communication unit 42100 in the special effect chair 42000 will be described.

The communication unit 42100 according to an embodiment of the present invention is a configuration for communication between the central control device 41000 and the special effect chair 42000.

The communication unit 42100 may be a cable connecting the central control device 41000 and the special effect chair 42000 by a wire.

Alternatively, the communication unit 42100 may be a frequency transmitter/receiver connecting the central control device 41000 and the special effect chair 42000 wirelessly.

Since both the wired type and the wireless type have their own advantages and disadvantages, the wired type and the wireless type may be simultaneously provided in the communication unit 42100 according to circumstances. A LAN in which various cables, such as a twisted pair, a coaxial cable, and a fiber optic cable, may be used may be a typical example of the wired type. However, the wired type is not limited thereto, and any suitable medium and suitable communication network may be used according to the size of a theater, the size of data, and the like.

The wireless type may mostly use WLAN communication methods such as Wi-Fi. However, when, according to the size of a theater, short range communication is sufficient, WPAN communication methods such as Bluetooth and ZigBee may also be used. However, since wireless communication protocols are not limited thereto, other known communication methods such as an infrared communication method may also be used. Meanwhile, as a wired/wireless communication protocol, an exclusive protocol developed by a manufacturer of the special effect control system may also be used.

Next, a configuration and general operations of the controller 42600 will be described.

The controller 42600 according to an embodiment of the present invention controls internal elements of the special effect chair 42000 and facilitates exchange of information between the elements.

The controller 4260 may be connected to the communication unit 42100 and receive thermal feedback data and heat dissipation data from the central control device 41000 and may process the received thermal feedback data and heat dissipation data. The controller 42600 may interpret the thermal feedback data and the heat dissipation data according to a predetermined protocol to appropriately process the thermal feedback data and heat dissipation data.

The controller 42600 may obtain thermal feedback information on a result of processing the thermal feedback data, a type of thermal feedback to be provided, an intensity of thermal feedback to be provided, and times of thermal feedback to be provided (start time and/or end time). According to circumstances, a non-negligible time interval may be present between a time point at which thermal feedback is actually provided to the user (thermal feedback providing time point) and a time point at which power is applied to the thermoelectric element 42320 for providing thermal feedback (power application time point). In this case, any one of the thermal feedback providing time point and the power application time point may be included in the thermal feedback data. When only the thermal feedback providing time point is included in the thermal feedback data, the controller 42600 may calculate a time delay from the power application time point to the thermal feedback providing time point. The controller 42600 may obtain the power application time point from the thermal feedback data by taking the time delay into consideration.

The controller 42600 may enable a required size of power to be applied to the heat output module 42300 at a necessary time according to the obtained thermal feedback information.

The controller 42600 may obtain information on a result of processing the heat dissipation data, start and end times points of the heat dissipating operation, or an intensity of the heat dissipating operation. When the special effect control system further includes a temperature sensor or a noise sensor, the controller 42600 may receive a measured temperature value or noise value and obtain information on a main portion of heat dissipation on the basis of the received temperature value or noise value.

The controller 42600 may transmit a signal requesting for a start and stop of the heat dissipating operation to the heat dissipation module 42500 so that the heat dissipating operation may be performed according to the obtained heat dissipation information.

When the special effect chair 42000 further includes a seating sensing device, the controller 42600 may receive information on whether the user is seated from the seating sensing device and may transmit the information on whether the user is seated to the central control device 41000. In this way, the central control device 41000 may calculate a seat occupancy rate in a theater and only transmit information on various special effects including thermal feedback to special effect chairs 42000 determined as having users seated thereon. Also, when it is determined, on the basis of the information received from the seating sensing device, that the user has left the seating portion 42200, the controller 42600 may transmit a control signal to various feedback devices including the heat output module 42300 to stop the provision of various special effects including thermal feedback.

When the special effect chair 42000 further includes a user input unit 44000, the controller 42600 may be connected to the user input unit 44000 and receive a received user input. The controller 42600 may interpret/process the received user input to product a corrected control signal to which the user input is reflected and then may transmit the produced control signal to the heat output module 42300. Also, the controller 42600 may transmit the user input to the central control device 41000 so that the central control device 41000 produces a control signal by reflecting the user input.

To perform the above-described functions, the controller 42600 may be provided as a processor storing and processing data in terms of hardware and may be provided in the form of a program or code for driving a circuit in terms of software.

3. Method of Controlling Thermal Feedback

Hereinafter, a method of providing thermal feedback in the special effect control system according to an embodiment of the present invention will be described. Particularly, a method of controlling a thermoelectric operation, a type of thermal feedback, a method of controlling thermal feedback, and a method of correcting thermal feedback will be described in detail.

3.1. Controlling Thermoelectric Operation

When power is applied to the thermoelectric element 42320, a thermoelectric operation occurs at the front surface 42324 and the rear surface of the thermoelectric element 42320. When the endothermic operation occurs at the front surface 42324 of the thermoelectric element 42320, the exothermic operation occurs at the rear surface 42325, and when the exothermic operation occurs at the front surface 42324, the endothermic operation occurs at the rear surface 42325.

Which operation of the exothermic operation and the endothermic operation occurs at the front surface 42324 is determined by a direction of a current of power applied to the thermoelectric element 42320. When a direction of a current which causes the exothermic operation at the front surface 42324 is assumed as a forward direction, a direction of a current which causes the endothermic operation at the front surface 42324 may be assumed as a reverse direction which is opposite the forward direction.

An amount of absorbed or generated heat is determined by an intensity of power applied to the thermoelectric couple array 42323. Generally, an amount of heat increases as a voltage or a current value of applied power becomes higher.

The controller 42600 may cause a desired thermoelectric operation to occur by adjusting power applied to the thermoelectric element 42320. For example, the controller 42600 receives thermal feedback data and interprets the thermal feedback data to obtain information on a strength of a voltage, a direction of a current, an application time point, and the like of power to be applied. The controller 42600 may generate an electrical signal on the basis of the obtained information and then apply the generated electrical signal to the thermoelectric element 42320, thereby inducing a desired thermoelectric operation. The method of controlling thermal feedback will be described below.

3.2. Types of Thermal Feedback

It has been described above that, basically, on the basis of types of hotness/coldness that the user experiences through a thermal sensation or the like of the user, types of thermal feedback may include hot feedback, cold feedback, and thermal pain feedback.

As mentioned above, the thermoelectric couple array 42323 of the heat output module 42300 may be formed of one or more thermoelectric couple groups 42322 which are separately controllable. That is, the controller 42600 may control a direction, a strength of voltage, an application time, and the like of power applied to each thermoelectric couple group 42322 to be different. Using such independent power application to each thermoelectric couple group 42322, the heat output module 42300 may implement various types of thermal feedback.

For example, the heat output module 42300 may provide an effect as if hot heat or cold heat sequentially advances from one side to the other side of the contact portion 42400. To this end, the plurality of thermoelectric couple groups 42322 may be disposed in a row while abutting each other in the thermoelectric couple array 42323. In such an arrangement, the controller 42600 may first apply power to a first thermoelectric couple group 42322 disposed at any one side of the thermoelectric couple array 42323. After a predetermined amount of time, the controller 42600 may stop the application of the power. Next, the controller 42600 may begin to apply power to a second thermoelectric couple group 42322 which is adjacent to the first thermoelectric couple group 42322. Using the same method, the controller 42600 may stop the application of the power and then apply power to a third thermoelectric couple group 42322 adjacent to the second thermoelectric couple group 42322. When power application using this method is sequentially repeated from a thermoelectric couple group 42322 at one side to a thermoelectric couple group 42322 at the other side in the thermoelectric couple array 42323, the effect as if hot heat or cold heat moves from one side to the other side of the thermoelectric couple array 42323 may be provided.

As still another example, the heat output module 42300 may receive an effect in which an intensity at which a portion of the user's body in contact with the contact portion 42400 is heated or cooled becomes gradually stronger. To this end, the controller 42600 may increase a strength of a voltage applied to a specific thermoelectric couple group 42322 by a certain magnitude of voltage from a low intensity to a high intensity at predetermined time intervals or may decrease the strength of the voltage in a reverse order.

As yet another example, thermal feedback having another effect may be provided by combining the two above-described effects—the effect as if warmth sequentially advances from one side to the other side of the contact portion 42400 and the effect as if the strength of warmth increases or decreases with time. For example, a first voltage having a specific magnitude of voltage is applied to a first thermoelectric couple group 42322 at any one side of the plurality of thermoelectric couple groups 42322 disposed to abut each other which are included in the thermoelectric couple array 42323. Then, after a predetermined amount of time, the application of the voltage to the first thermoelectric couple group 42322 is stopped, and a second voltage, which is higher than the first voltage by a certain magnitude, is applied to the second thermoelectric couple group 42322 adjacent to the first thermoelectric couple group 42322. Such power application may be repeated several times from a thermoelectric couple group 42322 disposed at one side to a thermoelectric couple group 42323 disposed at the other side in the thermoelectric couple array 24232. In this case, the user may sense that, as warmth moves in any one direction, an intensity of the warmth becomes gradually stronger.

3.3. Controlling Thermal Feedback

The controller 42600 interprets thermal feedback data received from the central control device 41000 to obtain information on thermal feedback including thermal feedback type information, thermal feedback intensity information, thermal feedback timing information, and the like. The information on thermal feedback is information that is preset so that a thermal event and thermal feedback closely correspond to each other in terms of a time, type, intensity, and the like in order to allow the user to enjoy the thermal event included in multimedia content realistically.

Hereinafter, a method of providing a thermal experience to a user with thermal feedback corresponding to a thermal event will be described with reference to FIG. 98.

Figure 98A:
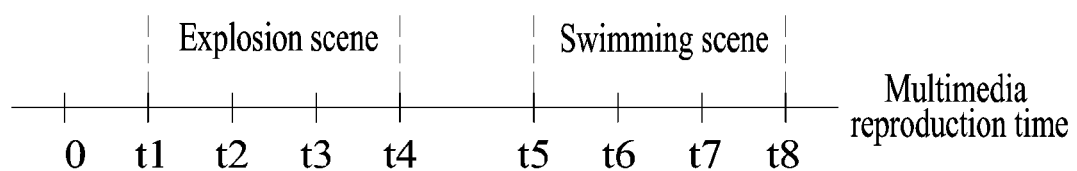
FIGS. 98A and 98B are timing diagrams of thermal feedback corresponding to a thermal event according to an embodiment of the present invention.

FIG. 98A is a graph in which time points at which thermal events included in multimedia content occur are shown corresponding to each reproduction time point of the multimedia content. For example, an explosion scene may appear as an example of a thermal event in reproduction of multimedia content. Each section of the explosion scene, which is divided into a plurality of sections, will be described.

In a first event section which starts at a first time point t1 and ends at a second time point t2, a scene in which an explosion begins is reproduced.

In a second event section which starts at the second time point t2 and ends at a third time point t3, a scene in which consecutive explosions occur around the initial explosion location following the initial explosion is reproduced.

In a third event section which starts at the third time point t3 and ends at a fourth time point t4, a scene in which the explosions end is reproduced.

In a fifth event section which starts at a fifth time point t5 and ends at a sixth time point t6, a scene in which a protagonist in multimedia content dives into cold water is reproduced.

In a sixth event section which starts at the sixth time point t6 and end at a seventh time point t7, a scene in which the protagonist enjoys swimming in the water is reproduced.

In a seventh event section which starts at the seventh time point t7 and ends at an eighth time point t8, a scene in which the protagonist comes out of the water after swimming is reproduced.

Figure 98B:
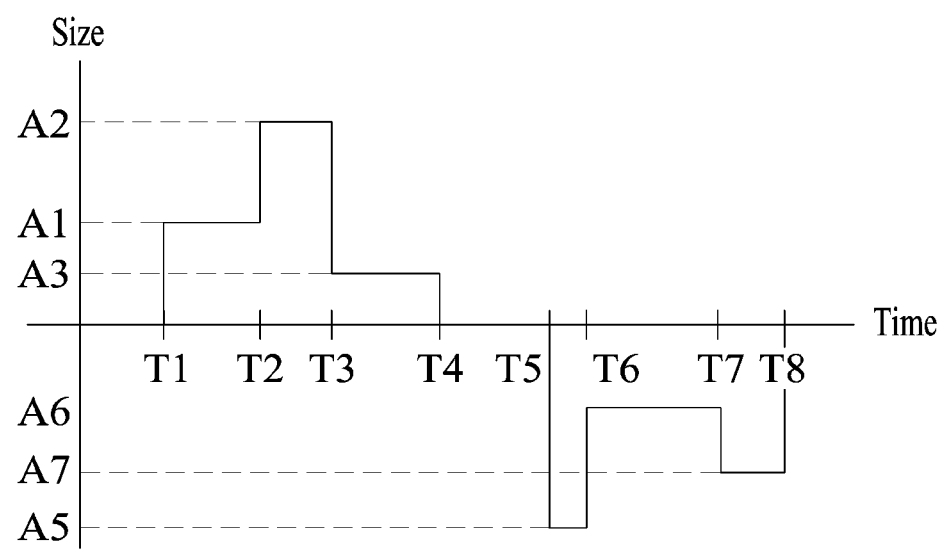

FIG. 98B is a graph in which intensities and types of thermal feedback provided to a user on the basis of thermal feedback data according to an embodiment of the present invention are shown in a time frame as the multimedia content described above with reference to FIG. 98A is reproduced. The vertical axis indicates a size of thermal feedback, and the horizontal axis indicates time. When the size of thermal feedback has a positive sign, the thermal feedback refers to hot feedback, and when the size of thermal feedback has a negative sign, the thermal feedback refers to cold feedback. A large absolute value of thermal feedback shown in the graph indicates that an intensity of the corresponding thermal feedback is strong. A time at which thermal feedback starts and a time at which the thermal feedback stops in the graph refers to a time at which thermal feedback is actually provided to the user's body and a time at which the provision of the thermal feedback is stopped through the contact portion 42400.

To express the thermal events included in the multimedia content illustrated in FIG. 98A, the information on thermal feedback illustrated in FIG. 98B is synchronized with the thermal events.

In a first feedback section which starts at a first time point T1 and ends at a second time point T2, information on thermal feedback corresponding to the scene in which the explosion begins, which is the thermal event of the first event section, is shown. Looking at the graph, it can be seen that hot feedback is provided to a size A1. In this way, the user may sense hotness, which expresses the explosion in the first feedback section, through the contact portion 42400 while viewing the explosion scene of the first event section.

Here, as described above, the first feedback section is a section in which thermal feedback which effectively expresses the thermal event of the first event section is provided. However, each of the pair of the first time point T1 and the first time point t1 and the pair of the second time point T1 and the second time point t2 may not necessarily be the same time points. The same may apply for other feedback sections and event sections which will be described below.

In a second feedback section which starts at the second time point T2 and ends at a third time point T3, information on thermal feedback which expresses the thermal event of the second event section is shown. In the second feedback section, warmth corresponding to the case in which the consecutive explosions occur and the heat of explosion reaches its peak may be expressed. Therefore, in the second feedback section, hot feedback may be provided to a size A2 which is greater than the size A1. In this way, the user may sense hotness, which is hotter than the hotness in the first feedback section, through the contact portion 42400 while viewing the consecutive explosions scene of the second event section.

In a third feedback section which starts at the third time point T3 and ends at a fourth time point T4, information on thermal feedback which expresses the thermal event of the third event section is shown. In the third feedback section, warmth corresponding to the case in which residual heat seems to remain after the explosion has ended may be expressed. Therefore, in the third feedback section, hot feedback may be provided to a size A3 which is less than the sizes A1 and A2. In this way, the user may sense slight hotness, which corresponds to the residual heat after the explosion in the third feedback section, while viewing the scene in which the explosion has ended in the third event section.

In a fifth feedback section which starts at a fifth time point T5 and ends at a sixth time point T6, information on thermal feedback which expresses the thermal event of the fifth event section is shown. In the fifth feedback section, there is a need to express coldness corresponding to the case in which coldness of the water is transmitted to the protagonist's body as the protagonist dives into the water. Therefore, it can be seen that, in the fifth feedback section, cold feedback is provided to a size A5. Since coldness should be provided at the moment at which the protagonist dives into the water, the fifth feedback section may be a very small section in terms of time.

In a sixth feedback section which starts at the sixth time point T6 and ends at a seventh time point T7, information on thermal feedback which expresses the thermal event of the sixth event section is shown. Since the sixth feedback section is a section in which the protagonist adapts to a temperature of the water with time after diving into the water, cold feedback may be provided to a size A6 which is smaller than the size A5 (based on absolute values) in the sixth feedback section. Therefore, the user may receive cold feedback through the contact portion 42400 in the sixth feedback section while viewing the scene in which the protagonist swims in the sixth event section.

In a seventh feedback section which starts at the seventh time point T7 and ends at an eighth time point T8, information on thermal feedback which expresses the thermal event of the seventh event section is shown. The seventh feedback section is a section in which the protagonist feels chilly due to evaporated heat after coming out of the water. Therefore, cold feedback may be provided to a size A7 which is larger than the size A6. In this way, the user may receive strong coldness through the contact portion 42400 in the seventh feedback section while viewing the scene in which the protagonist comes out of the water in the seventh event section.

Examples of causing pieces of suitable thermal feedback to correspond to various thermal events to express the thermal events have been described above.

The special effect control system according to an embodiment of the present invention may express various types of thermal events, other than the above-described explosion scene or swimming scene, by using thermal feedback.

In addition, although only cold feedback and hot feedback have been mentioned in the above-described example, the special effect control system according to an embodiment of the present invention may also express a thermal event in which a protagonist in multimedia content gets injured. To this end, the special effect control system may provide thermal pain feedback in a time section corresponding to a time section in which the thermal event is provided.

Hereinafter, a method in which the above-described various types of thermal feedback are actually produced/provided in the special effect chair 42000 according to an embodiment of the present invention will be described in detail.

Figure 99:
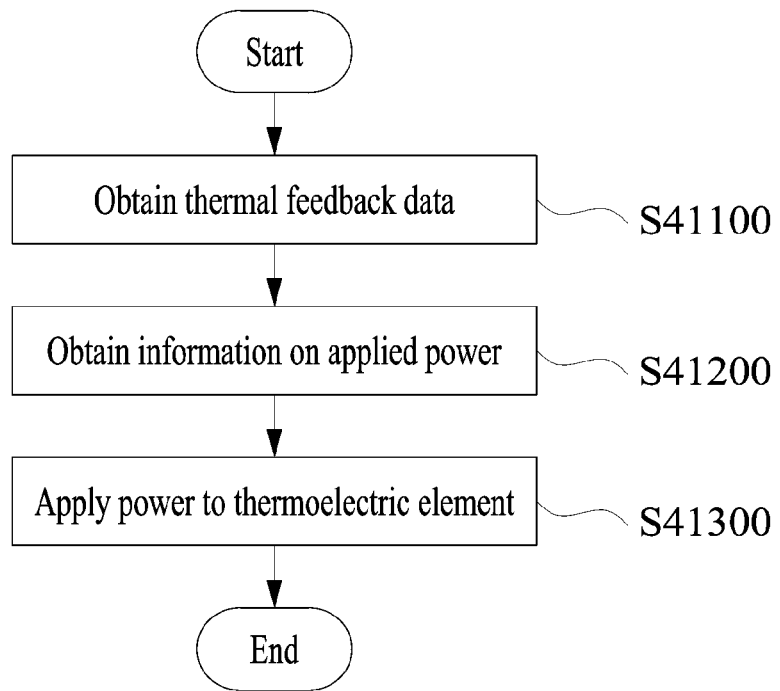
FIG. 99 is a flowchart related to a method of controlling thermal feedback according to an embodiment of the present invention.

FIG. 99 shows a thermal feedback controlling method of the special effect control system according to an embodiment. First, the special effect chair 42000 obtains thermal feedback data (S41100). The controller 42600 in the special effect chair 42000 interprets the received thermal feedback data to obtain information on power applied to the thermoelectric element 42320 (S41200). The controller 42600 generates an electrical signal according to the obtained information and applies the generated electrical signal to the thermoelectric element 42320 (S41300).

Hereinafter, each of the above-listed steps will be described in detail.

First, the controller 42600 of the special effect chair 42000 may obtain thermal feedback data (S41100). The thermal feedback data may be transmitted from the central control device 41000 to the controller 42600 through the communication unit 42100. There may be various methods of transmitting thermal feedback data to a controller. For example, the pieces of information on a plurality of pieces of thermal feedback corresponding to all thermal events in multimedia content may be included in thermal feedback data at once and transmitted to the special effect chair 42000. Alternatively, pieces of information on pieces of unit thermal feedbacks corresponding to unit thermal events may be transmitted to the special effect chair 42000 over several times. The unit thermal event refers to a single thermal event constituting a plurality of thermal events included from a start time point to an end time point of multimedia content. For example, a single unit thermal event may refer to a single explosion scene included in multimedia content. The method in which the controller 42600 receives thermal feedback data from the central control device 41000 will be described in more detail below.

Alternatively, thermal feedback data may be pre-stored in a memory included in the special effect chair 42000 itself instead of essentially going through the process in which the thermal feedback data is transmitted from the central control device 41000. When the role of the central control device 41000 collectively controlling the special effect control system is insignificant since there is only one special effect chair 42000, or when the need for synchronizing different special effect chairs and feedback provision is low due to the special effect chair 42000 separately including an audiovisual video output device, the above-described method in which thermal feedback data is provided from the internal memory of the special effect chair 42000, instead of from the central control device 41000, to the controller 42600 may be useful.

The controller 42600 interprets the obtained thermal feedback data to obtain information on thermal feedback (S41200).

In the obtained thermal feedback data, thermal feedback information including thermal feedback type information, thermal feedback intensity information, thermal feedback timing information, and the like may be included in an encoded state. The controller 42600 may decode the thermal feedback data to obtain the information on thermal feedback. The controller 42600 may interpret the information on thermal feedback to obtain information on power applied to the thermoelectric element 42320. The information on the applied power may include information on a direction in which power is applied to the thermoelectric element 42320, information on a current value or voltage value of power applied to the thermoelectric element 42320, information on a time point at which power is applied to the thermoelectric element 42320 and a time point at which the application of the power is stopped, and the like. The time point at which power is applied to the thermoelectric element 42320 and the time point at which the application of the power is stopped are times points obtained from a thermal feedback providing time point in consideration of time taken for performing a thermoelectric operation and may be different from the thermal feedback providing time point.

If the graph of FIG. 98B is a graph schematically showing thermal feedback information, the information obtained by the controller 42600 is information on a configuration of power applied to the thermoelectric element 42320 to implement the thermal feedback illustrated in FIG. 98B.

The controller 42600 may generate an electrical signal according to the obtained information and apply the generated electrical signal to the thermoelectric element 42320 (S41300).

The controller 42600 may generate power to be applied having a predetermined size of voltage value according to the obtained information on applied power, apply power to the thermoelectric element 42320 at a predetermined application time point, and apply power in a predetermined direction.

For example, the controller 42600 may apply power to the thermoelectric element 42320 at a power application time point corresponding to the start time point T1 of the first feedback section. The applied power may have a voltage value corresponding to the thermal feedback size A1. A direction in which the power is applied may be a forward direction. The controller 42600 may stop the application of the power to the thermoelectric element 42320 at a power application stop time point corresponding to the end time point T2 of the first feedback section. The controller 42600 may apply power to the thermoelectric element 42320 at a power application time point corresponding to the start time point T2 of the second feedback section. The applied power may have a voltage value corresponding to the thermal feedback size A2. A direction in which the power is applied may be a forward direction. The controller 42600 may stop the application of the power to the thermoelectric element 42320 at a power application stop time point corresponding to the end time point T3 of the second feedback section. Likewise, the controller 42600 may apply power to the thermoelectric element 42320 at a power application time point corresponding to the start time point T3 of the third feedback section. The applied power may have a voltage value corresponding to the thermal feedback size A3. A direction in which the power is applied may be a forward direction. The controller 42600 may stop the application of the power to the thermoelectric element 42320 at a power application stop time point corresponding to the end time point T4 of the third feedback section.

The thermoelectric element 42320 performs a thermoelectric operation in response to the power applied thereto at the power application time point. In this way, at the front surface 42324 of the thermoelectric element 42320, the endothermic operation or exothermic operation for providing thermal feedback occurs. At the rear surface 42325 of the thermoelectric element 42320, due to a characteristic of the thermoelectric effect, a thermoelectric operation of a type opposite to the type of thermal feedback occurs. Since the front surface 42324 of the thermoelectric element 42320 is thermally connected to the contact portion 42400, heat generated at the front surface 42324 of the thermoelectric element 42320, of which the heat generated at the front surface 42324 has a positive value when the thermoelectric operation is the exothermic operation and has a negative value when the thermoelectric operation is the endothermic operation, may be transferred to the contact portion 42400. By the transferred heat being re-transferred from the contact portion 42400 to the user's body, thermal feedback may be provided to the user.

The power applied to the thermoelectric element 42320 is the electrical signal generated on the basis of the information obtained from the thermal feedback data by the special effect controller 42600 in the previous step S41200. Therefore, suitable thermal feedback may be provided corresponding to a thermal event in the multimedia content. For example, the thermoelectric element 42320 may generate a predetermined type of thermal feedback in the thermal feedback data. Also, the thermoelectric element 42320 may begin a thermoelectric operation at a predetermined power application time point for providing thermal feedback. Also, the thermoelectric element 42320 may generate a predetermined amount of heat for providing thermal feedback.

The controller 42600 may stop the supply of power applied to the thermoelectric element 42320 at the time point at which application of power is stopped based on the obtained information (S1400).

When the supply of power is stopped, the thermoelectric element 42320 stops the thermoelectric operation, and the provision of thermal feedback ends. In this way, the provision of thermal feedback may be stopped at the time point at which expressing a thermal event using thermal feedback is stopped.

Hereinafter, a method in which the central control device 41000 transmits the thermal feedback data to the special effect chair 42000 in the special effect control system according to an embodiment of the present invention will be described.

A method of transmitting thermal feedback data may be implemented in various forms.

For example, the central control device 41000 may transmit the pieces of information on thermal feedback that should be provided to the user corresponding to all thermal events in multimedia content at once to the special effect chair 42000. In this case, the controller 42600 may interpret the thermal feedback data while maintaining the received thermal feedback data in the internal memory to apply an appropriate type of power to the thermoelectric element 42320 at an appropriate period of time. In this case, time synchronization, in which the current time recognized by each special effect chair 42000 is reset to be the same, should be performed so that the same thermal feedback may be provided in each special effect chair 42000 at the same time point. This is because, in a theater accommodating multiple users, it is common that multimedia content is reproduced at the same time and ended at the same time. Particularly, when multiple users share a single audiovisual video output device, the need for performing the time synchronization may be further increased.

Figure 100:
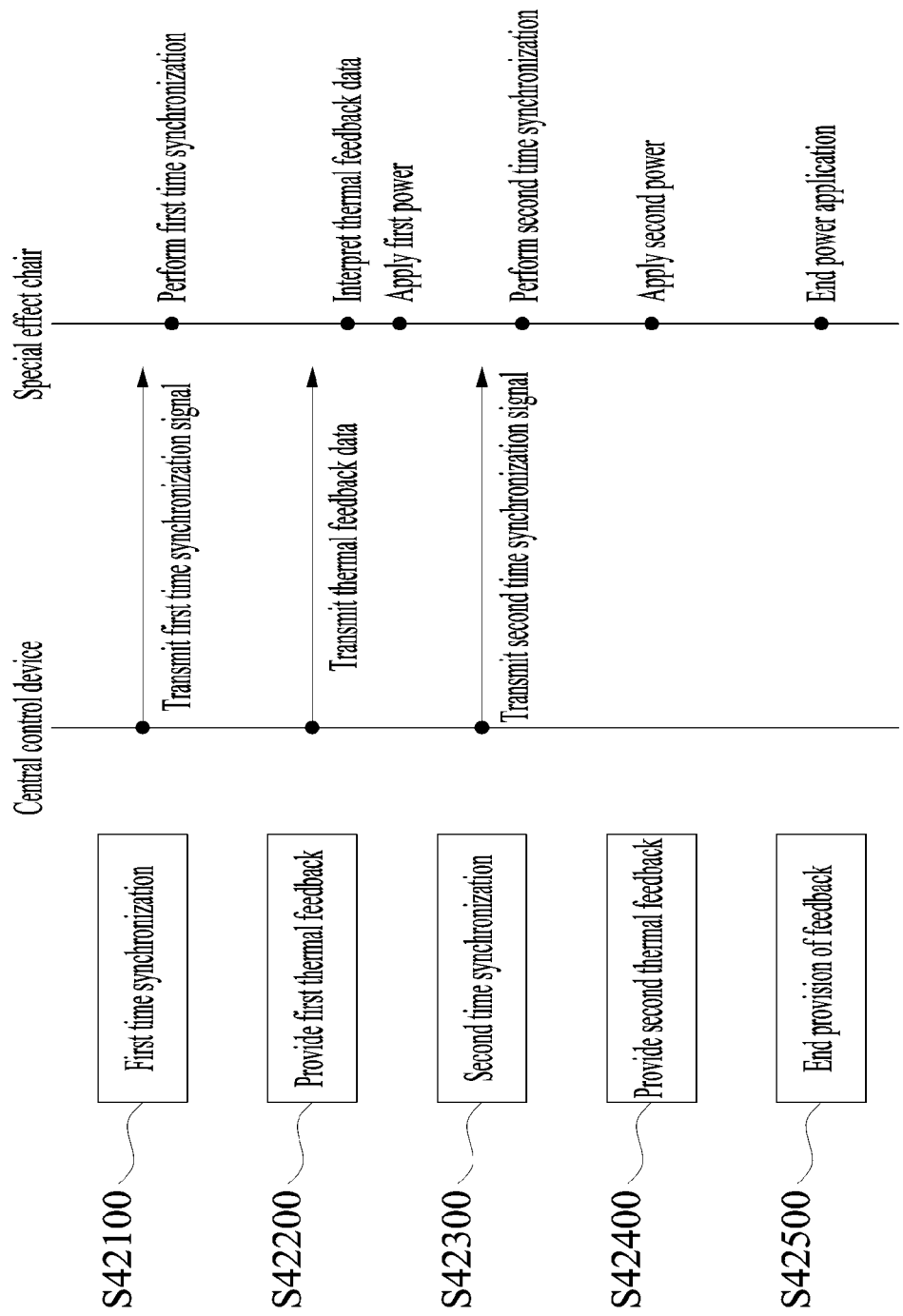
FIG. 100 is a ladder flowchart related to a method of providing thermal feedback in the special effect control system according to an embodiment of the present invention.

Hereinafter, a method of providing thermal feedback in the special effect control system when all of the pieces of thermal feedback included in multimedia content are transmitted from the central control device 41000 to each special effect chair 42000 at once will be described mainly on the basis of the time synchronization function with reference to FIG. 100.

First, the central control device 41000 transmits a first time synchronization signal to each special effect chair 42000 (S42100). Next, a first piece of thermal feedback is provided in each special effect chair 42000 (S42200). The central control device 41000 may transmit a second time synchronization signal to each special effect chair 42000 during reproduction of multimedia (S42300). Next, each special effect chair 42000 may provide a second piece of thermal feedback (S42400). Each special effect chair 42000 stops the provision of thermal feedback at a thermal feedback end time point obtained from thermal feedback data (S42500).

Hereinafter, each of the above-listed steps will be described in detail.

First, the central control device 41000 may transmit a first time synchronization signal to each special effect chair 42000 (S42100).

Each special effect chair 42000 receives the synchronization signal through the communication unit 42100 and transmits the received synchronization signal to the controller 42600. The time synchronization signal may be transmitted in the form of encoded data. The time synchronization signal may include a specific time that has to be set as the current time at the moment at which each special effect chair 42000 processes the time synchronization signal. In each special effect chair 42000, the controller 42600 processes the first time synchronization signal and sets a specific time included in the first time synchronization signal as the current time. In this way, the controller 42600 in each special effect chair 42000 may recognize the same time as the current time.

Next, a first piece of thermal feedback may be provided in the special effect chair 42000 (S42200).

To this end, the central control device 41000 may transmit thermal feedback data to the plurality of special effect chairs 42000. The thermal feedback data may include information on a plurality of pieces of thermal feedback that should be provided in series from a time point at which reproduction of multimedia content begins to a time point at which the reproduction of the multimedia content ends. The controller 42600 may interpret the received thermal feedback data to obtain information on applied power. The obtained information may include information on a first power application time and a second power application time for providing the first piece of thermal feedback and the second piece of thermal feedback. The information on the first power application time and the second power application time may be set on the basis of time synchronized according to the time synchronization performed in the previous step. The controller 42600 in each special effect chair 42000 may apply power to the thermoelectric element 42320 at the first power application time. The thermoelectric element 42320 in each special effect chair 42000 may provide the first piece of thermal feedback to the user by power applied thereto. Since the first power application time is the same in each special effect chair 42000, the first piece of thermal feedback may be provided at the same time in each special effect chair 42000.

In addition to the power application times for providing thermal feedback, the thermal feedback data may include various pieces of information on a direction and size of applied power. However, here, description will be given mainly on the basis of time synchronization for simultaneously providing thermal feedback in a plurality of special effect chairs 42000. Therefore, even when only the information on power application time is mentioned regarding provision of thermal feedback, it should be understood that various other pieces of information on thermal feedback regarding the provision of thermal feedback are being described together.

Here, each of the first piece of thermal feedback and the second piece of thermal feedback merely refer to a single piece of thermal feedback arbitrarily selected among a series of pieces of thermal feedback and do not necessarily refer to a piece of thermal feedback that is provided first or a piece of thermal feedback that is provided second in time.

Here, the central control device 41000 transmitting thermal feedback data to the special effect chair 42000 is not necessarily performed later in time than the first time synchronization. The controller 42600 may also receive the first time synchronization signal after receiving/interpreting the thermal feedback data. However, the application of power to the thermoelectric element 42320 at the first power application time should be later in time than the first time synchronization.

The central control device 41000 may transmit a second time synchronization signal to each special effect chair 42000 during the reproduction of multimedia (S42300).

The first time synchronization is performed immediately before the reproduction of multimedia in the preceding step. When a certain amount of time has passed after the first time synchronization and thermal feedback has been provided for a predetermined number of times or more, a difference may occur in the current time recognized by each special effect chair 42000 due to an unexpected variable. To deal with such a difference, the central control device 41000 may transmit a second time synchronization signal to each special effect chair 42000 periodically during the reproduction of multimedia, thereby removing the time difference that may occur. In each special effect chair 42000, the current time is reset to the synchronized time according to the second time synchronization signal.

Here, the first time synchronization and the second time synchronization refer to time synchronizations arbitrarily selected among a plurality of time synchronizations, and it is not necessary for the first time synchronization and the second time synchronization to be consecutive.

The number of times of transmitting a time synchronization signal or a time interval between times at which time synchronization signals are transmitted may be preset by a manager managing the special effect system. Alternatively, the time synchronization may be performed under the judgment of the central control device 41000. For example, the central control device 41000 may periodically receive information on the current time recognized in each special effect chair 42000 from each special effect chair 42000. The central control device 41000 may compare the current time received from each special effect chair 42000 with the current time received from another special effect chair 42000. When a difference value of a certain extent or more occurs between the current times recognized by the special effect chairs 42000, the central control device 41000 may determine that time synchronization is necessary and transmit a time synchronization signal to each special effect chair 42000.

Next, each special effect chair 42000 may provide the second piece of thermal feedback (S42400).

The controller 42600 in each special effect chair 42000 may apply power to the thermoelectric element 42320 at the second power application time point for providing the second piece of thermal feedback. In this way, the second piece of thermal feedback may be provided in each special effect chair 42000 at the same time.

The controller 42600 in each special effect chair 42000 ends the application of power at a thermal feedback end time point obtained from the thermal feedback data (S42500).

Due to ending the application of power to the thermoelectric element 42320 in each special effect chair 42000 at the same times, the provision of thermal feedback may end in each special effect chair 42000 at the same time. To this end, a thermal feedback end signal may be transmitted from the central control device 41000 to each special effect chair 42000. The transmitting of the thermal feedback end signal is not always necessary. For example, the application of power may also be ended by information on ending thermal feedback being included in thermal feedback data stored in each special effect chair 42000.

In another embodiment in which thermal feedback data is transmitted to each special effect chair 42000, the central control device 41000 may divide the thermal feedback data into a plurality of pieces of unit thermal feedback data to transmit the thermal feedback data.

Figure 101:
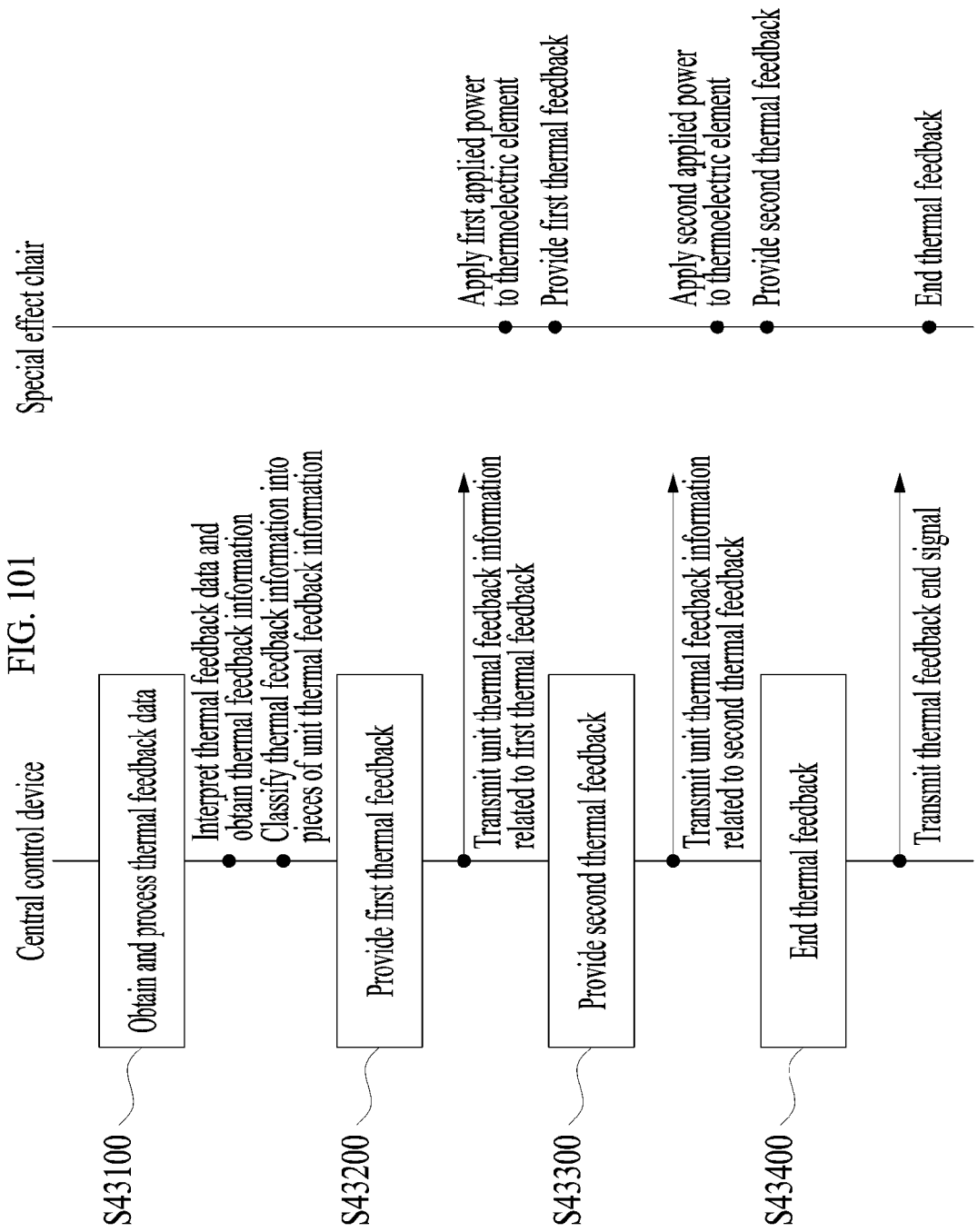
FIG. 101 is a ladder flowchart related to a method of providing thermal feedback in the special effect control system according to an embodiment of the present invention.

Hereinafter, a method of providing thermal feedback using a method in which the central control device 41000 divides thermal feedback and transmits divided pieces of thermal feedback to each special effect chair 42000 will be described with reference to FIG. 101.

First, the central control device 41000 obtains thermal feedback data and interprets the obtained thermal feedback data to obtain information on thermal feedback (S43100). Next, the special effect control system provides a first piece of thermal feedback (S43200). Next, the special effect control system provides a second piece of thermal feedback (S43300). Lastly, the special effect control system ends the provision of thermal feedback (S43400).

Hereinafter, each of the above-listed steps will be described in detail.

First, the central control device 41000 obtains thermal feedback data and interprets the obtained thermal feedback data to obtain information on thermal feedback (S43100).

The information on thermal feedback includes thermal feedback type information, thermal feedback intensity information, and thermal feedback timing information. From the aspect of applied power, a direction in which power is applied may be included in the thermal feedback type information. Also, a voltage value or a current value of applied power may be included in the thermal feedback intensity information. Also, a power application time point and a power application stop time point may be included in the thermal feedback timing information.

The thermal feedback data may include information on a plurality of pieces of thermal feedback provided in series from a start point to an end point of multimedia content. The controller 41300 in the central control device 41000 may divide or classify the obtained information on the plurality of pieces of thermal feedback in to a plurality of pieces of unit thermal feedback information. A single piece of unit thermal feedback information refers to information on thermal feedback corresponding to a single unit thermal event.

For example, when a thermal event is a scene in which an explosion occurs, the unit thermal feedback information may be information indicating that a direction in which power is applied to provide hot feedback corresponding to the explosion scene is a forward direction. Alternatively, the unit thermal feedback information may be information on a time point at which power application begins corresponding to a time point at which the explosion scene starts. Alternatively, the unit thermal feedback information may be information on a voltage value of power applied to the thermoelectric element 42320 to express warmth corresponding to the explosion.

For convenience of description, among pieces of unit thermal feedback, an arbitrary piece of unit thermal feedback will be referred to as a first piece of thermal feedback, and another arbitrary piece of unit thermal feedback that occurs later in time than the first piece of thermal feedback will be referred to as a second piece of thermal feedback. A time point at which power is applied to the thermoelectric element 42320 to provide the first piece of thermal feedback will be referred to as a first power application time point, and a time point at which power is applied to the thermoelectric element 42320 to provide the second piece of thermal feedback will be referred to as a second power application time point.

Next, the first piece of thermal feedback may be provided in the special effect control system (S43200).

The central control device 41000 may transmit a first piece of thermal feedback information to each special effect chair 42000. A time point at which the first piece of thermal feedback information is transmitted may be a time point earlier than the first power application time point by a predetermined time interval. The predetermined time interval may be time taken for thermal feedback information to be processed and power to be applied in the controller 42600.

The controller 42600 in each special effect may receive the first piece of thermal feedback information and interpret the received first piece of thermal feedback information to obtain information on first applied power. The controller 42600 may apply the first applied power based on the obtained information to the thermoelectric element 42320, thereby providing the first piece of thermal feedback. Alternatively, instead of the controller 42600 in each special effect interpreting the first piece of thermal feedback information, the central control device 41000 may directly interpret the first piece of thermal feedback information and directly apply the first applied power in the form of an electrical signal to the thermoelectric element 42320.

The first applied power may only be maintained until a first applied power stop time point, and the first applied power may be stopped after the first applied power stop time point. The first applied power stop time point may be included in the first piece of thermal feedback information that the special effect controller 42600 has received previously. Alternatively, the central control device 41000 may also transmit a signal for stopping the application of power at a time point earlier than the first applied power stop time point by a predetermined time interval. The predetermined time interval may be time taken for the controller 42600 in the special effect chair 42000 to transmit and process the signal for stopping the first applied power and stop the applied power.

It has been described above that the central control device 41000 only transmits the first piece of thermal feedback information to the special effect chair 42000. However, according to circumstances, the central control device 41000 may also transmit a second piece of thermal feedback information as well as the first piece of thermal feedback information to the special effect chair 42000.

Next, the second piece of thermal feedback may be provided in the special effect control system (S43300).

The central control device 41000 may transmit a second piece of thermal feedback information to each special effect chair 42000. A time point at which the second piece of thermal feedback information is transmitted may be a time point earlier than the second power application time point by a predetermined time interval. The predetermined time interval may be time taken for thermal feedback information to be processed and power to be applied in the controller 42600.

The controller 42600 in each special effect may receive the second piece of thermal feedback information and interpret the received second piece of thermal feedback information to obtain information on second applied power. The controller 42600 may apply the second applied power based on the obtained information to the thermoelectric element 42320, thereby providing the second piece of thermal feedback. Alternatively, instead of the controller 42600 in each special effect interpreting the second piece of thermal feedback information, the central control device 41000 may directly interpret the second piece of thermal feedback information and directly apply the second applied power in the form of an electrical signal to the thermoelectric element 42320.

The second applied power may only be maintained until a second applied power stop time point, and the second applied power may be stopped after the second applied power stop time point. The second applied power stop time point may be included in the second piece of thermal feedback information that the special effect controller 42600 has received previously. Alternatively, the central control device 41000 may also transmit a signal for stopping the application of power at a time point earlier than the second applied power stop time point by a predetermined time interval. The predetermined time interval may be time taken for the controller 42600 in the special effect chair 42000 to transmit and process the signal for stopping the second applied power and stop the applied power.

Lastly, the special effect control system ends the provision of thermal feedback (S43400).

The central control device 41000 transmits a signal for ending application of power to each special effect chair 42000. Each special effect chair 42000 stops the provision of thermal feedback according to the end signal. Here, a time point at which the central control device 41000 transmits a signal for ending the application of power may be a time point earlier than the thermal feedback end time point by a predetermined time interval. The predetermined time interval may be time taken for each special effect chair 42000 to transmit/process the signal for ending the application of power and actually end the application of power.

Here, the transmitting of the thermal feedback ending signal is not always necessary, and the last thermal feedback stop time point may also be understood as an end of thermal feedback.

The methods of providing thermal feedback in each special effect chair 42000 in connection with the central control device 41000 have been described above. Hereinafter, a method of correcting thermal feedback will be described.

3.4. Correcting Thermal Feedback

Regarding thermal feedback at the same intensity, the degree of warmth actually felt may be different for each user.

Therefore, there is a need for correction to adjust an intensity of thermal feedback. Correction on an intensity of thermal feedback may be performed by adjusting a strength of a voltage applied to the thermoelectric element 42320.

Hereinafter, correcting an intensity of thermal feedback will be described in detail.

The sensitivity at which the user senses thermal feedback may be different for each user according to differences in physical characteristics of the users, clothing worn by the users, and the like. Therefore, it may be necessary for the user to adjust the power and intensity of thermal feedback directly to an extent that each user may sense a thermal experience in an optimal state. To this end, the special effect chair 42000 according to an embodiment of the present invention may further include a user input unit 44000 receiving a user input. The user input unit 44000 may convert the received user input to the form of an electrical signal and transmit the converted user input to the controller 42600.

Figure 102:
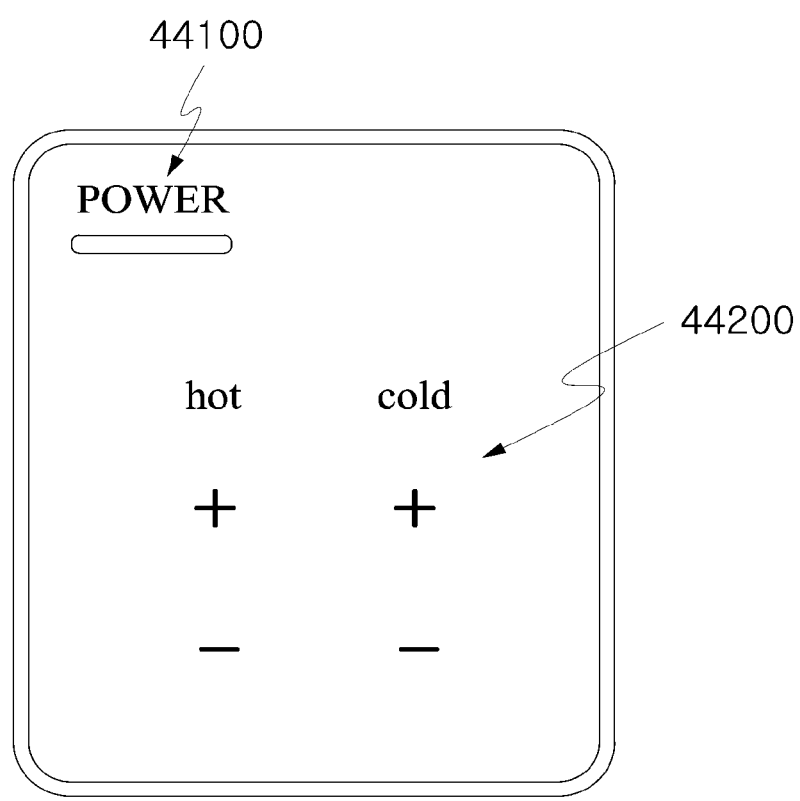
FIG. 102 is a schematic diagram of a user input unit according to an embodiment of the present invention.

FIG. 102 illustrates the user input unit 44000 according to an embodiment of the present invention. The user input unit 44000 may include a power button 44100 with which on/off of thermal feedback may be selected. Also, the user input unit 44000 may include a feedback intensity adjusting button 44200 with which an intensity of thermal feedback may be adjusted from a low level to a high level. Regarding hot feedback and cold feedback, the intensities of pieces of thermal feedback may be adjusted in the same direction at once. Alternatively, regarding hot feedback and cold feedback, intensities of pieces of thermal feedback may be adjusted independently.

The intensity adjusting button may have various forms. For example, the intensity adjusting button may also be provided in the form of a switch, form of a button, form of a wheel, or form of a touchscreen.

According to circumstances, the user input unit 44000 may further include a display. Multimedia content reproduction information, feedback intensity information, and the like may be displayed on the display.

The user input unit 44000 may be disposed on any location as long as it is easy for a seated user to manipulate the user input unit 44000 at the location. For example, when the seating portion 42200 includes an armrest portion, the user input unit 44000 may be disposed at one end of the armrest portion. The user input unit 44000 may be disposed at a location that is easy for the user to reach with his/her hand while the user's arm is placed on the armrest portion.

The user input unit 44000 may have a form attached and fixed to a portion of the seating portion 42200 or may have a form attachable to and detachable from a portion of the seating portion 42200.

The user input unit 44000 may be communicatively connected to the controller 42600 in the special effect chair 42000 via a wire or wirelessly. For example, by including an infrared transmitter/receiver, the user input unit 44000 may wirelessly transmit a received user input to the controller 42600.

Other than the above-described forms, the user input unit 44000 may also be implemented in various forms having an interface so that the user may adjust an intensity of thermal feedback.

Figure 103:
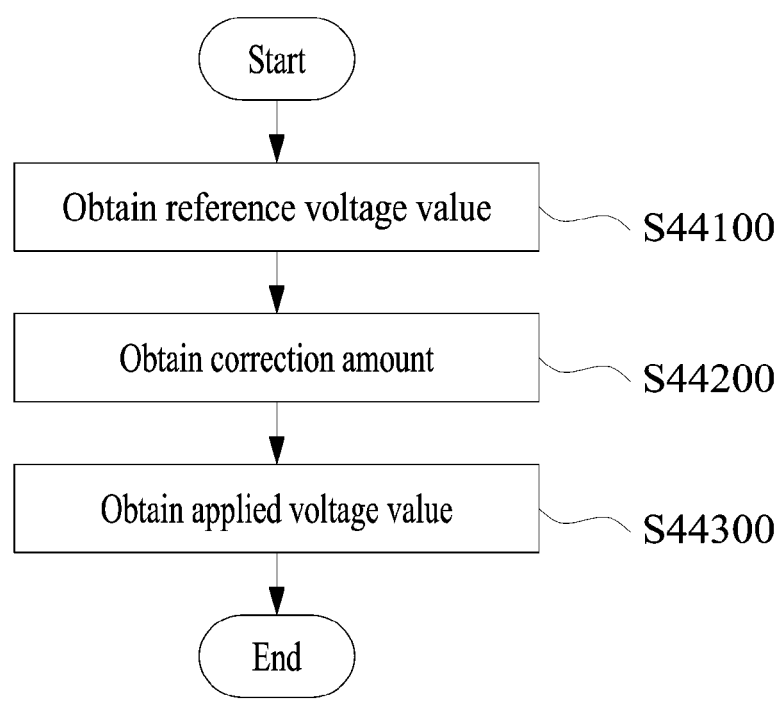
FIG. 103 is a flowchart of a method of correcting an intensity of thermal feedback according to an embodiment of the present invention.

Hereinafter, a method in which an intensity of thermal feedback is adjusted using the user input unit 44000 will be described with reference to FIG. 103.

First, the controller 42600 obtains a reference voltage value according to each feedback intensity (S44100). The controller 42600 may obtain a correction amount according to a user input (S44200). The controller 42600 may obtain an applied voltage value according to a user input (S44300).

Hereinafter, the method in which an intensity of thermal feedback is adjusted will be described in detail for each step.

First, the controller 42600 may obtain a reference voltage value according to each feedback intensity (S44100).

For example, intensities of thermal feedback may include intensities from a first level at which an intensity is the lowest, i.e., a voltage value of applied power is the smallest, to a third level at which an intensity is the highest, i.e., a voltage value of applied power is the highest. Hereinafter, for convenience of description, description will be given using hot feedback as an example. The intensity of the first level is an intensity of hot feedback provided at a scene in which a protagonist drinks a hot tea in multimedia content. The intensity of the second level is an intensity at which hotness stronger than that of the intensity of the first level is provided. For example, the intensity of the second level is an intensity of hot feedback provided in a scene in which a protagonist basks in a bonfire. At the intensity of the third level, hotness stronger than that of the intensity of the second level may be provided. For example, the intensity of the third level is an intensity of hot feedback provided at a scene in which an explosion occurs close to the protagonist.

In order to provide an intensity of hot feedback corresponding to each level, a voltage value of applied power may be set differently for hot feedback corresponding to each level. Here, a voltage value of applied power set corresponding to each feedback level is referred to as a reference voltage value. A voltage value corresponding to a first hot feedback level is referred to as a first reference voltage value. A voltage value corresponding to a second hot feedback level is referred to as a second reference voltage value. A voltage value corresponding to a third hot feedback level is referred to as a third reference voltage value.

Each of the reference voltage values may be included in information on thermal feedback. The controller 42600 may receive the information on thermal feedback from the central control device 41000. The controller 42600 may interpret the information on thermal feedback to obtain the reference voltage value for each level.

For example, the first reference voltage value corresponding to the first level of a hot feedback intensity may be set to any one voltage value in a forward direction. The second reference voltage value may be a voltage value greater than the first reference voltage value. The third reference voltage value may be a voltage value greater than the second reference voltage value.

In some cases, thermal feedback is provided without a signal for correction being input through the user input unit 44000. In this case, the controller 42600 may set voltage values of power applied to the thermoelectric element 42320 according to each feedback level to reference voltage values corresponding to each feedback level.

Next, the controller 42600 may obtain a correction amount according to a user input (S44200).

The user may press "hot feedback intensity increase button" of the user input unit 44000. The user input unit 44000 may sense the user input and transmit the user input in the form of an electrical signal to the controller 42600. The controller 42600 may interpret the user input. The controller 42600 may obtain a correction amount corresponding to the user input. The correction amount refers to a size of a voltage added to a reference voltage value of each feedback level corresponding to the user input. The correction amount may be a different value for each feedback level. Alternatively, the correction amount may be the same value for each feedback level.

When a user input for increasing an intensity of hot feedback is received one or more times, a correction amount may be obtained as many times as the user input has been input.

Correction amounts corresponding to different user inputs may be values different from each other.

The correction amount may be a value preset by a manager managing the special effect control system according to a specific purpose; the specific purpose may be, for example, to cause hot feedback provided at each level to be increased by the same amount of heat or to cause hot feedback provided at each level to rise by the same temperature as the intensity of the feedback is corrected. The correction amount may be a value included in thermal feedback data.

Next, the controller 42600 may obtain an applied voltage value according to a user input (S44300).

The applied voltage value refers to a voltage value applied by the controller 42600 to the thermoelectric element 42320 for provision of thermal feedback. The applied voltage value may be obtained by adding the correction amount to the reference voltage value. Therefore, the applied voltage value is obtained as a value greater than the reference voltage value since the correction amount is a positive value when a signal for increasing an intensity of hot feedback is input. A different value may be obtained as the applied voltage value for each feedback level. A different value may be obtained as the applied voltage value according to the number of times the user input has been received. Then, when providing hot feedback, the controller 42600 applies power having the applied voltage value to the thermoelectric element 42320. In this way, the user may receive a stronger degree of hot feedback by pressing the hot feedback intensity increase button.

In addition, the above-described steps may also be applied when the user manipulates a hot feedback intensity decrease button. However, in this case, the correction amount has a negative value. Therefore, an applied voltage value obtained by adding the correction amount to a reference voltage value may be a value less than the reference voltage value. In this way, the user may receive hot feedback at a weaker intensity.

The above description has been given on the basis of hot feedback. However, the above description may also be applied to intensity correction of cold feedback. In this case, a direction in which power is applied may be changed to a reverse direction.

Unlike the above description, regarding intensities of hot feedback and cold feedback, the intensities of pieces of thermal feedback may be corrected at once by a single user input. In this case, the correction amount regarding the intensity of hot feedback may have a positive value, and the correction amount regarding the intensity of cold feedback may have a negative value. Sizes (based on absolute values) of the correction amount regarding the intensity of hot feedback and the correction amount regarding the intensity of cold feedback may be different from each other. When an input for correction of intensities of hot feedback and cold feedback is input several times, each correction amount corresponding to one-time correction may be a different value.

When necessary, the controller 42600 may inform the central control device 41000 that correction has been performed on an intensity of thermal feedback through the communication unit 42100.

In addition, when the special effect control system according to an embodiment of the present invention further includes a temperature sensor to obtain a heat dissipation request message, changes to a reference temperature value and a cooling reference value may be accompanied corresponding to correction of an intensity of thermal feedback. This will be described in detail below in relation to a method of controlling a heat dissipating operation.

4. Method of Controlling Heat Dissipating Operation

Hereinafter, a method of controlling a heat dissipating operation performed by the special effect control system according to an embodiment of the present invention will be described.

4.1. Outline of Heat Dissipating Operation

It has been described above that the heat dissipating operation is an operation for dissipating waste heat, which accumulates in the special effect chair 42000 due to the thermoelectric operation of the thermoelectric element 42320, to outside the special effect chair 42000. If the heat dissipating operation is not performed in time, the accumulated waste heat may affect sensitivity of thermal feedback and may become a risk factor that may cause a problem in terms of durability of the special effect chair 42000 or cause a burn on the user's body.

In the special effect control system according to an embodiment of the present invention, obtaining a heat dissipation request message may be required for a heat dissipating operation to be performed.

In the special effect control system according to another embodiment of the present invention, obtaining a heat dissipation permission message may be required for a heat dissipating operation to be performed.

In the special effect control system according to another embodiment of the present invention, 1) obtaining a heat dissipation request message and 2) obtaining a heat dissipation permission message may be required for a heat dissipating operation to occur.

Here, the expression "obtain" the message may be understood to mean that, when whether a certain condition is satisfied in a single controller is determined, the certain condition has been satisfied.

For example, the heat dissipation request message and the heat dissipation permission message may be in the form of a control signal generated at a time point at which a certain condition is satisfied.

For example, there may be a specific condition required to perform a heat dissipating operation. When such a necessary condition for heat dissipation is satisfied, it can be seen that a heat dissipation request message has been obtained. Also, there may be a specific condition in which it is possible to perform a heat dissipating operation temporally/spatially. When such a condition for permitting heat dissipation is satisfied, it can be seen that a heat dissipation permission message has been obtained.

In order to determine whether the necessary condition for heat dissipation or condition for permitting heat dissipation is satisfied, i.e., whether the heat dissipation request message or heat dissipation permission message is obtained, a controller may receive information from a separate sensor/information obtainer. The received information may be, for example, a temperature value, a noise value, a heat dissipation start time point/stop time point, an acceleration value, and the like. The information may be determined in order to determine the necessary condition for heat dissipation or condition for permitting heat dissipation. The information may not necessarily be used only for determination of any one condition.

Figure 104:
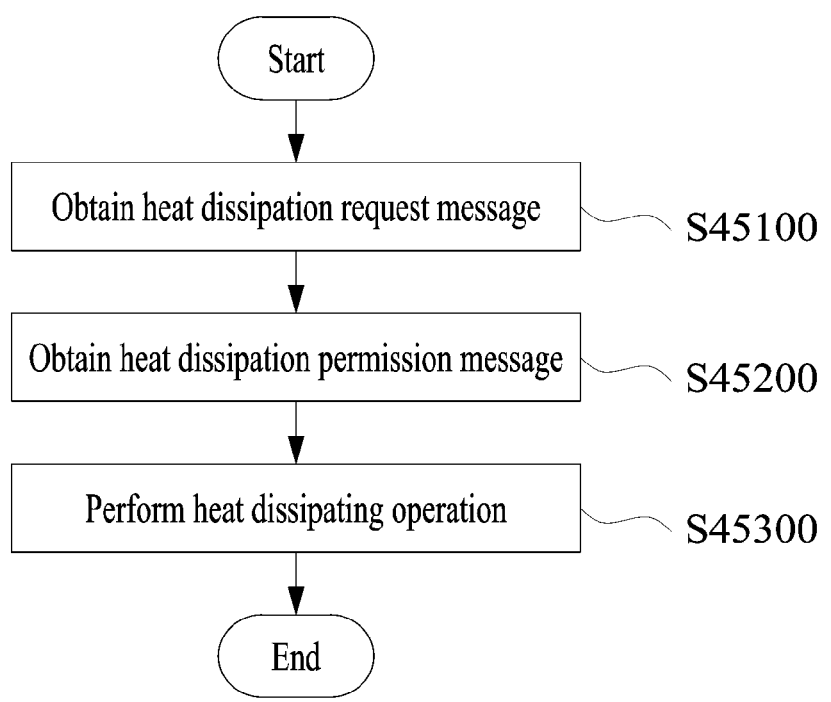
FIG. 104 is a flowchart related to a method of controlling a heat dissipating operation according to an embodiment of the present invention.

Hereinafter, a heat dissipating operation method including obtaining a heat dissipation request message and obtaining a heat dissipation permission message will be described with reference to FIG. 104. The obtaining of the heat dissipation request message will be described first for convenience of description, but an order may not necessarily be present between the obtaining of the heat dissipation request message and the obtaining of the heat dissipation permission message. Therefore, the obtaining of the heat dissipation permission message may be performed first, or the two steps may also be simultaneously performed.

First, the controller 42600 may obtain the heat dissipation request message (S45100). Then, the controller 42600 may obtain the heat dissipation permission message (S45200). The controller 42600 may perform a heat dissipating operation (S45300).

Hereinafter, each step will be described in detail.

First, the controller 42600 may obtain the heat dissipation request message (S45100).

The heat dissipation request message is a message that informs the controller 42600 that a heat dissipating operation should be performed. That is, when more heat is accumulated than necessary, the heat dissipation request message may be obtained.

There may be various methods of obtaining the heat dissipation request message. For example, the heat dissipation request message may be obtained by interpreting heat dissipation data. As another example, heat dissipation data may be obtained by measuring a temperature of a portion of the special effect chair 42000. In addition to the above-described examples, the heat dissipation request message may be obtained using any other methods capable of determining that a certain amount or more of waste heat has been accumulated.

There may be various periods of time in which the heat dissipation request message is obtained. For example, the heat dissipation request message may be obtained at an intermediate time point between a heat dissipating operation start time point and a heat dissipating operation stop time point included in heat dissipation data. As another example, the heat dissipation request message may be obtained at a time point at which a temperature of a portion of the special effect chair 42000 reaches a reference temperature value or higher. In addition to the above-described examples, the heat dissipation request message may be obtained at a time point at which waste heat is accumulated by a certain amount or more.

The method of obtaining the heat dissipation request message and times and conditions related thereto will be described in more detail below.

Next, the controller 42600 may obtain the heat dissipation permission message (S45200).

As described above, the heat dissipation permission message is a message meaning that a condition under which a heat dissipating operation may be performed is met.

There may be various factors that may be taken into consideration to permit a heat dissipating operation.

For example, a condition under which a heat dissipating operation may be performed may refer to a time section in which it is fine for a heat dissipating operation to be performed temporally. Alternatively, a condition under which a heat dissipating operation may be performed may mean that a place in which a heat dissipating operation may be performed is secured spatially. Alternatively, a condition under which a heat dissipating operation may be performed may refer to a condition that does not interfere with the user enjoying multimedia content even when a heat dissipating operation is performed for other reasons.

An example of a heat dissipation permission message will be described. The heat dissipating operation may occasionally cause noise in driving the heat dissipation module 42500. The caused noise may become a factor that interferes with the user enjoying multimedia content. Therefore, the controller 42600 may perform the heat dissipating operation only when noise is generated around the special effect chair 42000, thereby minimizing the possibility that the heat dissipating operation will be an interfering factor. To this end, the controller 42600 in the special effect chair 42000 may be connected to a noise sensor. The controller 42600 may interpret and process noise information measured from the noise sensor, thereby obtaining a heat dissipation permission message when a certain condition is satisfied.

Still another example of the heat dissipation permission message will be described. The seating portion 42200 may perform an operation such as rotation or vibration as a type of a special effect. When a heat dissipating operation is performed while the seating portion 42200 performs the special effect operation, the heat dissipating operation may be performed in a situation in which it is not recognized by the user. Therefore, the heat dissipating operation may not interfere with the user enjoying multimedia content. To this end, the controller 42600 may sense that the seating portion 42200 is performing the special effect operation such as rotation or vibration. For example, the controller 42600 may be connected to an acceleration sensor. Alternatively, the controller 42600 may also interpret data including information on the special effect operation. Using the acceleration sensor or information on the special effect operation, the controller 42600 may recognize that the seating portion 42200 is performing the special effect operation. Upon sensing that the special effect operation is being performed, the controller 42600 may obtain the heat dissipation permission message.

The above-described embodiments will be described in more detail below.

When the controller 42600 has not obtained the heat dissipation permission message, if a control signal is being transmitted to the heat dissipation module 42500, the controller 42600 may stop the transmission of the control signal. In this way, the heat dissipating operation may be stopped. The controller 42600 may not transmit a control signal to the heat dissipation module 42500 until the heat dissipation request message and the heat dissipation permission message are obtained again.

However, there may be an exceptional case in which the heat dissipating operation has to be performed even if the heat dissipation permission message has not been obtained. For example, when a temperature value of the contact portion 42400 has risen to an extent that a danger may be caused to the user's body, there is a need to perform the heat dissipating operation due to only the heat dissipation request message regardless of whether the heat dissipation permission message is obtained. To be prepared for such a case, information on whether the heat dissipating operation is urgently required may be included in the heat dissipation request message. When the heat dissipating operation is urgent, the controller 42600 may determine to perform the heat dissipating operation even if the heat dissipation permission message has not been obtained. When the heat dissipating operation is not urgent, the controller 42600 may determine to not perform the heat dissipating operation. The above-described determining of whether the heat dissipating operation is urgently required may not be necessary.

Next, the controller 42600 may perform the heat dissipating operation (S5400).

When the heat dissipation request message and the heat dissipation permission message have been obtained, the controller 42600 may perform the heat dissipation. The controller 42600 may transmit a control signal causing the heat dissipating operation to occur to the heat dissipation module 42500 to perform the heat dissipating operation. For example, the controller may determine a start time point of a heat dissipating operation, a stop time point of the heat dissipating operation, and an intensity of the heat dissipating operation on the basis of information which has been used to determine whether the heat dissipation request message or the heat dissipation permission message has been obtained.

4.2. Heat Dissipation Request Message

Hereinafter, an implementation of a heat dissipation request message will be described in detail.

Figure 105:
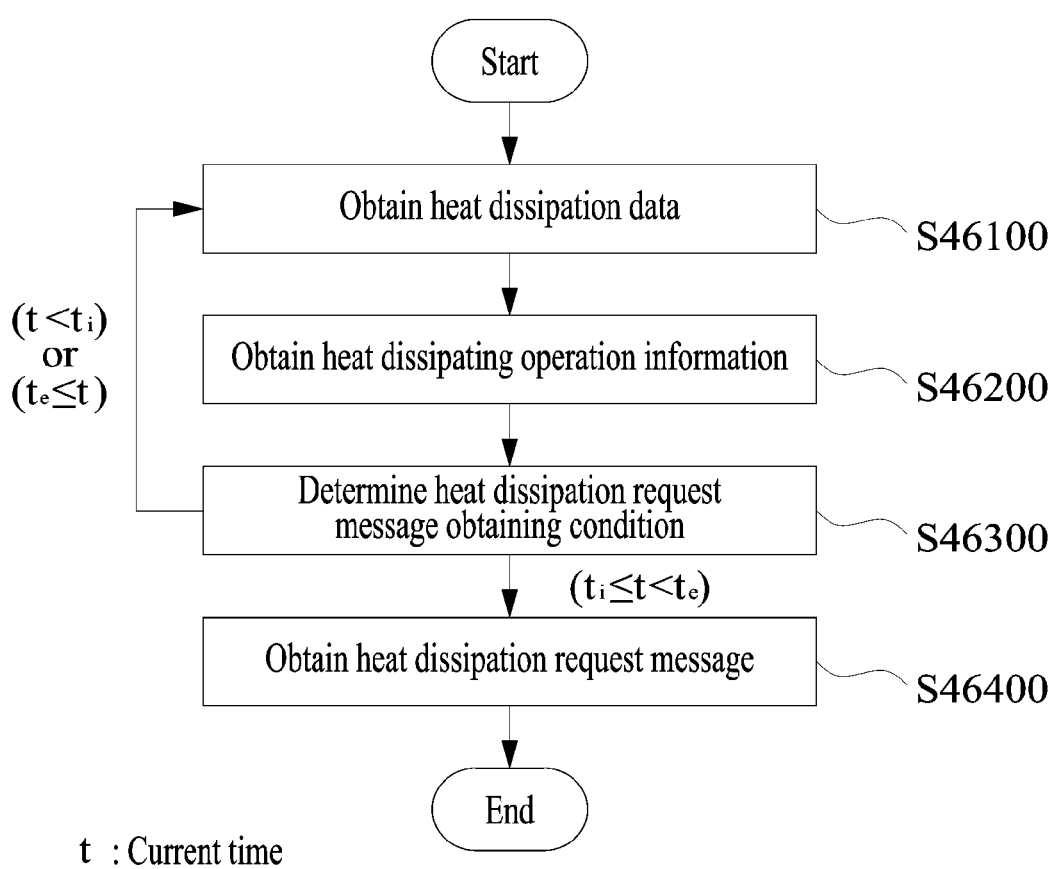
FIG. 105 is a flowchart related to a method of obtaining a heat dissipation request message according to an embodiment of the present invention.

In FIG. 105, as an embodiment of obtaining a heat dissipation request message, a method of using heat dissipation data will be described.

First, the controller 42600 may obtain heat dissipation data (S46100). Then, the controller 42600 may obtain heat dissipating operation information (S46200). Then, the controller 42600 may determine, according to a heat dissipation request message obtaining condition, whether the heat dissipation request message has been obtained (S46300). The controller 42600 may obtain the heat dissipation request message (S46400). Hereinafter, each step will be described in detail.

First, the controller 42600 may obtain heat dissipation data (S46100). The heat dissipation data is data including information on a heat dissipating operation in connection with thermal feedback data. Information on the heat dissipating operation may be information on a start time point ti and a stop time point te of a heat dissipating operation and an intensity of the heat dissipating operation. The start time point ti and the stop time point te of the heat dissipating operation and the intensity of the heat dissipating operation are inserted at a time point at which heat dissipation is determined to be necessary in consideration of a number of times, a time duration, an intensity, and the like of thermal feedback in connection with thermal feedback data.

The special effect chair 42000 may receive the heat dissipation data from the central control device 41000 through the communication unit 42100. The heat dissipation data may include information on a plurality of heat dissipating operations. The central control device 41000 may transmit the entirety of information on the plurality of heat dissipating operations at once. Alternatively, the information on the plurality of heat dissipating operations may be divided or classified into pieces of information on a plurality of unit heat dissipating operations. The central control device 41000 may also transmit the divided pieces of information on unit heat dissipating operations to the special effect chair 42000 over several times.

Next, the controller 42600 may obtain heat dissipating operation information (S46200). The controller 42600 may interpret the heat dissipation data to obtain information on the start time point ti and the stop time point te of the heat dissipating operation and the intensity of the heat dissipating operation.

Next, the controller 42600 may determine, according to a heat dissipation request message obtaining condition, whether the heat dissipation request message has been obtained (S46300). The heat dissipation request message obtaining condition may be a condition of comparing the current time with the start time point ti and the stop time point te of the heat dissipating operation. The controller 42600 itself may know information on the current time t. The controller 42600 may determine that there is no need to perform the heat dissipating operation when the current time t has not reached the heat dissipation start time point ti or when the current time t has reached the heat dissipation stop time point te or passed the heat dissipation stop time point te. In this case, the controller 42600 is not able to obtain the heat dissipation request message.

When the controller 42600 has failed to obtain the heat dissipation request message, the controller 42600 does not perform the heat dissipating operation. Then, the controller 42600 may re-perform the determining of the heat dissipation request message obtaining condition.

The controller 42600 may determine that the heat dissipating operation is necessary when the current time t has reached the heat dissipation start time point ti (includes the case in which the current time t is the same as the heat dissipation start time point ti) and has not reached the heat dissipation stop time point te.

The controller 42600 may obtain the heat dissipation request message (S46400). The controller 42600 may obtain the heat dissipation request message when the heat dissipating operation is determined to be necessary. Obtaining of the heat dissipation request message may not necessarily mean performing the heat dissipating operation.

Figure 106:
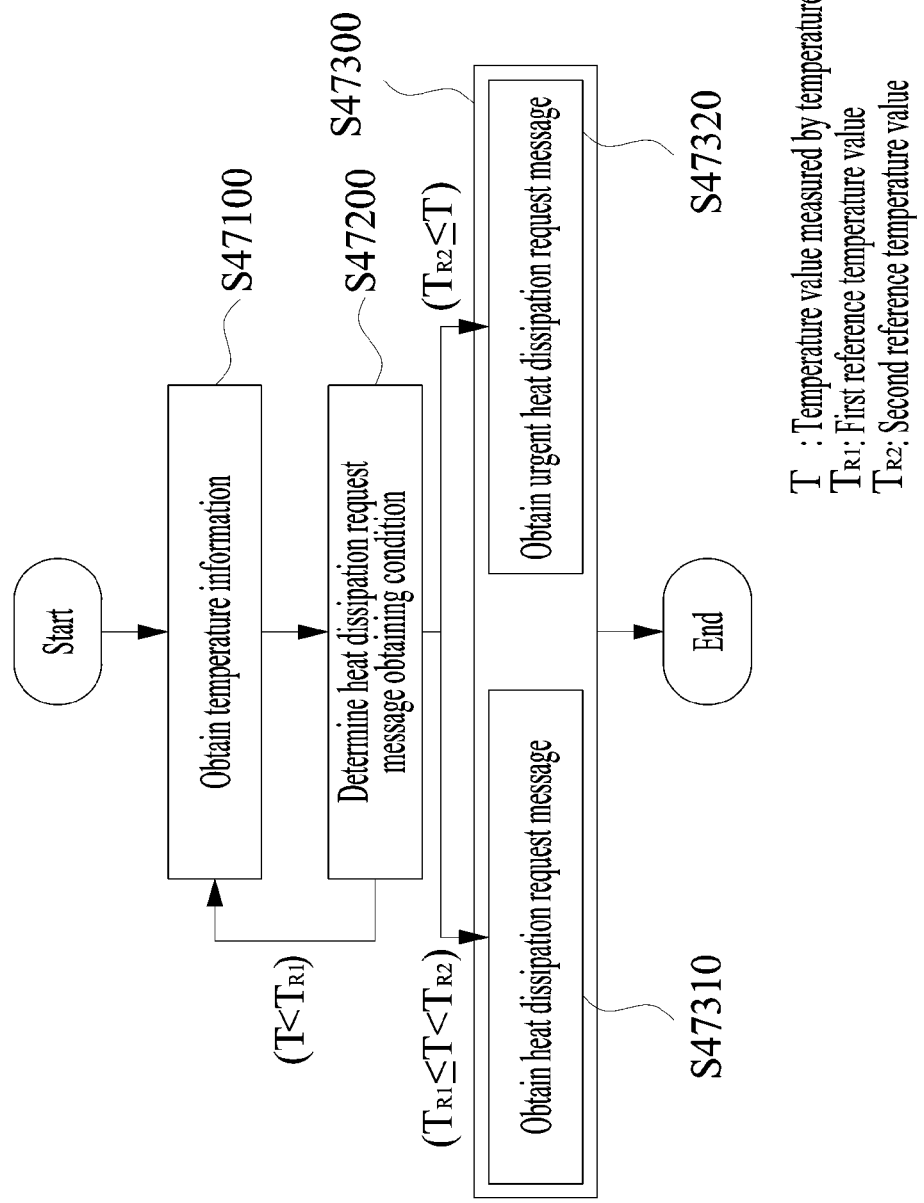
FIG. 106 is a flowchart related to a method of obtaining a heat dissipation request message according to an embodiment of the present invention.

Hereinafter, as an embodiment of obtaining a heat dissipation request message, a method of using a temperature sensor will be described with reference to FIG. 106.

First, the controller 42600 may obtain temperature information on a portion of a special effect chair (S47100). The controller 42600 may determine, on the basis of the obtained temperature information, whether the heat dissipation request message obtaining condition is satisfied (S47200). Then, the controller 42600 may obtain the heat dissipation request message (S47300).

Hereinafter, each step will be described in detail.

First, the controller 42600 may obtain temperature information on the heat output module 42300 (S47100).

The special effect chair 42000 may further include a temperature sensor measuring a temperature of a portion of the special effect chair 42000. A temperature value T measured from the temperature sensor may be provided to the controller 42600. A location at which the temperature sensor is disposed may be a portion of the thermoelectric element 42320 or a portion of the contact portion 42400. Alternatively, the temperature sensor may be disposed at a location at which it is easy for waste heat to be accumulated in terms of structural features of the special effect chair 42000. The controller 42600 may interpret the temperature value T to determine whether the heat dissipating operation is necessary.

The controller 42600 may determine, on the basis of the obtained temperature information, whether the heat dissipation request message obtaining condition is satisfied (S47200).

The heat dissipation request message obtaining condition may be a condition of comparing a reference temperature value and the obtained temperature information. A plurality of reference temperature values may be set. Hereinafter, for convenience of description, description will be given by assuming that there are two reference temperature values.

The controller 42600 may have a first reference temperature value TR1 and a second reference temperature value TR2 pre-stored therein. When a thermoelectric operation is repeated in the thermoelectric element 42320, a portion of the special effect chair 42000 may be heated to the extent that sensitivity of thermal feedback is degraded. When the thermoelectric operation is repeated more times, the heating of the portion of the special effect chair 42000 may reach a level beyond the extent that sensitivity of hot feedback is degraded which deteriorates durability of the special effect chair 42000 and causes danger to the user. A temperature value when the temperature value T measured by the temperature sensor reaches the above-described level at which the sensitivity of thermal feedback is degraded is referred to as a first reference temperature value TR1, and a temperature value when the measured temperature value T reaches the level at which the durability of the special effect chair 42000 is deteriorated and a danger is caused to the user is referred to as a second reference temperature value TR2. Therefore, the second reference temperature value TR2 may be greater than the first reference temperature value TR1.

The controller 42600 may compare the temperature value T measured by the temperature sensor with the first reference temperature value TR1 and the second reference temperature value TR2. When the measured temperature value T is less than the first reference temperature value TR1, the controller 42600 may determine that the heat dissipating operation is not necessary.

When the measured temperature value T is greater than or equal to the first reference temperature value TR1 and less than the second reference temperature value TR2, the controller 42600 may determine that the heat dissipating operation is necessary.

When the measured temperature value T is greater than or equal to the second reference temperature value TR2, the controller 42600 may determine that the heat dissipating operation is urgently required.

By giving some examples of the measured temperature value, the heat dissipation request message obtaining condition will be described with reference to FIG. 107. The vertical axis indicates a temperature value measured by the temperature sensor. The horizontal axis is an axis for showing the measured temperature values by distinguishing the measured temperature values.

A first temperature value B1 is less than the first reference temperature value TR1. Therefore, when the measured temperature value T is the first temperature value B1, the controller 4260 may determine that the heat dissipating operation is not necessary.

A second temperature value B2 is greater than or equal to the first reference temperature value TR1 and less than the second reference temperature value TR2. Therefore, when the measured temperature value T is the second temperature value B2, the controller 42600 may determine that the heat dissipating operation is necessary.

A third temperature value B3 is greater than or equal to the second reference temperature value TR2. Therefore, when the measured temperature value T is the third temperature value B3, the controller 42600 may determine that the heat dissipating operation is urgently required.

When the controller 42600 has determined the heat dissipating operation to be unnecessary, the controller 42600 does not obtain the heat dissipation request message. In this case, if the heat dissipating operation is in progress, the controller 42600 may control the heat dissipating operation, which is in progress, to be stopped. Then, the controller 42600 may obtain temperature information again.

Next, the controller 42600 may obtain a heat dissipation request message (S47300).

When the controller 42600 has determined the heat dissipating operation to be necessary, the controller 42600 may obtain a general heat dissipation request message. Here, the general heat dissipation request message may not necessarily mean that the heat dissipating operation is performed (S47310).

When the controller 42600 has determined the heat dissipating operation to be urgently required, the controller 42600 may obtain an urgent heat dissipation request message. When the urgent heat dissipation request message is obtained, the controller 42600 may perform the heat dissipating operation (S47320). When the urgent heat dissipation request message is obtained, the controller may perform the heat dissipating operation after the heat dissipation permission message is determined to have been obtained or regardless of whether the heat dissipation permission message has been obtained.

Figure 107:
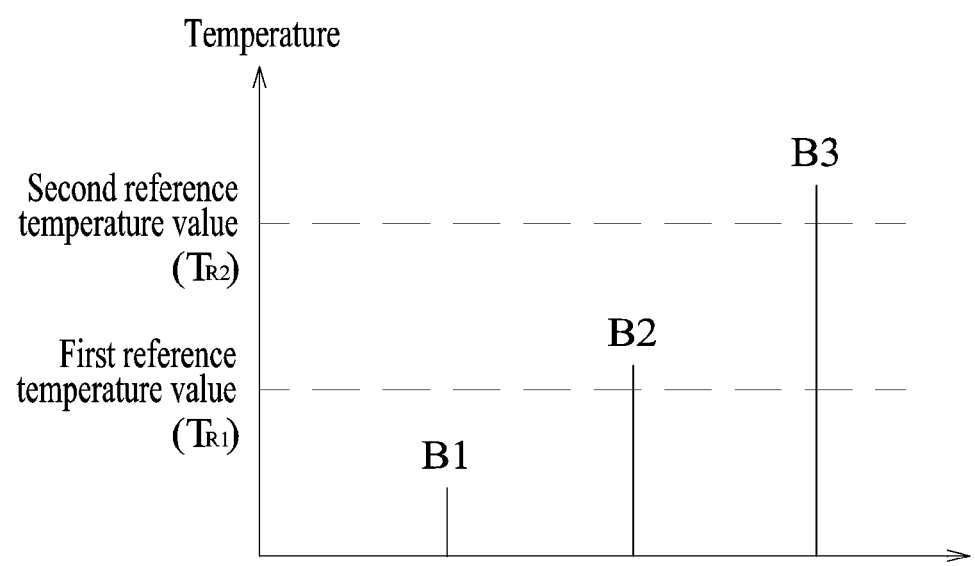
FIG. 107 is a graph related to a reference temperature value related to the obtaining of the heat dissipation request message according to an embodiment of the present invention.

Referring to FIG. 107, when the temperature value T measured by the temperature sensor has a size of the first temperature value B1, the controller 42600 does not obtain the heat dissipation request message. When the measured temperature value T has a size of the second temperature value B2, the controller 42600 obtains the general heat dissipation request message. When the measured temperature value T has a size of the third temperature value B3, the controller 42600 obtains the urgent heat dissipation request message.

The general heat dissipation request message and the urgent heat dissipation request message may include information on an intensity of a heat dissipating operation. Intensities of a heat dissipating operation included in the general heat dissipation request message and the urgent heat dissipation request message may be different from each other. For example, the fact that the urgent heat dissipation request message has been provided may mean that the heat dissipating operation should be performed at a stronger intensity. Therefore, the heat dissipating operation intensity included in the urgent heat dissipation request message may be an intensity stronger than that of the heat dissipating operation included in the general heat dissipation request message.

Here, when there is correction on an intensity of thermal feedback, the reference temperature value may vary corresponding to the correction.

The second reference temperature value TR2 may be maintained to a predetermined value even if there is correction on an intensity of thermal feedback. The second reference temperature value TR2 is a temperature value set in relation to device durability and user safety. Therefore, the second reference temperature value TR2 may be maintained to a predetermined value regardless of correction of an intensity of thermal feedback.

The first reference temperature value TR1 may have to be changed according to correction on an intensity of thermal feedback. When the thermal feedback intensity increases, an amount of generated heat provided to the contact portion 42400 due to exothermic feedback increases. Accordingly, the temperature of the contact portion 42400 increases when the exothermic feedback is provided. The user may sense hot feedback through the increased temperature of the contact portion 42400. In this case, since the temperature of the contact portion 42400 increases, a temperature value of the contact portion 42400 degrading the sensitivity of hot feedback may also increase. Therefore, there is a need to correct the first reference temperature value TR1 to be increased. To this end, for example, the controller 42600 may store a table in which intensities of thermal feedback and the first reference temperature value TR1 corresponding thereto are set in the internal memory. When the controller 42600 recognizes that there is correction on an intensity of thermal feedback, the controller 42600 may refer to the table and load the first reference temperature value TR1 corresponding to the corrected intensity of thermal feedback. The controller 42600 may determine, on the basis of the obtained first reference temperature value TR1, whether the heat dissipation request message has been obtained.

4.3. Heat Dissipation Permission Message

Hereinafter, obtaining a heat dissipation permission message in the special effect control system according to an embodiment of the present invention will be described using a specific embodiment.

Figure 108:
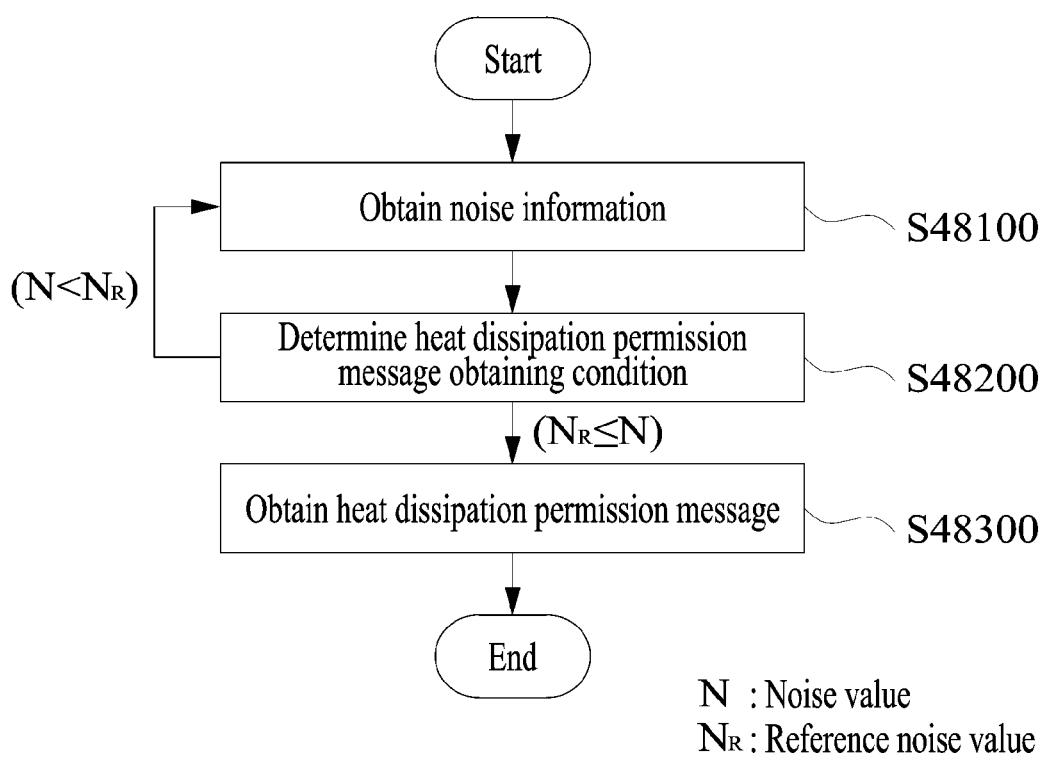
FIG. 108 is a flowchart related to a method of obtaining a heat dissipation permission message according to an embodiment of the present invention.

Referring to FIG. 108, as an embodiment of a method of obtaining a heat dissipation permission message, a flowchart of a method using a degree of noise around a special effect is shown.

When the heat dissipation module 42500 is driven, for example, noise may be generated due to driving of a heat dissipation fan. The generated noise may be a factor interfering with enjoyment of multimedia content. Therefore, there is a need to minimize the generated noise. To this end, the heat dissipating operation may be designed to be performed only when noise generated around the special effect chair 42000 by audiovisual video or other special effects provided to the user is sufficiently loud.

First, the controller 42600 may obtain noise information (S48100). The controller 42600 may determine whether the obtained noise information satisfies a heat dissipation permission message obtaining condition (S48200). The controller 42600 may obtain a heat dissipation permission message (S48300).

Hereinafter, each step will be described in detail.

First, the controller 42600 may obtain noise information (S48100).

The controller 42600 may be connected to a noise sensor. The noise sensor may measure a volume of noise generated around the special effect chair 42000. The controller 42600 may receive a noise value N indicating the volume of noise from the noise sensor.

The controller 42600 may determine whether the obtained noise information satisfies a heat dissipation permission message obtaining condition (S48200).

The controller 42600 may store a reference noise value NR. The reference noise value NR refers to a degree of noise that is determined not to interfere with the user's immersion even when the heat dissipating operation is performed since sufficiently loud noise is being generated in surroundings. Here, although there may be one or more reference noise values NR having different values, for convenience of description, description will be given assuming that there is only one reference noise value NR. The controller 42600 may compare the noise value N measured from the noise sensor with the reference noise value NR. When the measured noise value N is less than the reference noise value NR, the controller 42600 may determine that the heat dissipating operation should not be performed. In this case, the controller 42600 is unable to obtain the heat dissipation permission message. The controller 42600 may obtain noise information again.

When the measured noise value N is greater than or equal to the reference noise value NR, the controller 42600 may determine that performing the heat dissipating operation is acceptable.

The controller 42600 may obtain the heat dissipation permission message (S48300).

When the controller 42600 has determined that it is okay to perform the heat dissipating operation, the controller 42600 may obtain the heat dissipation permission message.

The fact that the heat dissipation permission message is obtained does not necessarily mean that the heat dissipation module 42500 performs the heat dissipating operation.

Figure 109:
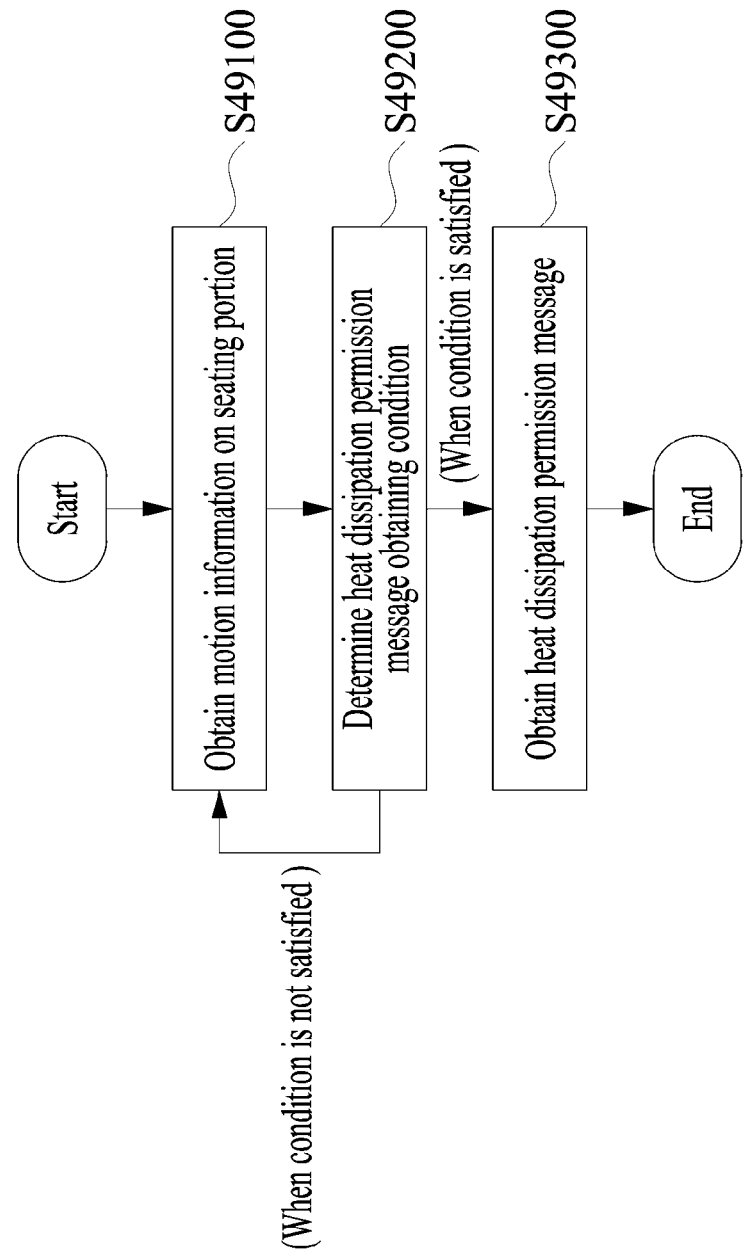
FIG. 109 is a flowchart related to a method of obtaining a heat dissipation permission message according to an embodiment of the present invention.

Hereinafter, as another embodiment of obtaining a heat dissipation permission message, a method utilizing motion information such as rotation/vibration of the seating portion 42200 will be described with reference to FIG. 109.

First, the controller 42600 may obtain motion information on the seating portion 42200 (S49100). Then, the controller 42600 may determine whether the obtained motion information satisfies a heat dissipation permission message obtaining condition (S49200). The controller 42600 may obtain the heat dissipation permission message (S49300).

Hereinafter, each step will be described in detail.

First, the controller 42600 may obtain motion information on the seating portion 42200 (S49100).

There may be various methods in which the controller 42600 obtains motion information. For example, motion information on the seating portion 42200 may be included in motion data. The motion information may include information on a time point at which a motion effect including rotation/vibration of the seating portion 42200 starts and a time point at which the motion effect stops. The controller 42600 may receive the motion data from the central control device 41000. The controller 42600 may interpret the motion data to obtain the motion information.

As another example in which the controller 42600 obtains motion information, the controller 42600 may be connected to an acceleration sensor. The acceleration sensor may sense a change in an acceleration that is generated when the seating portion 42200 performs an operation such as rotation/vibration. The controller 42600 may receive acceleration information from the acceleration sensor. The controller 42600 may interpret/process the acceleration information to obtain motion information on the seating portion 42200. The motion information may include information on an extent to which the rotation/vibration occurs in the seating portion 42200.

Next, the controller 42600 may determine whether the obtained motion information satisfies a heat dissipation permission message obtaining condition (S49200).

For example, when the obtained motion information is information obtained from motion data, the controller 42600 may compare the current time with the motion information.

The controller 42600 may know the current time. When the current time has not reached the motion effect start time point, or when the current time has reached the motion effect stop time point (includes the case in which the current time and the motion effect stop time point are the same or the case in which the current time has passed the motion effect stop time point), the controller 42600 may determine that the heat dissipating operation should not be performed. When the current time has reached the motion effect start time point but has not reached the motion effect stop time point, the controller 42600 may determine that it is okay to perform the heat dissipating operation.

As another example, when the obtained motion information is information obtained from the acceleration sensor, the controller 42600 may use a reference acceleration value. The reference acceleration value refers to an acceleration value in which acceleration is carried out to an extent that does not interfere with the user's immersion even when the heat dissipating operation is performed when the rotation/vibration of the seating portion 42200 occurs. Although there may be one or more reference acceleration values having different values, for convenience of description, description will be given assuming that there is only one reference acceleration value.

When the acceleration value measured from the acceleration sensor is less than the reference acceleration value, the controller 42600 may determine that the heat dissipating operation should not be performed. In this case, the controller 42600 is unable to obtain the heat dissipation permission message. The controller 42600 may obtain motion information of the seating portion 42200 again.

When the acceleration value measured from the acceleration sensor is greater than or equal to the reference acceleration value, the controller 42600 may determine that it is okay to perform the heat dissipating operation.

The controller 42600 may obtain the heat dissipation permission message (S49300).

When the controller 42600 has determined that it is okay to perform the heat dissipating operation, the controller 42600 may obtain the heat dissipation permission message. The fact that the heat dissipation permission message is obtained does not necessarily mean that the heat dissipating operation will be performed.

5. Method of Sensing Whether User is Seated

The special effect control system according to an embodiment of the present invention may sense whether a user is seated on the seating portion 42200 and use the obtained seating information to control thermal feedback and a heat dissipating operation to only be performed in a special effect chair 42000 on which the user is seated.

A considerable amount of electricity is consumed in driving of the special effect chair 42000. The special effect control system may minimize electricity consumption by preventing special effects including thermal feedback from being provided to special effect chairs 42000 on which users are not seated.

In order to sense whether a user is seated, the special effect chair 42000 may further include a seating sensor. The seating sensor may be communicatively connected with the controller 42600.

For example, the seating sensor may be a pressure sensor disposed at the seating portion 42200. The present sensor may determine whether a user is seated by sensing a weight of the seated user. Alternatively, the seating sensor may be a sensor measuring a bio-signal. When the user is seated, the bio-signal sensor may come in contact with a portion of the user's body to measure a bio-signal, thereby determining whether the user is seated. Alternatively, the seating sensor may be a sensor measuring a change in electrical resistance.

The special effect control system according to another embodiment of the present invention may use movie theater seat use information to sense whether a user is seated. Generally, a movie theater collects seat use information through reservation information or the like in order to prevent seats from being double-booked and to obtain a seat occupancy rate. The special effect control system may receive the seat use information from a server in which the seat use information is stored. The central control device 41000 may use the seat use information to determine whether a user is seated on each special effect chair 42000.

The central control device 41000 may only provide special effect data including thermal feedback and heat dissipation data to special effect chairs 42000 determined to have users seated thereon.

The special effect control system may continuously sense whether a user is seated. For example, when the user leaves a special effect chair 42000 during reproduction of multimedia content, an operation of the corresponding special effect chair 42000 should be stopped. Therefore, the controller 42600 may control each special effect providing device to stop provision of special effects.

According to circumstances, since special effects are continuously being provided in other adjacent special effect chairs 42000, separately stopping the operation of only the special effect chair 42000 that the user has left may be rather dangerous. Therefore, the controller 42600 may control special effects to be continuously provided to the special effect chair 42000 even after the user has left. Whether to stop special effects in a special effect chair when a user has left the special effect chair may have been preset and stored in the central control device 41000 or the controller 42600 in the special effect chair 42000 according to a situation in a movie theater.

The method according to an embodiment may be implemented as program instructions executable by a variety of computers and may be recorded on a computer-readable medium. The computer-readable recording medium may include a program instruction, a data file, a data structure, or a combination thereof. The program instruction recorded in the medium may be designed and configured specially for the embodiment or may be publicly known and available to those skilled in the field of computer software. Examples of the computer-readable recording medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a read-only memory (ROM), a random access memory (RAM), a flash memory, etc. Examples of the program instructions include not only machine code generated by a compiler or the like but also high-level language codes that may be executed by a computer using an interpreter or the like. The hardware device may be configured as at least one software module in order to perform operations of the embodiment and vice versa.

Although the present invention has been described with reference to specific embodiments and features, it will be appreciated that various variations and modifications can be made from the invention by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, embodiments, and equivalents are within the scope of the following claims.

The invention claimed is:

1. A method for providing a thermal experience to a user using a feedback device, wherein the feedback device includes a thermoelectric element performing a thermoelectric operation, and a contact surface contacting with the user's body part and transferring heat generated by the thermoelectric operation to the user, the method comprising:

reproducing a multimedia content including a video data related to a video and a thermal feedback data related to a thermal feedback corresponding to a specific scene of the video, wherein the thermal feedback includes at least one of a hot feedback and a cold feedback;

obtaining a thermoelectric operation start time point being set as a time point preceding an output time point of the specific scene by considering a correction time corresponding to a time from an initiation of a thermoelectric operation for the thermal feedback to a user's experience for the thermal feedback; and when a reproduction time point of the multimedia content reaches the thermoelectric operation start time point, applying power to the thermoelectric element so that the thermal feedback corresponding to the specific scene is provided to the user in conjunction with the specific scene at the output time point of the specific scene.

2. The method of claim 1, wherein the correction time is determined by considering at least one of a type of the thermal feedback and an intensity of the thermal feedback.

3. The method of claim 2, wherein the correction time corresponding to the hot feedback is different from the correction time corresponding to the cold feedback.

4. The method of claim 2, wherein the correction times corresponding to a first intensity and a second intensity stronger than the first intensity for the same type of the thermal feedback are different from each other.

5. The method of claim 1, wherein the method further comprises:
applying power to the thermoelectric element at a predetermined time point to output a calibration thermal feedback;
obtaining a first user input indicating an experiencing time point, wherein the experiencing time point is a time point at which the contact surface reaches an experiencing temperature that the user experiences the calibration thermal feedback; and
calculating the correction time by using the predetermined time point and the experiencing time point.

6. The method of claim 5, wherein the method further comprises:
outputting the thermal feedback in order from a weak intensity to a strong intensity among a plurality of intensities of the thermal feedback;
obtaining a second user input indicating user recognition for the thermal feedback;
setting an intensity of the thermal feedback outputted at the time of the obtaining the second user input to a lowest intensity of the thermal feedback;
when the thermal feedback is outputted at a certain intensity among the plurality of intensities after obtaining the second user input, obtaining a third user input;
setting an intensity of the thermal feedback outputted at the time of the obtaining the third user input to a highest intensity of the thermal feedback;
setting at least one intermediate intensity for the thermal feedback between the lowest intensity and the highest intensity; and
outputting the thermal feedback by using the lowest intensity, the highest intensity and the at least one intermediate intensity.

7. The method of claim 1, wherein the thermoelectric operation start time point precedes the reproduction time point of the specific scene by the correction time.

8. A feedback device for providing a thermal experience to a user, wherein the thermal experience is provided to the user in reproducing a multimedia content including a video data related to a video and a thermal feedback data related to a thermal feedback corresponding to a specific scene of the video, and the thermal feedback includes at least one of a hot feedback and a cold feedback, the device comprising:
a thermoelectric element performing a thermoelectric operation; and
a feedback controller for controlling the thermoelectric element,
wherein the feedback controller is configured to:
obtain a thermoelectric operation start time point being set as a time point preceding an output time point of the specific scene by considering a correction time corresponding to a time from an initiation of a thermoelectric operation for the thermal feedback to a user's experience for the thermal feedback; and
when a reproduction time point of the multimedia content reaches the thermoelectric operation start time point, apply power to the thermoelectric element so that the thermal feedback corresponding to the specific scene is provided to the user in conjunction with the specific scene at the output time point of the specific scene.

9. The device of claim 8, wherein the correction time is determined by considering at least one of a type of the thermal feedback and an intensity of the thermal feedback.

10. The device of claim 9, wherein the correction time corresponding to the hot feedback is different from the correction time corresponding to the cold feedback.

11. The device of claim 9, wherein the correction times corresponding to a first intensity and a second intensity stronger than the first intensity for the same type of the thermal feedback are different from each other.

12. The device of claim 8, wherein the feedback controller is further configured to:
apply power to the thermoelectric element at a predetermined time point to output a calibration thermal feedback;
obtain a first user input indicating an experiencing time point, wherein the experiencing time point is a time point at which a contact surface reaches an experiencing temperature that the user experiences the calibration thermal feedback; and
calculate the correction time by using the predetermined time point and the experiencing time point.

13. The device of claim 12, wherein the feedback controller is further configured to:
output the thermal feedback in order from a weak intensity to a strong intensity among a plurality of intensities of the thermal feedback;
obtain a second user input indicating user recognition for the thermal feedback;
set an intensity of the thermal feedback outputted at the time of the obtaining the second user input to a lowest intensity of the thermal feedback;
when the thermal feedback is outputted at a certain intensity among the plurality of intensities after obtaining the second user input, obtain a third user input;
set an intensity of the thermal feedback outputted at the time of the obtaining the third user input to a highest intensity of the thermal feedback;
set at least one intermediate intensity for the thermal feedback between the lowest intensity and the highest intensity; and
output the thermal feedback by using the lowest intensity, the highest intensity and the at least one intermediate intensity.

14. The device of claim 8, wherein the thermoelectric operation start time point precedes the reproduction time point of the specific scene by the correction time.

* * * * *